United States Patent [19]
Tran

[11] Patent Number: 5,822,574
[45] Date of Patent: Oct. 13, 1998

[54] FUNCTIONAL UNIT WITH A POINTER FOR MISPREDICTED RESOLUTION, AND A SUPERSCALAR MICROPROCESSOR EMPLOYING THE SAME

[75] Inventor: Thang M. Tran, Austin, Tex.

[73] Assignee: Advanced Micro Devices, Inc., Sunnyvale, Calif.

[21] Appl. No.: 819,109

[22] Filed: Mar. 17, 1997

Related U.S. Application Data

[63] Continuation of Ser. No. 420,664, Apr. 12, 1995, abandoned.

[51] Int. Cl.⁶ ........................................ G06F 9/38
[52] U.S. Cl. .................... 395/580; 395/800.23; 395/393; 395/391; 395/582; 395/584; 395/586
[58] Field of Search ................... 395/800, 392, 395/391, 580, 581, 582, 583, 584, 500

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 395/402 |
| 4,807,115 | 2/1989 | Torng | 395/75 |
| 4,833,599 | 5/1989 | Colwell et al. | 395/583 |
| 4,858,105 | 8/1989 | Kuriyama et al. | 395/375 |
| 4,928,223 | 5/1990 | Dao et al. | |
| 5,053,631 | 10/1991 | Perlman et al. | |
| 5,058,048 | 10/1991 | Gupta et al. | |
| 5,129,067 | 7/1992 | Johnson | |
| 5,136,697 | 8/1992 | Johnson | 395/375 |
| 5,226,126 | 7/1993 | McFarland et al. | 395/375 |
| 5,226,130 | 7/1993 | Favor et al. | 395/375 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 0 661 625 A2 | 7/1995 | European Pat. Off. . |
| 0 686 913 A2 | 12/1995 | European Pat. Off. . |
| 2263985 | 8/1993 | United Kingdom . |
| 2263987 | 8/1993 | United Kingdom . |
| 2281422 | 3/1995 | United Kingdom . |
| 90/10267 | 9/1990 | WIPO . |

OTHER PUBLICATIONS

Popescu et al "The Metaflow Architecture" Jun. 1991, IEEE.
Tomasulo; An Efficient Algorithm for Exploiting Multiple Arithmetic Units 1982.
Jourdan et al An Investigation of Performance of Various Instructions—Issue Buffer Topologies.
Patt et al. "Critical Issues Regarding HPS, A HIgh Performance Micro Architecture", 1985 IEEE.
Wallace et al. Design and Implementation of 100 MHz ReOrder Buffer, 1995 ITE.
Jourdan et al. "A High Out of Order Issue Symetric Superpipeline Super Scalar Microprocessor" 1994; IEEE.

(List continued on next page.)

Primary Examiner—Larry D. Donaghue
Attorney, Agent, or Firm—Conley, Rose & Tayon; B. Noel Kivlin; Lawrence J. Merkel

[57] ABSTRACT

A superscalar microprocessor is provided having functional units which receive a pointer (a reorder buffer tag) which is compared to the reorder buffer tags of the instructions currently being executed. The pointer identifies the oldest outstanding branch instruction. If a functional unit's reorder buffer tag matches the pointer, then that functional unit conveys its corrected fetch address to the instruction fetching mechanism of the superscalar microprocessor (i.e. the branch prediction unit). The superscalar microprocessor also includes a load/store unit which receives a pair of pointers identifying the oldest outstanding instructions which are not in condition for retirement. The load/store unit compares these pointers with the reorder buffer tags of load instructions that miss the data cache and store instructions. A match must be found before the associated instruction is presented to the data cache and the main memory system. The pointer-compare mechanism provides an ordering mechanism for load instructions that miss the data cache and store instructions.

22 Claims, 61 Drawing Sheets

U.S. PATENT DOCUMENTS

| | | | |
|---|---|---|---|
| 5,367,703 | 11/1994 | Leviton | 395/800 |
| 5,404,470 | 4/1995 | Miyake | 395/325 |
| 5,434,985 | 7/1995 | Emma et al. | 395/375 |
| 5,454,117 | 9/1995 | Puziol et al. | 395/800 |
| 5,463,745 | 10/1995 | Vidimans et al. | 395/375 |
| 5,524,224 | 6/1996 | Denwom et al. | 395/375 |
| 5,535,346 | 7/1996 | Thomas, Jr. | 395/375 |
| 5,559,976 | 9/1996 | Song | 395/375 |
| 5,560,032 | 9/1996 | Nguyen et al. | 395/800 |
| 5,561,776 | 10/1996 | Popescu et al. | 395/375 |
| 5,574,935 | 11/1996 | Vidwons et al. | 395/800 |

OTHER PUBLICATIONS

Sohi, "Instruction Issue Logic for High Performance, Interruptible, Multiple Functional Unit, Pipelined Computers"; 1990; IEEE.

Picket, et al., "Enhanced Superscalar Hardware: The Schedule Table", Proceedings of the Supercomputing Conference, Portland, Nov. 15–19, 1993, Institute of Electrical and Electronics Engineers, pp. 636–644, XP000437401.

Diefendorff, et al., "Organization of the Motorola 88110 Superscalar Risc Microprocessor", IEEE Micro, vol. 12, No. 2, Apr. 1, 1992, pp. 40–63, XP000266192.

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

Example of sequence of 2 byte instructions.

| Cycle | issue range | issue1 0:2 | issue2 1:4 | issue3 3:7 | issue4 6:10 | issue5 9:12 | issue6 12:15 |
|---|---|---|---|---|---|---|---|
| 1 | line# startB | line/ax 0 | line/ax 2 | line/ax 4 | line/ax 6 | line/ax | line/ax |
| 2 | line# startB | line/ax | line/ax | line/ax | line/ax 8 | line/ax 10 | line/ax 12 |
| 3 | line# startB | line/ax | line/ax | line/ax | line/ax | line/ax | line/ax 14 |

Fig. 11

Example of sequence of 1 byte instructions.

| Cycle | issue range | issue1 0:2 | issue2 1:4 | issue3 3:7 | issue4 6:10 | issue5 9:12 | issue6 12:15 |
|---|---|---|---|---|---|---|---|
| 1 | line# startB | line/ax 0 | line/ax 1 | line/ax | line/ax | line/ax | line/ax |
| 2 | line# startB | line/ax 2 | line/ax 3 | line/ax 4 | line/ax | line/ax | line/ax |
| 3 | line# startB | line/ax | line/ax | line/ax 5 | line/ax 6 | line/ax | line/ax |
| 4 | line# startB | line/ax | line/ax | line/ax 7 | line/ax 8 | line/ax 9 | line/ax |
| 5 | line# startB | line/ax | line/ax | line/ax | line/ax 10 | line/ax 11 | line/ax 12 |

Fig. 12

| Address | Instruction | #bytes |
|---|---|---|
| line ex | | |
| 46d7e3 | INC ESI | 1 |
| | cmp byte[esi] | 3 |
| | jz | 2 |
| 46d7e9 | cmp byte[esi] | 2 |
| | jz | 2 |
| | inc[edx] | 2 |
| 46d7ee | or ecx.ecx | 2 |

| | | |
|---|---|---|
| line fx | | |
| | jz | 2 |
| 46d7f4 | mov al[esi] | 2 |
| | mov [ecx],al | 2 |
| | inc ecx | 1 |
| 46d7f9 | inc esi | 1 |
| | cmp byte[esi] | 3 |
| | jnz | 2 |
| 46d7ff | inc dw [ecx] | 2 |

| | | |
|---|---|---|
| line 0x | | |
| | or ecx, ecx | 1 |
| | jnz | 2 |
| 46d805 | mov b[ecx] | 2 |
| | inc ecx | 1 |
| 46d809 | cmp byte[ecx] | 3 |
| | jnz | 2 |
| 46d80e | inc esi | 1 |
| | sub edi.edi | 2 |

| | | |
|---|---|---|
| line 1x | | |
| 46d811 | cmp byte [esi] | 2 |
| | jz 46d8d0 | 6 |
| 46d81a | mov al,[esi] | 2 |
| | cmp al,20 | 2 |
| | jz | 2 |

Fig. 13

| Cycle | issue range | issue1 0:2 | issue2 1:4 | issue3 3:7 | issue4 6:10 | issue5 9:12 | issue6 12:15 |
|---|---|---|---|---|---|---|---|
| 1 | line# startB | line/ex 3 | line/ex 4 | line/ex 7 | line/ex 9 | line/ex 11 | line/ex 13 |
| 2 | line# startB | line/fx 2 | line/fx 4 | line/fx 6 | line/fx 8 | line/fx 9 | |
| 3 | line# startB | | | | | line/fx 10 | line/fx 13 |
| 4 | line# startB | line/0x 1 | line/0x 2 | line/0x 4 | line/0x 6 | line/0x | line/0x |
| 5 | line# startB | line/0x | line/0x | line/0x 7 | line/0x 10 | line/0x 12 | line/0x 13 |
| 6 | line# startB | line/1x 1 | line/1x 3 | line/1x | line/1x 9 | line/1x 11 | line/1x 13 |
| 7 | line# startB | line/1x 15 | line/2x open | line/2x open | line/2x open | line/2x open | line/2x open |

Fig. 14

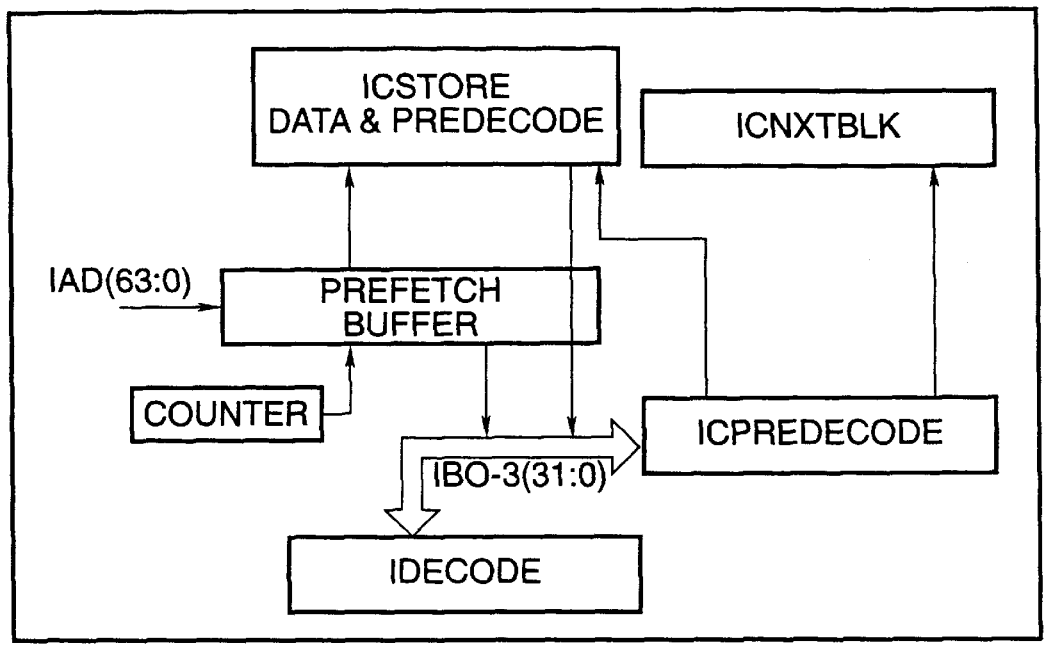
Fig. 17
Fig. 18
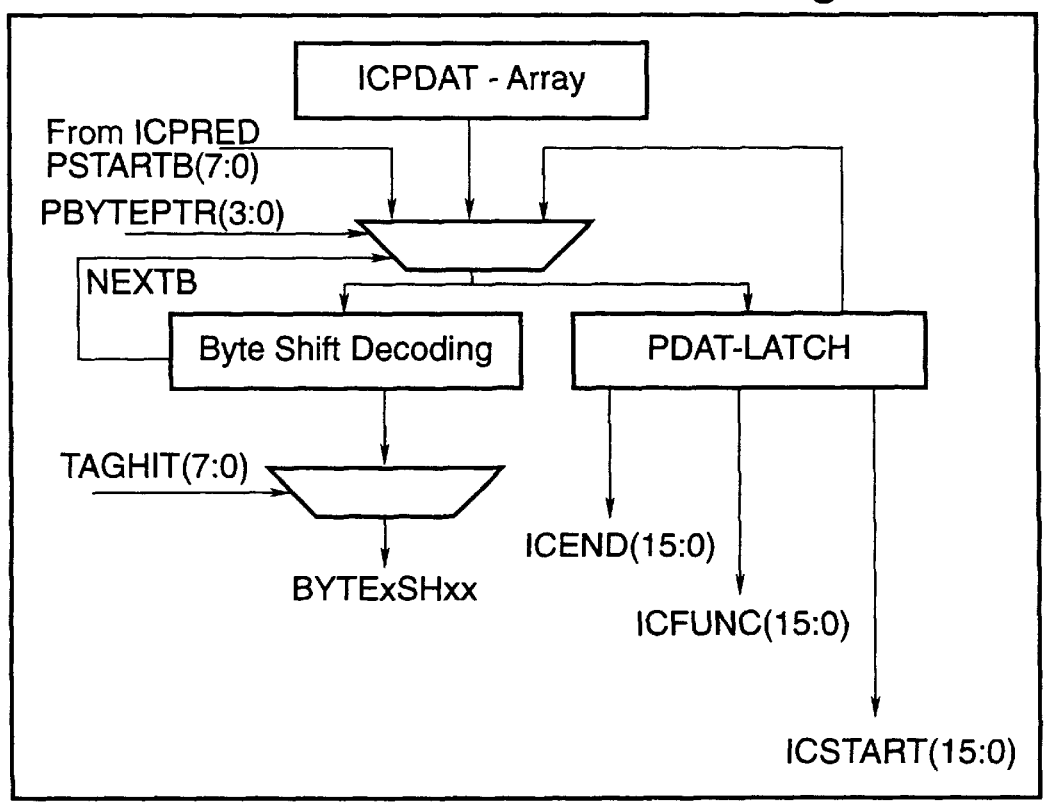

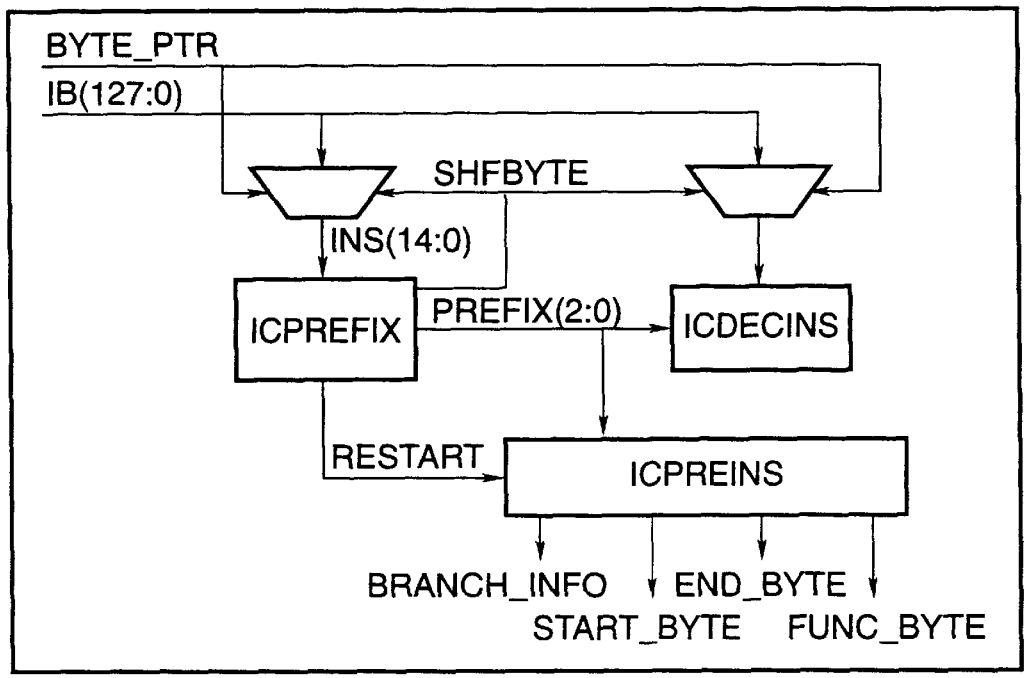
Fig. 23
Fig. 24
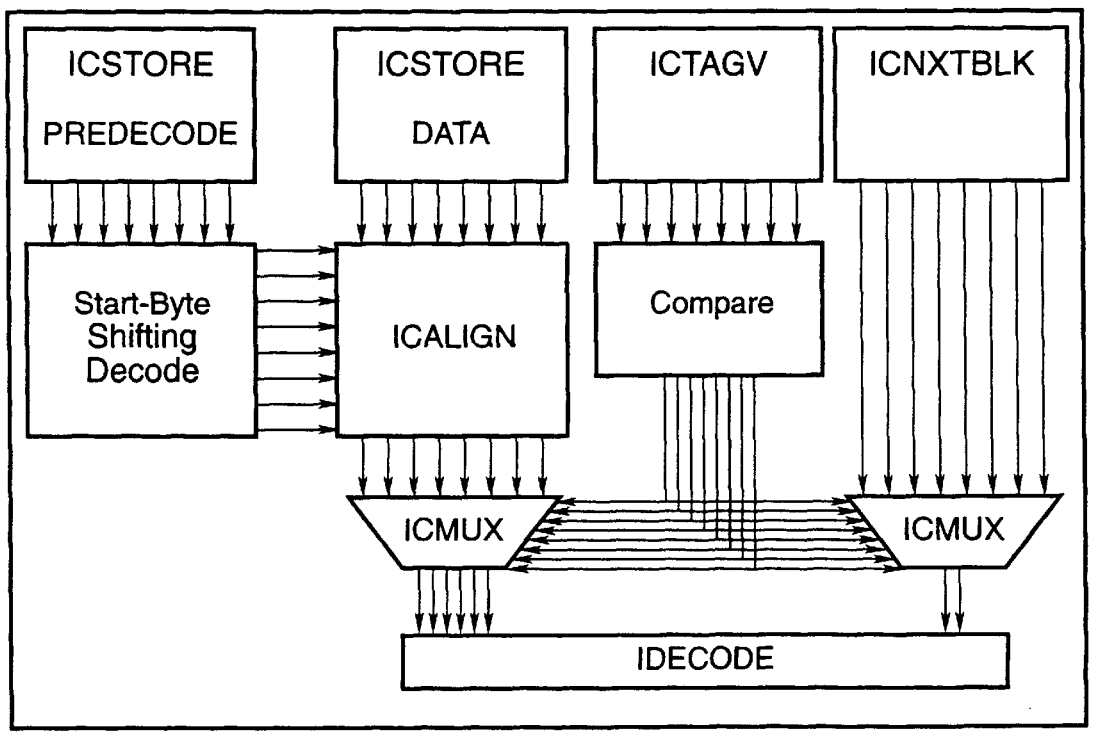

Fig. 33
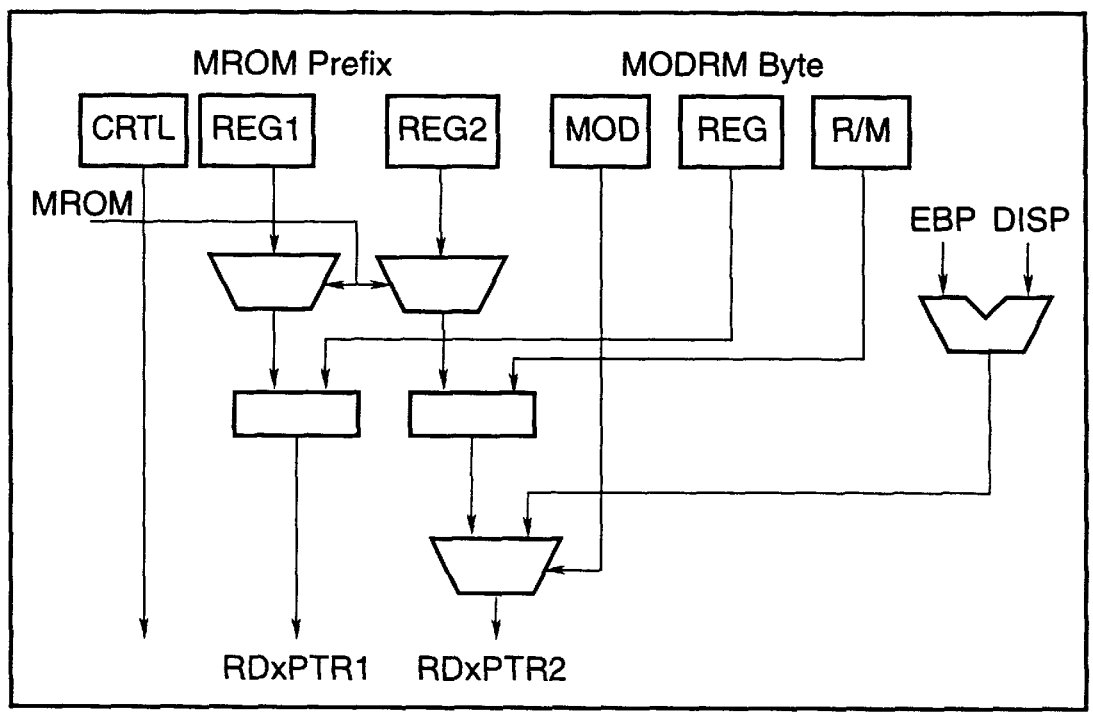
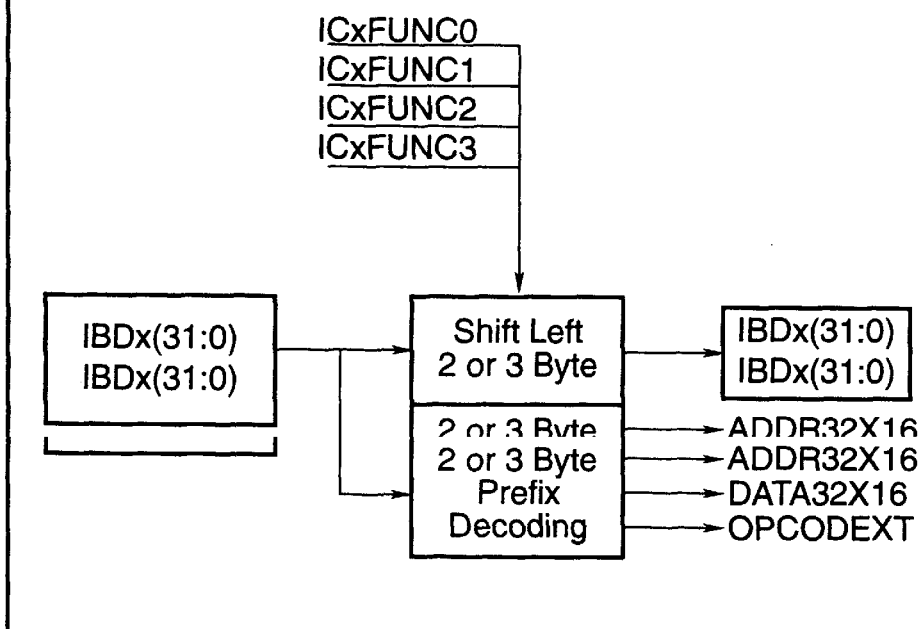
Fig. 34

Reservation Station Timing

Fig. 52

Examples of Operand Steering, Status Bits, and Where Data Comes From:

| | VAtag | Atag | VAopd laxdat | Aopnd/EIP laxdat | VDISP | dispAxB | Disp | Jcc | VBtag | Btag | VBopnd laxdat | Bopd/CC laxdat | | FTag |
|---|---|---|---|---|---|---|---|---|---|---|---|---|---|---|
| ADD EAX,immed | 1 | CLDCK | 0 0 | null | 0 | 0 | null | 0 | 0 | null | 1 0 | immed | 0 | null |
| ADD EAX,immed | 1 | LOROB | 0 0 | null | 0 | 0 | null | 0 | 0 | null | 1 0 | immed | 0 | null |
| ADD EAX,immed | 0 | null | 1 0 | ROBDAT | 0 | 0 | null | 0 | 0 | null | 1 0 | immed | 0 | null |
| ADD EAX,immed | 0 | null | 1 0 | REGF | 0 | 0 | null | 0 | 0 | null | 1 0 | immed | 0 | null |
| SUB [EBP+disp],EDX | 1 | CLDCK | 0 0 | null | 1 | 0 | null | 0 | 1 | CLDCK | 0 0 | null | 0 | null |
| SUB [EBP+disp],EDX | 1 | ROBDCK | 0 0 | null | 1 | 0 | null | 0 | 1 | CLDCK | 0 0 | null | 0 | null |
| SUB [EBP+disp],EDX | 0 | null | 1 1 | LA | 1 | 0 | null | 0 | 1 | CLDCK | 0 0 | null | 0 | null |
| SUB [EBP+disp],EDX | 0 | null | 1 0 | SC | 1 | 0 | null | 0 | 1 | ROBDCK | 0 0 | null | 0 | null |
| ADC ECX,[EAX+disp] | 0 | null | 1 0 | REGF | 1 | 1 | dis | 0 | 0 | null | 1 0 | REGF | 0 | null |
| ADC [EAX+disp],imm | 1 | ROBDCK | 0 0 | null | 1 | 1 | dis | 0 | 0 | null | 1 0 | immed | 0 | null |
| ADC ECX,[EAX] | 1 | CLDCK | 0 0 | null | 0 | 1 | null | 0 | 0 | null | 1 1 | REGF | 0 | null |
| JNZ rel8 | 0 | null | 1 0 | Decode | 0 | 0 | rel | 1 | 1 | Decode | 1 0 | decode | 1 | flag |
| JNZ rel8 | 0 | null | 1 0 | Decode | 0 | 0 | rel | 1 | 0 | ROBDAT | 1 0 | decode | 1 | flag |
| JMP near indirect | 0 | null | 1 0 | REGF | 0 | 0 | null | 0 | 0 | null | 1 0 | zero | 0 | null |
| JMP near indirect | 1 | CLDCK | 0 0 | null | 0 | 0 | null | 0 | 0 | null | 1 0 | zero | 0 | null |

Legend:
Vatag    valid A tag (1 bit)
Atag     A tag (6 bits)
Vaopd    valid A operand (1 bit)
laxdat   linear addr or data (1 bit)
Aopnd/EIP A operand or EIP (32bits)
VDISP    valid displacement (1bit)
Disp     Displacement (32 bits)

JCC      Conditional branch info on B side (1 bit)
Vbtag    valid B tag (1 bit)
Btag     B tag (6 bits)
Vbopnd   valid B operand (1 bit)
Bopd/CC  B operand or branch condition code (32 bits)
Vftag    valid flag tag (1 bit)
Ftag     flag tag(6 bits)

LDSTBUF Entry:

| V | DTAG | LA | LV | DATA | DV | SZ | M | D | ENT_N | Misc |
|---|---|---|---|---|---|---|---|---|---|---|
| 1 | 5 | 32 | 1 | 32 | 1 | 2 | 1 | 1 | 4 | ? |

V - Entry Valid Bit

DTAG - Instruction dispatch tag

LA - Linear Address

LV - Linear Address Valid Bit

DATA - Store Data

DV - Store Data Valid Bit

SZ - Data Operand Size

M - Miss. Entry set with this bit missed in the Data Cache during an earlier access D - Dependent. The load is dependent on a store in the buffer ENT_N - Entry number of the store the load is dependent on Misc. - Control bits to be identified

Fig. 55

Relative Position of LSSEC wrt other units

Timing diagram for one/two cycle aligned dcache load access

Fig. 65 Timing diagram for one/two cycle aligned dcache store access

Timing diagram for unaligned load access

Timing diagram for DC/SC line transfers

FUNCTIONAL UNIT WITH A POINTER FOR MISPREDICTED RESOLUTION, AND A SUPERSCALAR MICROPROCESSOR EMPLOYING THE SAME

This application is a continuation of application Ser. No. 08/420,664, filed Apr. 12, 1995, now abandoned.

BACKGROUND OF THE INVENTION

1. Field of the Invention

This invention relates to the field of superscalar microprocessors and, more particularly, to branch misprediction recovery and load/store retirement.

2. Description of the Relevant Art

Superscalar microprocessors achieve high performance by executing multiple instructions simultaneously using the shortest possible clock cycle. As used herein, the term "clock cycle" refers to the interval of time that a superscalar microprocessor requires to complete the various tasks employed within its pipeline (for example, the processing of instructions). Two features important to high performing superscalar microprocessors are branch prediction and out-of-order execution.

Branch prediction is the process of speculatively selecting the direction that a branch instruction will select before the branch instruction is executed. Microprocessors execute instructions sequentially: when a first instruction is executed, the second instruction to be executed is the instruction stored in memory adjacent to the first instruction. Branch instructions, however may cause the next instruction to be executed to be either the next sequential instruction, or alternatively an instruction which resides in another memory location that is specified by the branch instruction. The memory location specified by the branch instruction is typically referred to as the "target" of the branch. Which of the instructions is selected for execution typically depends on a condition that the branch instruction tests. An exemplary tested condition is the value stored in a register, wherein the branch target is selected if the register contains zero and the next sequential instruction is selected if the register does not contain zero. It is noted that some branch instructions do not test a condition. Unconditional branches always select the target path, and typically no instructions are specifically encoded into the next sequential memory locations.

Branches occur relatively frequently in computer programs. In order to continue executing large numbers of instructions simultaneously, superscalar microprocessors predict which direction (or which "path") each branch instruction will select: next sequential or target. The microprocessor then speculatively executes instructions residing on the predicted path. If the superscalar microprocessor "mispredicts" the path that a branch instruction selects, the speculatively executed results are discarded and the correct path is fetched and executed. Various branch prediction mechanisms are well-known.

Because branch instruction mispredictions occur, a misprediction recovery mechanism is necessary. A misprediction recovery mechanism is a mechanism which causes the corrected fetch address to be fetched from the cache and the associated instructions to be dispatched to the instruction processing pipelines. The corrected fetch address is the address generated by the branch instruction for locating the next instruction to be executed. The misprediction recovery mechanism is required to complete in relatively few clock cycles, so that correct instructions are executed soon after the misprediction is determined. Typically, the clock cycles between the clock cycle in which the misprediction is discovered and the clock cycle in which the corrected instructions begin execution are idle cycles. Overall performance of the superscalar microprocessor is degraded by the number of idle cycles it must endure.

Superscalar microprocessors are evolving such that they execute larger and larger numbers of instructions simultaneously. However, branch instructions continue to occur in programs with the same frequency. Therefore, superscalar microprocessors are implementing branch prediction schemes in which multiple branch predictions may be outstanding in a given clock cycle (i.e. multiple branch paths have been predicted, but have not been validated by the execution of the associated branch). With the possibility of multiple branch instructions executing in a given clock cycle, and therefore multiple mispredictions being detected, the misprediction recovery mechanism becomes more complex. However, the importance of the misprediction recovery mechanism completing in relatively few clock cycles is not diminished. A misprediction recovery mechanism which requires relatively few clock cycles to complete and that can correctly resolve multiple branch mispredictions is desired.

Along with branch prediction, another feature intended to improve the performance of superscalar microprocessors is out-of-order execution. Out-of-order execution is the process of executing a particular instruction in a clock cycle that is before a clock cycle in which instructions which are before the particular instruction in program order are executed. An instruction which does not depend on the results generated by the instructions before it in program order need not delay its execution until the instructions before it execute. Because the instruction must be executed at some time, performance is advantageously increased by executing the instruction in a pipeline stage that would otherwise be idle in a clock cycle.

Unfortunately, certain instructions cannot be executed out-of-order. Programs assume that instructions are executed in-order, and therefore out-of-order execution must be employed in a manner which is transparent to programs. Exemplary instructions that cannot be executed out-of-order are load instructions that miss the data cache and store instructions. Store instructions modify memory, as opposed to other instructions which modify registers. If the store instruction is allowed to modify the data cache out-of-order and is then cancelled due to a previous branch misprediction or an interrupt, then the data cache would contain corrupted data. Therefore, the store instruction must not be allowed to modify the data cache or main memory until previous instructions have executed, so that the store instruction is not going to be cancelled. Load instructions that miss the data cache cannot be executed out-of-order either, as will be discussed below.

Data caches are implemented either on the same silicon substrate as a superscalar microprocessor, or are coupled nearby. The data cache is a high speed memory which is configured to store copies of a main system memory (when employed in a computer system). When a load or store instruction accesses the data cache, the access is found to be either a "hit" or a "miss". If an access is a hit, then the associated data is currently stored in the data cache. If the access is a miss, the associated data is in main memory. Load instructions are allowed to execute out-of-order when reading the data cache. However, when load instructions miss the data cache they are required to execute in order. Otherwise, a load miss may begin a transfer from main memory and then be cancelled. The external bus bandwidth used by the access would then be wasted. Furthermore, the data being transferred may cause a line to be removed from the cache. If that removed line is later needed, it will have to be transferred in from main memory and more external bus bandwidth would be wasted. Therefore, load instructions that are data cache misses should not execute out of order. A mechanism is needed to correctly order load instructions that are data cache misses and store instructions.

SUMMARY OF THE INVENTION

The problems outlined above are in large part solved by a superscalar microprocessor employing a plurality of functional units, a load/store unit, and a reorder buffer in accordance with the present invention. The functional units receive a pointer (a reorder buffer tag) which is compared to the reorder buffer tags of the instructions currently being executed. The pointer identifies the oldest outstanding branch instruction. If a functional unit's reorder buffer tag matches the pointer, then that functional unit conveys its corrected fetch address to the instruction fetching mechanism of the superscalar microprocessor (i.e. the branch prediction unit).

Because the functional units convey the corrected fetch address directly to the instruction fetching mechanism, clock cycles are advantageously removed from the branch misprediction recovery mechanism. Without functional units of the present invention, corrected fetch addresses would be reported to the reorder buffer in the same way that other instruction execution results are reported. The reorder buffer would then be required to scan the branch instructions stored within it for a mispredicted branch and then convey the corrected fetch address to the instruction fetching mechanism. This conventional mechanism requires at least one clock cycle more than that of the present invention, and for high frequency (short clock cycle) superscalar microprocessors more than one extra clock cycle may be required. A superscalar microprocessor in accordance with the present invention may enable higher performance by reducing the number of idle clock cycles associated with mispredicted branch instructions.

In one embodiment, the load/store unit receives a pair of pointers which identify the oldest outstanding instructions which are not in condition for retirement. The load/store unit compares these pointers with the reorder buffer tags of load instructions that miss the data cache and store instructions. A match must be found before the associated instruction accesses the data cache and the main memory system. Because the pointers indicate the oldest outstanding instructions, the pointer-compare mechanism provides an ordering mechanism for load instructions that miss the data cache and store instructions.

The load/store ordering mechanism of the present invention advantageously provides ordering with minimum handshaking between the load/store unit and the reorder buffer. A pair of pointers are added to the communication signals that the load/store unit uses to indicate that instructions have completed. Fewer interface signals simplifies the design of both the load/store unit and the reorder buffer, but the required functions are provided without a degradation in performance.

Broadly speaking, the present invention contemplates a superscalar microprocessor comprising a plurality of functional units. Each of the functional units is configured to execute instructions, and at least one of the functional units is configured to execute branch instructions. Furthermore, each of the functional units is configured to receive a pointer capable of identifying an oldest outstanding branch instruction.

The present invention further contemplates a superscalar microprocessor comprising a plurality of functional units, a load/store unit, and a reorder buffer. Each of the functional units is configured to execute instructions, and at least one of the functional units is further configured to execute branch instructions. Each of the functional units is configured to receive a pointer capable of identifying an oldest outstanding instruction. The load/store unit is configured to execute load and store instructions, and also receives the pointer. The reorder buffer is configured to generate the pointer.

BRIEF DESCRIPTION OF THE DRAWINGS

Other objects and advantages of the invention will become apparent upon reading the following detailed description and upon reference to the accompanying drawings in which.

Figure 1:
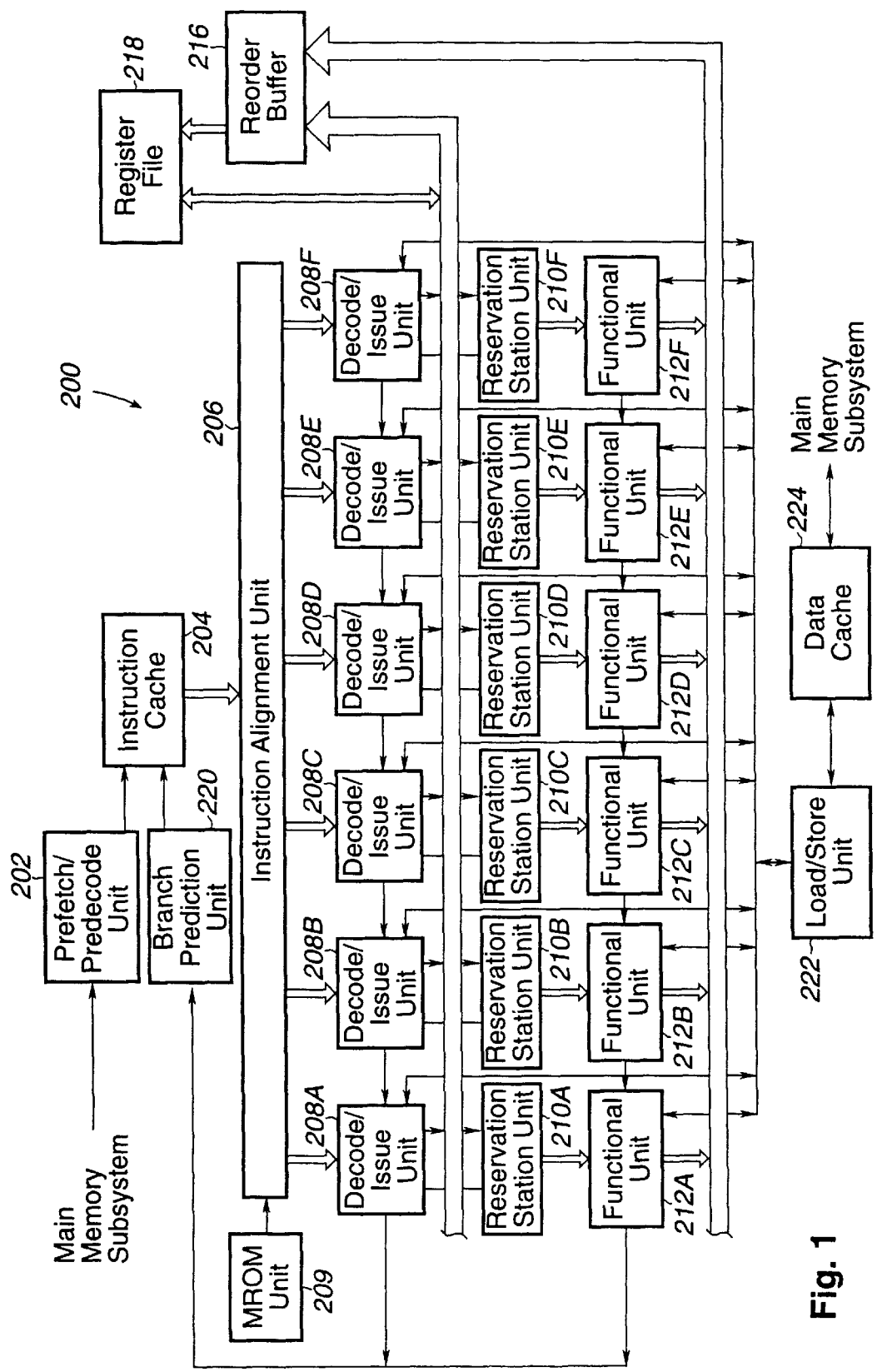
FIG. 1 is a block diagram of a superscalar microprocessor employing functional units, a load/store unit, and a reorder buffer in accordance with the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 shows a block diagram of a superscalar microprocessor 200 including functional units 212A–212F, a load/store unit 222, and a reorder buffer 216 in accordance with the present invention. As illustrated in the embodiment of FIG. 1, superscalar microprocessor 200 includes a prefetch/predecode unit 202 and a branch prediction unit 220 coupled to an instruction cache 204. Instruction alignment unit 206 is coupled between instruction cache 204 and a plurality of decode units 208A–208F (referred to collectively as decode units 208). Each decode unit 208A–208F is coupled to a respective reservation station unit 210A–210F (referred collectively as reservation stations 210), and each reservation station 210A–210F is coupled to a respective functional unit 212A–212F (referred to collectively as functional units 212). Decode units 208, reservation stations 210, and functional units 212 are further coupled to a reorder buffer 216, a register file 218 and a load/store unit 222. A data cache 224 is finally shown coupled to load/store unit 222, and an MROM unit 209 is shown coupled to instruction alignment unit 206.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 16 bytes each (where each byte consists of 8 bits). During operation, instruction code is provided to instruction cache 204 by prefetching code from a main memory (not shown) through prefetch/predecode unit 202. It is noted that instruction cache 204 could be implemented in a set-associative, a fully-associative, or a direct-mapped configuration.

Prefetch/predecode unit 202 is provided to prefetch instruction code from the main memory for storage within instruction cache 204. In one embodiment, prefetch/predecode unit 202 is configured to burst 64-bit wide code from the main memory into instruction cache 204. It is understood that a variety of specific code prefetching techniques and algorithms may be employed by prefetch/predecode unit 202.

As prefetch/predecode unit 202 fetches instructions from the main memory, it generates three predecode bits associated with each byte of instruction code: a start bit, an end bit, and a "functional" bit. The predecode bits form tags indicative of the boundaries of each instruction. The predecode tags may also convey additional information such as whether a given instruction can be decoded directly by decode units 208 or whether the instruction must be executed by invoking a microcode procedure controlled by MROM unit 209, as will be described in greater detail below.

Table 1 indicates one encoding of the predecode tags. As indicated within the table, if a given byte is the first byte of an instruction, the start bit for that byte is set. If the byte is the last byte of an instruction, the end bit for that byte is set. If a particular instruction cannot be directly decoded by the decode units 208, the functional bit associated with the first byte of the instruction is set. On the other hand, if the instruction can be directly decoded by the decode units 208, the functional bit associated with the first byte of the instruction is cleared. The functional bit for the second byte of a particular instruction is cleared if the opcode is the first byte, and is set if the opcode is the second byte. It is noted that in situations where the opcode is the second byte, the first byte is a prefix byte. The functional bit values for instruction byte numbers 3–8 indicate whether the byte is a MODRM or an SIB byte, as well as whether the byte contains displacement or immediate data.

TABLE 1

Encoding of Start, End and Functional Bits

| Instr. Eyte Number | Start Bit Value | End Bit Value | Functional Bit Value | Meaning |
|---|---|---|---|---|
| 1 | 1 | X | 0 | Fast decode |
| 1 | 1 | X | 1 | MROM instr. |
| 2 | 0 | X | 0 | Opcode is first byte |
| 2 | 0 | X | 1 | Opcode is this byte, first byte is prefix |

TABLE 1-continued

Encoding of Start, End and Functional Bits

| Instr. Eyte Number | Start Bit Value | End Bit Value | Functional Bit Value | Meaning |
|---|---|---|---|---|
| 3–8 | 0 | X | 0 | Mod R/M or SIB byte |
| 3–8 | 0 | X | 1 | Displacement or immediate data; the second functional bit set in bytes 3–8 indicates immediate data |
| 1–8 | X | 0 | X | Not last byte of instruction |
| 1–8 | X | 1 | X | Last byte of instruction |

As stated previously, in one embodiment certain instructions within the x86 instruction set may be directly decoded by decode units 208. These instructions are referred to as "fast path" instructions. The remaining instructions of the x86 instruction set are referred to as "MROM instructions". MROM instructions are executed by invoking MROM unit 209. When an MROM instruction is encountered, MROM unit 209 parses and serializes the instruction into a subset of defined fast path instructions to effectuate a desired operation. A listing of exemplary x86 instructions categorized as fast path instructions as well as a description of the manner of handling both fast path and MROM instructions will be provided further below.

Instruction alignment unit 206 is provided to channel variable byte length instructions from instruction cache 204 to fixed issue positions formed by decode units 208A–208F. Instruction alignment unit 206 is configured to channel instruction code to designated decode units 208A–208F depending upon the locations of the start bytes of instructions within a line as delineated by instruction cache 204. In one embodiment, the particular decode unit 208A–208F to which a given instruction may be dispatched is dependent upon both the location of the start byte of that instruction as well as the location of the previous instruction's start byte, if any. Instructions starting at certain byte locations may further be restricted for issue to only one predetermined issue position. Specific details follow.

Before proceeding with a detailed description of the functional units 212, load/store unit 222, and reorder buffer 216, general aspects regarding other subsystems employed within the exemplary superscalar microprocessor 200 of FIG. 1 will be described. For the embodiment of FIG. 1, each of the decode units 208 includes decoding circuitry for decoding the predetermined fast path instructions referred to above. In addition, each decode unit 208A–208F routes displacement and immediate data to a corresponding reservation station unit 210A–210F. Output signals from the decode units 208 include bit-encoded execution instructions for the functional units 212 as well as operand address information, immediate data and/or displacement data.

The superscalar microprocessor of FIG. 1 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible, as will be described further below. If a branch prediction is incorrect, the results of speculatively-executed instructions along the mispredicted path can be invalidated in the buffer before they are written to register file 218.

The bit-encoded execution of instructions and immediate data provided at the outputs of decode units 208A–208F are routed directly to respective reservation station units 210A–210F. In one embodiment, each reservation station unit 210A–210F is capable of holding instruction information (i.e., bit encoded execution bits as well as operand values, operand tags and/or immediate data) for up to three pending instructions awaiting issue to the corresponding functional unit. It is noted that for the embodiment of FIG. 1, each decode unit 208A–208F is associated with a dedicated reservation station unit 210A–210F, and that each reservation station unit 210A–210F is similarly associated with a dedicated functional unit 212A–212F. Accordingly, six dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP), as will be described further below. Reorder buffer 216 contains temporary storage locations for results which change the contents of these registers to thereby allow out of order execution. A temporary storage location of reorder buffer 216 is reserved for each instruction which, upon decode, modifies the contents of one of the real registers. Therefore, at various points during execution of a particular program, reorder buffer 216 may have one or more locations which contain the speculatively executed contents of a given register. If following decode of a given instruction it is determined that reorder buffer 216 has previous location(s) assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Reservation station units 210A–210F are provided to temporarily store instruction information to be speculatively executed by the corresponding functional units 212A–212F. As stated previously, each reservation station unit 210A–210F may store instruction information for up to three pending instructions. Each of the six reservation stations 210A–210F contain locations to store bit-encoded execution instructions to be speculatively executed by the corresponding functional unit and the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212F, the result of that instruction is passed directly to any reservation station units 210A–210F that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210F has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes prefetch/predecode unit 202 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known. More specific details regarding communication between functional units 212 and branch prediction unit 220 are provided below.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210F where pending instructions may be waiting for the results of previous instruction executions to obtain the required operand values.

Data cache 224 is a high speed cache memory provided to temporarily store data being transferred between load/store unit 222 and the main memory subsystem. In one embodiment, data cache 224 has a capacity of storing up to eight kilobytes of data. It is understood that data cache 224 may be implemented in a variety of specific memory configurations, including a set associative configuration.

Generally speaking, load/store unit 222 provides an interface between functional units 212A–212F and data cache 224. In one embodiment, load/store unit 222 is configured with a load/store buffer with sixteen storage locations for data and address information for pending load or store memory operations. Functional units 212 arbitrate for access to the load/store unit 222. The load/store unit 222 also performs dependency checking for load memory operations against pending store memory operations to ensure that data coherency is maintained.

Figure 2:
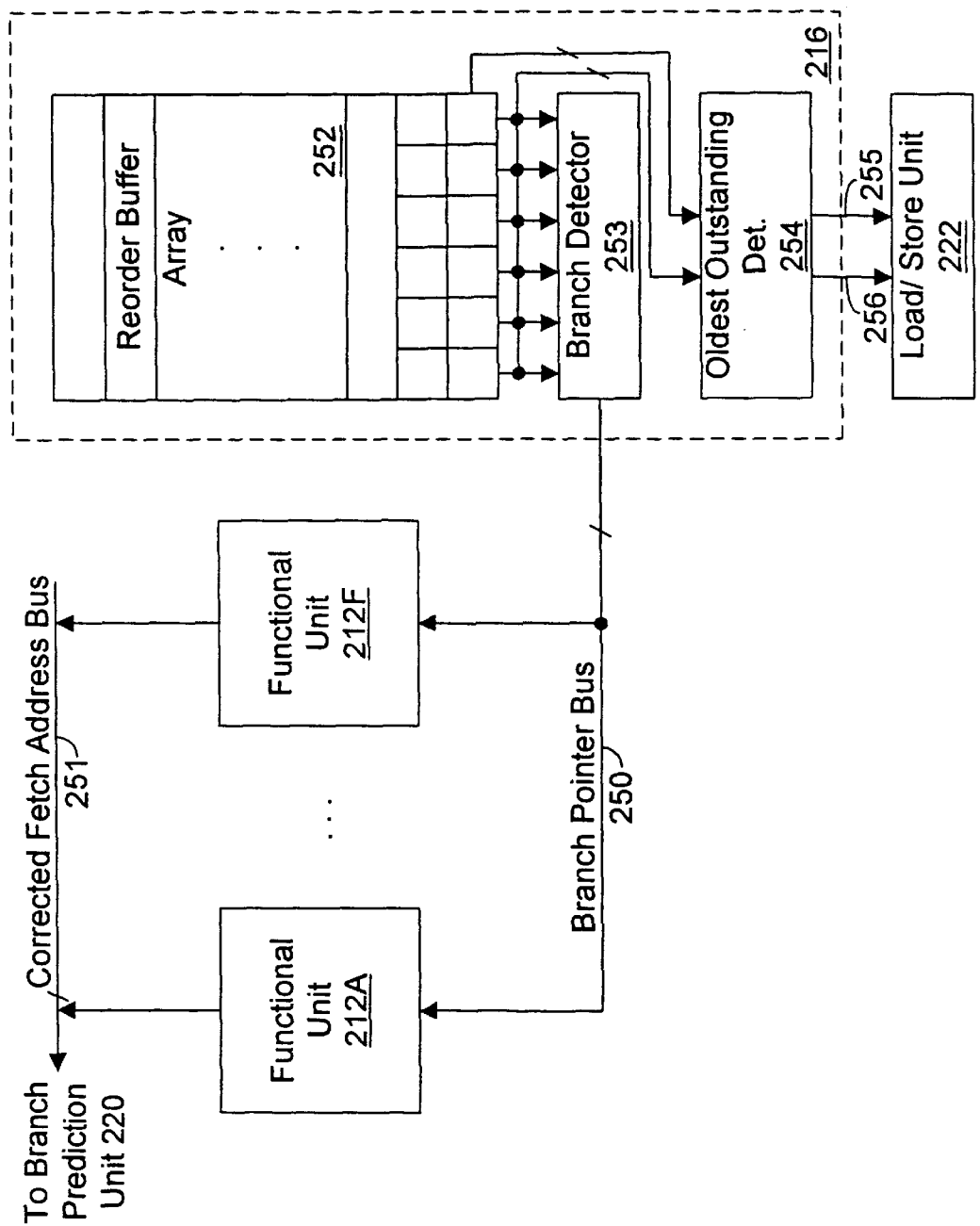
FIG. 2 is a partial block diagram of a superscalar microprocessor showing functional units, a load/store unit, and a reorder buffer in more detail.

Turning now to FIG. 2, a block diagram depicting functional units 212, reorder buffer 216, and load/store unit 222 is shown. FIG. 2 details the connections between the depicted units, and shows reorder buffer 216 in more detail as well. Although two functional units (212A and 212F) are shown, similar connections are made to each of the remaining functional units 212. Reorder buffer 216 conveys a branch pointer to functional units 212 on a branch pointer bus 250. Functional units 212 are also connected to a corrected fetch address bus 251, which conveys an address to branch prediction unit 220. Reorder buffer 216 conveys a pair of oldest pointers (i.e. an oldest pointer and a second-oldest pointer) on a pair of oldest pointer buses 255 and 256 to load/store unit 222. When used in the context of an instruction, the term "oldest" means an instruction in the reorder buffer which does not yet have valid results, but each prior instruction within the reorder buffer does have valid results.

Generally speaking, the branch pointer conveyed by reorder buffer 216 on branch pointer bus 250 identifies the oldest branch instruction currently stored within reorder buffer 216. Functional units 212 compare the branch pointer to the pointer identifying the instruction currently executing. If the comparison indicates a match, then the associated functional unit may transfer its corrected fetch address on corrected fetch address bus 251 to branch prediction unit 220. The functional unit conveys a corrected fetch address if the associated branch instruction was mispredicted by branch prediction unit 220. The oldest pointers conveyed on oldest pointer buses 255 and 256 identify the oldest instructions that are not in condition for retirement. Load/store unit 222 compares the oldest pointers to the pointers identifying outstanding load miss and store instructions stored within a load/store buffer within load/store unit 222. If the comparison indicates a match, then the corresponding load or store instruction is performed by transferring the associated memory locations into the cache (if necessary), and storing the data associated with store instructions into the data cache or forwarding the data associated with load instructions to the target register. Thus, a mechanism for branch prediction recovery and a mechanism for performing load instructions that are data cache misses and store instructions in program order is created. An instruction is determined to be "in condition for retirement" if the results of executing the instruction have been transferred to reorder buffer 216. The term "retirement" refers to removing an instruction from reorder buffer 216.

The branch pointer is generated by reorder buffer 216 using a branch detector circuit 253. Branch detector circuit 253 scans a certain number of entries storing the oldest instructions in a reorder buffer array 252. In one embodiment, the number of entries scanned is six. Reorder buffer array 252 is configured to store information pertaining to instructions that are currently outstanding in superscalar microprocessor 200 (i.e. instructions that have been dispatched and are not yet in condition for retirement), as described with respect to FIG. 1 above. A "reorder buffer tag" (which uniquely identifies an instruction within reorder buffer 216) associated with the oldest branch instruction within the oldest six entries in reorder buffer array 252 is selected by branch detector circuit 253 and conveyed as the branch pointer. Therefore, the branch pointer in this embodiment is a reorder buffer tag.

In this embodiment, branch detector circuit 253 employs one tag routing device. The tag routing device will be explained in more detail with respect to FIG. 3C, but generally speaking it selects a reorder buffer tag from multiple entries of reorder buffer array 252 dependent on a bit associated with each entry. In the case of branch detector circuit 253, the bit identifies the instruction as a branch. If the oldest entry is a branch, its associated reorder buffer tag is routed to functional units 212. Similarly, if the second oldest entry is a branch and the oldest entry is not a branch, the second oldest entry's tag is routed to functional units 212, and so on for the four remaining reorder buffer entries being scanned. If no branch instruction is found within the entries scanned by branch detector circuit 253, an invalid tag is routed to functional units 212.

The pair of oldest pointers conveyed on oldest pointer buses 255 and 256 are generated by an oldest outstanding detector circuit 254 (hereinafter referred to as detector circuit 254). Similar to branch detector circuit 253, detector circuit 254 scans a certain number of entries storing the oldest instructions within reorder buffer 216. The reorder buffer tags associated with the oldest and second oldest instructions that are not in condition for retirement are routed to load/store unit 222 by detector circuit 254. In one implementation, the number of reorder buffer entries scanned is twelve.

In one embodiment, detector circuit 254 contains two tag routing devices, as will be described with respect to FIG. 3C. The first tag routing device routes a reorder buffer tag similar to the tag routing device of branch detector circuit 253, except that the bit from reorder buffer array 252 used to select the reorder buffer tag indicates that the associated instruction is not in condition for retirement. The second tag routing device is configured to route the second oldest reorder buffer tag associated with an instruction that is not in condition for retirement. Therefore, the selection bit provided to the second tag routing device is the logical AND of the bit that indicates an instruction is not in condition for retirement and a bit indicating that the instruction is not selected by the first tag routing device. The selection bits are priority encoded by the tag routing device, as will be explained with respect to FIG. 3C.

In this embodiment, load/store unit 222 is required to return the data associated with a load instruction to the reorder buffer, and is required to indicate to the reorder buffer that a store has been performed. Load instructions that hit in the data cache transfer the associated data to the reorder buffer, and are thereby completed. However, load instructions that miss the data cache (and so cannot return data) as well as store instructions remain in the load/store buffer until their associated reorder buffer tag is indicated on one of the oldest pointers. Then, the load/store unit may select the load miss instruction to transfer data into the data cache from main memory or the store instruction to store data into the data cache. When the load/store unit has performed these actions, it returns the data or indicates that the store is complete (respectively). In a subsequent clock cycle, the oldest pointers will move to the next oldest instructions in reorder buffer 216. Load instructions that miss the data cache and store instructions are therefore executed in order.

In another embodiment, branch pointer bus 250 and oldest outstanding bus 255 are operated such that they convey the same pointer in each clock cycle. Therefore, branch pointer bus 250 and oldest outstanding bus 255 can be combined into a common bus for this embodiment, and branch detector circuit 253 can be eliminated. As will be explained below, functional units 212 generate valid corrected fetch addresses when executing branch instructions and invalid corrected fetch addresses otherwise. Therefore, if branch pointer bus 250 conveys a non-branch instruction and the pointer matches the pointer identifying an instruction currently being executed, branch prediction unit 220 will receive an invalid corrected fetch address.

Figure 3A:
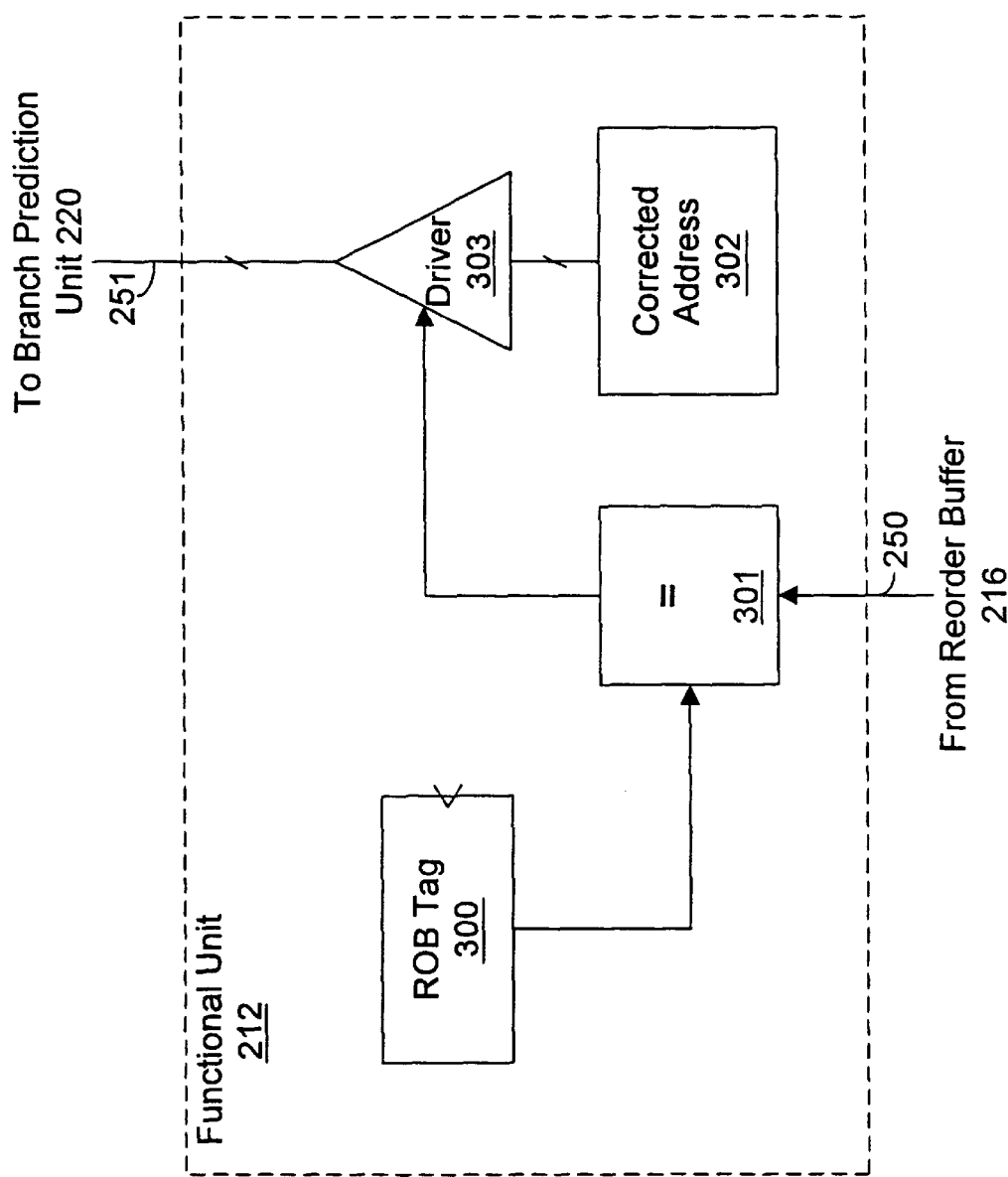
FIG. 3A is a diagram of one of the functional units shown in FIG. 2, depicting elements of an embodiment of the present invention.

Turning now to FIG. 3A, internal logic circuits of one of functional units 212 are shown. Functional units 212 are each configured with a register 300 which stores the reorder buffer tag of the instruction being executed in the current clock cycle. Register 300 is connected to a comparator circuit 301 which is also connected to branch pointer bus 250. Therefore, comparator circuit 301 compares the branch pointer conveyed on branch pointer bus 250 to the reorder buffer tag stored in register 300. Because branch pointer bus 250 conveys a valid reorder buffer tag only if the associated instruction is a branch, the comparator output indicates a match in clock cycles where a branch instruction is being executed by the functional unit. The output of comparator 301 is coupled to the enable of a tri-state driver circuit 303. Tri-state driver circuit 303 is coupled to a corrected address logic block 302 which is configured to generate a corrected fetch address if the branch instruction being executed is a mispredicted branch, and an invalid address if the branch is predicted correctly or the instruction is not a branch. Tri-state driver circuit conveys the address produced by corrected address logic block 302 if comparator circuit 301 indicates a match, and conveys nothing if comparator circuit 301 does not indicate a match. Therefore, multiple functional units 212 may be connected to the same corrected fetch address bus 251 because only one functional unit can contain a reorder buffer tag which matches the pointer conveyed on pointer bus 250 in a given clock cycle. Branch prediction unit 220 is configured to recognize an invalid address such that corrected fetch addresses are acted upon and invalid addresses are ignored. It is noted that functional units 212 report the results of executing a branch instruction to reorder buffer 216, as is the case with other instructions.

By employing functional units 212 in a superscalar microprocessor, a mechanism for branch misprediction recovery may be implemented that requires relatively few clock cycles to complete. The clock cycle in which a branch is executed and found to be mispredicted is the cycle in which the corrected fetch address is conveyed to branch prediction unit 220. In the following clock cycle, the corrected fetch address will access the instruction cache and the associated instructions will be dispatched. Furthermore, the branch misprediction recovery mechanism handles multiple branch predictions by conveying the corrected fetch address associated with the oldest branch instruction.

Figure 3B:
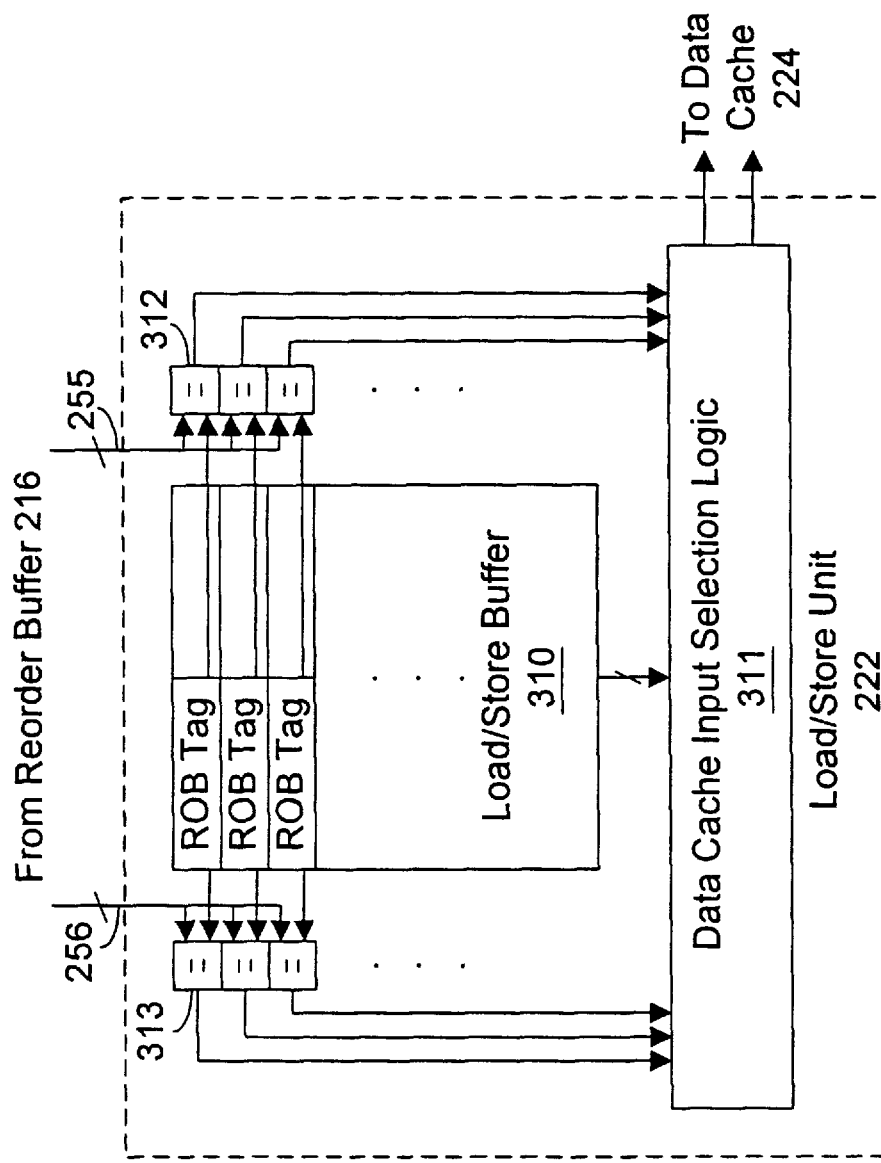
FIG. 3B is a diagram of the load/store unit in FIG. 2, depicting elements of an embodiment of the present invention.

Turning now to FIG. 3B, load/store unit 222 is depicted in more detail. Load/store unit 222 receives oldest pointer buses 255 and 256 from reorder buffer 216, and selects load or store instructions to access data cache 224. In one embodiment, load/store unit 222 selects up to two load/store instructions to access the data cache in each clock cycle. Load/store unit 222 is configured with a load/store buffer 310 which is configured to store information regarding outstanding load and store instructions. Included in the information stored within load/store buffer 310 is the reorder buffer tag for each instruction, as indicated in FIG. 3B. The reorder buffer tag for each entry is compared to the oldest pointers using comparator circuits 312 and 313. A data cache input selection logic block 311 (hereinafter referred to as selection logic block 311) receives the comparator outputs as well as the contents of load/store buffer 310 and generates up to two requests for data cache 224. Selection logic block 311 does not select a load instruction that has been determined to miss the data cache unless the associated comparator circuits indicate a match with the oldest pointers. Similarly, selection logic block 311 does not select a store instruction unless the associated comparator circuits indicate a match with the oldest pointers. In one embodiment, selection logic block 311 employs a priority scheme for selecting instructions to access data cache 224. The highest priority is assigned to a load miss or store instruction with a reorder buffer tag which matches the oldest pointer transferred on oldest pointer bus 255. An intermediate priority is assigned to a load miss or store instruction that has a reorder buffer tag which matches the oldest pointer transferred on oldest pointer bus 256. Lowest priority is assigned to load instructions that have not yet accessed data cache 224.

By employing load/store unit 222 in a superscalar microprocessor which produces the oldest pointers, load instructions that miss data cache 224 and store instructions are executed in order. Neither of the two types of instructions are allowed to access data cache 224 or the main memory subsystem until their reorder buffer tags are conveyed on the oldest pointers, indicating that they are the oldest outstanding instructions that are not in condition for retirement. Therefore, each of the instructions prior to the load or store instruction has completed, and the load or store instruction may be executed.

Figure 3C:
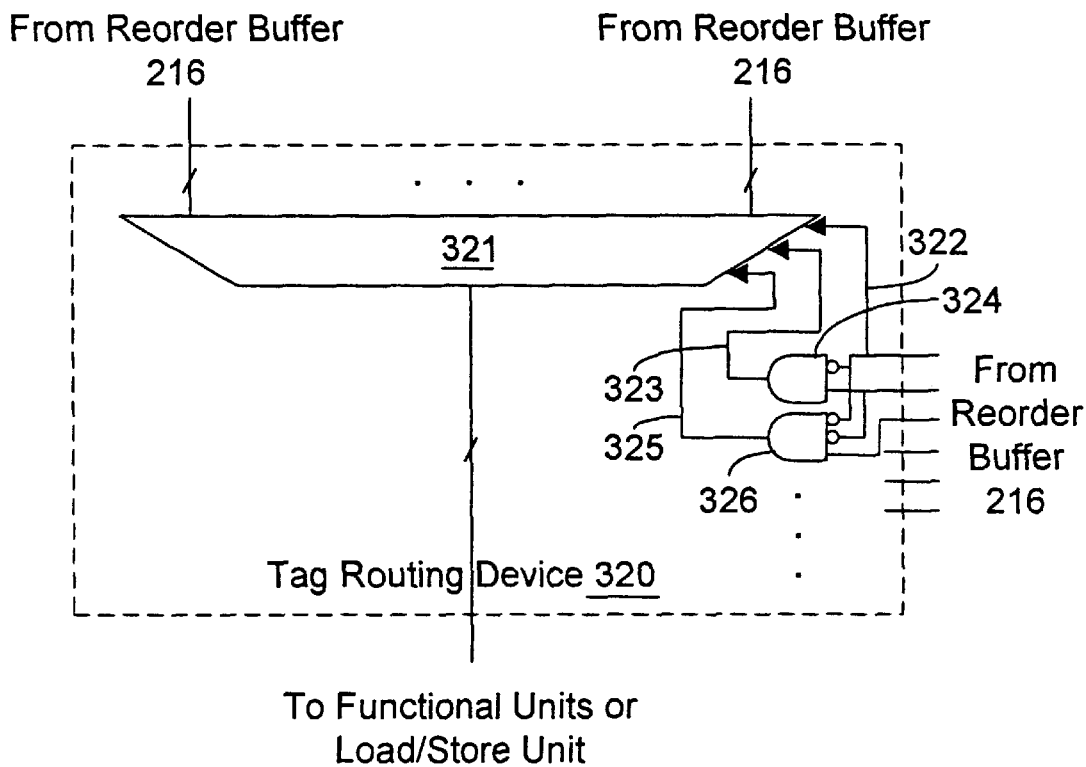
FIG. 3C is a diagram of a tag routing device used as part of the branch detection and oldest outstanding detection blocks shown in FIG. 2.

Turning now to FIG. 3C, an embodiment of tag routing device 320 employed within branch detection circuit 253 (shown in FIG. 2) and oldest outstanding detector circuit 254 (shown in FIG. 2) is shown. Tag routing device 320 includes a multiplexor 321 which receives reorder buffer tags from reorder buffer array 252. Associated with each reorder buffer tag is a signal conveying a logical one if the tag should be considered for routing by tag routing device 320. The embodiment shown in FIG. 3C is a priority encoded mechanism which selects the oldest tag if its associated signal is a logical one, as indicated by signal line 322 connected to multiplexor 321. The encoding mechanism selects the second oldest tag if its associated signal conveys a logical one and the signal associated with the oldest tag conveys a logical zero. Therefore, signal line 323 (which selects the second oldest tag) is generated by AND gate 324. If both the signal associated with the oldest tag and the signal associated with the second oldest tag convey a logical zero and the signal associated with the third oldest tag conveys a logical one, then the third oldest tag is selected. Therefore, signal line 325 (which selects the third oldest tag) is generated by AND gate 326. Additional select signals for multiplexor 321 are generated similarly.

Figure 4:
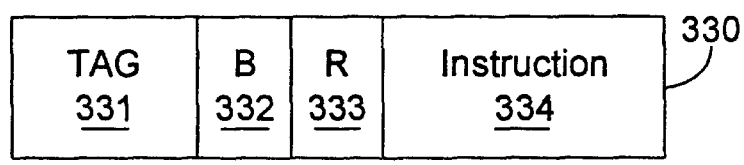
FIG. 4 is a diagram of a typical reorder buffer entry of an embodiment of the present invention.

Turning now to FIG. 4, an exemplary reorder buffer entry 330 for reorder buffer array 252 is shown. Tag entry 330 has four fields: a reorder buffer tag field 331, a branch bit 332, a retire bit 333, and an instruction field 334. Instruction field 334 contains the instruction for this reorder buffer entry along with other data a particular embodiment of reorder buffer 216 may require. Reorder buffer tag field 331 stores the reorder buffer tag, and is connected to branch detector circuit 253 and oldest outstanding detector circuit 254 for reorder buffer array entries that are configured to contain the oldest instructions in the array. Branch bit 332 stores a logical one if the instruction stored in reorder buffer entry is a branch instruction, and a logical zero otherwise. Branch bit 332 forms one of the select signals for the tag routing device of branch detector circuit 253. Retire bit 333 stores a logical one when the instruction stored in reorder buffer array entry 330 is in condition for retirement, and a logical zero otherwise. An inversion of retire bit 333 is used to form one of the select signals for tag routing devices 320 within oldest outstanding detection circuit 254.

In yet another embodiment, each of the functional units 212 communicate the results of the comparisons to the branch pointer as well as whether or not they are executing a branch instruction which is mispredicted in the clock cycle to each of the other functional units 212. If no match to the branch pointer is detected among the functional units 212, then a priority scheme is invoked, as shown in the flow diagram of FIG. 4. The priority scheme selects a functional unit to drive corrected address bus 251 as follows: functional unit 212A will drive corrected fetch address bus 251 if it contains a mispredicted branch instruction; functional unit 212B will drive corrected fetch address bus 251 if it contains a mispredicted branch instruction and functional unit 212A does not contain a mispredicted branch instruction; functional unit 212C will drive corrected fetch address bus 251 if it contains a mispredicted branch instruction and neither functional unit 212A nor functional unit 212B contains a mispredicted branch instruction, and so on for the remaining functional units. In this manner, corrected fetch address bus 251 conveys a value in each clock cycle.

It is noted that other embodiments of the present invention may vary in the number of functional units and load/store units employed. It is further noted that the number of branch pointers and oldest pointers may vary from embodiment to embodiment. Load/store unit 222 is configured with a unified load/store buffer in this embodiment. However, load/store unit 222 could be configured with multiple load/store buffers, and load and store instructions may be stored in separate buffers, in other embodiments.

Figure 5:
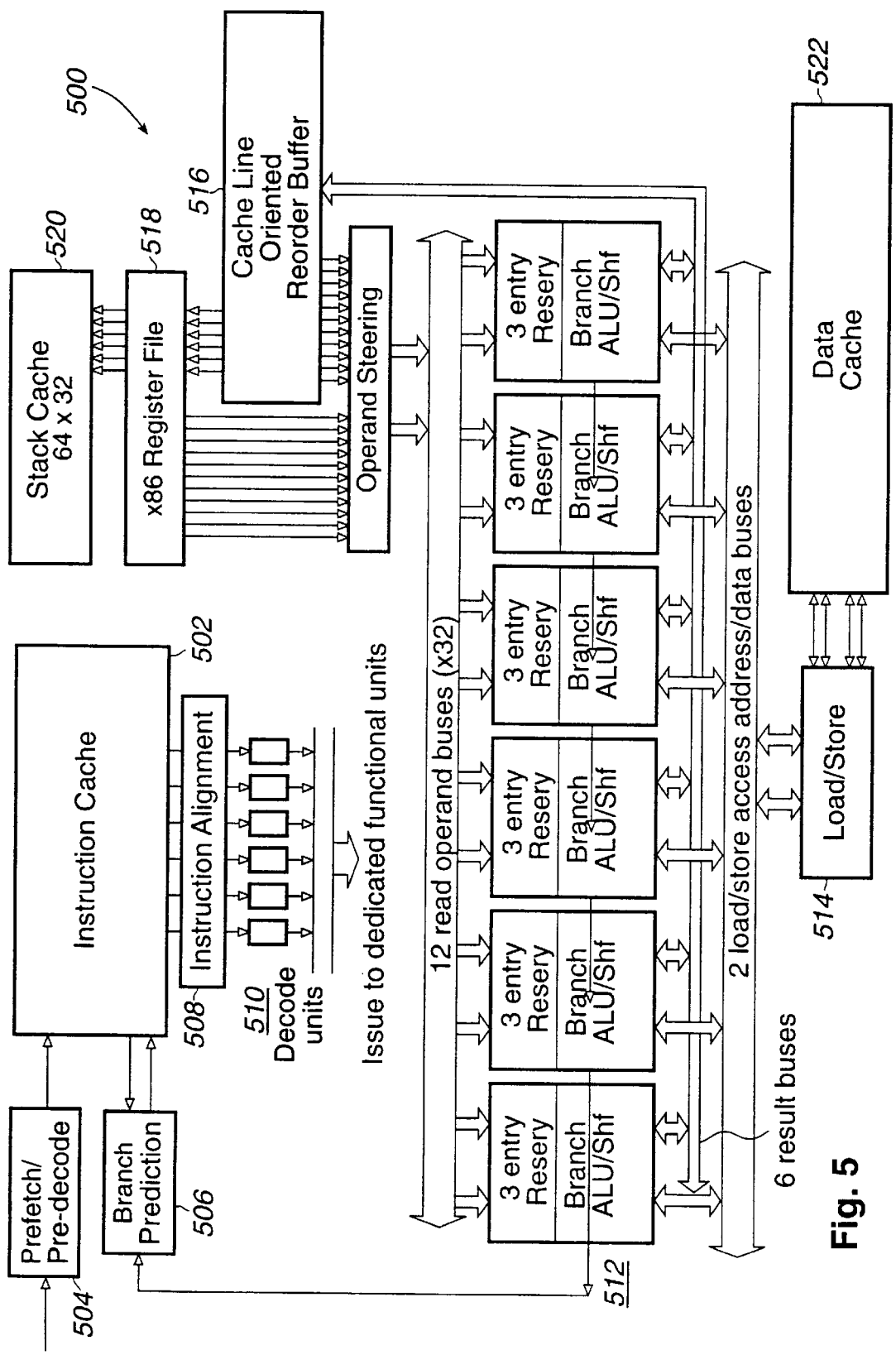
FIGS. 5–68 depict a superscalar microprocessor.
Figure 68:
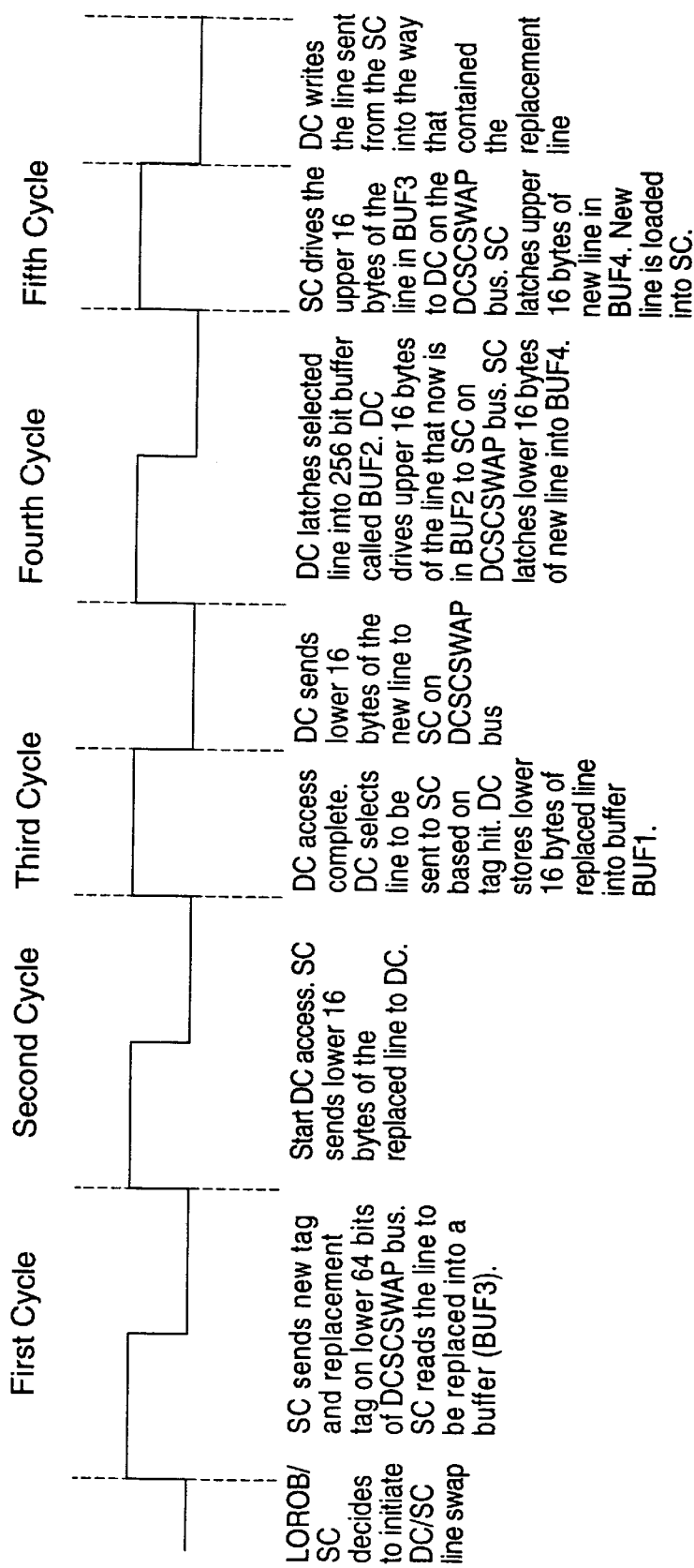

Turning next to FIGS. 5–68, details regarding various aspects of another embodiment of a superscalar microprocessor are next considered. FIG. 5 is a block diagram of a processor 500 including an instruction cache 502 coupled to a prefetch/predecode unit 504, to a branch prediction unit 506, and to an instruction alignment unit 508. A set 510 of decode units is further coupled to instruction alignment unit 508, and a set 512 of reservation station/functional units is coupled to a load/store unit 514 and to a reorder buffer 516. A register file unit 518 and a stack cache 520 is finally shown coupled to reorder buffer 516, and a data cache 522 is shown coupled to load/store unit 514.

Processor 500 limits the addressing mechanism used in the x86 to achieve both regular simple form of addressing as well as high clock frequency execution. It also targets 32-bit O/S and applications. Specifically, 32-bit flat addressing is employed where all the segment registers are mapped to all 4 GB of physical memory. the starting address being 0000-0000 hex and their limit address being FFFF hex. The setting of this condition will be detected within processor 500 as one of the conditions to allow the collection of accelerated datapaths and instructions to be enabled. The absence of this condition of 32-bit flat addressing will cause a serialization condition on instruction issue and a trapping to MROM space.

Another method to insure that a relatively high clock frequency may be accommodated is to limit the number of memory address calculation schemes to those that are simple to decode and can be decoded within a few bytes. We are also interested in supporting addressing that fits into our other goals, i.e., stack relative addressing and regular instruction decoding.

As a result, the x86 instruction types that are supported for load/store operations are:

```
push   [implied ESP – 4]
pop    [implied ESP + 4]
call   [implied ESP + 8]
ret    (implied ESP – 8]
load   [base + 8-bit displacement]
store  [base + 8-bit displacement]
oper.  [EBP + 8-bit displacement]
oper.  [(EAX + 8-bit displacement]
```

Figure 6:
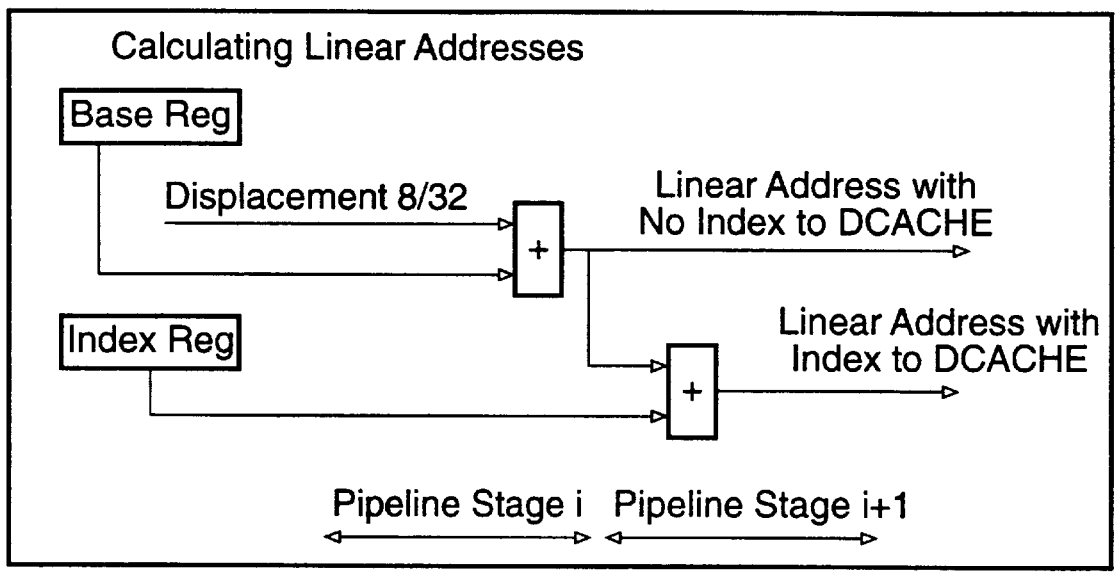

The block diagram of FIG. 6 shows the pipeline for calculating addressing within processor 500. It is noted that base+8/32 bit displacement takes 1 cycle, where using an index register takes 1 more cycle of delay in calculating the address. More complicated addressing than these requires invoking an MROM routine to execute.

A complete listing of the instruction sub-set supported by processor 500 as fast path instructions is provided below. All other x86 instructions will be executed as micro-ROM sequences of fast path instructions or extensions to fast path instructions.

The standard x86 instruction set is very limited in the number of registers it provides. Most RISC processors have 32 or greater general purpose registers, and many important variables can be held during and across procedures or processes during normal execution of routines. Because there are so few registers in the x86 architecture and most are not general purpose, a large percentage of operations are moves to and from memory. RISC architectures also incorporate 3 operand addressing to prevent moves from occurring of register values that are desired to be saved instead of overwritten.

The x86 instruction set uses a set of registers that can trace its history back to the 8080. Consequently there are few resisters, many side effects, and sub-registers within registers. This is because when moving to 16-bit, or 32-bit operands, mode bits were added and the lengths of the registers were extended instead of expanding the size of the register file. Modern compiler technology can make use of large register sets and have a much smaller percentage of loads and stores. The effect of these same compilers is to have a much larger percentage of loads and stores when compiling to the x86. The actual x86 registers are often relegated to temporary registers for a few clock cycles while the real operation destinations are in memory.

Figure 7:
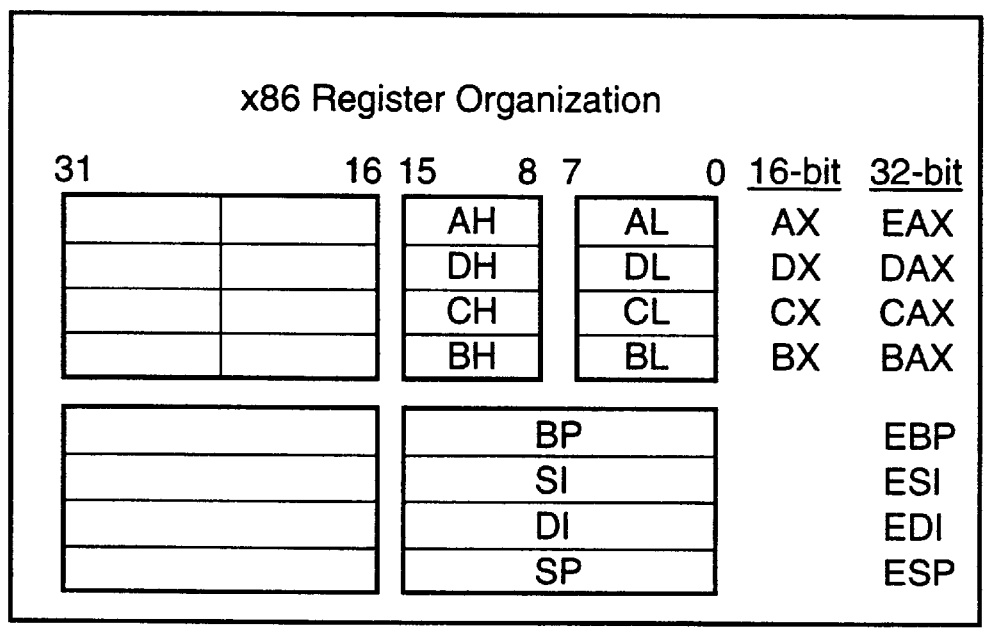

FIG. 7 shows a programmer's view of the x86 register file. One notes from this organization that there are only 8 registers. and few are general purpose. The first four registers, EAX, EDX, ECX, and EBX, have operand sizes of 8, 16, or 32-bits depending on the mode of the processor or instruction. The final 4 resisters were added with the 8086 and extended with the 386. Because there are so few real registers, they tend to act as holding positions for the passing of variables to and from memory.

The important thing to note is that when executing x86 instructions, one must be able to efficiently handle 8, 16, and 32-bit operands. If one is trying to execute multiple x86 instructions in parallel, it is not enough to simply multi-port the register file. This is because there are too few registers and all important program variables must be held in memory on the stack or in a fixed location.

Processor 500 achieves the affect of a large register file by multi-porting stack relative operations on the x86. Specifically, ESP or EBP relative accesses are detected, and upon a load or store to these regions a 32 byte data cache line is moved into an on-chip multi-port structure.

This structure is called a stack relative cache or stack cache (see FIG. 5). It contains a number of 32 byte cache lines that are multi-ported such that every issue position can simultaneously process a load or store. The accesses allowed are 8/16/32 bit accesses. 16 and 32-bit accesses are assumed to be aligned to natural boundaries. If this is not true, the access will take 2 consecutive cycles. The final optimization is that this structure for reads is contained in an early decode stage, the same stage that normal register file access is contained. Memory locations are also renamed so that speculative writes to the stack can be forwarded directly to subsequent operations.

The stack cache has two ports for each issue position. One port is for a load, and one port is for a store. Up to 8 cache lines, or 64 32-bit registers can be cached. Each 32-bit register can have 6 concurrent accesses. These cache lines are not contiguous, and the replacement algorithm for each cache line is LRU based. Unaligned accesses are handled as consecutive sequences of 2 reads and/or 2 writes, stalling, issue from that position until completion. The resulting two read accesses or write accesses are merged to form the final 16 or 32-bit access.

Thus an operation such as ADD EAX, [EBP+d8]=[EBP+d8] is encoded as one issue position. The load and store operations occur to the stack relative cache and not to the data cache. Up to 6 of these operations can issue in one clock cycle, and up to 6 operations can retire in one cycle. Also operations such as push that imply a store operation and a ESP relative decrement are directly executed, and multiple of these operations are allowed to occur in parallel.

Figure 8:
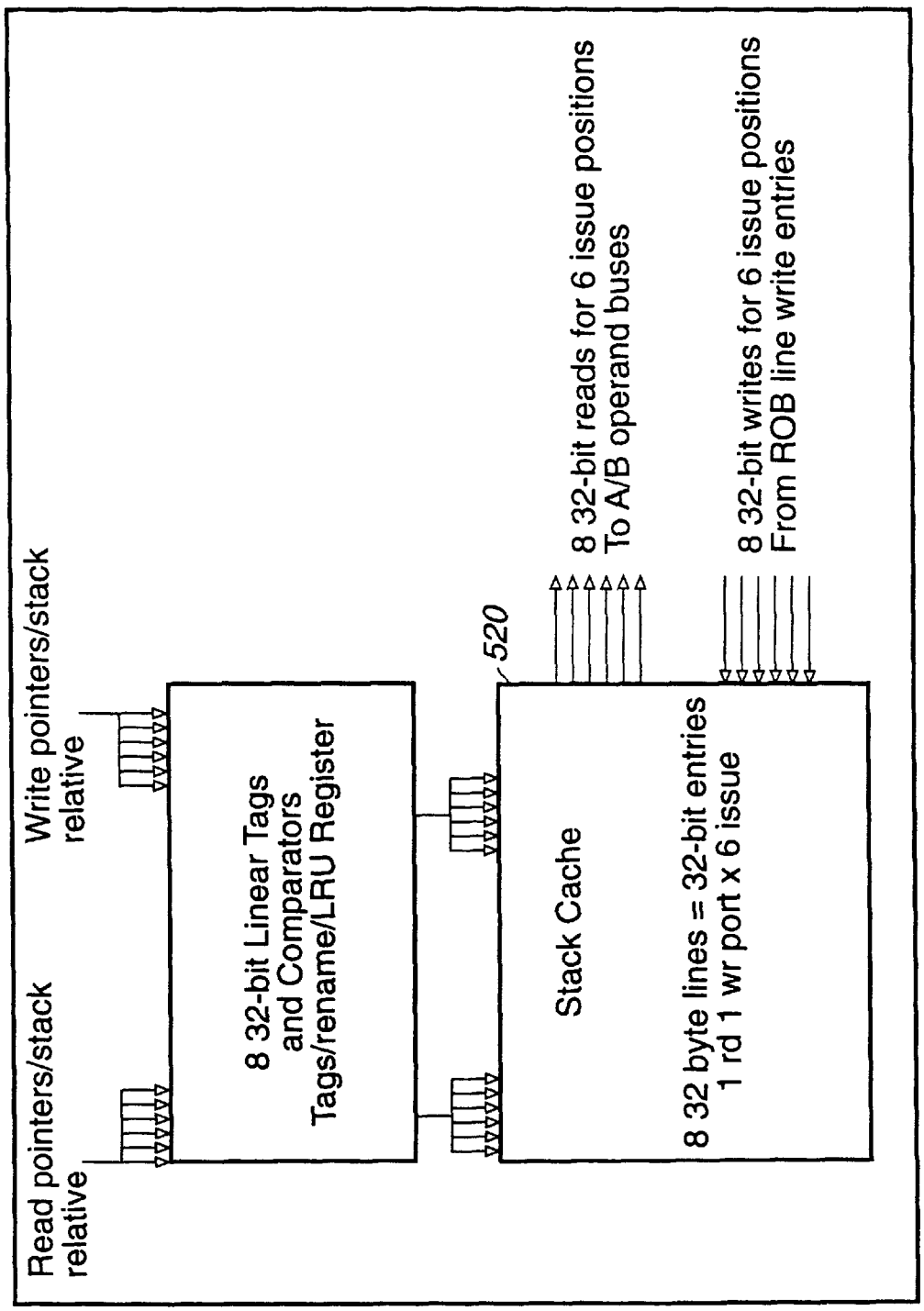

FIG. 8 is a block diagram which shows the speculative hardware for the stack relative cache 520. Part of the first two pipeline stages decodes the accelerated subset and calculates the base pointer or stack pointer relative calculations to form the linear address before reaching the pipeline stage that accesses the stack relative register file and the line oriented reorder buffer. This will be discussed in greater detail below.

RISC designs employ regular instruction decoding along natural boundaries to achieve very high clock frequencies and also with a small number of pipeline stages even for very wide issue processors. This is possible because finding a large number of instructions and their opcodes is relatively straightforward, since they are always at fixed boundaries.

As stated previously, this is much more difficult in an x86 processor where there are variable byte instruction formats, as well as prefix bytes and SIB bytes that can effect the length and addressing/data types of the original opcode.

Processor 500 employs hardware to detect and send simple instructions to fixed issue positions, where the range of bytes that a particular issue position can use is limited. This may be compensated for by adding many issue positions that each instruction cache line can assume in parallel.

Once the instructions are aligned to a particular issue position, the net amount of hardware required to decode common instructions is not significantly greater than that of a RISC processor, allowing equivalent clock frequencies to be achieved. Processor 500 achieves high frequency, wide issue, and limited pipeline depth by limiting the instructions executed at high frequency to a sub-set of the x86 instructions under the conditions of 32-bit flat addressing.

Supporting a load/store memory architecture is possible within the constraints of the x86 instruction set if one redefines the meaning of register and memory. The reason for this redefinition is the x86 needs more than 8 resisters for optimal performance. The high performance RISC architecture use their large multi-ported register files to hold commonly referenced variables or constants. Thus, the inherently slower memory accesses can be limited to load and store operations, and the RISC can concentrate on building very wide issue hardware that executes directly on register/register operations.

As previously noted, many of the advantages of a large RISC register file can be achieved by multi-porting stack relative memory references, and keeping these structures in a multi-ported RAM array that can be read and written in the same pipeline stages as a register file on a RISC. There is also an advantage if these accesses are aligned to natural 16/32-bit boundaries, which is similarly a benefit to all existing x86 processors.

All operations that use this stack addressing subset can be treated as register like instructions that can be speculatively executed identical to the normal x86 registers. The remaining memory accesses may then be treated as being load/store operations by supporting these through access to a conventional data cache, but where the data cache is pipelined and performs accesses at accelerated clock frequencies.

Hardware detects and forwards memory calculations that hit in the current entries in the stack relative cache since it is possible for addressing modes outside of stack relative accesses to indirectly point to this same region of memory, and the stack cache is treated as modified memory. Because memory operations are a part of most x86 instructions, load/op/store operations may be converted to single issue operations. Processor 500 does this by allowing a single issue to contain as many as three distinct operations. If memory load and store operations outside of the stack relative cache are detected in decode, the pending operation is held in a reservation station, and the load access and addressing calculation are sent the multi-ported data cache. Upon completion of the load operation the reservation station is allowed to issue to the functional unit. Upon completion of execution, the result is either an x86 register or a pending store.

In either case the result is returned as completed to the entry in the reorder buffer. If a store, the store is held in speculative state in front of the data cache in a store buffer, from which point it can be speculatively forwarded from. The reorder buffer then can either cancel this store or allow it to writeback to the data cache when the line is retired.

All accesses to the stack relative cache can be renamed and forwarded to subsequent operations, identical to registers. This also includes references that are made as indirect non-stack relative accesses that store to the stack relative cache.

Figure 9:
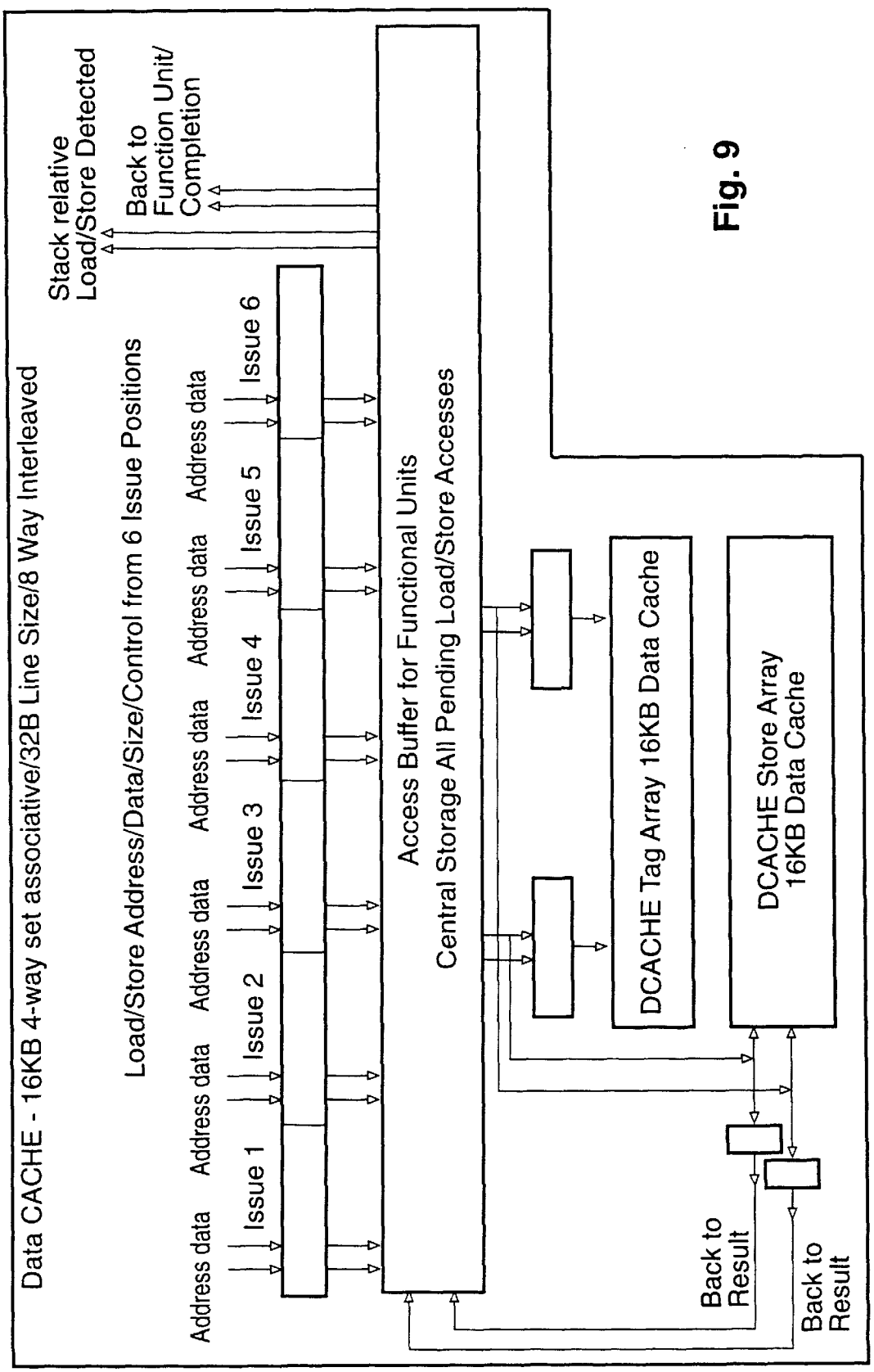

FIG. 9 is a block diagram which illustrates portions of an exemplary embodiment of processor 500 in greater detail. This structure is assumed to be capable of reading two data elements and writing two data elements per clock cycle at the accelerated clock frequency. Note that a mechanism must be maintained to allow the load and store operations to execute and forward speculatively while maintaining true program order.

The following set of instructions probably comprise 90% of the dynamically executed code for 32-bit applications:

8/32-bit operations
move reg/reg reg/mem
arithmetic operations reg/mem reg/reg logical operations reg/reg reg/mem push
logical operations reg/reg reg/mem
push
pop
call/return
load effective address
jump cc
jump unconditional
16-bit operations
prefix/move reg/reg
prefix/move reg/mem
prefix/arithmetic operations reg/reg, reg/mem
prefix/logical operations reg/reg reg/mem
prefix/push
prefix/pop When executing 32-bit code under flat addressing, these instructions almost always fall within 1–8 bytes in length, which is in the same rough range of the aligned, accelerated fast path instructions.

Figure 10:
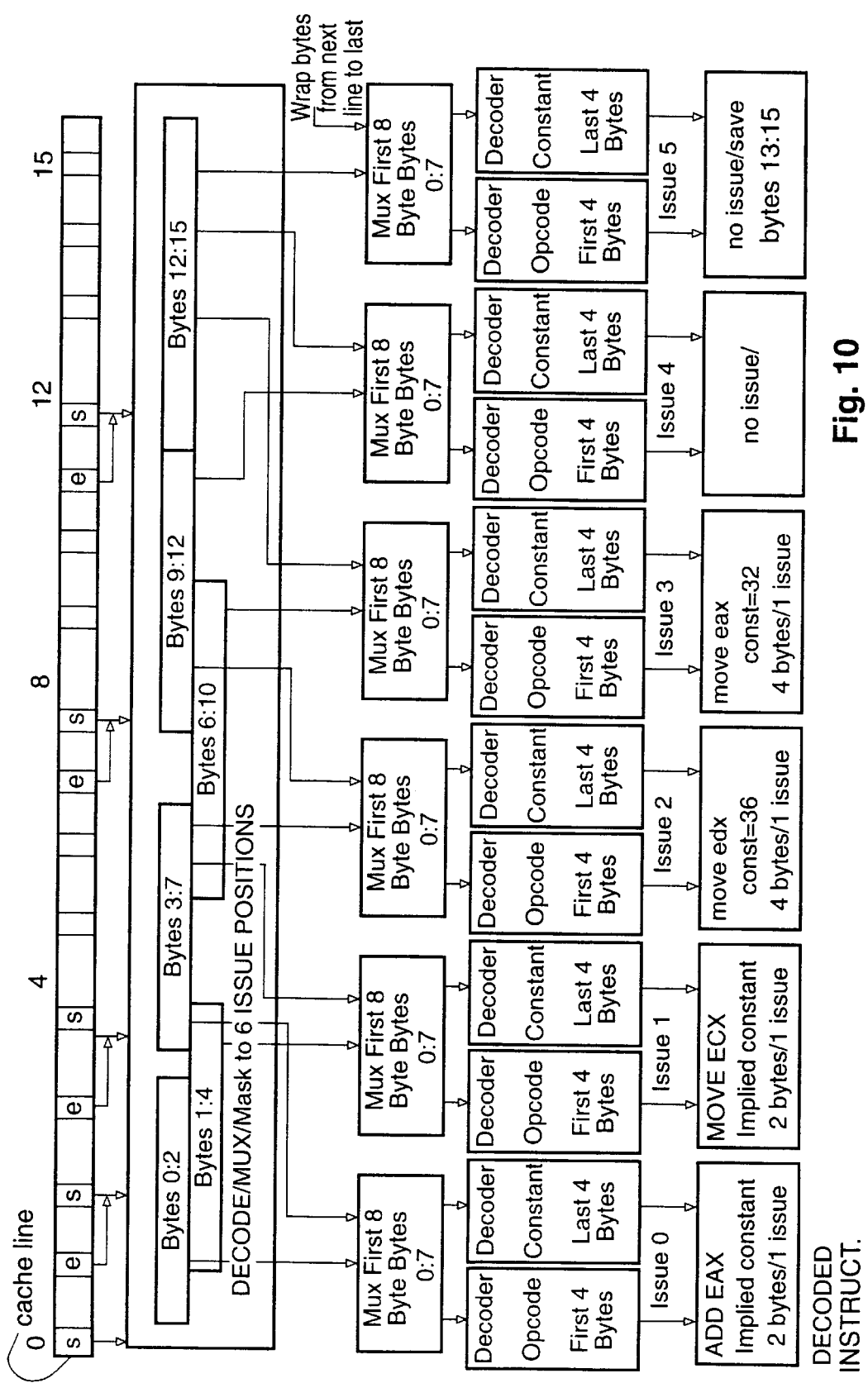

FIG. 10 is a block representation of the alignment and decode structure of processor 500. This structure uses the instruction pre-decode information contained within each cache line to determine where the start and end positions are, as well as if a given instruction is an accelerated instruction or not.

Accelerated instructions are defined as fast-path instructions between 1 and 8 bytes in length. It noted that it is possible that the start/end positions predecoded reflect multiple x86 instructions, for instance 2 or 3 pushes that are predecoded in a row may be treated as one accelerated instruction that consumes 3 bytes.

When a cache line is fetched from the instruction cache, it moves into an instruction alignment unit which looks for start bytes within narrow ranges. The instruction alignment unit uses the positions of the start bytes of the instructions to dispatch the instructions to six issue positions. Instructions are dispatched such that each issue position accepts the first valid start byte within its range along with the next three bytes.

Four bytes is the maximum number of bytes which can include the prefix and opcode bytes of an instruction. A multiplexer in each decoder looks for the end byte associated with each start byte, where an end byte can be no more than seven bytes away from a start byte. The mechanism to scan for a constant value in an instruction over four bytes in length is given an extra pipeline stage due to the amount of time potentially required.

Note that instructions included in the subset of accelerated instructions, and which are over four bytes in length, always have a constant as the last 1/2/4 bytes. This constant is usually not needed until the instruction is issued to a functional unit, and therefore the determination of the constant value can be delayed in the pipeline. The exception is an instruction requiring an eight-bit displacement for an address calculation. The eight-bit displacement for stack-relative operations is always the third byte after the start byte, so this field will always be located within the same decoder as the rest of the instruction.

It is possible that a given cache line can have more instructions to issue than can be accommodated by the six entry positions contained in each line of the line-oriented reorder buffer. If this occurs, the line-oriented reorder buffer allocates a second line in the buffer as the remaining instructions are dispatched. Typically, in 32-bit application and O/S code, the average instruction length is about three bytes. The opcode is almost always the first two bytes, with the third byte being a sib byte specifying a memory address (if included), and the fourth byte being a 16-bit data prefix.

The assumption in the processor 500 alignment hardware is that if the average instruction length is three, then six dedicated issue positions and decoders assigned limited byte ranges should accommodate most instructions found within 16-byte instruction cache lines. If very dense decoding occurs (i.e., lots of one and two byte instructions), several lines are allocated in the line-oriented reorder buffer for the results of instructions contained in a few lines of the instruction cache. The fact that these more compact instructions are still issued in parallel and at a high clock frequency more than compensates for having some decoder positions potentially idle.

As an example, take the case of 8 two-byte instructions continually encoded within a cache line. This instruction sequence would have start bytes at positions:

0
2
4
6
8
10
12
14

FIG. 11 shows the cycle during which each instruction would be decoded and issued, and to which issue positions each instruction would be dispatched. Note that the instruction alignment unit uses no other advanced knowledge except the locations of the start bytes of each instruction. Entry positions in the line-oriented reorder buffer which correspond to issue positions which are not used during a given cycle are invalidated, and a new line is allocated in the line-oriented reorder buffer each cycle. This allows us to decode and align instructions at high speed without specifically knowing whether a given issue position is allocated an instruction in a given cycle.

A worst-case scenario might be a sequence of one-byte instructions (e.g., inc, push, inc, push, etc.). FIG. 12 shows the cycle during which each instruction would be decoded and issued, and to which issue positions each instruction would be dispatched. While the performance isn't spectacular, sequences of one-byte instructions are probably rarely encountered in code. The important point is that the mechanism does not break. Code typically contains two-byte, three-byte, and four-byte instructions mixed with one-byte instructions. With this mix, the majority of issue positions are allocated instructions. Long six-byte instructions are also rare, but if encountered, they are also directly executed.

FIG. 13 shows an example instruction sequence based on exemplary 32-bit application code. FIG. 14 shows the cycle during which each instruction would be decoded and issued, and to which issue positions each instruction would be dispatched. In this example, all branches are assumed not taken. Focusing on cycles 1–6 of FIG. 14, 26 x86 instructions are decoded/issued in six clock cycles. This reduces to 4.33 raw x86 instructions per clock cycle with this alignment technique.

Figure 15:
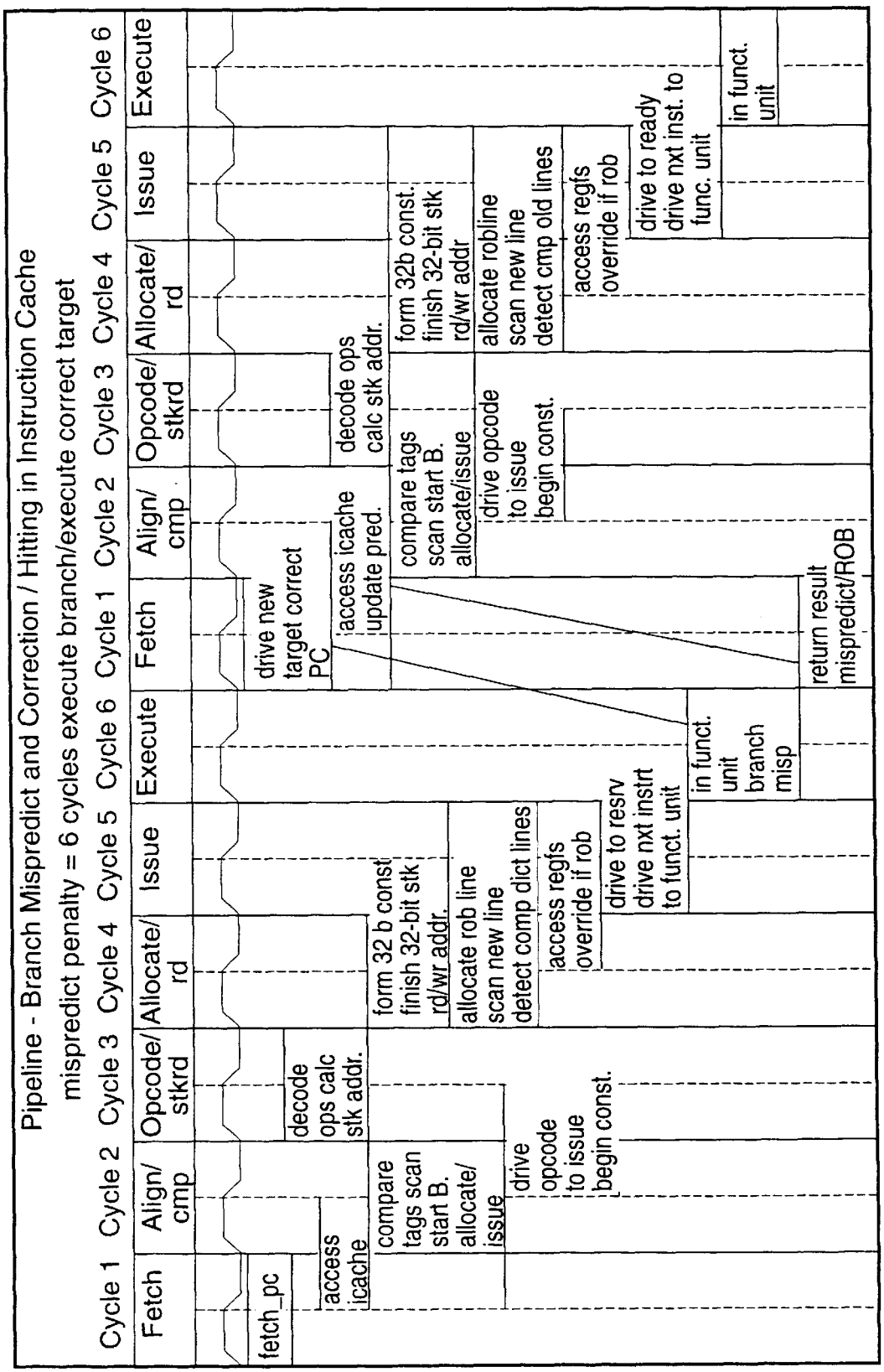
Figure 16:
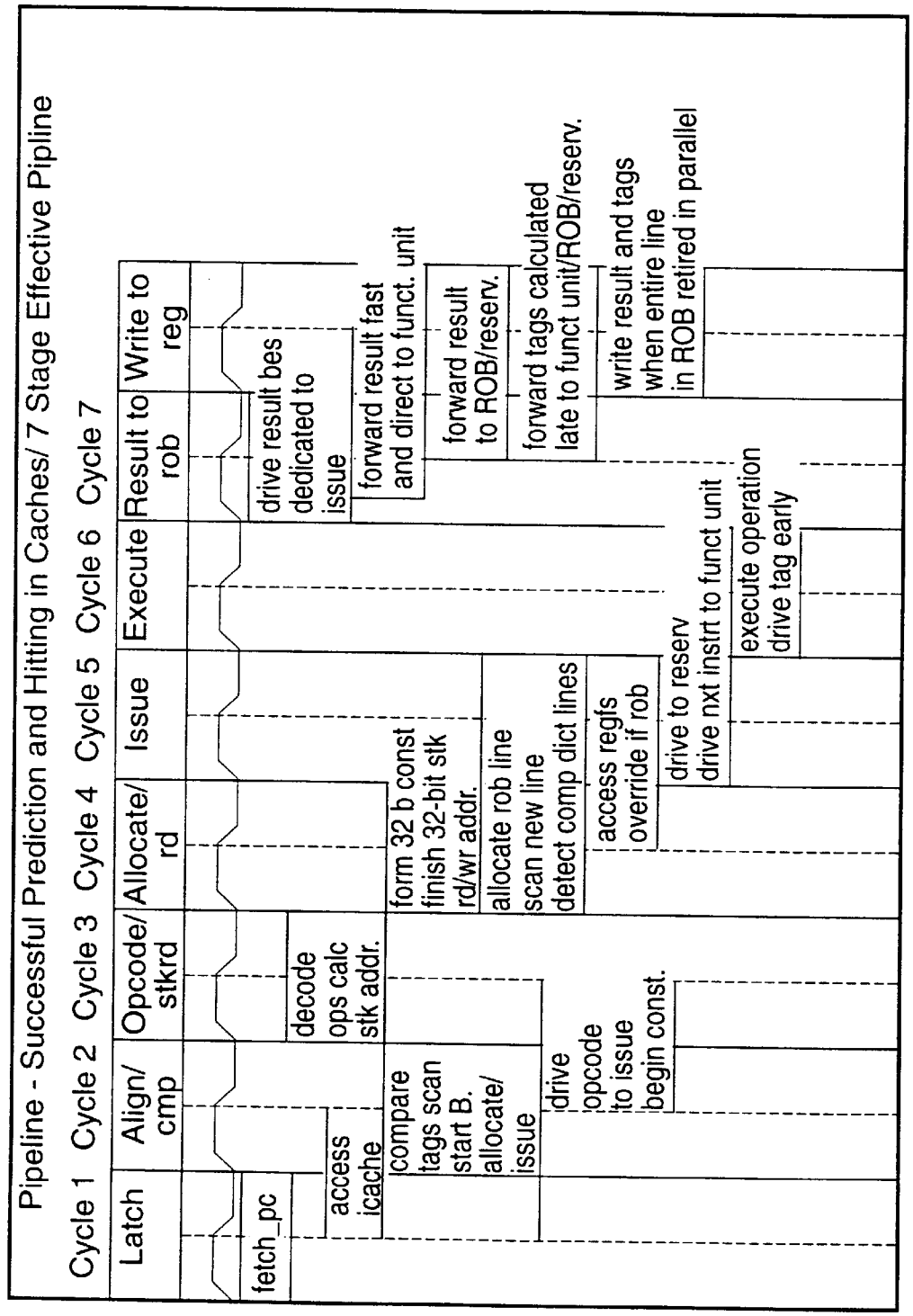
Figure 19:
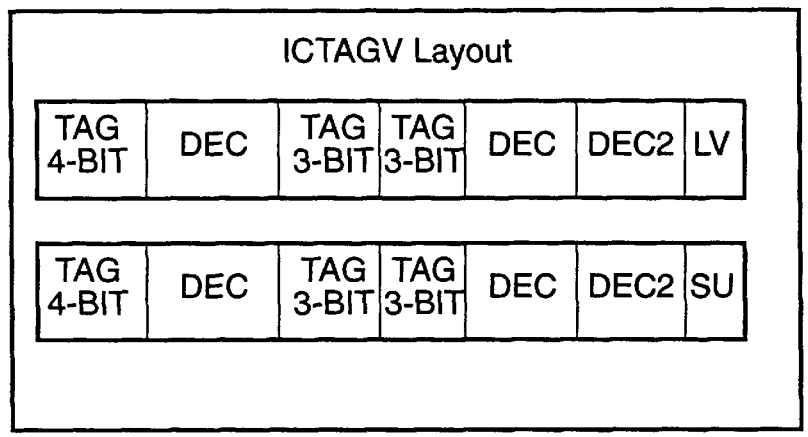
Figure 20:
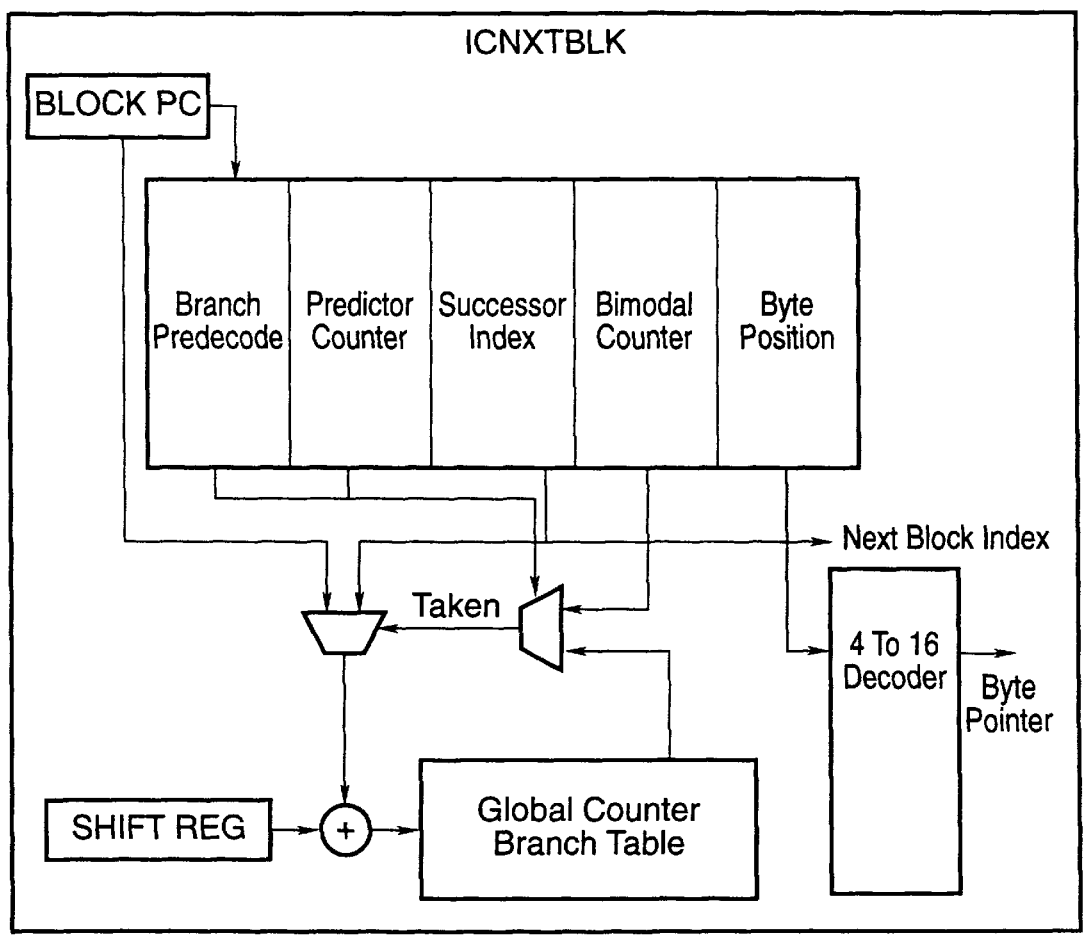

FIG. 15 illustrates processor 500 pipeline execution cycles with a branch misprediction detected during cycle 6 and the resulting recovery operation. FIG. 16 similarly illustrates the processor 500 pipeline execution cycles for the equivalent seven stages assuming successful branch prediction and all required instruction and data present in the respective caches.

DESCRIPTION OF INSTRUCTION CACHE AND FETCHING MECHANISM

Next the instruction cache organization, fetching mechanism, and pre-decode information will be discussed. As shown in FIGS. 17–20, the instruction cache (Icache) 502 of processor 500 includes blocks ICSTORE, ICTAGV, ICNXTBLK, ICCNTL, ICALIGN, ICFPC, and ICPRED. The instruction cache contains 32K bytes of storage and is an 8-way set associative cache, and is linearly addressed. The Icache is allowed more than one clock cycle to read and align the instructions to the decode units. The address is calculated in first half of ICLK, the data, tag, pre-decode, and predicting information are read in by the end of ICLK. In the next cycle, and the data are multiplexed from the tag comparison, and the instructions are aligned and sent to the decode units. The alignment multiplexing is accomplished as the tags are compared. The decode units can start decoding in the second half of this clock. The Icache includes a way-prediction which can be done in a single clock using the ICNXTBLK target. The branch prediction includes bimodal and global branch prediction which takes two clock cycles.

TABLE 6

Signal list.

| | |
|---|---|
| IRESET | Global signal used to reset ICACHE block. Clears all state machines to Idle/Reset. |
| IDECJAMIC | Global signal from the LOROB. Used to indicate that an interrupt or trap is being taken. Effect on Icache is to clear all pre-fetch or access in progress, and set all state machines to Idle/Reset. |
| SUPERV | Input from LSSEC indicates the supervisor mode or user mode of the current accessed instruction. |
| TR12DIC | Input from SRB indicates that all un-cached instructions must be fetched from the external memory. |
| SRBINVILV | Input from SRB to invalidate the Icache by clear all valid bits. |
| INSRDY | Input from BIU to indicates the valid external fetched instruction is on the INSB(63:0) bus. |
| INSFLT | Input from BIU to indicates the valid but faulted external fetched instruction is on the INSB(63:0) bus. |
| INSB(63:0) | Input from external buses for fetched instruction to the Icache. |
| REMAP | Input from L2 indicates the instruction is in the Icache with different mapping. The L2 provides the way associative and new supervisor bit. The LV will be set in this case. |
| PFREPLCOL(2:0) | Input from L2 indicates the way associative for writing of the ICTAGV. |
| UPDFPC | Input from LOROB indicate that a new Fetch PC has been detected. This signal accompanies the FPC for the Icache to begin access the cache arrays. |
| TARGET(31:0) | Input from LOROB as the new PC for branch correction path. |
| BRNMISP | Input from the Branch execution of the FU indicates that a branch mis-prediction. The Icache changes its state machine to access a new PC and clears all pending instructions. |

TABLE 6-continued

Signal list.

| | |
|---|---|
| BRNTAKEN | Input from the LOROB indicate the status of the mis-prediction. This signal must be gated with UPDFPC. |
| BRNFIRST | Input from the LOROB indicate the first or second target in the ICNXTBLK for updating the branch prediction. |
| BRNCOL(3:0) | Input from the LOROB indicates the instruction byte for updating the branch prediction in the ICNXTBLK. |
| FPCTYP | Input for the LOROB indicates the type of address that is being passed to the Icache. |
| BPC(11:0) | Input from the LOROB indicates the PC index and byte-pointer of the branch instruction which has been mis-predicted for updating the ICNXTBLK. |
| MVTOSRIAD | Input from SRB, indicates a move to IAD special register, Icache needs to check its pointer against the pointer driven on IAD. |
| MVFRSRIAD | Input from SRB, indicates a move from IAD special register, Icache needs to check its pointer against the pointer driven on IAD. |
| MVTOARIAD | Input from SRB, indicates a move to IAD special register array, Icache needs to check its pointer against the pointer driven on IAD. |
| MVFRARIAD | Input from SRB, indicates a move from IAD special register array, Icache needs to check its pointer against the pointer driven on IAD. |
| RTOPPTR(2:0) | Input from decode indicates the current top-of-the-stack pointer for the return stack. This information should be kept in the global shift register in case of mis-predicted branch. |
| RETPC(31:0) | Input from decode indicates the PC address from the top of the return stack for fast way prediction. |
| INVBYTE(3:0) | Input from Idecode to ICPRED indicates the starting byte position of the confused instruction for pre-decoding. |
| INVPRED | Input from Idecode to ICPRED indicates pre-decoding for the confused instruction. |
| INVPOLD | Input from Idecode indicates pre-decoding for the previous line of instruction. The ICFPC should start with the previous line. |
| REERESH2 | Input from Idecode indicates current line of instructions will be refreshed and not accept new instructions from Icache. |
| MROMEN | Input from MROM indicates the micro-instructions is sent to Idecode instead of the Icache. |
| RETPTR(2:0) | Output indicates the old pointer of the return stack from the mis-predicted branch instruction. The return stack should use this pointer to restore the top-ot-the-stack pointer. |
| ICPC(31:0) | Output from Idecode indicates the current line PC to pass along with the instruction to the LOROB. |
| ICPOS0(3:0) | ICLK7 Output to decode unit 0 indicates the PC's byte position of the instruction. |
| ICPOS1(3:0) | ICLK7 Output to decode unit 1 indicates the PC's byte position of the instruction. |
| ICPOS2(3:0) | ICLK7 Output to decode unit 2 indicates the PC's byte position of the instruction. |
| ICPOS3(3:0) | ICLK7 Output to decode unit 3 indicates the PC's byte position of the instruction. |
| ICPOS4(3:0) | ICLK7 Output to decode unit 4 indicates the PC's byte position of the instruction. |
| ICPOS5(3:0) | ICLK7 Output to decode unit 5 indicates the PC's byte position of the instruction. |
| IBD0(31:0) | ICLK7 Output to decode unit 0 indicates the 4-byte of the instruction. |
| IBD1(31:0) | ICLK7 Output to decode unit 1 indicates the 4-byte of the instruction. |
| IBD2(31:0) | ICLK7 Output to decode unit 2 indicates the 4-byte of the instruction. |
| IBD3(31:0) | ICLK7 Output to decode unit 3 indicates the 4-byte of the instruction. |
| IBD4(31:0) | ICLK7 Output to decode unit 4 indicates the 4-byte of the instruction. |
| IBD5(31:0) | ICLK7 Output to decode unit 5 indicates the 4-byte of the instruction. |

TABLE 6-continued

Signal list.

| | |
|---|---|
| IC0START | |
| IC1START | |
| IC2START | |
| IC3START | |
| IC4START | |
| IC5START | ICLK7 Output to Idecode indicates the start-byte for the lines of instructions being fetched. |
| IC0END(3:0) | |
| IC1END(3:0) | |
| IC2END(3:0) | |
| IC3END(3:0) | |
| IC4END(3:0) | |
| IC5END(3:0) | ICLK7 Output to Idecode indicates the end-byte for the lines of instructions being fetched. |
| IC0FUNC(3:0) | |
| IC1FUNC(3:0) | |
| IC2FUNC(3:0) | |
| IC3FUNC(3:0) | |
| IC4FUNC(3:0) | |
| IC5FUNC(3:0) | ICLK7 Output to Idecode indicates the functional-bit for the lines of instructions being fetched. |
| ICSTART(15:0) | ICLK7 Output to MROM indicates the start-byte for the lines of instructions being fetched. |
| ICEND(15:0) | ICLK7 Output to MROM indicates the end-byte for the lines of instructions being fetched. |
| ICFUNC(15:0) | ICLK7 Output to MROM indicates the functional-bit for the lines of instructions being fetched. |
| ICBRN1 | ICLK7 Output, indicates the branch taken prediction of the first target in the ICNXTBLK for the lines of instructions being fetched. |
| ICBRN2 | ICLK7 Output, indicates the branch taken prediction of the second target in the ICNXTBLK for the lines of instructions being fetched. |
| ICBCOL1(3:0) | ICLK7 Output, indicates the column of the first branch target in the ICNXTBLK for the lines of instructions being fetched. |
| ICBCOL2(3:0) | ICLK7 Output, indicates the column of the second branch target in the ICNXTBLK for the lines of instructions being fetched. |
| BTAG1(3:0) | Output indicates the position of the first target branch instruction with respect to the global shift register in case of branch mis-prediction. |
| BTAG2(3:0) | Output indicates the position of the second target branch instruction with respect to the global shift register in case of branch mis-prediction. |
| ICERROR | ICLK7 Output, indicates an exception has occurred on an instruction pre-fetched, the type of exception (TLB-miss, page-fault, illegal opcode, external bus error) will also be asserted. |
| INSPFET | Output to BIU and L2 requests instruction fetching from the previous incremented address, the pre-fetch buffer in the Icache has space for a new line from external memory. |
| ICAD(31:0) | ICLK7 Output to MMU indicates a new fetch PC request to external memory. |
| ICSR(31:0) | Input/Output to special registers indicates reading/writing data into the array for testing purpose. |
| IBTARGET(31:0) | Output to decode unit indicates the predicted taken branch target for the line on instruction in the previous cycle. |
| RETPRED | Output from Idecode indicates the current prediction of the return instruction of the fetched line. The return instruction must be detected in the current line of instruction or the Icache must be re-fetched from a new line. |

ICSTORE

As stated previously, processor 500 executes fast path instructions directly. Three pre-decode bits are associated with each byte of instruction: a start bit, an end bit, and a functional bit. All the external fetched instructions will be latched into the Icache. Only single-byte prefixes of 0x66 and 0x0F are allowed for fast path instructions. Instructions including a second prefix byte of 0x67 are also allowed, and require one extra decode cycle. All other prefixes require extra cycles in decoding or execution using microcode sequences stored in MROM. With these simple prefixes, the instruction bytes need not be modified. The linear valid bit is used for the whole cache-line of instructions (16 bytes). The replacement procedure is controlled by the L2 unit. Along with each line of instruction, the L2 unit directs the Icache on storing the data and tag. The start and end bits are sufficient to validate the instruction. In cases of branching to the middle of a line or instructions which wrap around to the next line, the start and end bits must be detected for each instruction or else the instruction must be pre-decoded again. The possible cases are branching to the opcode and skipping the prefix (pruning of the instruction) and replacing part of the instruction in the Icache. The instructions must first be passed through pre-fetch buffers before being sent to the ICPRED. The ICPRED has only one input from the IB(127:0) for both the pre-fetched or cached instructions. The pre-decode information is written into the ICPDAT as the whole line is decoded.

Since the instruction fetching from external memory will be written directly into the Icache, the pre-fetch buffer should be built into the ICSTORE; the input/output path of the array. In this way, the data will be written into the Icache regardless of the pre-decode information or the taken branch instruction and the instructions are available to the Icache as soon as they are valid on the bus. There may be two pre-fetch buffers, and requests will be made to the BIU as soon as there is space in pre-fetch buffer for another line of instructions. The pre-fetch buffer includes a counter and a valid bit for instructions written into the cache, as well as a valid bit for instructions sent to the decode unit. As long as the address pointer is still in the same block, the data will be written to the array. With the pre-fetch buffer in the Icache, a dedicated bus should be used to transfer instructions directly from the pads to the Icache; this is a step to keep processor 500 from using dynamic precharged buses.

ICSTORE Organization

The ICSTORE in processor 500 does not include the pre-decode data. The ICSTORE contains 32K bytes of instructions organized as 8 sets of 128 rows by 256 columns. Each of the sets consist of two bytes of instructions. The 8-way associative multiplexing from the 8 TAG-HITs is performed before the data is routed to the ICALIGN block. With this arrangement, the input/output to each set is 16-bit buses. The multiplexing information regarding which byte is to be directed to which decode unit should also be decoded; this topic will be discussed in more detail in the ICALIGN section. For optimal performance, the layout of the column should be 64 RAM cells, precharge, 64 RAM cells, write buffer, and senseamp. The row decoder should be in the middle of the array to drive 128 columns each way, and the precharge and the row decoder should cross in the middle of the array. The self-time column is used to generate internal clock signals for each set of the array. The precharge is gated by the ICLK signal. The instruction is valid by the end of ICLK, the data multiplexed by the TAG-HIT signals should be gated by ICLK to be valid for the second ICLK. The two-entry pre-fetch buffers are implemented inside the array with data input from either entry. The output IB bus is driven by either the array or the pre-fetch buffer.

TABLE 7

Signal list.

| | |
|---|---|
| IADD(11:0) | Input from ICFPC indicates the address of instruction to access the array. Bits 11:5 are for the row decoder, bits 4:0 are for column select. |
| TAGHIT(7:0) | Input from ICTAGV indicates which set is selected to read instructions. |
| ICSRD | Input from ICCNTL to read instruction. |
| ICSWR | Input from ICCNTL to write instructions from pre-fetch buffers into the array. |
| SRSRD | Input from ICCNTL to read instruction for special register. |
| SRSWR | Input from ICCNTL to write instruction for special register. |
| SETSEL(7:0) | Input from ICFPC indicates which set to read, no tag compare is needed. |
| TAGCHK | Input from ICCNTL to indicates the valid set is from TAGHIT or SETSEL. |
| PBENAB | Input from ICCNTL to enable the pre-fetch buffer to latch the INSB(31:0) bus and write into the array. |
| INSB(63:0) | Input from external buses for fetched instruction to the Icache. |
| IB(127:0) | Output to ICALIGN after the set select to align instructions to decode units. |
| PBFLT | Output to ICCNTL indicates the current instruction is faulted from external fetch. |
| PBVAL | Output to ICCNTL indicates the current instruction is valid from external fetch. may be in the ICCNTL |
| PBEMPTY | Output to ICCNTL indicates the pre-fetch buffer is empty. |
| PBONE | Output to ICCNTL indicates the pre-fetch buffer has one available entry. |
| PBFULL | Output to ICCNTL indicates the pre-fetch buffer is full. |

ICPDAT

In processor 500, the pre-decode data is stored in the ICPDAT section, not in the ICSTORE. The pre-decode data is updated with a different timing than that of instructions. The ICPDAT will be updated as the whole instruction line is completed decoding in the ICPRED. As instructions are written from pre-fetch buffer to the ICSTORE array, zeros will be written into the ICPDAT array to prevent future erroneous access. The pointer to ICSTORE will not advance until the whole line of instruction is pre-decoded and the ICPDAT array is updated. The control unit should allow the ICPDAT one clock cycle for updating before jumping to the next block. The pre-decode data includes three bits: start bit, end bit, and functional bit. Any valid instruction should begin with start-byte (with its start bit set) and end with the end-byte (with its end bit set) before the next start-byte is encountered. The start-byte and the end-byte are used to align the instructions from the ICSTORE to the decode units. The start bits are decoded into byte-shifting information which will be used by the ICALIGN block. The byte-shifting logic uses the following rules:

| Start-byte | Decode units |
|---|---|
| 0 | |
| 1 | 0 or 1 |
| 2 | 0 or 1 |
| 3 | 1 or 2 |
| 4 | 1 or 2 |
| 5 | 2 |
| 6 | 2 or 3 |
| 7 | 2 or 3 |
| 8 | 2 or 3 |
| 9 | 3 or 4 |
| 10 | 3 or 4 |
| 11 | 4 |
| 12 | 4 or 5 |
| 13 | 5 or 6 |
| 14 | 5 or 6 |
| 15 | 5 or 6 |
| Byte group | |
| 0–3 | 0, 1, or 2 |
| 4–7 | 1, 2, or 3 |
| 8–11 | 2, 3, or 4 |
| 12–15 | 4, 5, or 6 |

If the start byte is at byte location 0, the byte would be dispatched to decode unit 0. A given start byte will be dispatched to the lowest-ordered decoding unit possible not taken by the previous start byte. If a byte cannot be sent to any decode unit, then the rest of the line must wait for the next cycle to be dispatched to the decode units. In the next cycle, all the start bytes up to this byte should be clear, the first valid byte should go to the lowest-ordered decode unit possible. The last instruction of the line may wrap around to the next line if no end byte is detected. For example, if only three bytes of an instruction more than three bytes long is dispatched to decode unit 6, then decode unit 6 should not encounter an end byte. The logic for the alignment shifting is constructed with the maximum path of seven gates, the last gate of which is an inverter which can be included in the multiplexing of data. Two simplifications are made to eliminate the required scan through all the bytes:

1. At byte position 9, scan back to bytes 6–8. If there is a start byte in bytes 6–8, regardless of which decode unit is used, then byte 9 uses decode unit 4, else uses decode unit 3.
2. At byte position 12, scan back to bytes 9–11. If there is a start byte in bytes 9–11, regardless of which decode unit is used, then byte 12 uses decode unit 5, else uses decode unit 4.

The predecode bits are sent along with the instructions to the decode units. If a part of the line cannot be dispatched to the decode units, no start-byte is sent for that part of the line. The IBDx buses can be pseudo-dynamic buses with precharge using the self-time clock of the array. If the first byte of the decode unit does not have a start-byte, the decode unit passes a NOOP to the functional unit.

ICPDAT Organization

The ICPDAT contains 32K of 3-bit pre-decode data organized as 8 sets of 64 rows by 192 columns. Each of the sets consists of two 3-bit pre-decode data. The pre-decode data is decoded into byte-shifting information which is used by the ICALIGN block. The 8-way associative multiplexing from the 8 TAGHITs is performed before the byte-shifting data is routed to the ICALIGN block. In order for the instructions to get to the Idecode in middle of the second ICLK, the decode logic for the byte-shifting should be less than seven gates. Because of this byte-shifting logic, the array for ICPDAT is 64 rows instead of 128 rows for the ICSTORE array. For optimal performance, the layout of the column is 32 RAM cells, precharge, 32 RAM cells, write buffer and senseamp. The row decoder should be in the middle of the array to drive 96 column each way, and the precharge and the row decoder should cross in the middle of the array. The self-time column is used to generate internal clock signals for each set of the array. The precharge is gated by the ICLK signal. The byte-shifting data multiplexed by the TAGHIT should be gated by ICLK to be valid for the second ICLK. The output of the array should include logic to feedback the previous pre-decode data for breaking up of the line for second cycle access.

TABLE 8

Signal list.

| Signal | Description |
|---|---|
| IADD(11:0) | Input from ICFPC indicates the address of instruction to access the array. Bits 11:6 are for the row decoder, bits 5:0 are for column select. |
| TAGHIT(7:0) | Input from ICTAGV indicates which set is selected to read instructions. |
| ICSRD | Input from ICCNTL to read instruction. |
| ICPWR | Input from ICCNTL to write predecoded data from ICPRED into the array. |
| SRPRD | Input from ICCNTL to read pre-decode data for special register. |
| SRPWR | Input from ICCNTL to write pre-decode data for special register. |
| SETSEL(7:0) | Input from ICFPC indicates which set to read, no tag compare is needed. |
| TAGCHK | Input from ICCNTL to indicates the valid set is from TAGHIT or SETSEL. |
| PSTARTB(7:0) | Input from ICPRED indicates the start bytes for current instruction. The start bytes are latched until pre-decoding of the whole line is completed. |
| PENDB(7:0) | Input from ICPRED indicates the end bytes for current instruction. The end bytes are latched until pre-decoding of the whole line is completed. |
| PFUNCB(7:0) | Input from ICPRED indicates the functional bytes for current instruction. The functional bytes are latched until pre-decoding of the whole line is completed. |
| PBYTEPTR(3:0) | Input from ICPRED indicates the byte position of the predecoded bytes for current instruction. |
| ICSTART(15:0) | ICLK7 Output to Idecode indicates the start-byte for the lines of instructions being fetched. |
| ICEND(15:0) | ICLK7 Output to Idecode indicates the end-byte for the lines of instructions being fetched. |
| ICFUNC(15:0) | ICLK7 Output to Idecode indicates the functional-bit for the lines of instructions being fetched. |
| BYTE0SH00 | ICLK Output to ICALIGN indicates that byte 0 is shifted to byte 0 of decode 0. |
| BYTE1SH01 | ICLK Output to ICALIGN indicates that byte 1 is shifted to byte 1 of decode 0. |
| BYTE2SH02 | ICLK Output to ICALIGN indicates that byte 2 is shifted to byte 2 of decode 0. |
| BYTE3SH03 | ICLK Output to ICALIGN indicates that byte 3 is shifted to byte 3 of decode 0. |
| BYTE1SH00 | |
| BYTE2SH01 | |
| BYTE3SH02 | |
| BYTE4SH03 | ICLK Output to ICALIGN indicates that start-byte 1 and the next 3 bytes are shifted to decode 0. |
| BYTE2SH00 | |
| BYTE3SH01 | |
| BYTE4SH02 | |
| BYTE5SH03 | ICLK Output to ICALIGN indicates that start-byte 2 and the next 3 bytes are shifted to decode 0. |
| BYTE6SH10 | |
| BYTE7SH11 | |
| BYTE8SH12 | |
| BYTE9SH13 | ICLK Output to ICALIGN indicates that start-byte 2 and the next 4 bytes starting at byte 6 are shifted to decode 1. |
| BYTE1SH10 | |
| BYTE2SH11 | |
| BYTE3SH12 | |
| BYTE4SH13 | ICLK Output to ICALIGN indicates that start-byte 1 and the next 3 bytes are shifted to decode 1. |
| BYTE2SH10 | |
| BYTE3SH11 | |
| BYTE4SH12 | |
| BYTE5SH13 | ICLK Output to ICALIGN indicates that start-byte 2 and the next 3 bytes are shifted to decode 1. |
| BYTE3SH10 | |
| BYTE4SH11 | |
| BYTE5SH12 | |
| BYTE6SH13 | ICLK Output to ICALIGN indicates that start-byte 3 and the next 3 bytes are shifted to decode 1. |
| BYTE4SH10 | |
| BYTE5SH11 | |
| BYTE6SH12 | |
| BYTE7SH13 | ICLK Output to ICALIGN indicates that start-byte 4 and the next 3 bytes are shifted to decode 1. |
| BYTE3SH20 | |
| BYTE4SH21 | |
| BYTE5SH22 | |
| BYTE6SH23 | ICLK Output to ICALIGN indicates that start-byte 3 and the next 3 bytes are shifted to decode 2. |
| BYTE4SH20 | |
| BYTE5SH21 | |
| BYTE6SH22 | |
| BYTE7SH23 | ICLK Output to ICALIGN indicates that start-byte 4 and the next 3 bytes are shifted to decode 2. |
| BYTE5SH20 | |
| BYTE6SH21 | |
| BYTE7SH22 | |
| BYTE8SH23 | ICLK Output to ICALIGN indicates that start-byte 5 and the next 3 bytes are shifted to decode 2. |
| BYTE6SH20 | |
| BYTE7SH21 | |
| BYTE8SH22 | |
| BYTE9SH23 | ICLK Output to ICALIGN indicates that start-byte 6 and the next 3 bytes are shifted to decode 2. |
| BYTE7SH20 | |
| BYTE8SH21 | |
| BYTE9SH22 | |
| BYTEASH23 | ICLK Output to ICALIGN indicates that start-byte 7 and the next 3 bytes are shifted to decode 2. |
| BYTEBSH30 | |
| BYTECSH31 | |
| BYTEDSH32 | |
| BYTEESH33 | ICLK Output to ICALIGN indicates that start-byte 7 and the next 4 bytes starting at byte 11 are shifted to decode 3. |
| BYTE8SH20 | |
| BYTE9SH21 | |
| BYTEASH22 | |
| BYTEBSH23 | ICLK Output to ICALIGN indicates that start-byte 8 and the next 3 bytes are shifted to decode 2. |
| BYTECSH30 | |
| BYTEDSH31 | |
| BYTEESH32 | |
| BYTEFSH33 | ICLK Output to ICALIGN indicates that start-byte 8 and the next 4 bytes starting at byte 12 are shifted to decode 3. |
| BYTE6SH30 | |
| BYTE7SH31 | |
| BYTE8SH32 | |
| BYTE9SH33 | ICLK Output to ICALIGN indicates that start-byte 6 and the next 3 bytes are shifted to decode 3. |
| BYTE7SH30 | |
| BYTE8SH31 | |
| BYTE9SH32 | |
| BYTEASH33 | ICLK Output to ICALIGN indicates that start-byte 7 and the next 3 bytes are shifted to decode 3. |
| BYTE8SH30 | |
| BYTE9SH31 | |
| BYTEASH32 | |
| BYTEBSH33 | ICLK Output to ICALIGN indicates that start-byte 8 and the next 3 bytes are shifted to decode 3. |
| BYTE9SH30 | |
| BYTEASH31 | |
| BYTEBSH32 | |
| BYTECSH33 | ICLK Output to ICALIGN indicates that start-byte 9 and the next 3 bytes are shifted to decode 3. |
| BYTEDSH40 | |
| BYTEESH41 | |
| BYTEFSH42 | ICLK Output to ICALIGN indicates that start-byte 9 and the next 3 bytes starting at byte 13 are shifted to decode 4. |
| BYTEASH30 | |
| BYTEBSH31 | |
| BYTECSH32 | |

TABLE 8-continued

Signal list.

| | |
|---|---|
| BYTEDSH33 | ICLK Output to ICALIGN indicates that start-byte 10 and the next 3 bytes are shifted to decode 3. |
| BYTEESH40 | |
| BYTEFSH41 | ICLK Output to ICALIGN indicates that start-byte 10 and the next 2 bytes starting at byte 14 are shifted to decode 4. |
| BYTE9SH40 | |
| BYTEASH41 | |
| BYTEBSH42 | |
| BYTECSH43 | ICLK Output to ICALIGN indicates that start-byte 9 and the next 3 bytes are shifted to decode 4. |
| BYTEASH40 | |
| BYTEBSH41 | |
| BYTECSH42 | |
| BYTEDSH43 | ICLK Output to ICALIGN indicates that start-byte 10 and the next 3 bytes are shifted to decode 4. |
| BYTEBSH40 | |
| BYTECSH41 | |
| BYTEDSH42 | |
| BYTEESH43 | ICLK Output to ICALIGN indicates that start-byte 11 and the next 3 bytes are shifted to decode 4. |
| BYTECSH40 | |
| BYTEDSH41 | |
| BYTEESH42 | |
| BYTEFSH43 | ICLK Output to ICALIGN indicates that start-byte 12 and the next 3 bytes are shifted to decode 4. |
| BYTECSH50 | |
| BYTEDSH51 | |
| BYTEESH52 | |
| BYTEFSH53 | ICLK Output to ICALIGN indicates that start-byte 12 and the next 3 bytes are shifted to decode 5. |
| BYTEDSH50 | |
| BYTEESH51 | |
| BYTEFSH52 | ICLK Output to ICALIGN indicates that start-byte 13 and the next 2 bytes are shifted to decode 5. |
| BYTEESH50 | |
| BYTEFSH51 | ICLK Output to ICALIGN indicates that start-byte 14 and the next 1 bytes are shifted to decode 5. |
| BYTEFSH50 | ICLK Output to ICALIGN indicates that start-byte 15 is shifted to decode 5. |
| BYTEDSH60 | |
| BYTEESH61 | |
| BYTEFSH62 | ICLK Output to ICALIGN indicates that start-byte 13 and the next 2 bytes are shifted to decode 6. |
| BYTEESH60 | |
| BYTEFSH61 | ICLK Output to ICALIGN indicates that start-byte 14 and the next 1 bytes are shifted to decode 6. |
| BYTEFSH60 | ICLK Output to ICALIGN indicates that start-byte 15 is shifted to decode 6. |
| NEXT2 | ICLK Output to ICALIGN indicates break to next line starting from byte 2 and clears all pre-decode bits up to byte 2. |
| NEXT4 | ICLK Output to ICALIGN indicates break to next line starting from byte 4 and clears all pre-decode bits up to byte 4. |
| NEXT5 | ICLK Output to ICALIGN indicates break to next line starting from byte 5 and clears all pre-decode bits up to byte 5. |
| NEXT7 | ICLK Output to ICALIGN indicates break to next line starting from byte 7 and clears all pre-decode bits up to byte 7. |
| NEXT8 | ICLK Output to ICALIGN indicates break to next line starting from byte 8 and clears all pre-decode bits up to byte 8. |
| NEXTA | ICLK Output to ICALIGN indicates break to next line starting from byte 10 and clears all pre-decode bits up to byte 10. |
| NEXTD | ICLK Output to ICALIGN indicates break to next line starting from byte 13 and clears all pre-decode bits up to byte 13. |
| NEXTE | ICLK Output to ICALIGN indicates break to next line starting from byte 14 and clears all pre-decode bits up to byte 14. |
| NEXTF | ICLK Output to ICALIGN indicates break to next line starting from byte 15 and clears all pre-decode bits up to byte 15. |

ICTAGV

As mentioned earlier, processor 500 executes the fast path instructions directly and the instructions are written into the Icache regardless of the pre-decode information. The linear valid bit is used for the whole line of instructions, assuming that the BIU always fetches 16 bytes of data. The L2 unit directs placement of the pre-fetch data and tag. Writing of the tag and linear valid bit are done at the same time as writing the data into the ICSTORE. The start and end bits are sufficient to validate the instruction. If branching to the middle of the line or to instructions which wrap around to the next cache line, the start and end bytes must be detected for each instruction or else the instruction must be pre-decoded again. The possible cases for invalid instructions are (1) branching to the opcode and skipping the prefix, (2) part of an instruction which wraps around to the next cache line has been replaced in the Icache, (3) part of the line was not predecoded because it contained a branch instruction or branch target. Whenever the MMU is re-mapped or the L2 executes a certain instruction, all the LV bits can be cleared. The next access to the Icache would result in LV miss, the L2 may send new mapping information to the Icache regarding the way-associative, the SU, and the new tag. In this case the Icache needs to write the ICTAGV with new information (including setting the LV bit) and read the other arrays.

With respect to a branch prediction, the tag address must be read from the ICTAGV in the next cycle to merge with the successor index for the predicted target address. The predicted target address must be sent to the decode units and to the functional units for comparison.

ICTAGV Organization

The ICTAGV contains 2048 lines of:

1. 20-bit Tag address.
2. 2 Status bits (SU, LV).

The status bits need to be dual-port to read and write in the same clock cycle. The ICTAGV is organized as two sets of 64 rows by 224 columns and two sets of 64 rows by 128 columns. Each of the first two sets includes seven-bit tag addresses, and each of the last two sets includes three-bit tag addresses and the SU or LV bit. The two status bits are dual-port RAM cells. The SU uses the delayed PC to write, and the LV bit has the snooping index from L2. The ICTAGV uses 64 rows for dual-port RAM and quick reading of tag addresses. For optimal performance, the layout of the columns should be 32 RAM cells, precharge, 32 RAM cells, write buffer and senseamp. The row decoder should be in the middle of the array to drive 112 or 96 columns each way, and the precharge and the row decoder should cross in the middle of the array. The row decoder for the dual port RAM should be located at one end of the array. The self-time column is used to generate internal clock for each set of the array. The precharge is gated by the ICLK signal. The status bits multiplexed by the TAGHIT signal should be gated by the ICLK signal to be valid for the second ICLK. The above layout is to ensure the minimum routing for the TAGHIT signal.

TABLE 9

Signal list.

| | |
|---|---|
| ITADD(11:4) | Input from ICFPC indicates the address of instruction to access the array. Bits 11:5 are for the row decoder, bit 4 is for column select. |
| IPADD(11:4) | Input from ICFPC indicates the address of instruction to access the LV array. Bits 11:5 are for the row decoder, bit 4 is for column select. |

TABLE 9-continued

Signal list.

| | |
|---|---|
| ICTAG(31:12) | Input from ICFPC indicates the address of instruction to compare with the tag arrays. |
| ICTVRD | Input from ICCNTL to read tag array. |
| ICTWR | Input from ICCNTL to write new tag. |
| ICVWR | Input from ICCNTL to write new valid bits. |
| ICCLRA | Input from ICCNTL to clear all valid bits. |
| ICSUWR | Input from ICCNTL to write the SU bit. |
| ICLVWR | Input from ICCNTL to write the LV bit. |
| SRTVRD | Input from ICCNTL to read tag for special register. |
| SRTVWR | Input from ICCNTL to write tag for special register. |
| SETSEL(7:0) | Input from ICFPC indicates which set to read, no tag compare is needed. |
| TAGCHK | Input from ICCNTL to indicates the valid set is from TAGHIT or SETSEL. |
| TAGHIT(7:0) | Output indicates which set is selected to read instructions. |
| VALBIT(7:0) | Output indicates the valid bits of 8 sets, uses for way-prediction. |
| VALBLK | Output indicates the valid block. |
| TVSU | Output indicates the supervisor/user mode of current block. |
| IBTARGET(31:0) | Output to decode unit indicates the predicted taken branch target for the line on instruction in the previous cycle. |

ICNXTBLK

Figure 22:
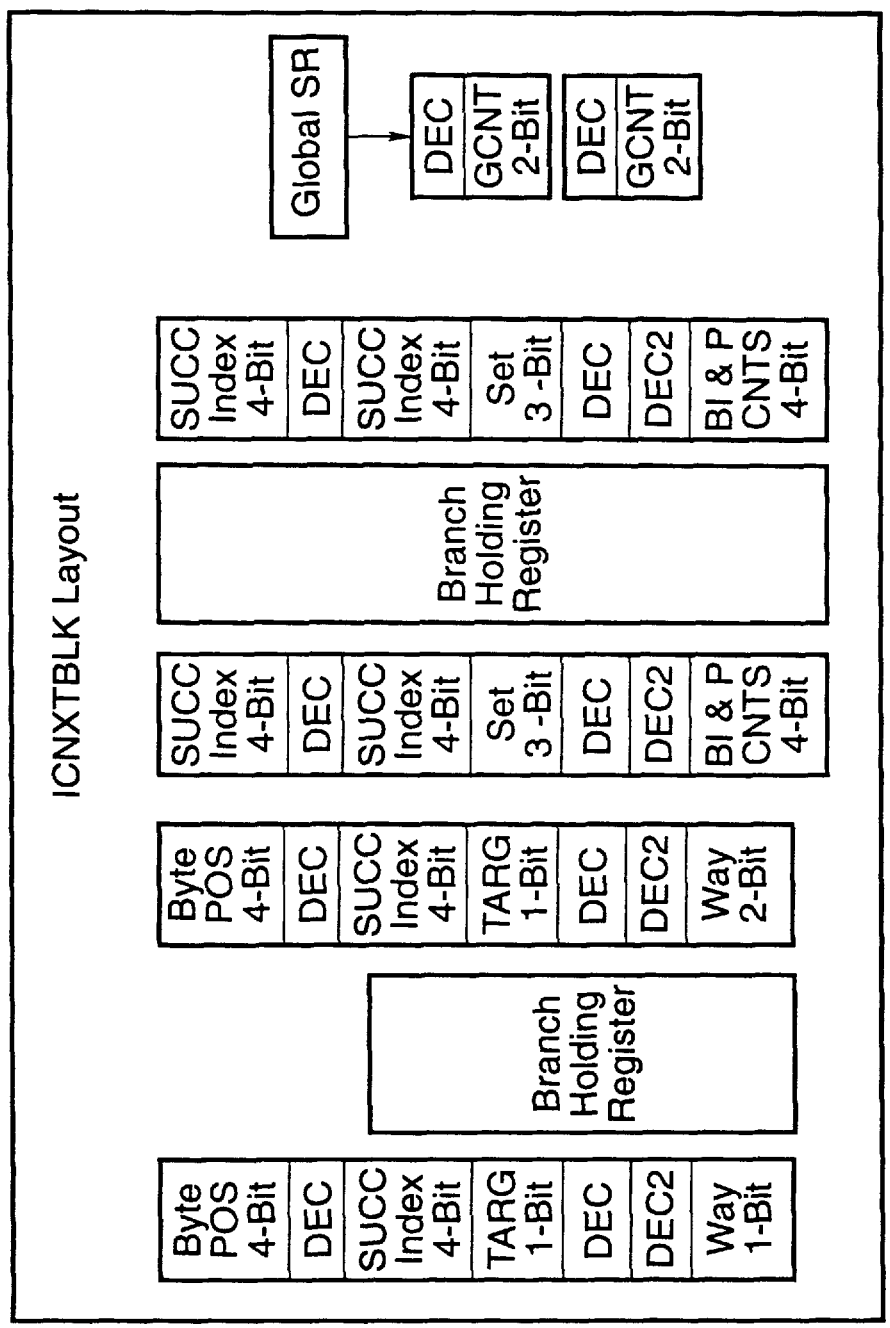

The ICNXTBLK block contains the branch prediction information for the Icache. FIG. 22 is a block diagram of the ICNXTBLK block. An important performance features of superscalar/superpilined microprocessors is branch prediction. As the number of pipeline stages and the number of functional units increases, the cost of branch mis-prediction is high. Processor 500 implements a branch prediction technique which picks one of the 8 ways from the previous line of instructions. Three bits are needed for this prediction. Another two bits are needed to select one of the two branch targets depending on the start-byte position in the next line. Without the two bits to select the branch targets, comparison of the start-byte position with the positions of the branch targets will cause the way-prediction to be more than one clock cycle. This speculative selection of a line of instructions can be corrected in the next cycle from the proper TAGHIT and the branch prediction. The following rules are used to set up the ICNXTBLK:

1) During pre-decode, if there is an unconditional branch instruction, it will take two clock cycles for the next target address to be calculated in the decode unit to update the PC. The pre-decode unit should continue to pre-decode instructions until the PC changes, the speculative way-prediction is updated with the successor index in the cycle following the target address access. If there is no unconditional branch, the speculative way-prediction is updated after fetching of the next block PC. The index after accessing the array should be kept for three clock cycles before the way-prediction is known for updating.

2) In the case of a branch mis-prediction, the new target PC is fetched, and the selected set and successor index are updated.

To improve the accuracies of branch predictions, the ICNXTBLK includes two branch targets and pre-decode unconditional branch instructions such as Unconditional Jump and CALL. The pre-decoding also calculates the branch target address for unconditional branch instructions if available. The RETURN instruction will be detected in the early phase of decoding. If there is a hit in the ICNXTBLK, the new target will be used for the new fetch PC. The taken branch will have higher priority to occupy the two branch target entries in ICNXTBLK.

Processor 500 implements two different branch predictors to maximize the performance. The next few sections discuss the Bimodal and Global predictors and the implementation of the combined branch predictor in processor 500.

Updating Branch Targets

Processor 500 employs an extra branch holding register for branch mis-predictions and pre-decoding branch instructions. The branch holding register should always be compared to the PC address and the contents of the branch holding register forwarded instead of reading from the ICNXTBLK. When the next branch mis-prediction occurs, the branch holding register will update the ICNXTBLK as the mis-prediction takes one cycle to send an address to the ICACHE. Another scenario during which to write the branch holding register into the ICNXTBLK array is when external fetch is started. With the branch holding register, the ICNXTBLK array can be single-ported. A single-ported array would take up less than half the size of a dual-ported array. The branch holding register includes the branch address which is used for comparison and forwarding of data, the successor index, the update branch predictor count, and the way-prediction after reading of the new target line. The branch address register resides in the ICFPC for comparison to the current fetch PC. The successor index, branch predictor counts, and the way-prediction are latched inside the ICNXTBLK to write into the array at a later convenient time. If the mis-prediction is a RETURN instruction, only the target selection of the way prediction should be updated. The global shift register and the return stack should restore the old value the same way.

Bimodal Branch Prediction

The bi-modal branch prediction method uses a saturated counter for prediction. Instead of a single bit prediction which indicates taken/non-taken, a two-bit counter is used for taken/non-taken prediction. The most significant bit determines the taken/non-taken prediction. Since branch instructions are more likely to be taken than non-taken, the counter should initialize to 10 if the branch target address can be calculated. If the branch is taken, the counter increases by 1 and saturates at 11. If the branch is not taken, the counter decrements by 1 to 01. A subsequent not-taken branch causes the counter to saturate at 00. The bimodal branch prediction is better than a single bit prediction as the branch correct prediction is 88.09% instead of 82.29% for two targets prediction based on tsim. The bimodal branch prediction performs well for mostly taken or non-taken branch instructions, and at worst flip-flops between taken and non-taken. The cost is one extra bit per branch target in the ICNXTBLK, and extra logic for the counter.

Global Branch Prediction

Figure 21:
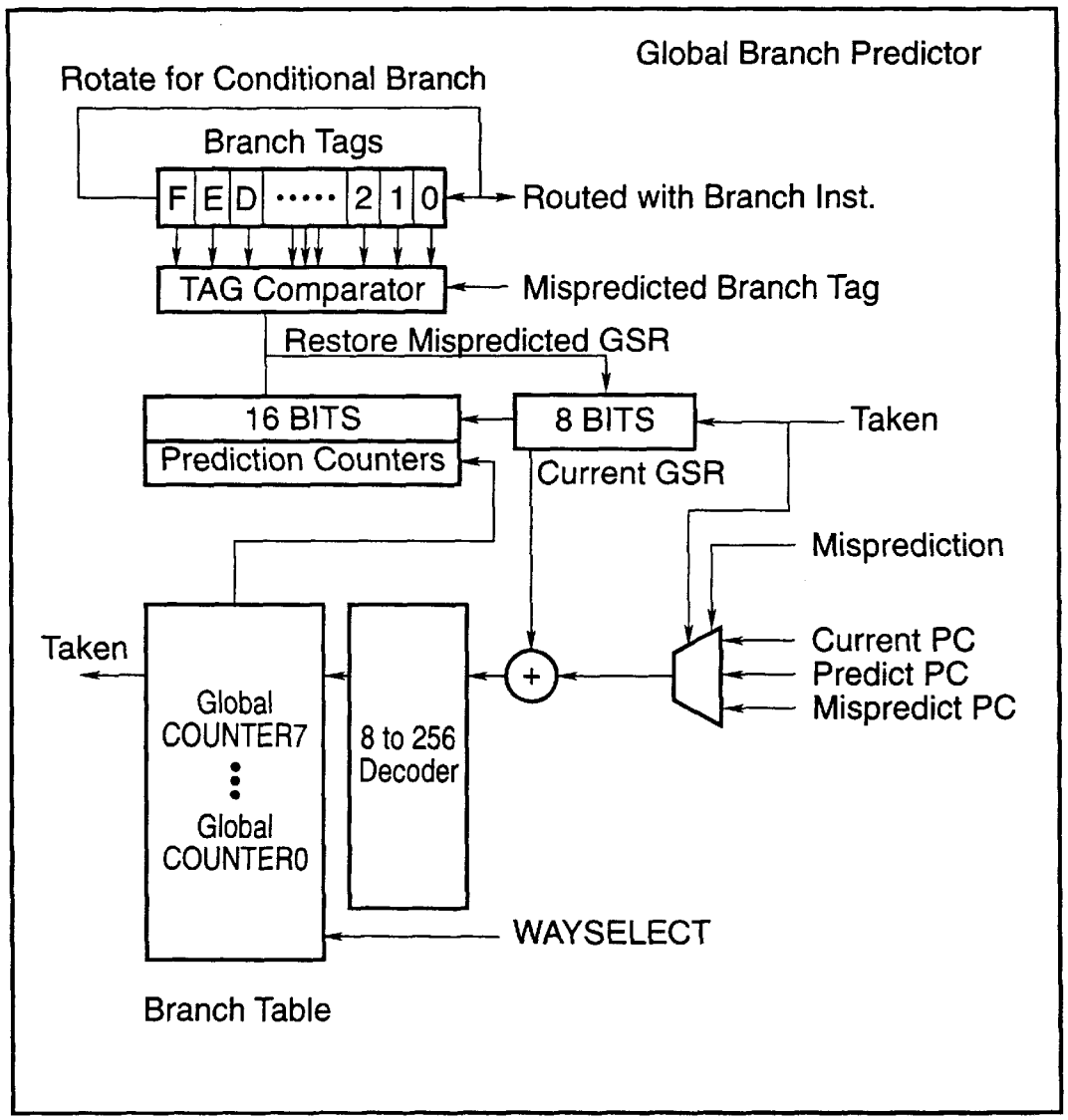

The global branch prediction method is an independent branch predictor, not a part of the Icache. FIG. 21 is a block diagram of the global branch predictor. Of the many different types of global branch prediction, processor 500 uses the global branch prediction which has the highest ratio of correct predictions. The prediction entries are indexed by an exclusive OR of the PC and the branch shift register. This global branch prediction has a correct prediction of 89.24% based on tsim; the prediction improves as more branch history bits are used in the prediction. A single shift register records the branches taken and not taken by the most recent n conditional branches. Since the branch history includes all branches, global branch prediction takes advantage of two types of patterns: 1) the direction taken by the current branch may depend strongly on the other recent branches, and 2) duplicating the behavior of local branch prediction (patterns of branches in loops). To match the number of entries in the Icache, the global branch prediction has 2048 entries with two targets per entry. It is organized with 256 rows of 8-way associative storage. Eighth bits are needed to index the branch prediction table. The PC uses bits 11:4 for indexing the branch prediction table.

Combined Branch Prediction

Combining the Bimodal and Global branch predictions should give a better correct prediction ratio. A predictor counter is used to select which branch predictor is better for each individual branch instruction. This technique should give a higher correct prediction ratio than the above two prediction techniques. The same saturated counter is used for the predictor counter. If the bimodal predictor is correct and the global predictor is incorrect then the counter is incremented until saturated. If the global predictor is correct and the bimodal predictor is incorrect, then the counter is decremented until saturated. In other cases, no change is made to the predictor counter. The most significant bit of the predictor counter is used as the branch predictor. ICNXTBLK is implemented with the bimodal counter and the predictor counter. ICNXTBLK has two targets per instruction line, each target consists of the following:

12 bits—successor index, need 11:4 for global table index, 11:0 for icache.

3 bits—for 8-way associative.

4 bits—byte position of the branch instruction within a line.

2 bits—bimodal counter 2 bits—predictor counter The table for the global branch predictor also has two targets per entry, each entry consisting of a two-bit global counter. The bimodal and predictor counters must be updated on every cycle. The least significant bit of the counters is dual-ported. If the count is 10, the branch is predicted as taken, and the new count is 11. If the count is 01, the branch is predicted as not taken, and the new count is 00.

Implementation of Global Branch Prediction

As discussed above, the global branch predictor needs a table with 256 rows, 8-way associative storage, and two targets per line. An eight-bit shift register is needed for indexing. The global branch predictor shift register has to be able to back track to the previous mis-predicted conditional branch. As each conditional branch is predicted, the direction of the branch is shifted into the shift register from right to left, 1 for taken and 0 for not taken. The shift register is 24 bits long, and each of the bit positions beyond the eight indexing bits has a tag associated with it. The LOROB can handle up to 5 lines of instructions, and the pipeline from fetch to dispatch can hold another 3 lines of instructions. Each line of instructions can have up to two branch targets, which results in a maximum of 16 branch instructions in the pipeline. The shift register needs to keep track of all the conditional branch instructions. The extra 16 bits of the shift register is the maximum number of branches which can be predicted by eight lines of instructions. Four-bit tags are used for the 16 branch instructions. Each tag has three bits to indicate the line and one bit to indicate the first or second conditional branch prediction in the line. All the tags and the taken/not taken bits are shifted in the shift register. The shift register tag (branch tag) is routed with the branch instruction to the functional units and LOROB. If a branch instruction is mis-predicted, the branch tag is used to recover the old eight bits in the shift register for updating the prediction counter and supply the shift register with the new direction for the mis-predicted branch instruction. Along with the taken/not taken bits, the branch predictor count, the bimodal count, the global count, and the byte position should be kept in the same global shift register which will be restored for updating of the counters and the byte position in case of branch mis-prediction. The counters are six bits, the byte position is four bits, the branch tag is three bits, and one the taken/not taken bit; the total bits in the shift register is 14. The information will be restored and incremented/decremented to the holding register to update the mis-predicted block.

Way Prediction

Since the evaluation of the branch prediction takes two cycles, which would create a bubble in the pipeline, the way-prediction is implemented for faster prediction. The way prediction predicts which of the eight associative ways will be hit, and uses the ICNXTBLK for the next fetch PC. The way-prediction is validated in the next cycle with the TAGHIT and the actual branch prediction. If they are not the same, and the predicted set and the TAGHIT set are not both not taken, then the instruction line will be invalidated, creating a bubble in the pipeline.

The way-predicting has three bits used to multiplex the successor index and branch prediction from ICNXTBLK for accessing the Icache in the next cycle. Depending the current fetch PC's position, the way prediction can use one of the two branch targets or none for sequential. In order to access the next PC within a cycle, a target selection of two bits is needed. The target selection can also include the return stack option. The program for the target selection is:

1. 00—sequential, 2. 01—first branch target, 3. 10—second branch target, 4. 11—return stack.

The way prediction is dual port RAM cells because the information must be updated while reading data, the initial value for the way prediction should be the same as the current PC's set. The way prediction is not known for updating until three clock cycles later.

ICNXTBLK Organization

FIG. 22 shows a block diagram of the layout of ICNXTBLK. The ICNXTBLK includes 2048 lines of two branch targets, each target consist of 23 bits:

1. 12 bits—successor index, need 11:4 for global table index, 11:0 for icache.

2. 3 bits—for 8-way associative.

3. 4 bits—byte position.

4. 2 bits—bimodal counter.

5. 2 bits—predictor counter.

The ICNXTBLK also includes 2048 lines for way prediction which are dual ports:

1. 3 Way-prediction bits.

2. Target-selection bits.

The ICNXTBLK is organized as 5 sets of 64 rows by 256 columns, 1 set of 64 rows by 196 columns, 1 set of 64 rows by 96 dual-ported columns, and 1 set of 64 rows by 64 dual-ported columns. Each of the first two sets consists of 2×4 bits of successor index, the next two sets consists of 2×4 bits of successor index and 2×4 bits of the byte position, the next two sets consists of 2×2 bits bimodal counter, 2×2 bits predictor counter, and 2×3 bits 8-way associative, and the last two sets consist of the 3 bits way-prediction and two bits target selection which are dual-ported RAM cells. The least significant bits of the counters are dual-ported and updated on every cycle. To minimize routing and implementation of the branch holding register, the same associated bits of the two branch targets should be laid out in two sets opposite each other. The branch successor index is selected by the way and target prediction to access the ICACHE in next clock cycle. Because of this speed path in way prediction for reading the Icache in the next cycle, the array for ICNXT-BLK is 64 rows instead of 128 rows as for the ICSTORE array. For optimal performance the layout of the column should be 32 RAM cells, precharge, 32 RAM cells, write buffer and senseamp. The row decoder should be in the middle of the array to drive 96 or 112 column each way, and the precharge and the row decoder should cross in the middle of the array. The self-time column is used to generate internal clock for each set of the array. Precharge is gated by ICLK. The ICNXTBLK has two different outputs; the first output in the first cycle is based on the way-prediction and the second output in the second cycle is based on TAGHIT. If the two outputs do not select the same set, or are not both not taken, the reading of instruction in the second cycle will be invalidated, creating a bubble in the pipeline. The second output should be gated with TAGHIT and ICLK to be valid in the second cycle. The way-prediction which uses the return stack may create a speedpath, depending on where the return stack is implemented.

The branch holding register is located in the ICNXTBLK array. This means that the bits of the two targets must be alternate in the array to access the branch holding register. The array may be skewed to accommodate the bits into a single array. The global branch counter is also implemented as the array in ICNXTBLK. The shift register and the branch tag for mis-prediction recovery are also implemented next to the array.

TABLE 10

Signal List.

| | |
|---|---|
| INADD(11:4) | Input from ICFPC indicates the address of instruction to access the array. Bits 11:5 are for the row decoder, bit 4 is for column select. |
| ICNVRD | Input from ICCNTL to read branch prediction array. |
| ICNWR | Input from ICCNTL to write branch prediction. |
| ICBCWR | Input from ICCNTL to write bimodal counter bits. |
| ICPSWR | Input from ICCNTL to write predictor counter bits. |
| SRNRD | Input from ICCNTL to read branch prediction for special register. |
| SRNWR | Input from ICCNTL to write branch prediction for special register. |
| STBYTE(3:0) | Input from ICFPC indicates the start byte position of the instruction, the position of the branch target must be greater than the start byte. |
| SETSEL(7:0) | Input from ICFPC indicates which set to read, no tag compare is needed. |
| TAGCHK | Input from ICCNTL to indicates the valid set is from TAGHIT or SETSEL. |
| TAGHIT(7:0) | Input from ICTAGV indicates which set is selected to read branch array. |
| RTOPPTR(2:0) | Input from decode indicates the current top-of-the-stack pointer for the return stack. This information should be kept in the global shift register in case of mis-predicted branch. |
| SINDEX(14:0) | Output indicates the successor index from branch prediction. |
| ICBRN1 | ICLK7 Output, indicates the branch taken prediction of the first target in the ICNXTBLK for the lines of instructions being fetched. |
| ICBRN2 | ICLK7 Output, indicates the branch taken prediction of the second target in the ICNXTBLK for the lines of instructions being fetched. |
| ICBCOL1(3:0) | ICLK7 Output, indicates the column of the first branch target in the ICNXTBLK for the lines of instructions being fetched. |

TABLE 10-continued

Signal List.

| | |
|---|---|
| ICBCOL2(3:0) | ICLK7 Output, indicates the column of the second branch target in the ICNXTBLK for the lines of instructions being fetched. |
| BTAG1(3:0) | Output indicates the position of the first target branch instruction with respect to the global shift register in case of branch mis-prediction. |
| BTAG2(3:0) | Output indicates the position of the second target branch instruction with respect to the global shift register in case of branch mis-prediction. |
| BTAKEN(1:0) | Output indicates branch taken from the msb of the bimodal count. |
| PSELECT(1:0) | Output from the msb of the predictor count, 1 indicates using the bimodal predictor, 0 indicates using the global predictor. |
| ICPSET(2:0) | Output to ICPEC indicates which set is predicted hit in the next cycle. The branch prediction and targets are used in the ICNXTBLK to access the next line. |
| ICPTAR(1:0) | Output to ICFPC indicates which branch target to use to access the cache in the next cycle. 00 - sequential, 01 - first branch target, 10 - second branch target, and 11 - return stack. |
| ICBTYP1(1:0) | ICLK7 Output, indicates the type of branch of the first target in the ICNXTBLK for the lines of instructions being fetched. |
| ICBTYP2(1:0) | ICLK7 Output, indicates the type of branch of the second target in the ICNXTBLK for the lines of instructions being fetched. |
| RETPRED | Output from Idecode indicates the current prediction of the return instruction of the fetched line. The return instruction must be detected in the current line of instruction or the Icache must be re-fetched from a new line. |

ICFPC

With an instruction address latch and incrementer in the ABI block, instruction addresses may be driven on the external address bus. This increases the performance of the DRAM access in burst mode. Continuous instruction address requests can be made by the Icache directly to the BIU without any handshaking. With a taken branch, the instruction address latch in the ABI block will be invalidated, and a new address must be sent to the MMU. The instruction address latch must detect page-boundary overflows (NAND gates for the lower bits of the address).

The ICFPC block contains all the current fetch PC logic, the PC incrementer for sequential access, and the branch holding address register for updating of the ICNXTBLK. The branch holding address register must always be compared to the PC to forward the branch data instead of reading from the ICNXTBLK.

The ICACHE uses linear addressing while the decode units use logical addressing. The code segment register is included in the ICFPC. The branch execution unit must calculate the linear address to send to ICACHE in case of branch mis-prediction. The ICACHE must subtract the base address of the code segment from the linear address to generate the logical address for the decode units. The translation is either for 16-bit addressing or 32-bit addressing, and either real or protected mode. The linear address can either be from the branch mis-prediction or the target tag-address of the successor index. The limit of the code segment register as sent to the decode units for calculation of segment violations. Generally speaking, the logical address should be less than the segment limit. The code segment register includes:

1. Segment selector (15:00)
2. Base Address 15:00, Segment Limit 15:00
3. Base Address 31:24, Control, Limit 19:16, Control, Type, Base Address 23:16

ICFPC Organization

The possible sources for index of ICSTORE are:
1. Incrementer of sequential address.
2. Refresh of current index.
3. Refresh the previous index because of confused instruction in decode.
4. Successor index of taken branch from way predictor of ICNXTBLK.
5. Return instruction target from way predictor of ICNXTBLK.
6. Corrected index of taken branch from branch prediction of ICNXTBLK.
7. Branch mis-prediction or Read-after-Write dependency flush from LOROB.
8. Special register reading/writing.

The possible sources for index of ICTAGV are:
1. Incrementer of sequential address.
2. Refresh of current index.
3. Refresh the previous index because of confused instruction in decode.
4. Next block address to check the cache during pre-fetching.
5. Successor index of taken branch from way predictor of ICNXTBLK.
6. Return instruction target from way predictor of ICNXTBLK.
7. Corrected index of taken branch from branch prediction of ICNXTBLK.
8. Branch mis-prediction or Read-after-Write dependency flush from LOROB.
9. L2 new mapping for current tag miss.
10. Special register reading/writing.

The possible sources for index of ICPDAT are:
1. Incrementer of sequential address for reading (same as ICSTORE).
2. Refresh of current index.
3. Refresh the previous index because of confused instruction in decode.
4. Delay of sequential address for writing of pre-decode data.
5. Successor index of taken branch from way predictor of ICNXTBLK.
6. Return instruction target from way predictor of ICNXTBLK.
7. Corrected index of taken branch from branch prediction of ICNXTBLK.
8. Branch mis-prediction or Read-after-Write dependency flush from LOROB.
9. Special register reading/writing.

The possible sources for index of ICNXTBLK are:
1. Incrementer of sequential address.
2. Refresh of current index.
3. Refresh the previous index because of confused instruction in decode.
4. Delay of sequential address for writing of pre-decode data.
5. Successor index of taken branch from way predictor of ICNXTBLK.
6. Return instruction target from way predictor of ICNXTBLK.
7. Corrected index of taken branch from branch prediction of ICNXTBLK.
8. Branch mis-prediction or Read-after-Write dependency flush from LOROB.
9. Branch holding address register.
10. Special register reading/writing.

The ICFPC block also includes the code segment register, the PC incrementer address, the branch holding address register and comparator, and the subtractor for calculation of logical address. The code segment register includes the base for logical address calculation and the limit for segment violation. The PC incrementer has two parts: the index incrementer and the tag-address incrementer. The tag-address incrementer is used only when the index incrementer is overflowed. It is much faster to break up the PC incrementer in two parts.

TABLE 11

| | Signal list. |
|---|---|
| INVPOLD | Input from Idecode indicates pre-decoding for the previous line of instruction. The ICFPC should start with the previous line. |
| ICNEWBLK | Input from ICCNTL to read new sequential block. |
| ICNXTBLK | Input from ICCNTL to check next sequential block during pre-fetching. |
| WPTAKEN | Input from ICNXTBLK indicates taken branch from way prediction. |
| WPRET | Input from ICNXTBLK indicates the return instruction from way prediction. |
| BPTAKEN | Input from ICNXTBLK indicates taken branch from the correct branch prediction. |
| BRNMISP | Input from the Branch execution of the FU indicates that a branch mis-prediction. The Icache changes its state machine to access a new PC and clears all pending instructions. |
| MVSR | Input from ICCNTL indicates move-to special register instruction. |
| ICPWR | Input from ICCNTL to write predecoded data from ICPRED into the array. |
| ICNWR | Input from ICCNTL to write branch prediction. |
| WSINDEX(14:0) | Input from ICNXTBLK indicates the successor index from the way prediction. |
| BSINDEX(14:0) | Input from ICNXTBLK indicates the successor index from the correct branch prediction. |
| FPC(31:0) | Input from LOROB as the new PC for branch correction path. |
| RETPC(31:0) | Input from decode indicates the PC address from the top of the return stack for fast way prediction. |
| BRNMISP | Input from the Branch execution of the FU indicates that a branch mis-prediction. The Icache changes its state machine to access a new PC and clears all pending instructions. |
| BRNTAKEN | Input from the LOROB indicate the status of the mis-prediction. This signal must be gated with UPDFPC. |
| BRNFIRST | Input from the LOROB indicate the first or second target in the ICNXTBLK for updating the branch prediction. |
| BRNCOL(3:0) | Input from the LOROB indicates the instruction byte for updating the branch prediction in the ICNXTBLK. |
| FPCTYP | Input for the LOROB indicates the type of address that is being passed to the Icache. |
| BPC(31:0) | Input from the LOROB indicates the PC address of the branch instruction which has been mis-predicted for updating the ICNXTBLK. |
| CSREG(31:0) | Input from the LOROB indicates the new code segment register. |
| REMAP | Input from L2 indicates the instruction is in the Icache with different mapping. The L2 provides the way associative, new supervisor bit, and new tag address. The LV will be set in this case. |
| MTAG(31:12) | Input from L2 indicates the new tag to write into the ICTAGV. |
| MCOL(2:0) | Input from L2 indicates the way associative for writing of the ICTAGV. |

TABLE 11-continued

Signal list.

| | |
|---|---|
| ITADD(11:4) | Output to ICTAGV indicates the address of instruction to access the array. Bits 11:5 are for the row decoder, bit 4 is for column select. |
| IPADD(11:4) | Output to ICTAGV indicates the address of instruction to access the LV array. Bits 11:5 are for the row decoder, bit 4 is for column select. |
| ICLIMIT(19:0) | Output to decode units indicates the limit of the code segment register for segment violation. |
| ICPC(31:0) | Output from Idecode indicates the current line PC to pass along with the instruction to the LOROB. |

ICPRED

The ICPRED block pre-decodes the instructions as they come in from the external memory or from the Icache if the start/end bits are not found where expected. FIG. 23 is a block diagram of the ICPRED block. In processor 500, the ICPRED is connected to the IB(127:0) to read the instructions from either the pre-fetch buffer or the Icache. For external fetched instructions, the ICPRED starts from the fetched byte position. The ICPRED latches the instructions in the second ICLK as they are sent to the decode units. If the start/end bits are not found where expected, then the decode units send the byte position of the invalid instruction to the ICPRED for pre-decoding. The pre-decoding is started from scratch in this case. The ICPRED takes two clock cycles to decode one instruction plus an extra clock cycle for any prefix bytes. The pre-decode information include start, end, and functional bits, as well as any branch prediction information. The rules for predecoding of instructions are:

1. Fast-path instructions should have at most only one prefix, OF or 66. For more than one prefix, all prefixes except for string prefixes, the instructions will take two clock cycles during decoding. For other prefixes, MROM execution will be specified.
2. Any instruction which is not in subset of fast path instructions should have the MROM opcode bit set. The fast path instruction subset includes:
PUSH
POP
CALL/RETURN
LEA
JUMP cc/unconditional
8/32-bit operations
MOVE reg/reg reg/mem
ALU operations reg/mem reg/reg (excluding the RCR and RCL instructions)
3. Decoding of CALL and Unconditional JUMP instructions may cause the predictor and the bimodal counters to become saturated in the ICNXTBLK. The branch target information is kept in the branch holding register for future updating. The ICPRED calculates the target address for the Unconditional JUMP if possible. Otherwise, fetching of instructions ceases until the target address is calculated during decoding or execution.
4. The RETURN instructions are also pre-decoded to access the return stack.
5. Decoding of Conditional JUMP instructions with backward branch will require the calculation of the target address. Since backward branches are mostly taken and the adder is available to calculate the target address, the conditional branch should be predicted taken. The taken branches have the higher priority to occupy the branch targets. Conditional branch instructions are needed for the global branch predictor; conditional branch instructions have a higher priority to occupy the branch target than CALL or Unconditional JUMP with 8-bit displacement linear addresses. The decode units decode the instructions for unconditional branches. If target addresses are simple calculations, the decode units calculate the target addresses. All branch instructions must be predecoded and assigned to the two targets in the ICNXTBLK.

If early decoding of a "two-cycle" fast path instruction is detected, the instruction line will be delayed into the next cycle starting with the two-cycle fast path instruction. The extra cycle is needed to combine the prefixes into one and locate the other fields of the instruction. To distinguish the three different cases of prefixes, the pre-decoding of the functional byte is as follows:

| Byte Type | 0123 | Meaning |
|---|---|---|
| Start byte | 1000 | MROM |
| Func. byte | 1000 | opcode is at first or second byte |
| Start byte | 1000 | MROM |
| Func. byte | 1001 | opcode is at fourth byte |
| Start byte | 1000 | two-cycle fast path, two prefixes |
| Func. byte | 110— | opcode is at third byte |
| Start byte | 1000 | two-cycle fast path, three prefixes |
| Func. byte | 1110 | opcode is at fourth byte |
| Start byte | 10—— | fast path, one prefix |
| Func. byte | 01—— | opcode is at second byte |
| Start byte | 10—— | fast path, no prefix |
| Func. byte | 00—— | opcode is at first byte |

To ease instruction decoding later in the pipeline, the functional byte can encode more information regarding the opcode, MODRM, SIB, displacement, and immediate bytes quickly:

1. With start-byte, the functional byte is as discussed above.
2. Without start-byte, if the functional byte is set on second byte, it indicates that this second byte is opcode, the first byte (with start-byte) is prefix. If the functional byte is not set on second byte, the first byte is opcode.
3. Without start-byte, from third byte, if the functional byte is set, it indicates that this byte is displacement or immediate data. With 8-bit displacement, one functional byte is set, with 16-bit displacement, two consecutive functional bytes are set, with 32-bit displacement, 4 consecutive functional bytes are set. With this pre-decoding, the EBP+displacement can be calculated for any size of displacement. If there is no displacement field, the bit is set for the immediate field. In this case, the calculation of the assumed linear address by the decode unit can be invalidated by decoding of the MODRM byte. The setting of the immediate byte is important to detect the SIB byte in the instruction. The immediate data of the instruction can take more time in decoding and routing to the functional units.

ICPRED Organization

As shown in FIG. 23, the ICPRED includes three blocks. One block, ICPREFIX, decodes the prefix. Another block, ICDECINS, decodes the instruction. A third block, ICPREINS, sets up the pre-decode data. The ICPREFIX block decodes up to two prefix bytes per clock cycle. If there is more than one prefix byte and the prefix is not OF or 66, the first functional byte will signal an MROM instruction. The ICDECINS accepts prefix status and three instruction bytes; the opcode, the MODRM, and the SIB. In the first cycle, no prefix is assumed. If a prefix is detected in the ICPREFIX, the ICDECINS will restart the decoding of instruction with a new prefix status and three new instruction bytes. If more prefixes are detected in a subsequent cycle, the ICDECINS will restart the decoding with new information. After the decoding, the pre-decode information will be sent to the align logic and the latch in the ICPDAT. The ICPDAT will dispatch the appropriate instruction and pre-decode data to the decode unit. The byte pointer moves to the next instruction and the procedure continues until the whole line is completed. The writing of the ICPDAT will be accomplished when the whole line is decoded. The ICDECINS also decodes branch instructions and sets up the two targets in the ICNXTBLK. The ICDECINS includes an adder to calculate the simple taken branch addresses; PC+displacement. The ICPRED includes local latches of eight bytes for instruction which wrap around to the next line. For instructions longer than 15 bytes, an exception is asserted to the decode units. The outputs of the ICPREFIX and ICDECINS are directed to ICPREINS for analyzing and setting up the pre-decode data.

TABLE 12

| | Signal List. |
|---|---|
| IB(127:0) | Input from ICSTORE indicates the line of instructions from the array or pre-fetch buffer for pre-decoding. |
| INVBYTE(3:0) | Input from Idecode indicates the starting byte position of the confused instruction for pre-decoding. |
| INVPRED | Input from Idecode indicates pre-decoding for the confused instruction. |
| BYTEPTR | Input from ICFPC indicates the current position of the line for pre-decoding. |
| PREDEN | Input from ICCNTL to enable the pre-decoding of instruction. |
| PSTARTB(7:0) | Output to ICPDAT and decode units indicates the start bytes for current instruction. The start bytes are latched until pre-decoding of the whole line is completed. |
| PENDB(7:0) | Output to ICPDAT and decode units indicates the end bytes for current instruction. The end bytes are latched until pre-decoding of the whole line is completed. |
| PFUNCB(7:0) | Output to ICPDAT and decode units indicates the functional bytes for current instruction. The functional bytes are latched until pre-decoding of the whole line is completed. |
| PBYTEPTR(3:0) | Output to ICPDAT indicates the byte position of the predecoded bytes for current instruction. |
| PBYTE(3:0) | Output to ICNXTBLK indicates the byte position for current branch instruction. The byte position is latched until pre-decoding of the whole line is completed. |
| PJMPI(1:0) | Output to ICNXTBLK indicates the type of branch instruction which is latched until pre-decoding of the whole line is completed. |
| PTAKEN | Output to ICNXTBLK indicates the current branch instruction is predicted taken. The initial prediction is to use the bimodal branch predictor. The taken prediction is latched until pre-decoding of the whole line is completed. |
| PTARGET(31:0) | Output to ICNXTBLK and ICFPC indicates the branch target for current branch instruction. The successor index is latched until pre-decoding of the whole line is completed. If the branch is taken, the way calculation is done in ICFPC and latched until branch mis-predictions or external fetch is started. |
| PB1X2 | Output to ICNXTBLK indicates the first or second target in ICNXTBLK is updated for current branch instruction. |
| PJMPEN | Output to ICNXTBLK indicates the branch instruction predecoded. |

ICALIGN

Figure 25:
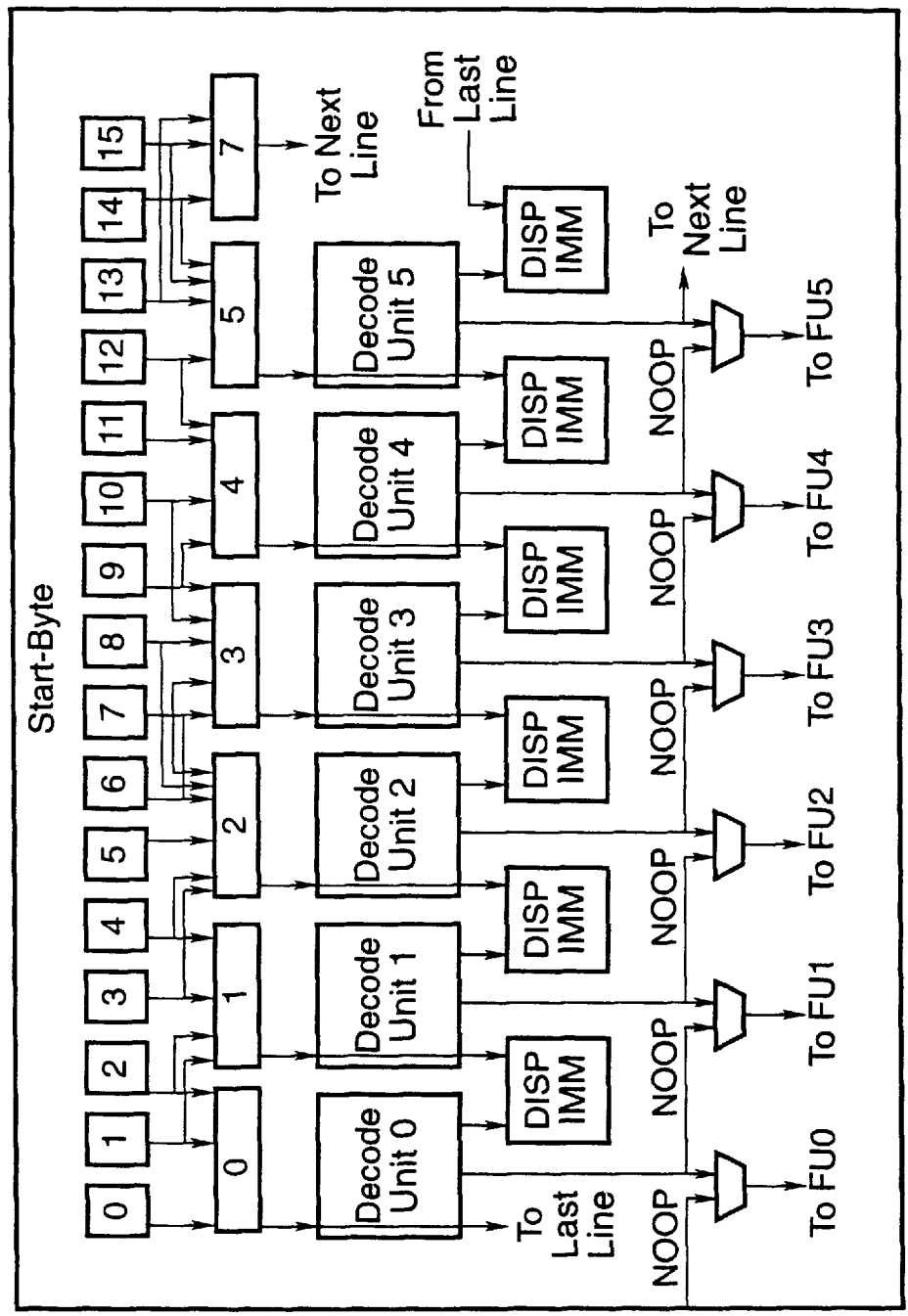

The function of the ICALIGN block is to use the pre-decode information and send the X86 instructions to the decode units as fixed length instructions of four-bytes or eight-bytes. FIG. 24 is a block diagram of how the ICALIGN function interfaces with other functions, and FIG. 25 is a block diagram of the ICALIGN function. The alignment works on the four-byte boundary, the shifting is based on the start/end byte information:

| Start-byte location | 0–2 | 1–4 | 3–8 | 6–10 | 9–12 | 12–15 | 13–15 |
|---|---|---|---|---|---|---|---|
| Decode unit | 0 | 1 | 2 | 3 | 4 | 5 | 6 |

Each decode unit is capable of receiving four-byte instructions. Instructions from five to eight bytes in length can be handled using two successive decode units. Issue position 6 is only three-byte in length and is not real; issues position 6 is used for wrapping the instruction to decode unit 0 of the next line. Decode unit 5 is also able to wrap an instruction around to decode unit 0 of the next line. If an instruction has between five and eight bytes, then bytes five and up are contained in the next decode unit. It is noted that these extra bytes contain only immediate data or displacement data. Each decode unit has a by-pass path to send the data to the immediate or displacement registers of the previous decode unit. The instruction being decoded can also be invalidated and set to NOOP by the previous decode unit. If the incomplete instruction, in decode unit 4 or 5, starts with four or more bytes in the first line and the displacement byte is known, then the decode unit should decode the instruction. The rest of the instruction is immediate data which can be forward, skipping one clock cycle and proceeding directly to the LOROB. Otherwise, the instruction will be passed to decode unit 0 when the next line is decoded during the next clock cycle.

If a byte in byte position 0 is a start-byte, the byte would be dispatched to decode unit 0. As mentioned earlier, a start byte should be dispatched to the lowest-ordered decoding unit not taken by a previous start byte. If a byte cannot be sent to any decode unit, the rest of the line must wait for the next cycle to be dispatched to the decode units. In this case, all the start bytes up to the current start byte should be clear, and the first valid start byte should go to the lowest-ordered decode unit. The logic for the alignment shifting may be implemented using seven cascaded levels of logic gates. The last gate is an inverter which may be included in the data multiplexing circuit.

In order to help the decode units calculate the current PC, the relative byte position of each byte will be encoded into four bits and routed with the start-byte to the decode units. Each decode unit concatenates the PC with the four-bit byte position for its PC address. This PC address can be used to calculate the relative taken branch address.

TABLE 12a.

| Instruction Dispatch. | |
|---|---|
| | Decode units |
| Start-byte | |
| 0 | |
| 1 | 0 or 1 |
| 2 | 0 or 1 |

TABLE 12a.-continued

Instruction Dispatch.

| | Decode units |
|---|---|
| 3 | 1 or 2 |
| 4 | 1 or 2 |
| 5 | 2 |
| 6 | 2 or 3 |
| 7 | 2 or 3 |
| 8 | 2 or 3 |
| 9 | 3 or 4 |
| 10 | 3 or 4 |
| 11 | 4 |
| 12 | 4 or 5 |
| 13 | 5 or 6 |
| 14 | 5 or 6 |
| 15 | 5 or 6 |
| Byte group | |
| 0–3 | 0, 1, or 2 |
| 4–7 | 1, 2, or 3 |
| 8–11 | 2, 3, or 4 |
| 12–15 | 4, 5, or 6 |

Only up to three instructions are allowed to start in byte locations 0–3; up to 4 instructions in byte locations 0–7; up to 5 instructions in byte 0–11; and a maximum of 7 instructions can be dispatched in the entire line at one time. It is noted that if seven instructions are dispatched, the last instruction should not have the end-byte in the same cache line.

Examples of Fetching Mechanism

| Byte # | Inst. | | Start | Decode # |
|---|---|---|---|---|
| | | Example 1: | | |
| 0 | 81 | sub | 1 | 0 |
| 1 | ec | | 0 | 0 |
| 2 | f0 | | 0 | 0 |
| 3 | 00 | | 0 | 0 |
| 4 | 00 | | 0 | 1 |
| 5 | 00 | | 0 | 1 |
| 6 | 56 | push | 1 | 2 |
| 7 | 57 | push | 1 | 3 |
| 8 | ff | push | 1 | 4 |
| 9 | 35 | | 0 | 4 |
| 10 | 9c | | 0 | |
| 11 | 9e | | 0 | 4 |
| 12 | 59 | | 0 | 5 |
| 13 | 00 | | 0 | |
| 14 | e8 | call | 1 | 6 |
| 15 | e3 | | 0 | 6 |
| 0 | 98 | | 0 | 0 |
| 1 | 08 | | 0 | 0 |
| 2 | 00 | | 0 | 0 |
| 3 | 83 | add | 1 | 1 |
| 4 | c4 | | 0 | 1 |
| 5 | 04 | | 0 | 1 |
| 6 | 0b | or | 1 | 2 |
| 7 | c0 | | 0 | 2 |
| 8 | 74 | jz | 1 | 3 |
| 9 | 26 | | 0 | 4 |
| 10 | 8b | mov | 1 | 4 |
| 11 | f8 | | 0 | 4 |
| 12 | b9 | mov | 1 | 5 |
| 13 | ff | | 0 | 5 |
| 14 | ff | | 0 | 5 |
| 15 | ff | | 0 | 5 |
| 0 | ff | | 0 | 0 |
| 1 | 2b | sub | 1 | 1 |
| 2 | c0 | | 0 | 1 |
| 3 | f2 | repne | 1 | 2MROM |
| 4 | ae | | 0 | 2MROM |
| | | Example 2: | | |
| 0 | 84 | lea | 0 | 0 |
| 1 | 24 | | 0 | 0 |
| 2 | a8 | | 0 | 0 |
| 3 | 00 | | 0 | 0 |
| 4 | 00 | | 0 | 1 |
| 5 | 00 | | 0 | 1 |
| 6 | 50 | push | 1 | 2 |
| 7 | e8 | call | 1 | 3 |
| 8 | 24 | | 0 | 3 |
| 9 | ff | | 0 | 3 |
| 10 | ff | | 0 | 3 |
| 11 | ff | | 0 | 4 |
| 12 | 83 | add | 1 | 5 |
| 13 | c4 | | 0 | 5 |
| 14 | 04 | | 0 | 5 |
| 15 | 8b | mov | 1 | 6 |
| 0 | 0d | | 0 | 1 |
| 1 | 80 | | 0 | 0 |
| 2 | 29 | | 0 | 0 |
| 3 | 8a | | 0 | 0 |
| 4 | 00 | | 0 | 1 |
| 5 | 81 | add | 1 | 2 |
| 6 | c1 | | 0 | 2 |
| 7 | 20 | | 0 | 2 |
| 8 | ec | | 0 | 2 |
| 9 | 59 | | 0 | 3 |
| 10 | 00 | | 0 | 3 |
| 11 | 8d | lea | 1 | 4 |
| 12 | 84 | | 0 | 4 |
| 13 | 24 | | 0 | 4 |
| 14 | a8 | | 0 | 4 |
| 15 | 00 | | 0 | 5 |
| 0 | 00 | | 0 | 0 |
| 1 | 00 | | 0 | 0 |
| 2 | 6a | push | 1 | 1 |
| 3 | 50 | | 0 | 1 |
| 4 | 8d | lea | 1 | 2 |
| 5 | 44 | | 0 | 2 |
| 6 | 24 | | 0 | 2 |
| 7 | 60 | | 0 | 2 |
| 8 | 50 | push | 1 | 3 |
| 9 | 8d | lea | 1 | 4 |
| 10 | 44 | | 0 | 4 |
| 11 | 24 | | 0 | 4 |
| 12 | 14 | | 0 | 4 |
| 13 | 50 | push | 1 | 5 |
| 14 | 51 | push | 1 | 5 |
| 15 | 51 | push | 1 | 5 |
| 0 | e8 | call | 1 | 0 |
| 1 | 0e | | 0 | 0 |
| 2 | 37 | | 0 | 0 |
| 3 | 05 | | 0 | 0 |
| 4 | 00 | | 0 | 1 |
| 5 | 8d | lea | 1 | 2 |
| 6 | 7c | | 0 | 2 |
| 7 | 24 | | 0 | 2 |
| 8 | 58 | | 0 | 2 |
| End of code | | | | |

| Byte # | Start | Decode |
|---|---|---|
| | Example 3: | |
| | 16 10 byte instructions. | |
| 0 | 1 | 0 |
| 1 | 1 | 1 |
| 2 | 1 | 0 |
| 3 | 1 | 1 |
| 4 | 1 | 2 |
| 5 | 1 | 2 |
| 6 | 1 | 3 |
| 7 | 1 | 2 |
| 8 | 1 | 3 |
| 9 | 1 | 4 |
| 10 | 1 | 3 |
| 11 | 1 | 4 |
| 12 | 1 | 5 |
| 13 | 1 | 5 |

-continued

| | | |
|---|---|---|
| 14 | 1 | 5 |
| 15 | 1 | |

Example 4:
8 2-byte instructions

| | | |
|---|---|---|
| 0 | 1 | 0 |
| 1 | 0 | 0 |
| 2 | 1 | 1 |
| 3 | 0 | 1 |
| 4 | 1 | 2 |
| 5 | 0 | 2 |
| 6 | 1 | 3 |
| 7 | 0 | 3 |
| 8 | 1 | 2 |
| 9 | 0 | 2 |
| 10 | 1 | 3 |
| 11 | 0 | 3 |
| 12 | 1 | 4 |
| 13 | 0 | 4 |
| 14 | 1 | 5 |
| 15 | 0 | 5 |

ICALIGN Organization

The ICALIGN function includes multiplexers for instructions and pre-decode data from ICACHE arrays to decode units. There are two levels of multiplexers; the first level is controlled by the TAGHIT, and the second level is controlled by the aligned logic in the ICPDAT. The first level of multiplexing is implemented within the ICSTORE and ICPDAT block. This block includes latches and logic to breakup the line for next cycle in case all instructions cannot be dispatched in the same clock cycle. The encoder for the start-byte position is needed to generate the relative address of the PC to the decode units.

TABLE 13

Signal List.

| | |
|---|---|
| REFRESH2 | Input from Idecode indicates current line of instructions will be refreshed and not accept new instructions from Icache. |
| MROMEN | Input from MROM indicates the micro-instructions is sent to Idecode instead of the Icache. |
| IB(127:0) | Input from ICSTORE indicates the new line of instructions to be sent to decode units. |
| BYTExSHxx | Input from ICPDAT to control the multiplexes, see ICPDAT for details. |
| NEXTx | Input from ICPDAT to breakup the line, see ICPDAT for details. |
| BYTEP1(15:0) | Input from ICNXTBLK indicate the byte position of the first branch target. |
| BYTEP2(15:0) | Input from ICNXTBLK indicate the byte position of the second branch target. |
| ICSTART(15:0) | ICLK7 Output to Idecode indicates the start-byte for the lines of instructions being fetched. |
| ICEND(15:0) | ICLK7 Output to Idecode indicates the end-byte for the lines of instructions being fetched. |
| ICFUNC(15:0) | ICLK7 Output to Idecode indicates the functional-bit for the lines of instructions being fetched. |
| ICPOS0(3:0) | ICLK7 Output to decode unit 0 indicates the PC's byte position of the instruction. |
| ICPOS1(3:0) | ICLK7 Output to decode unit 1 indicates the PC's byte position of the instruction. |
| ICPOS2(3:0) | ICLK7 Output to decode unit 2 indicates the PC's byte position of the instruction. |
| ICPOS3(3:0) | ICLK7 Output to decode unit 3 indicates the PC's byte position of the instruction. |
| ICPOS4(3:0) | ICLK7 Output to decode unit 4 indicates the PC's byte position of the instruction. |
| ICPOS5(3:0) | ICLK7 Output to decode unit 5 indicates the PC's byte position of the instruction. |
| IBD0(31:0) | ICLK7 Output to decode unit 0 indicates the 4-byte of the instruction. |

TABLE 13-continued

Signal List.

| | |
|---|---|
| IBD1(31:0) | ICLK7 Output to decode unit 1 indicates the 4-byte of the instruction. |
| IBD2(31:0) | ICLK7 dutput to decode unit 2 indicates the 4-byte of the instruction. |
| IBD3(31:0) | ICLK7 Output to decode unit 3 indicates the 4-byte of the instruction. |
| IBD4(31:0) | ICLK7 Output to decode unit 4 indicates the 4-byte of the instruction. |
| IBD5(31:0) | ICLK7 Output to decode unit 5 indicates the 4-byte of the instruction. |
| IC0START | |
| IC1START | |
| IC2START | |
| IC3START | |
| IC4START | |
| IC5START | ICLK7 Output to Idecode indicates the start-byte for the lines of instructions being fetched. |
| IC0END(3:0) | |
| IC1END(3:0) | |
| IC2END(3:0) | |
| IC3END(3:0) | |
| IC4END(3:0) | |
| IC5END(3:0) | ICLK7 Output to Idecode indicates the end-byte for the lines of instructions being fetched. |
| IC0FUNC(3:0) | |
| IC1FUNC(3:0) | |
| IC2FUNC(3:0) | |
| IC3FUNC(3:0) | |
| IC4FUNC(3:0) | |
| IC5FUNC(3:0) | ICLK7 Output to Idecode indicates the functional-bit for the lines of instructions being fetched. |

ICCNTL

Figure 26:
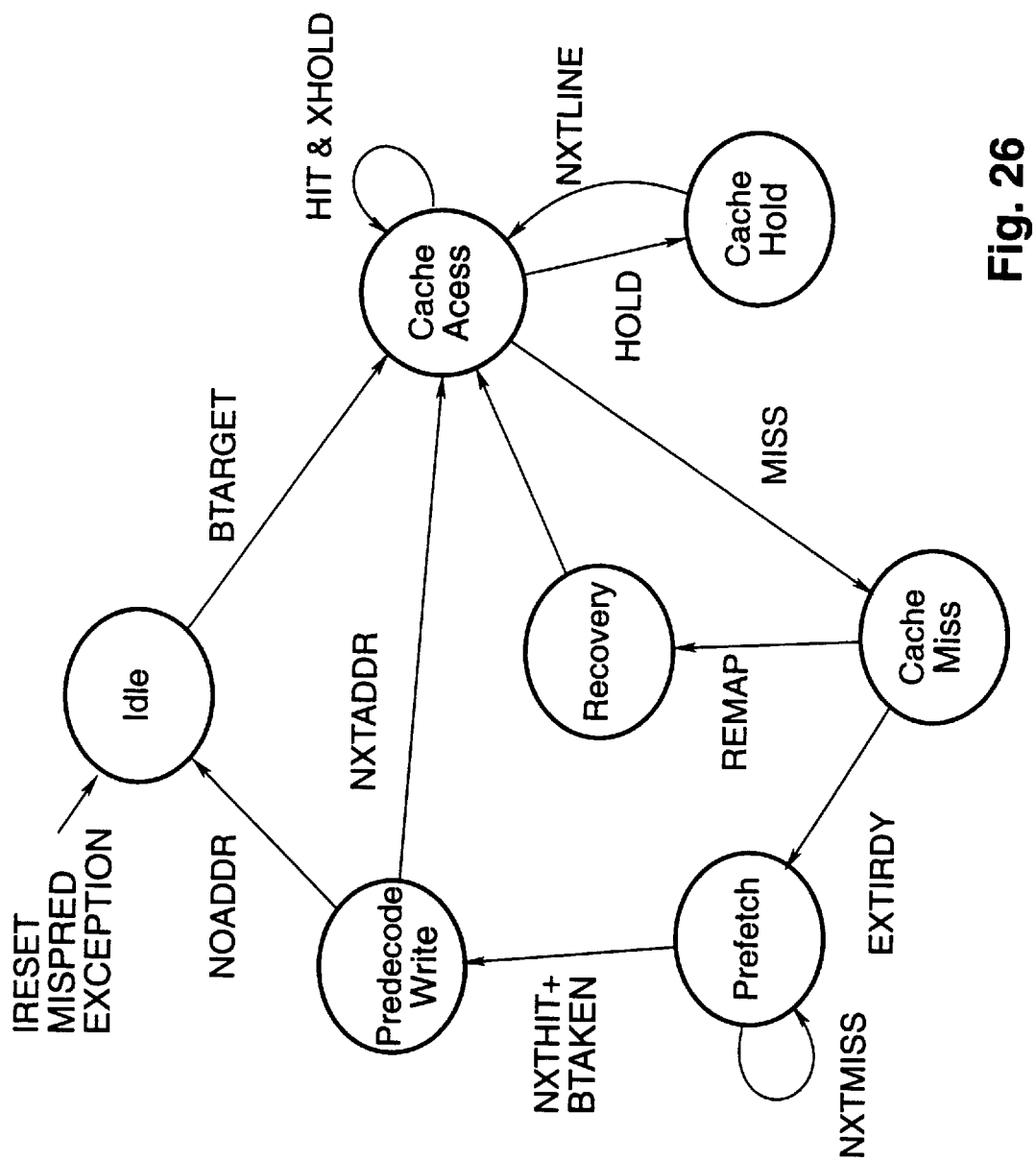

The ICCNTL is the main state machine in the ICACHE. FIG. 26 shows an embodiment of the ICCNTL state machine. ICCNTL latches the inputs at the beginning of the ICLK signal and generates control signals to the arrays for the next cycle by the end of the ICLK cycle. A few signal from the arrays, such as TAGHIT, are issued to ICCNTL in early ICLK cycle instead of the previous phase. The state machine can be forced to transition to certain states with late arriving signals from branch mis-prediction and branch prediction. The IRESET forces the state machine to Idle state, initializes the code segment register, and clears the status of ICACHE. For external fetches, dedicated buses may exist for addresses to MMU and instructions from the pads. The state machine for external fetches is not needed in this case. The preliminary state machine definition and transitions are from the current definition of processor 500.

The ICCNTL block uses logic synthesis with special attention to the late arriving signals from the ICTAGV and ICNXTBLK arrays. Input and output signals are described in sections on other blocks. The ICCNTL should provide all the signals to read and write the cache arrays.

STATE0: Idle state

The Idle state is forced by IRESET, Branch Misprediction, or EXCEPTION, and waits for taken branch target. This is a default state. If the state is forced by branch mis-prediction, it provides Icache control signals to write the Branch Holding Register into the ICNXTBLK. This state transfers to the Cache Access state when the taken branch address is valid, the transfer provides all Icache control signals for reading the array.

STATE1: Cache Access state

The Icache is being accessed. The TAGHIT is not determined until next clock cycle. The assumption is HIT and access is from the next block. The next block address can either come from the ICNXTBLK or sequential. This state provides all Icache control signals for reading the array. When the TAGHIT is received, if there is no holding due to breaking up of the instruction line or invalid pre-decode data, then the state remains in Cache Access state. Otherwise, the state will transition to Cache Hold state. The transition to Cache Hold state provides all Icache control signals for reading the next block of the array. If a miss occurs in the Icache, the state machine transitions to the Cache Miss state. The miss can either be the tag or LV miss. The transfer to Cache Miss state provides Icache control signals to write the Branch Holding Register into the ICNXTBLK.

STATE2: Cache Hold state

This state is a wait state for the whole line of instructions to be dispatched to the decode units. All Icache control signals for reading of next block are continuously provided. As soon as the ICALIGN block can accept the next line, the state machine transitions to the Cache Access state.

STATE3: Cache Miss state

The Cache Miss state makes a request to the L2 and waits for a response. There are two different responses: the first response is the new mapping of the PC (the instructions, pre-decode data, and branch prediction are still valid), and the second response is the fetch of instructions from external memory. The new mapping of the PC includes setting of the LV bit and writing of new SU and tag. For the first case, the state is transferred to Recovery state, and the Icache control signals are to write the ICTAGV and read the ICSTORE, ICPDAT, and ICNXTBLK. For the second case, the state is transferred to the Pre-fetch state, and the Icache control signals are to write the ICTAGV and ICSTORE.

STATE4: Recovery state

The Recovery state is a transitional state before transitions to the Cache Access State. This state provides all Icache control signals for reading the array.

STATE5: Pre-fetch state

This state sends the instruction from the pre-fetch buffer to the ICPRED for pre-decoding. The pre-fetch buffer accepts instructions until full. Handshaking with the BIU occurs to stop fetching and to prevent overfilling the buffer. As the current line is written into the ICSTORE array, the pre-fetch buffer can shift in a new line. The writing of the new line must wait for the completion of pre-decoding of the current line. This state provides array control signals for writing of the ICSTORE array and reading of the next sequential block in the ICTAGV. If the next sequential block is present, as soon as the current line is completed in pre-decoding, the state transitions to the Pre-decode Write state. The array control signals for these transitions are writing of the ICPDAT and ICNXTBLK. If the next sequential block is not present, completion of the pre-decoding of the current line causes the Icache PC to increment and the writing of the new line into the ICSTORE, and restarts the pre-decoding of the new line. If there is an instruction which wraps to the new line, writing of the last line into the ICPDAT and ICNXTBLK must wait for completion of pre-decoding of this wrapped instruction. During pre-decoding, a taken branch can be detected, the state transitions to the Pre-decode Write state.

STATE6: Pre-decode Write state

This state is a transitional state to write the ICPDAT and the ICNXTBLK before transitions to the Idle state or Cache Access state. If the next block address is present from either sequential block or taken branch address which is calculated by the ICPRED, then the state transitions to the Cache Access state. The transfer provides all Icache control signals for reading the array. If the taken branch address cannot be calculated by the ICPRED, then the state transitions to the Idle state, waiting for the target address from decoding or executing of the instruction.

Timing

Since the processor clock cycle is reduced to 4.5 ns, reading of the cache takes an entire clock cycle to get data. The clock is single phase, and the array needs to generate its own self-time clock. The self-time clock uses the same cache column self-time line. As the line is precharged to a high level, the precharge is disabled and the array access is enabled. As the line is discharged, the row driver and senseamp are disabled. The precharge takes 1.7 ns and the current timing for TAGHIT from the self-time clock with 64 rows is 2.8 ns for a total time of 4.5 ns from rising edge of ICLK. The reading of data occurs 2.0 ns from the self-time clock with 64 rows or 0.8 ns before the rising edge of ICLK. The ICSTORE can be implemented using larger arrays, 128 rows by 256 columns. The reading of instructions would take all of 4.5 ns ICLK in this case. All other arrays, ICTAGV, ICPRED, and ICNXTBLK, are 64 rows. The align logic in the ICPDAT takes 6–7 gates, the shifting of X86 instruction bytes to the decode unit can be done by the middle of the second ICLK. The fast path instructions should allow the decode units at least 2.5 ns in the second ICLK for calculation of the linear address.

1. ICLK1: ICFPC, multiplexing new PC, precharge, and access all arrays
2. ICLK2.0: Compare tags, aligning logics from pre-decode, setup branch prediction, and multiplexing instructions to decode units on IB buses.
3. ICLK2.1: Displacement linear address calculation. Fast decoding for register operands and validating of the linear address, and fast decoding for non-conditional branch.

If the predicted branch from the ICNXTBLK is taken, the new PC will take two clock cycles to update in the ICFPC. The speculative way-prediction takes two gates for set decoding, three gates for multiplexing of success index to ICFPC, and two gates in row decoding.

The timing for instructions from external memory is as follows:

1. ICLK1: Latch data from INSB bus to pre-fetch buffer and multiplex onto IB buses to ICPRED in next clock; the data on IB buses are held until pre-decode is completed. Write data into cache.
2. ICLK2: Decode opcode and prefix from the byte pointer. Decoding takes two clock cycles. If there is prefix, then restart the decoding of opcode in the next cycle.
3. ICLK3: Decode opcode. Send pre-decode data to ICPDAT and allow the align logic to select the instruction on IB buses to decode units
4. ICLK4: Send instruction from IB buses to decode units on IBDx buses. The IBDx buses should have the same timing as reading from the array.

Layout

Figure 27:
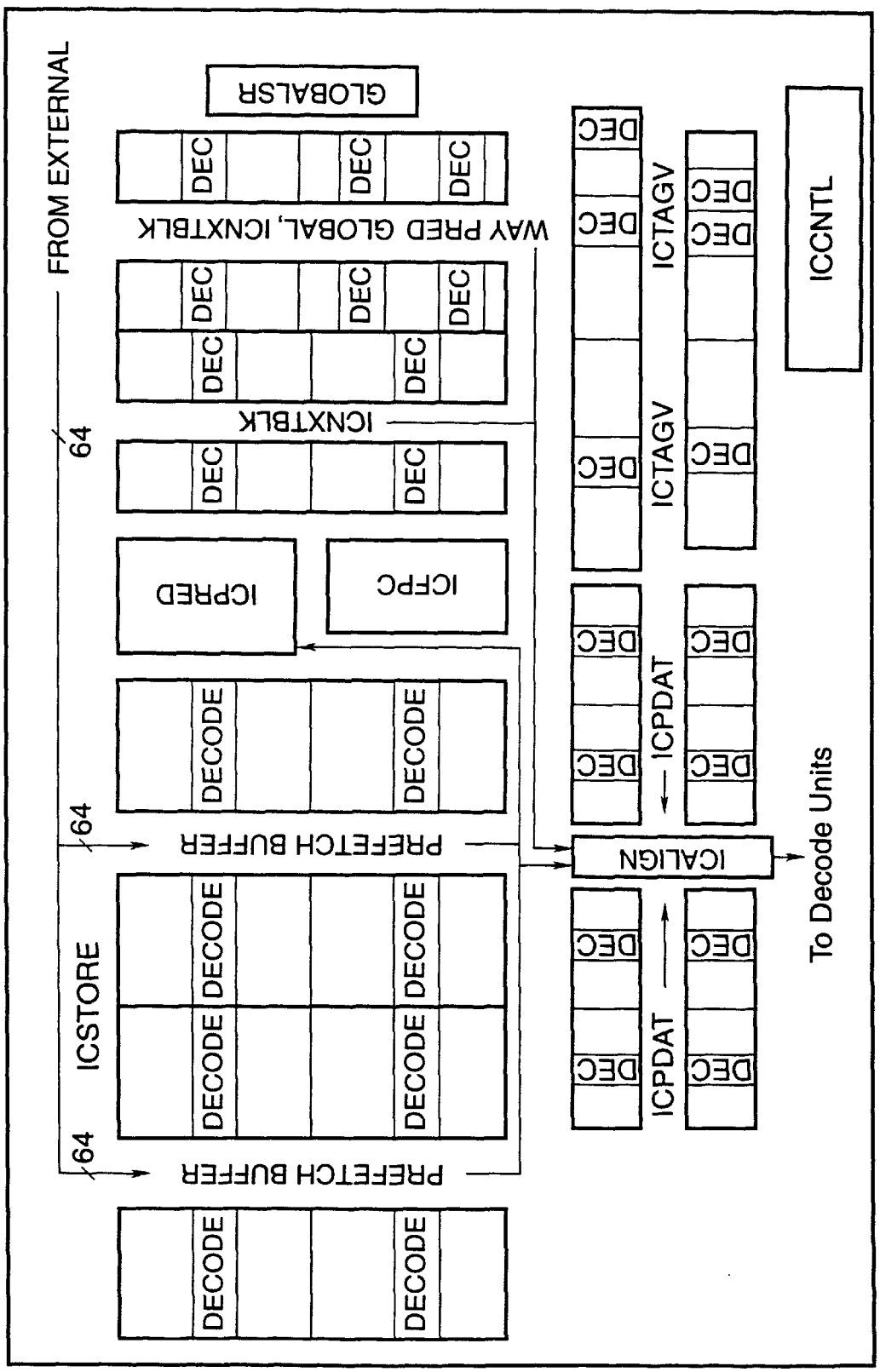

FIG. 27 is a block diagram of the Icache and fetching mechanism. With 4.5 ns ICLK, the size of the arrays are limited to 128 rows by 256 columns for single-port RAM arrays which read or write in different clock cycles and are not in the critical path. For dual-port RAM arrays or faster read timing, the 64 rows by 256 columns array are preferred. The array sizes are based on the single port RAM cell of 10.25 u×6.75 u, and the dual port RAM cell of 10.25 u×14.5 u. The arrays in the ICACHE are laid out as followed:

1. ICSTORE—2048 lines of 128 bits, 8 sets of 128×256, 1312 u×1728 u, single.

2. ICPREDAT—2048 lines of 48 bits, 8 sets of 64×192, 656 u×1296 u, single.
3. ICTAGV—2048 lines of 24 bits, 3 sets of 64×224, 656 u×1512 u, single, and 1 set of 64×96, 656 u×1392 u, dual.
4. ICNXTBLK—2048 lines of 51 bits, 5 sets of 64×256, 656 u×1728 u, single, 1 set of 64×192, 656 u×1296 u, single, 1 set of 64×96, 656 u×1392u, dual, and 1 set of 64×64, 656 u×928 u, dual.

ICTAGV includes a 20-bit tag, a 1-bit valid, a 3-bit status, and a 3-bit way-prediction. The tag and valid are single-port RAM, the status and way-prediction are dual-port RAM. The ICNXTBLK does not include the global branch prediction.

Description of the Instruction Decoder

This section describes the instruction decode organization. For processor 500, the instruction decoding accommodates X86 instructions only. The X86 variable-length instructions from the Icache are sent to the fixed-length decode units. Up to six instructions can be decoded and dispatched in one clock cycle. As stated previously, X86 instructions up to four bytes long may be dispatched to a single decode unit, and x86 instructions up to eight bytes long may be dispatched to two successive decode units. All the decode units are similar except for the first and the last decode units. The first and last decode units differ from the others to accommodate instructions which start in one cache line and continue into the next cache line. An important aspect of the decoding is to calculate the operand linear and register addresses. These addresses are used to access the stack relative cache, the X86 registers, and the LOROB. The stack cache and LOROB must check for dependencies. The calculation of the operand addresses is done in the second ICLK of the pipeline. Decoding of the instructions for the functional units can be done in two cycles. Another function of the decode units is to detect RETURN and the unconditional jump instructions, and to break up the line in case of SIB-byte instructions. The global controls of the decode units include a mechanism to stall the line due to limitations of the load/store buffers, the LOROB, and the reservation stations. The decode units should check for the proper end-byte of the instruction and return the instruction to pre-decode if necessary. The MROM interface includes decoding of MROM entry point, latching, and dispatching the various fields of the instruction.

There are three types of instructions that are sent from the Icache: 1) fast path instructions, 2) two-cycle fast path instructions, and 3) MROM instructions. The fast path instructions have at most one prefix: either 0x66 or 0x0F. The two-cycle fast path instructions have at most three prefixes: either 0x66, 0x67, or 0x0F. All other prefixes will trap to MROM execution. As mentioned earlier, if a "two-cycle" fast path instruction is detected during pre-decoding, the instruction line will be delayed into the next cycle starting with the two-cycle fast path instruction. The extra cycle is needed to combine the prefixes into one and shift the other bytes of the instruction.

Since each decode unit has only four bytes of instructions and the instructions be up to eight bytes in length, the displacement or immediate field of the instruction may be dispatched to the next decode unit. Each decode unit has a by-pass path for the instruction to go directly to the displacement or immediate register of the previous decode unit. The current instruction decoding is only valid if there is a start-byte in the first byte of the decode unit. In case of the last decode unit for the line of instructions, the immediate field of the instruction must be forwarded one clock cycle later by the first decode unit of the next line.

Calculation of the linear address can be done speculatively because the pre-decode information can give an indication of the location of the displacement. Processor 500 calculates the displacement linear address quickly. The register and linear address operands should be detected and subjected to dependency checking by the stack cache and LOROB in the third cycle of the ICLK signal. The addition of the displacement and contents of the EBP register may be done when the instruction arrives at the decode unit. The first bit sets in byte 3–8 cause the displacement to be added to the contents of the EBP register. The displacement's size depends on the number of bits set. The 32-bit adder without carry-in takes less than 2.4 ns. The speculative linear address should be available by the end of second ICLK.

Other functions of the decode units during the second ICLK are:

Decode the RETURN and unconditional jump instruction to generate taken branch address for the next fetch PC.

Detect the MROM instruction to send byte position to MROM interface unit.

Detect the SIB-byte instruction

Detect the predicted taken branch instruction.

Validate the instruction using start-byte and end-byte.

The opcode decoding of the instructions is not critical and can be done in the next two clock cycles to send to the functional units in the fourth ICLK.

TABLE 14

| | Signal list. |
|---|---|
| IRESET | Global signal used to reset all decode units. Clear all states. |
| EXCEPTION | Global signal from the LOROB. Used to indicate that an interrupt or trap is being taken. Effect on Idecode is to clear all instructions in progress. |
| BRNMISP | Input from the Branch execution of the FU indicates that a branch mis-prediction. The Idecode clears all instructions in progress. |
| ROBEMPTY | Input from the LOROB indicates the LOROB is empty. |
| ROBFULL | Input from the LOROB indicates the LOROB is full. |
| CS32X16 | Input from the LSSEC indicates the size of the code segment register. |
| SS32X16 | Input from the LSSEC indicates the size of the stack segment register. |
| MVTOSRIAD | Input from SRB, indicates a move to IAD special register, Idecode needs to check its pointer against the pointer driven on IAD. |
| MVFRSRIAD | Input from SRB, indicates a move from IAD special register, Idecode needs to check its pointer against the pointer driven on IAD. |
| MVTOARIAD | Input from SRB, indicates a move to IAD special register array, Idecode needs to check its pointer against the pointer driven on IAD. |
| MVFRARIAD | Input from SRB, indicates a move from IAD special register array, Idecode needs to check its pointer against the pointer driven on IAD. |
| RSFULL | Input from the functional units indicates the reservation station is full. |
| MROMDEC(5:0) | Input from MROM indicates the microcodes are being decoded by the decode units. |
| USExREG(5:0) | Input from MROM indicates the global decode registers for the MODRM, displacement, immediate field, and prefix control signals for the microcode instruction. |
| ICPC(31:0) | Input from Icache indicates the current line PC to pass along with the instruction to the LOROB. |
| ICPOSx(3:0) | ICLK7 Input from Icache to decode units indicates the PC's byte position of the instruction. |
| IBDx(31:0) | ICLK7 Input from Icache to decode units indicates the four-byte of the instruction. |
| ICxSTART | ICLK7 Input from Icache to Idecode indicates the start-byte for the lines of instructions being fetched. |

TABLE 14-continued

Signal list.

| | |
|---|---|
| ICxEND(3:0) | ICLK7 Input from Icache to Idecode indicates the end-byte for the lines of instructions being fetched. |
| ICxFUNC(3:0) | ICLK7 Input from Icache to Idecode indicates the functional-bit for the lines of instructions being fetched. |
| ICBRN1 | Input from Icache, indicates the branch taken prediction of the first target in the ICNXTBLK for the lines of instructions being fetched. |
| ICBRN2 | Input from Icache, indicates the branch taken prediction of the second target in the ICNXTBLK for the lines of instructions being fetched. |
| ICBCOL1(3:0) | Input from Icache, indicates the column of the first branch target in the ICNXTBLK for the lines of instructions being fetched. |
| ICBCOL2(3:0) | Input from Icache, indicates the column of the second branch target in the ICNXTBLK for the lines of instructions being fetched. |
| BTAG1(3:0) | Input from Icache, indicates the position of the first target branch instruction with respect to the global shift register in case of branch mis-prediction. |
| BTAG2(3:0) | Input from Icache indicates the position of the second target branch instruction with respect to the global shift register in case of branch mis-prediction. |
| IBTARGET(31:0) | Input from the Icache to decode unit indicates the predicted taken branch target for the line on instruction in the previous cycle. |
| DESP(31:0) | Input from the stack cache indicates the current ESP to be stored into the return stack with the CALL instruction or to compare with the ESP field for validating the RETURN instruction |
| RETPRED | Input from Icache indicates the current prediction of the return instruction of the fetched line. The return instruction must be detected in the current line of instruction or the Icache must be re-fetched from a new line. |
| RETPC(31:0) | Output to Icache indicates the PC address from the top of the return stack for fast way prediction. |
| UNJMP(5:0) | Output to stack cache and Icache indicates the unconditional branch instruction needs to calculate target address. |
| BRET(5:0) | Output to stack cache indicates the RETURN instruction needs to read PC from the ESP. This is for the case of the ESP mis-match. |
| BTADDR(31:0) | Output to functional units indicates the taken branch targets from either the branch prediction (IBTARGET from Icache) or unconditional branch. The functional units need to compare to the actual branch target. |
| BRNTKN(5:0) | Output indicates which decode unit has a predicted taken branch. The operand steering uses this signal to latch and send BTADDR(31:0) to the functional unit. |
| BRNINST(5:0) | Output indicates which decode unit has a global branch prediction. The operand steering uses this signal to latch and send BTAG1(3:0) and BTAG2(3:0) to the functional units. |
| IDPC(31:0) | Output to LOROB indicates the current line PC. |
| IDxIMM(2:0) | Output to indicates the immediate size information. 01-byte, 10-half word, 11-word, 00-not use. Bit 2 indicates (0) zero or (1) sign extend. |
| IDxDAT(1:0) | Output to indicates the data size information. 01-byte, 10-half word, 11-word, 00-not use. |
| IDxADDR | Output to indicates the address size information. 1-32 bit, 0–16 bit. |
| IDxLOCK | Output to indicates the lock prefix is set for this instruction for serialization. |
| DxUSEFL(2:0) | |
| DxWRFL(2:0) | Output to LOROB and stack cache indicates the type of flag uses/writes for this instruction of decode units:<br>xx1 CF-carry flag,<br>x1x OF-overflow flag,<br>1xx SF-sign, ZF-zero, PF-parity, and AF-auxiliary carry |
| DxUSE1(2:0) | Output to LOROB, register file, and stack cache indicates the type of operand being sent on operand 1 for decode units:<br>0xx register address.<br>1xx linear address.<br>x01 A source operand, no destination<br>x11 A source operand, also destination<br>x10 B source operand. (always no destination)<br>x00 not use this operand |
| DxUSE2(1:0) | Output to LOROB and register file indicates the type of operand being sent on operand 2 (operand 2 is always register address) for decode units:<br>01 first operand, no destination<br>11 first operand, with destination<br>10 second operand (always no destination)<br>00 not use operand 2 |
| INSDISP(5:0) | Indicates that the instruction in decode unit is valid, if invalid, NOOP is passed to LOROB. |
| RDxPTR1(31:0) | Indicates the linear addresses or register address for operand 1 of decode units. |
| RDxPTR2(5:0) | Indicates register address for operand 2 of decode units. |
| IMDIWx(31:0) | Output indicates the 32-bit displacement or immediate field of the instruction to pass to the functional units. |
| IMDINx(7:0) | Output indicates the 8-bit displacement or immediate field of the instruction to pass to the functional units. |
| USEIDW(5:0) | Output indicates the type used in IMDIWx buses. |
| USEIDN(5:0) | Output indicates the type used in IMDINx buses. |
| INSLSxB(5:0) | Output from decode units indicates the prefix values. bit 5 - data size, bit 4 - address size, bit 3 - lock, bit 2:0 - segment registers. |
| INVBYTE(3:0) | Output to ICPRED indicates the starting byte position of the confused instruction for pre-decoding. |
| INVPRED | Output to ICPRED indicates pre-decoding for the confused instruction. |
| INVPOLD | Output to Icache indicates pre-decoding for the previous line of instruction. The ICFPC should start with the previous line. |
| IDSIB(5:0) | Output to stack cache indicates which decode unit has the SIB-byte instruction. |
| REFRESH2 | Output indicates current line of instructions will be refreshed and not accept new instructions from Icache. |
| INSOPxB(11:0) | Output indicates the type of instructions being dispatched, this is the decoded information for the functional units to execute. |
| MROMPOS(5:0) | Output to MIU indicates the byte position of the MROM instruction for the MIU to decode. |
| MOPBYTE(7:0) | Output from MIU to MROM indicates the opcode-byte of the MROM instruction to use as the entry point. |
| MREPEAT(2:0) | Output from MIU to MROM indicates the repeat-byte for string operation of the MROM instruction. |

Early Decoding

The early decoding has to be done within the first half of the second ICLK cycle. The decoding includes validating the instruction, calculating the operands and flags, detecting the return and unconditional branch instructions, and generating control signals for EBP and ESP.

Validating The Instruction

Figure 28:
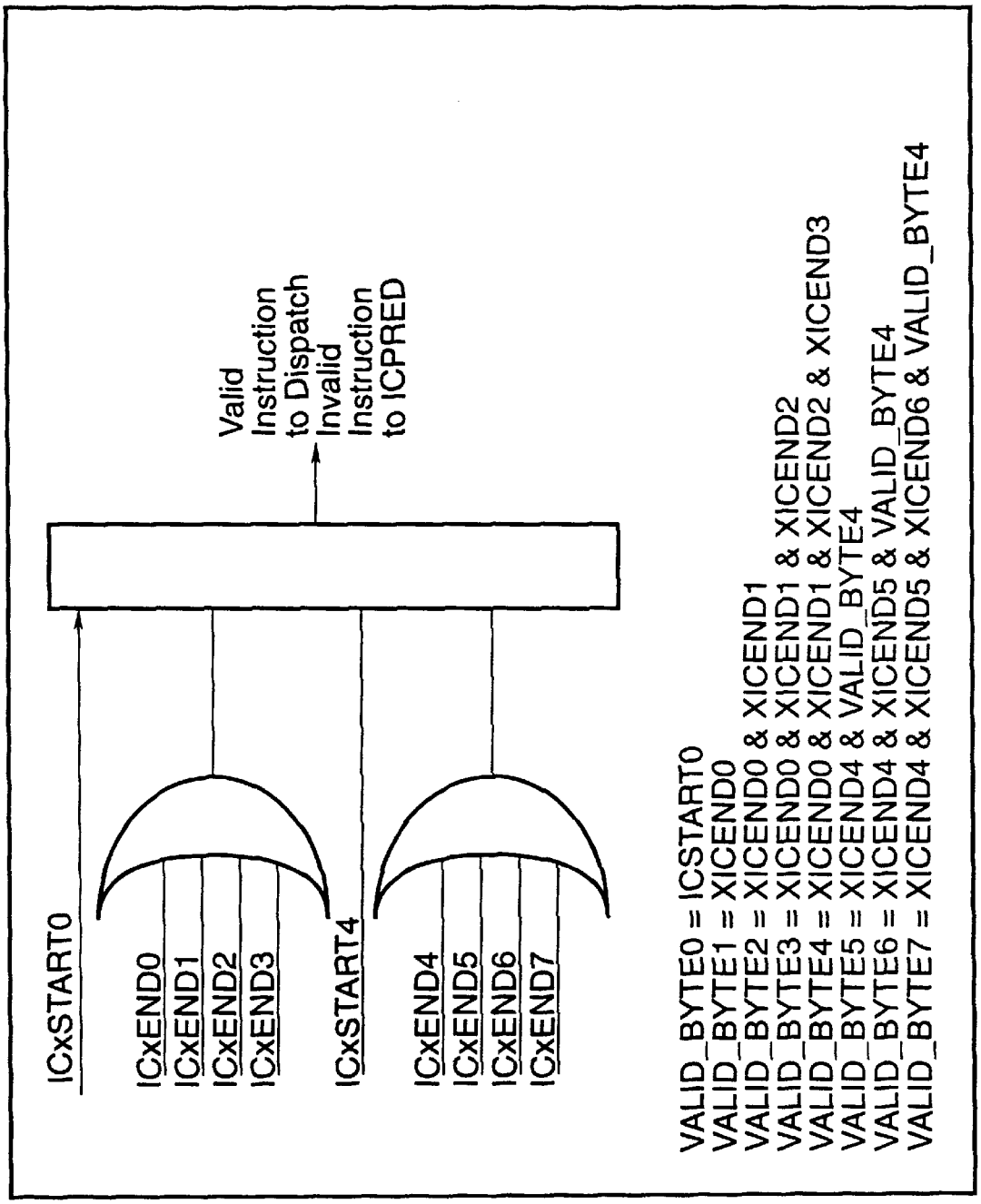

The instructions from the Icache may not be valid if the start-byte and end-byte are not properly set. The decode unit needs to use the start-byte and end-byte to validate every byte of the instruction. Each instruction should have a start-byte at the first byte of the decode unit and an end-byte within the next eight bytes. If the end-byte is not detected within the eight-byte boundary for the fast path instruction, the instruction must be sent back to the Icache for pre-decoding. The end-byte must also be detected for the MROM instruction which may have more than eight bytes in the MROM interface unit. For the case of instruction continuing to the next line, the Icache must re-fetch from the previous line for invalid instruction. The IFPC must retain the previous line PC in this case. The conditions necessary to validate the instruction and each byte are shown in FIG. 28.

Calculating Operands and Flags

With up to six instructions possibly dispatched every clock cycle, twelve possible read operands must be checked for data dependency every clock cycle. The LOROB checks all previously dispatched instructions (up to four lines or 24 instructions) for dependencies, and the stack cache checks for dependencies among the six instructions being dispatched. In the LOROB, the number of comparators is 24 by 6 for the 32-bit linear addresses and 24 by 6 for the 6-bit register operands. In the stack cache, the number of comparators is 15 for the 32-bit linear addresses and 15 for the 6-bit register operands. It is important that the decode units calculate the linear addresses and identify the register operands as soon as possible. The 32-bit adds without carry-in can be accomplished in 2.4 ns. Flags are in the same category with the operands which need early indication. Some of the X86 opcode has implied references to registers and flags. The register operands are from MODRM byte. The linear address is calculated by adding the displacement to contents of the EBP register.

Figure 29:
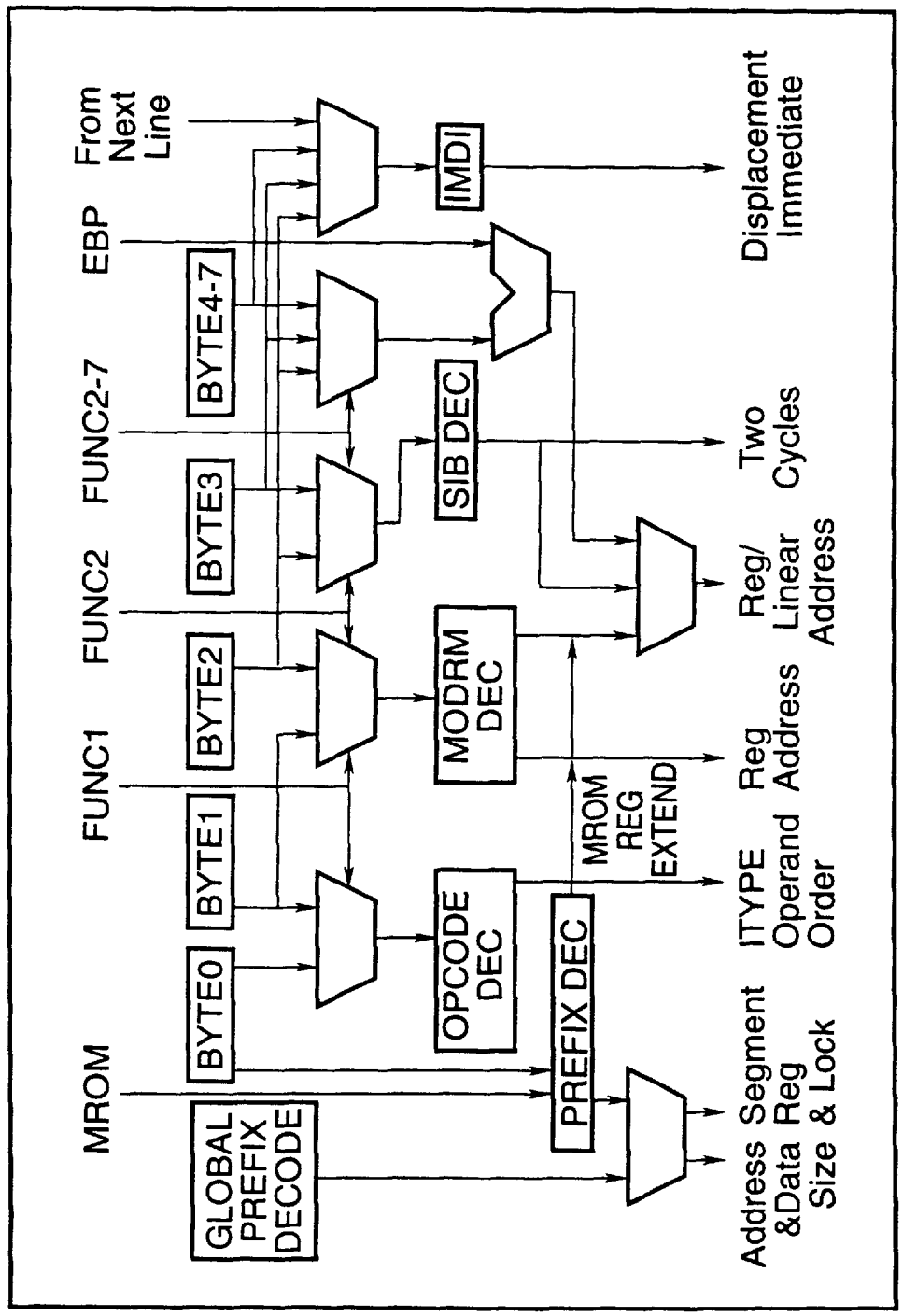

FIG. 29 is a block diagram of hardware within processor 500 which is used to calculate linear addresses and identify register operands. The X86 instruction set includes two-operand instructions with at most one memory reference. To increase the efficiency of the LOROB and the stack cache dependency checking operations, the 32-bit linear address should always be on first operand, and the register operand should always be on second operand. The first operand can alternatively have register operand. For naming convention, the suffix 1 and 2 are operands from the decode units to the LOROB, the stack cache, and the register file. The suffix A and B are operands from the LOROB, the stack cache, and the register file to the reservation stations and functional units. The operands A and B should be in the correct instruction's order. The first and second operand have tags to indicate read/write and memory/register references:

| First Tag: | 0xx | register address. |
| | 1xx | linear address. |
| | x01 | A source operand, no destination |
| | X11 | A source operand, also destination |
| | x10 | B source operand (always n0 destination) |
| | x00 | not use first operand |
| Second Tag: | D1 | A source operand, no destination |
| | 11 | A source operand, also destination |
| | 10 | B source operand (always no destination) |
| | 00 | not use second operand |

The operand steering performed by the LOROB, the stack cache, and the register file use the above tag information to send the operand's data in the correct instruction's order to the functional units. The order of the operands is not known until the actual decoding of the instruction opcode. The benefits of switching the order of operands include:

(1) A cycle gain in performance. Decode units only need to decode the MODRM byte to send the operands, the order of the operand is only known from decoding the opcode which is complex. The order of the operand is not needed until dispatching of instructions to functional units.

(2) Simplify the access to the LOROB and stack cache.

The 32-bit linear address is always on the first operand instead of either operands, the dependency checking in the LOROB and the stack cache is simpler.

The LOROB dependency checking for each dispatched instruction requires one 32-bit comparator for linear address or register, and one 6-bit comparator for register. Only the first operand accesses the stack cache.

(3) Flexibility of switching the operands to simplify the operation of the functional units. For the Subtract Reverse Instruction, the instruction will be dispatched to the functional unit as a Subtract Instruction with the A and operand 2 reverse.

The MODRM byte has 3 fields: REG, MOD, and R/M. The REG field is sent as the second operand. The linear address is calculated and validated the first operand for two cases:

MOD = 01 and R/M = 011, 8-bit displacement
MOD = 10 and R/M = 011, 32 or 16-bit displacement Bit 2 of the operand tag is set for the linear address. Otherwise, the R/M field is sent as the first operand (register).

Figure 30:
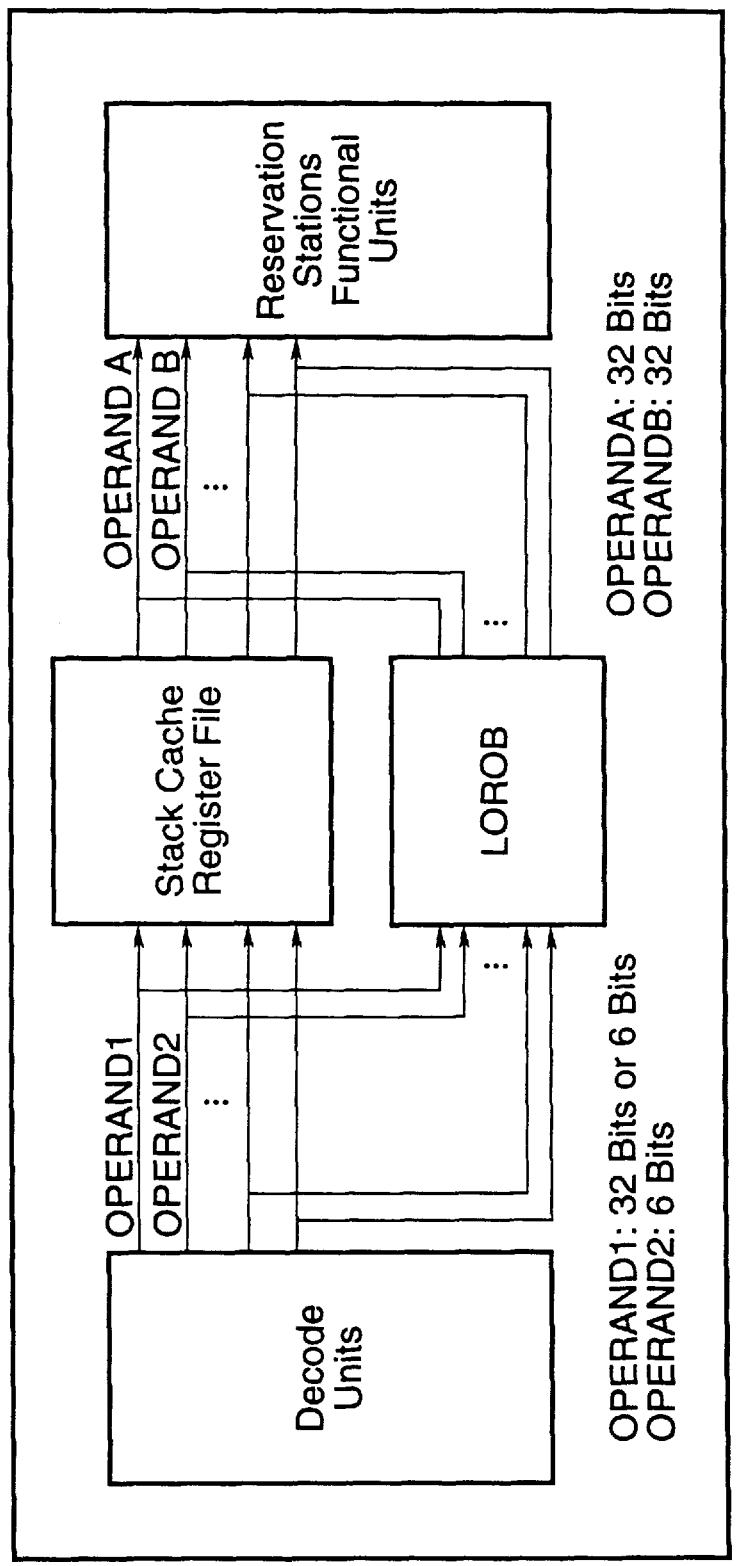

FIG. 30 is a block diagram showing how operands are identified and provided to the reservation stations and functional units.

Fast Decoding for Operands and Flags

The condition for validating the displacement linear address is based on the MODRM. The MODRM byte has to be present with 01xxx101 and there should not be any SIB byte. The first byte after the opcode byte is MODRM and the second byte after the opcode byte is the displacement byte. With the pre-decode information, the MODRM byte is known with certainty, the register addresses can also be calculated quickly. The instructions with implied register in the opcode should also be decoded:

TABLE 15

Register Operands.

| PUSH | 0101 | 0nnn | A, C, D, B, SP, BP, SI, DI | R |
|---|---|---|---|---|
| POP | 0101 | 1nnn | A, C, D, B, SP, BP, SI, DI | W |
| LEAVE | 1100 | 1001 | EBP, ESP | RW |
| ALU OP | 00xx 1000 | x100 0000 | AL | RW |
| ALU OP | 00xx 1000 | x101 00x1 | AX, EAX | RW |
| SHIFTD | 0F | 1010 | CL | R |
| ROT/SHF | 1101 | 001x | CL | R |
| INC | 0100 | 0nnn | A, C, D, B, SP, BP, SI, DI | RW |
| DEC | 0100 | 1nnn | A, C, D, B, SP, BP, SI, DI | RW |
| BSWAP | 0F 1nnn | 1100 | A, C, D, B, SP, BP, SI, DI | RW |
| CBW | 1001 | 1000 | A | RW |
| SAHF | 1001 | 1110 | AH | W |
| LAHF | 1001 | 1111 | AH | R |
| MOVE | 1010 | 000x | A | W |
| MOVE | 1010 | 001x | A | R |
| MOVE | 1011 | 0nnn | AL, CL, DL, BL, AH, CH, DH, BH | W |
| MOVE | 1011 | 1nnn | A, C, D, B, SP, BP, SI, DI | W |

The decoding of the status flags also needs to be accomplished during ICLK2. The status flags are set up in three groups: CF-carry flag, OF-overflow flag, and the rest of the ALU flags, XF (SF-sign flag, ZF-zero flag, PF-parity flag, and AF-auxiliary carry flag). The instructions must provide the reading and writing of the status flags in the same manner as the operands. The decoding of the status flags is as followed:

TABLE 16

Decoding of Status Flags.

| Instruction | opcode | | read flags | write flags |
|---|---|---|---|---|
| PUSHF | 9C | | ALL | |
| POPF | 9D | | | ALL |
| ADC, SBB | 0001 | x0xx | CF | ALL |
| | 0001 | xx0x | | |
| | 8 | 0 | | |
| | xx01xxxx | | | |
| | 8 | 1 | | |
| | xx01xxxx | | | |
| | 8 | 3 | | |
| | xx01xxxx | | | |
| ALU OP | 00xx | x100 | | ALL |
| SHIFTD | 0F | 1010 | | ALL |
| | x101 | | | |
| ROT/SHF | 1101 | 001x | | ALL |
| INC | 0100 | 0xxx | | ALL |
| DEC | 0100 | 1xxx | | ALL |
| LAHF | 1001 | 1111 | ALL | |
| SAHF | 1001 | 1110 | | ALL |
| CLC, SETC | 1111 | 100x | | CF |
| CMC | 1111 | 0101 | CF | CF |
| CLD, SETD | 1111 | 110x | | DF |
| CLI, SETI | 1111 | 101x | | IF |
| SET | 0F | 1001 | CF | |
| | 001x | | CF, ZF | |
| | 0F | 1001 | OF | |
| | 011x | | OF, XF | |
| | 0F | 1001 | XF | |
| | 000x | | XF | |
| | 0F | 1001 | | |
| | 11xx | | | |
| | 0F | 1001 | | |
| | 010x | | | |
| | 0F | 1001 | | |
| | 10xx | | | |
| JCCB | 0111 | 001x | CF | |
| | 0111 | 011x | CF, ZF | |
| | 0111 | 000x | OF | |
| | 0111 | 11xx | OF, XF | |
| | 0111 | 010x | XF | |
| | 0111 | 10xx | XF | |
| JCCW | 0F | 1000 | CF | |
| | 001x | | CF, ZE | |
| | 0F | 1000 | OF | |
| | 011x | | OF, XF | |
| | 0F | 1000 | XF | |
| | 000x | | XF | |
| | 0F | 1000 | | |
| | 11xx | | | |
| | 0F | 1000 | | |
| | 010x | | | |
| | 0F | 1000 | | |
| | 10xx | | | |
| BIT | 0F | 1010 | | CF |
| | x011 | | | |
| | 0F | 1011 | | |
| | x011 | | | |
| | 0F | 1011 | | |
| | 101x | | | |

TABLE 17

Signal list.

| Signal | Description |
|---|---|
| IBD0 (31:0) - | ICLK7 Input from Icache to decode unit 0 indicates the 4-byte of the instruction. |
| IBD1 (31:0) - | ICLK7 Input from Icache to decode unit 1 indicates the 4-byte of the instruction. |
| IBD2 (31:0) - | ICLK7 Input from Icache to decode unit 2 indicates the 4-byte of the instruction. |
| IBD3 (31:0) - | ICLK7 Input from Icache to decode unit 3 indicates the 4-byte of the instruction. |
| IBD4 (31:0) - | ICLK7 Input from Icache to decode unit 4 indicates the 4-byte of the instruction. |
| IBD5 (31:0) - | ICLK7 Input from Icache to decode unit 5 indicates the 4-byte of the instruction. |
| ICXSTART - | ICLK7 Input from Icache to Idecode indicates the start-byte for the lines of instructions being fetched. |
| ICxEND (3:0) - | ICLK7 Input from Icache to Idecode indicates the end-byte for the lines of instructions being fetched. |
| ICxFUNC (3:0) - | ICLK7 Input from Icache to Idecode indicates the functional-bit for the lines of instructions being fetched. |
| D0USEFL (2:0) - D0WRFL (2:0) | Output to LOROB and stack cache indicates the type of flag uses/writes for this instruction of decode unit 0:<br>xx1 CF-carry flag,<br>x1x OF-overflow flag,<br>1XX SF-sign, ZF-zero, PF-parity, and AF-auxiliary carry |
| D1USEFL (2:0) - D1WRFL (2:0) | Output to LOROB and stack cache indicates the type of flag uses/writes for this instruction of decode unit 1. |
| D2USEFL (2:0) - D2WRFL (2:0) | Output to LOROB and stack cache indicates the type of flag uses/writes for this instruction of decode unit 2. |
| D3USEFL (2:0) - D3WRFL (2:0) | Output to LOROB and stack cache indicates the type of flag uses/writes for this instruction of decode unit 3. |
| D4USEFL (2:0) - D4WRFL (2:0) | Output to LOROB and stack cache indicates the type of flag uses/writes for this instruction of decode unit 4. |
| D5USEFL (2:0)- D5WRFL (2:0) | Output to LOROB and stack cache indicates the type of flag uses/writes for this instruction of decode unit 5. |
| D0USE1 (2:0) - | Output to LOROB, register file, and stack cache indicates the type of operand being sent on operand 1 for decode unit 0:<br>0xx register address.<br>1xx linear address.<br>x01 A source operand, no destination<br>x11 A source operand, also destination<br>x10 B source operand (always no destination)<br>x00 not use this operand |
| D1USE1 (2:0) - | Output to LOROB, register file, and stack cache indicates the type of operand being sent on operand 1 for decode unit 1. |
| D2USE1 (2:0) - | Output to LOROB, register file, and stack cache indicates the type of operand being sent on operand 1 for decode unit 2. |
| D3USE1 (2:0) - | Output to LOROB, register file, and stack cache indicates the type of operand being sent on operand 1 for decode unit 3. |
| D4USE1 (2:0) - | Output to LOROB, register file, and stack cache indicates the type of operand being sent on operand 1 for decode unit 4. |
| D5USE1 (2:0) - | Output to LOROB, register file, and stack cache indicates the type of operand being sent on operand 1 for decode unit 5. |
| D0USE2 (1:0) - | Output to LOROB and register file indicates the type of operand being sent on operand 2 (operand 2 is always register address) for decode unit 0:<br>01 first operand, no destination<br>11 first operand, with destination<br>10 second operand (always no destination)<br>00 not use operand 2 |
| D1USE2 (1:0) - | Output to LOROB and register file indicates the type of operand being sent on operand 2 (operand 2 is always register address) for decode unit 1. |
| D2USE2 (1:0) - | Output to LOROB and register file indicates the type of operand being sent on operand 2 (operand 2 is always register address) for decode unit 2. |

TABLE 17-continued

Signal list.

| Signal | Description |
|---|---|
| D3USE2 (1:0) - | Output to LOROB and register file indicates the type of operand being sent on operand 2 (operand 2 is always register address) for decode unit 3. |
| D4USE2 (1:0) - | Output to LOROB and register file indicates the type of operand being sent on operand 2 (operand 2 is always register address) for decode unit 4. |
| D5USE2 (1:0) - | Output to LOROB and register file indicates the type of operand being sent on operand 2 (operand 2 is always register address) for decode unit 5. |
| INSDISP (5:0) - | Indicates that the instruction in decode unit is valid, if invalid, NOOP is passed to LOROB. |
| RD0PTR1 (31:0) - | Indicates the linear addresses or register address for operand 1 of decode unit 0. |
| RD1PTR1 (31:0) - | Indicates the linear addresses or register address for operand 1 of decode unit 1. |
| RD2PTR1 (31:0) - | Indicates the linear addresses or register address for operand 1 of decode unit 2. |
| RD3PTR1 (31:0) - | Indicates the linear addresses or register address for operand 1 of decode unit 3. |
| RD4PTR1 (31:0) - | Indicates the linear addresses or register address for operand 1 of decode unit 4. |
| RD5PTR1 (31:0) - | Indicates the linear addresses or register address for operand 1 of decode unit 5. |
| RD0PTR2 (31:0) - | Indicates register address for operand 2 of decode unit 0. |
| RD1PTR2 (31:0) - | Indicates register address for operand 2 of decode unit 1. |
| RD2PTR2 (31:0) - | Indicates register address for operand 2 of decode unit 2. |
| RD3PTR2 (31:0) - | Indicates register address for operand 2 of decode unit 3. |
| RD4PTR2 (31:0) - | Indicates register address for operand 2 of decode unit 4. |
| RD5PTR2 (31:0) - | Indicates register address for operand 2 of decode unit 5. |
| IMDIW0 (31:0) | |
| IMDIW1 (31:0) | |
| IMDIW2 (31:0) | |
| IMDIW3 (31:0) | |
| IMDIW4 (31:0) | |
| IMDIW5 (31:0) - | Output indicates the 32-bit displacement or immediate field of the instruction to pass to the functional units. |
| IMDIN0 (7:0) | |
| IMDIN1 (7:0) | |
| IMDIN2 (7:0) | |
| IMDIN3 (7:0) | |
| IMDIN4 (7:0) | |
| IMDIN5 (7:0) - | Output indicates the 8-bit displacement or immediate field of the instruction to pass to the functional units. |
| USEIDW (5:0) - | Output indicates the type used in IMDIWx buses. |
| USEIDN (5:0) - | output indicates the type used in IMDINx buses. |
| INVBYTE (3:0) - | Output to ICPRED indicates the starting byte position of the confused instruction for pre-decoding. |
| INVPRED - | Output to ICPRED indicates pre-decoding for the confused instruction. |
| INVPOLD - | Output to Icache indicates pre-decoding for the previous line of instruction. The ICFPC should start with the previous line. |
| IDSIB (5:0) - | Output to stack cache indicates which decode unit has the SIB-byte instruction. |
| IDxIMM (2:0) - | Output to indicates the immediate size information. 01-byte, 10-half word, 11-word, 00-not use. Bit 2 indicates (0) zero or (1) sign extend. |
| IDxDAT (1:0) - | Output to indicates the data size information. 01-byte, 10-half word, 11-word, 00-not use. |
| IDxADDR - | Output to indicates the address size information. 1–32 bit, 0–16 bit. |
| IDxLOCK - | Output to indicates the lock prefix is set for this instruction for serialization. |
| INSLSxB (5:0) - | Output from decode units indicates the prefix values. bit 5 - data size, bit 4 - address size, bit 3 - lock, bit 2:0 - segment registers. |

Handling of Branch Instructions

For unconditional branch instructions, the branch is always taken, and fetching of instructions ceases until the target address is known. There are three types of unconditional branch instructions: CALL, RETURN, and unconditional jump. These branch instructions should be predicted taken. The Idecode should implement an call/return stack, as the CALL instruction is in decode, the return target address will be calculated and written into the return stack for future references. The RETURN instruction will get the target address from the call/return stack, it is not necessary for the return instruction to be written into the ICNXTBLK. The decode units also need to decode the unconditional branches within ICLK2. If the number of unconditional branches is small, the decoding can be done quickly and the target address can also be calculated quickly. The target address calculation for non-conditional jump requires an adder to speculatively add the PC to displacement. The Idecode can receive the unconditional branch indication from the pre-decoding or can do its own decoding. It is noted that this target address calculation feature may not be necessary if the two branch targets in the ICNXTBLK is sufficient to hold both the non-conditional and conditional branch instructions. An important feature of branching in the decode units is the return stack which will be discussed in detail below.

| | | |
|---|---|---|
| JUMP | 1110 10x1 | PC = PC + imm |
| JUMP | EA | PC = CS:imm |
| JUMP | FF xx100xxx | pC = r/m32 |
| JUMP | FF xx101xxx | PC = CS:[m16:32] |
| CALL | E8 | PC = PC + imm |
| CALL | FF xx010xxx | PC = r/m32 |
| CALL | FF xx011xxx | PC = CS:[m16:32] |
| CALL | 98 | PC = CS:imm |
| RETURN | C2, C3, CA, CB | PC = [return stack] |

For conditional branch instructions, the ICNXTBLK is in total control of the prediction. Only the taken branch is important to the decode units in this case. Along with the start-byte, a taken bit is routed along with the instruction. If a taken bit is detected, all instructions after the taken branch instruction will be voided to NOOP.

Only one taken branch is possible per instruction line. The byte positions of the two branch targets from the Icache are compared against the byte positions of decode units to locate the predicted branch instruction within the line. The branch target address and the location of the global branch predictor should be routed along with the branch instruction to the LOROB in case of mis-prediction.

Return Stack

Figure 31:
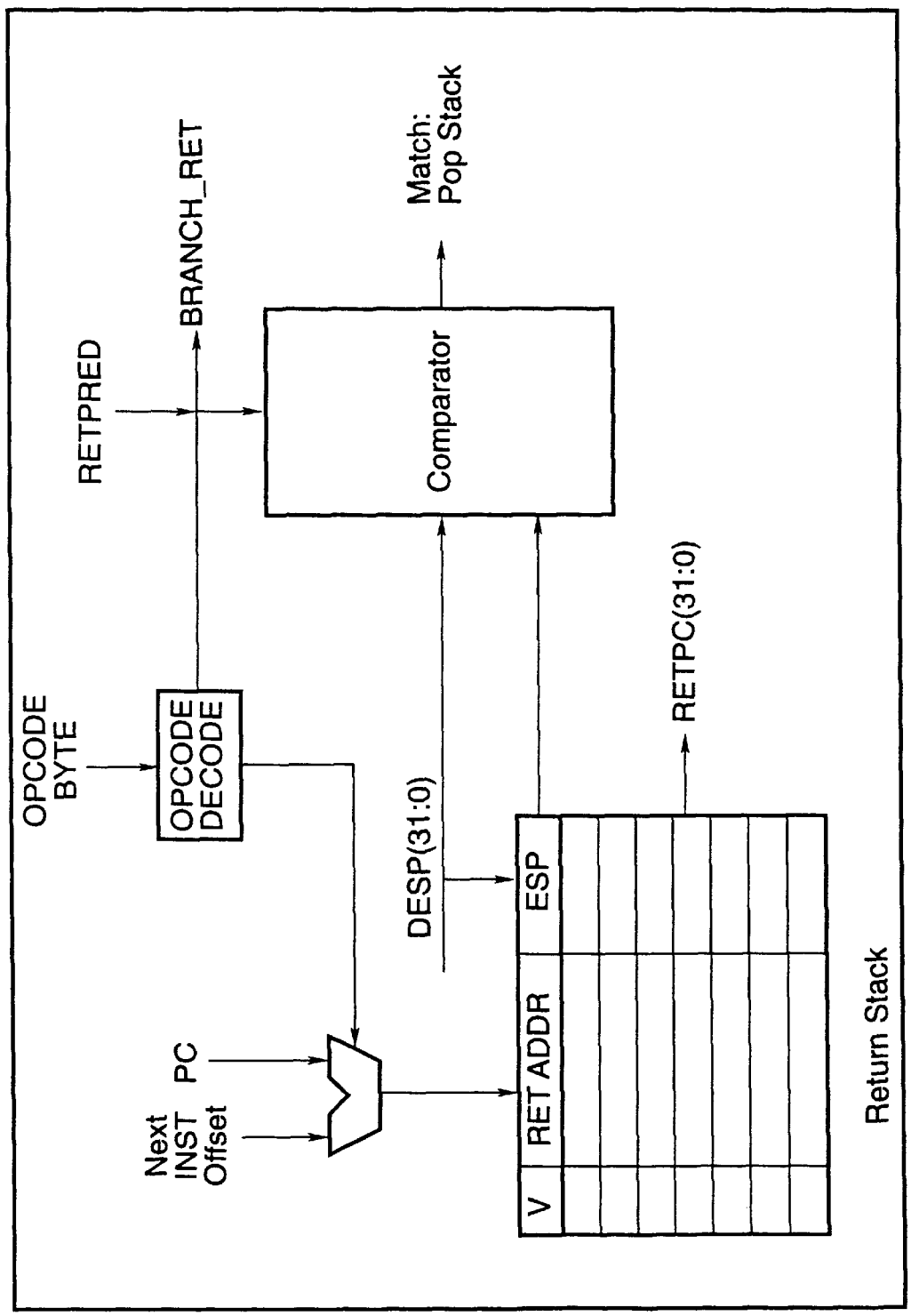

FIG. 31 is a block diagram of the return stack mechanism. The RETURN instruction should be detected in the decode units, and the next PC should be fetched from the return stack. It is noted that the RETURN instruction will not be in the ICNXTBLK. Similarly, the CALL instruction should also be detected in the decode units to update the return stack. The CALL instruction pushes PC+the size of the CALL instructions onto the stack, which concatenates the line PC and the next ICPOSx(3:0). In an application program, the RETURN instruction can be a false address, which causes the return stack to be mis-predicted; the value of the ESP register is included with the return stack to avoid this case. During the third ICLK, when the call information is pushed onto the stack pointer, the value of the ESP register should also be pushed onto the return stack. The RETURN instruction should be detected during the fetching cycle to access the next block in the Icache within one clock cycle. In the decoding, the RETURN instruction causes the current value of the ESP register to be compared with the ESP field in the return stack. An ESP match will pop the value at the top of the return stack; no ESP match causes the pipeline to stall until the return PC is read from the ESP. The return stack is last-in-first-out (LIFO) stack. For mis-predicted branch instruction, the return stack should be able to recover. The old top-of-the-stack pointer is sent from the ICNXTBLK. The return stack pointer communicates with the ICNXTBLK for proper recovery as discussed earlier in the section on the ICNXTBLK block.

In one embodiment, the return stack has eight storage locations. Each buffer location contains a valid bit, the return PC, and the ESP address. The valid bit is used for the case that the number of CALL instructions is more than the number of entries in the return stack. A mis-predicted RETURN instruction should occur only if the subroutine changes the return target in the stack pointer before executing the RETURN instruction.

TABLE 18

| | Signal list. |
|---|---|
| ICPOSX(3:0) | ICLK7 Input from Icache to decode units indicates the PC's byte position of the instruction. |
| ICBRN1 | Input from Icache, indicates the branch taken prediction of the first target in the ICNXTBLK for the lines of instructions being fetched. |
| ICBRN2 | Input from Icache, indicates the branch taken prediction of the second target in the ICNXTBLK for the lines of instructions being fetched. |
| ICBCOL1(3:0) | Input from Icache, indicates the column of the first branch target in the ICNXTBLK for the lines of instructions being fetched. |
| ICBCOL2(3:0) | Input from Icache, indicates the column of the second branch target in the ICNXTBLK for the lines of instructions being fetched. |
| BTAG1(3:0) | Input from Icache, indicates the position of the first target branch instruction with respect to the global shift register in case of branch mis-prediction. |
| BTAG2(3:0) | Input from Icache indicates the position of the second target branch instruction with respect to the global shift register in case of branch mis-prediction. |
| IBTARGET(31:0) | Input from the Icache to decode unit indicates the predicted taken branch target for the line on instruction in the previous cycle. |
| DESP(31:0) | Input from the stack cache indicates the current ESP to be stored into the return stack with the CALL instruction or to compare with the ESP field for validating the RETURN instruction |
| RETPRED | Input from Icache indicates the current prediction of the return instruction of the fetched line. The return instruction must be detected in the current line of instruction or the Icache must be re-fetched from a new line. |
| RETPC(31:0) | Output to Icache indicates the PC address from the top of the return stack for fast way prediction. |
| UNJMP(5:0) | Output to stack cache and Icache indicates the unconditional branch instruction needs to calculate target address. |
| BRET(5:0) | Output to stack cache indicates the RETURN instruction needs to read PC from the ESP. This is for the case of the ESP mis-match. |
| BTADDR(31:0) | Output to functional units indicates the taken branch targets from either the branch prediction (IBTARGET from Icache) or unconditional branch. The functional units need to compare to the actual branch target. |

TABLE 18-continued

| | Signal list. |
|---|---|
| BRNTKN(5:0) | Output indicates which decode unit has a predicted taken branch. The operand steering uses this signal to latch and send BTADDR(31:0) to the functional unit. |
| BRNINST(5:0) | Output indicates which decode unit has a global branch prediction. The operand steering uses this signal to latch and send BTAG1(3:0) and BTAG2(3:0) to the functional units. |

Instruction Opcode Decoding

The instruction decoding operation is allowed 1.5 ICLK cycles. The output is a wide bus with decoded commands for the functional units to execute the instruction.

TABLE 19

Instruction Opcode Decoding.

First 6 bits of decoding:

| 000001 | ADD | add |
|---|---|---|
| 000011 | OR | |
| 000101 | AND | and |
| 000111 | SUB | subtract |
| 001001 | XOR | exclusive or |
| 001011 | ANDN | nand |
| 001101 | XNOR | exclusive nor |
| 001111 | CONST | constant (move?) |
| 000000 | ADDC | add with carry |
| 000010 | SUBB | subtract |
| 000100 | DFADD | directional add |
| 000110 | INT | interrupt |
| 001000 | INTO | interrupt on overflow |
| 001010 | DIV0 | initial divide step |
| 001100 | DIV | divide step |
| 001110 | DIVL | last divide step |
| 010000 | DIVREM | remainder |
| 010010 | DIVCMP | divide compare |
| 010100 | DIVQ | quotient |
| 010110 | IDIVSGN | signed divide signs |
| 011000 | IDIVCMP | signed divide compare |
| 011010 | IDIVDEND0 | signed divide dividend LSW |
| 011100 | IDIVDEND1 | signed divide dividend MSW |
| 011110 | IDIVSOR | signed divide divisor |
| 011111 | IDIVQ | signed divide quotient |
| 100000 | ROL | rotate left |
| 100001 | ROR | rotate right |
| 100010 | SHL | shift logical left |
| 100011 | SHR | shift logical right |
| 100100 | SAR | shift arithmetic right |
| 100101 | SHLD | shift left double |
| 100110 | SHRD | shift right double |
| 100111 | SETFC | set funnel count |
| 101000 | EXTS8 | sign extend 8 bit operand |
| 101001 | EXTS16 | sign extend 16 bit operand |
| 101100 | MTFLAGS | store AH into flags |
| 101101 | CONSTHZ | move lower constant into upper, zero lower |
| 101110 | BTEST | bit test |
| 101111 | BTESTS | bit test and set |
| 110000 | BTESTR | bit test and reset |
| 110001 | BTESTC | bit test and compliment |
| 110010 | BSF | bit scan forward |
| 110011 | BSR | bit scan |
| 110100 | BSWAP | byte swap |
| 110101 | SHRDM | shift right double microcode |
| 110110 | RC0 | initialize rotate carry |
| 110111 | RCL | rotate carry left by 1 |
| 111000 | RCR | rotate carry right by 1 |
| 111001 | MTSRRES | move to special register result bus |

TABLE 19-continued

Instruction Opcode Decoding.

| | | |
|---|---|---|
| 111010 | MFSRRES | move from special register over result bus |
| 111011 | MTSRSRB | move to special register SRB bus |
| 111100 | MFSRSRB | move from special register SRB bus |
| 111101 | MTARSRB | move to cache array over SRB bus |
| 111110 | MFARSRB | move from cache array over SRB bus |

Second 6 bits of decoding:

| | | |
|---|---|---|
| 000000 | JMPB | jump if below CF=1 |
| 000001 | JMPNB | jump if not below CF=0 |
| 000010 | JMPA | jump if above CF=0 & ZF=0 |
| 000011 | JMPNA | jump if not above CF=1 or ZF=1 |
| 000100 | JMPO | jump if overflow OF=1 |
| 000101 | JMPNO | jump if not overflow OF=0 |
| 000110 | JMPZ | jump if zero ZF=1 |
| 000111 | JMPNZ | jump if not zero ZF=0 |
| 001000 | JMPS | jump if sign SF=1 |
| 001001 | JMPNS | jump if not sign SF=0 |
| 001010 | JMPP | jump if parity PF=1 |
| 001011 | JMPNP | jump if not parity PF=0 |
| 001100 | JMPL | jump if less SF<>OF |
| 001101 | JMPGE | jump if greater or equal SF=OF |
| 001110 | JMPLE | jump if less or equal SF<>OF or ZF=1 |
| 001111 | JMPG | jump if greater SF=OF and ZF=0 |
| 010000 | SETB | set if below CF=1 |
| 010001 | SETNB | set if not below CF=0 |
| 010010 | SETA | set if above CF=0 & ZF=0 |
| 010011 | SETNA | set if not above CF=1 or ZF=1 |
| 010100 | SETO | set if overflow OF=1 |
| 010101 | SETNO | set if not overflow OF=0 |
| 010110 | SETZ | set if zero ZF=1 |
| 010111 | SETNZ | set if not zero ZF=0 |
| 010000 | SETS | set if sign SF=1 |
| 011001 | SETNS | set if not sign SF=0 |
| 011010 | SETP | set if parity PF=1 |
| D11011 | SETNP | set if not parity PF=0 |
| 011100 | SETL | set if less SF<>OF |
| 011101 | SETGE | set if greater or equal SF=OF |
| 011110 | SETLE | set if less or equal SF<>OF or ZF=1 |
| 011111 | SETG | set if greater SF=OF and ZF=0 |
| 100000 | SELB | move if below CF=1 |
| 100001 | SELNB | move if not below CF=0 |
| 100010 | SELA | move if above CF=0 & ZF=0 |
| 100011 | SELNA | move if not above CF=1 or ZF=1 |
| 100100 | SELO | move if overflow OF=1 |
| 100101 | SELNO | move if not overflow OF=0 |
| 100110 | SELZ | move if zero ZF=1 |
| 100111 | SELNZ | move if not zero ZF=0 |
| 101000 | SELS | move if sign SF=1 |
| 101001 | SELNS | move if not sign SF=0 |
| 101010 | SELP | move if parity PF=1 |
| 101011 | SELNP | move if not parity PF=0 |
| 101100 | SELL | move if less SF<>OF |
| 101101 | SELGE | move if greater or equal SF=OF |
| 101110 | SELLE | move if less or equal SF<>OF or ZF=1 |
| 101111 | SELG | move if gre.ater SF=OF and ZF=fl |
| 110000 | | |
| 110001 | CONSTPC | move from EIP over DPC |
| 110010 | JMP | relative jump |
| 110011 | JMPI | absolute jump |
| 110100 | JMPNU | absolute jump, no prediction update |
| 110101 | JMPIFAR | absolute far jump |
| 110110 | JMPRZ | jump if A_OP ==0 |
| 110111 | JMPNRZ | jump if A#OP !=0 |
| 111000 | JMPNRZZ | jump if A#CP !=0 & ZF==1 |
| 111001 | JMPNRZNZ | jump if A#OP !=0 & ZF==0 |
| 111010 | JMPRS | jump if A#OP msb==1 |
| 111011 | JMPRNS | jump if A#OP msb==0 |
| 111100 | | |
| 111101 | | |
| 111110 | | |
| 111111 | | |

Another function of this block is to decode the instruction order of the operands sent to the LOROB, the stack cache, and the register file. The outputs are the two operand tags which will be used to send the operand data to the functional units in the correct instruction order. One exception is the reversed subtract which would be sent as a subtract instruction.

TABLE 20

Signal list.

INSOP0B (11:0)
INSOP1B (11:0)
INSOP2B (11:0)
INSOP3B (11:0)
INSOP4B (11:0)
INSOP5B (11:0) - Output indicates the type of instructiofls being dispatched, this is the decoded information for the functional units to execute.

MROM Decoding

The decode unit detects the MROM instruction using the predecode information and sends the instruction to the MROM block. All the buses from Icache to the decode units also route to the MROM block. The decode unit sends the signals along with byte position of the MROM instruction to the MROM interface unit for decoding. The microcodes should resemble the fast path instructions as much as possible to keep the decode units simple and avoid the critical path. In order to keep the size of the MROM under control, a set of global registers is used to store the fields of the instructions. The microcode needs to send indications to read the field of instructions for execution. The microcode uses extra registers for operation; the prefix field is used to extend the number of X86 registers from eight to 64. The decode units concatenate the register extension to the MODRM decoding. All floating point instructions will be sent to MROM. Floating point operations are sent to an on-chip floating-point co-processor.

MROM Interface Unit

Figure 32:
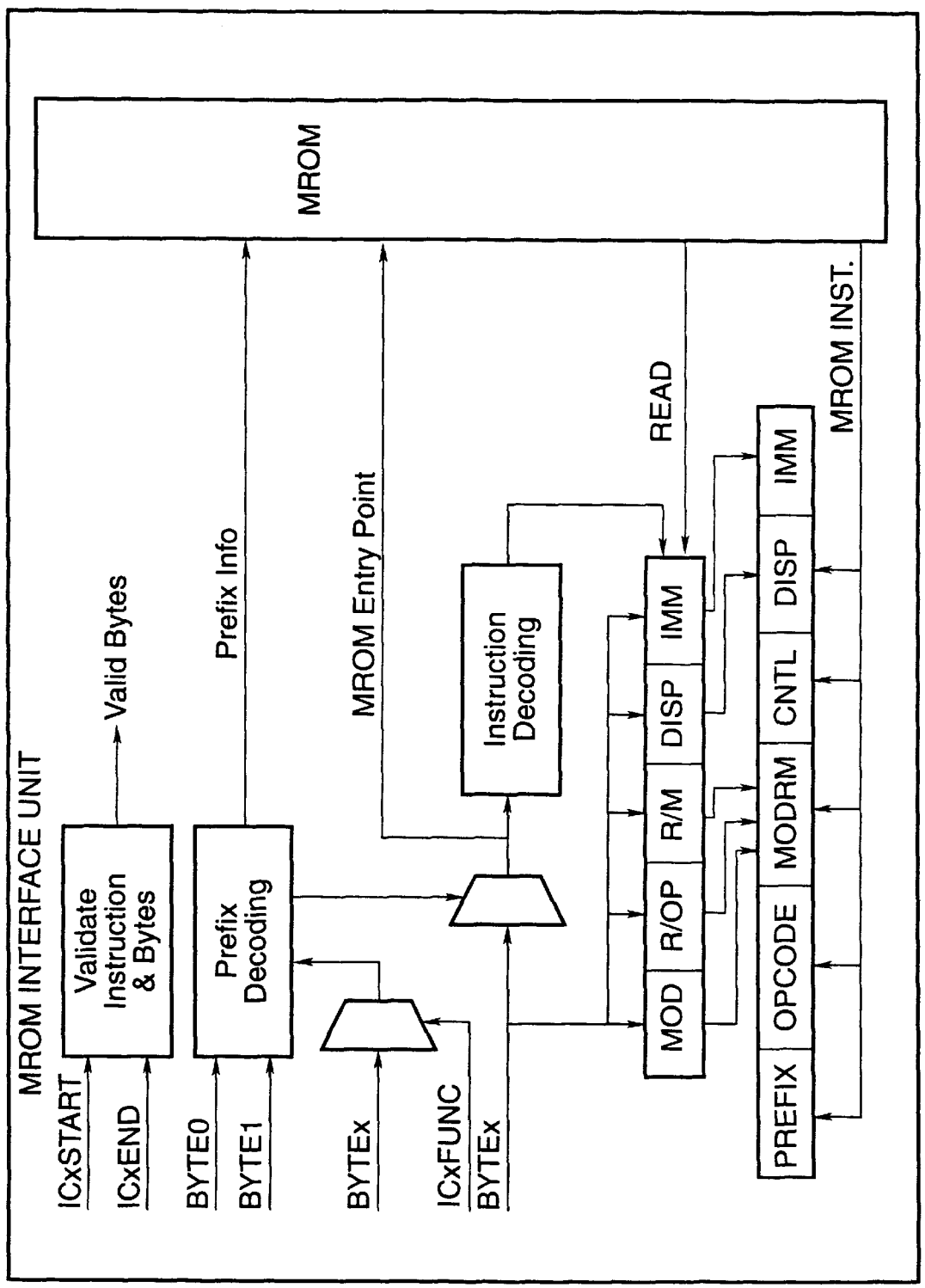

FIG. 32 is a block diagram of the MROM Interface Unit (MIU). The MIU takes input from the Icache with byte position indications from the decode unit. The MROM instruction should be validated by a similar logic as the decode units, the instruction can be as long as 15 bytes. The start-byte and end-byte should be detected or the instruction will be sent back to the ICPRED. The MIU detects the opcode as the MROM entry point and other fields of the instructions for latching into the global registers to be access by the MROM. The important fields are the MOD, REG/OP, R/M, displacement, and immediate. The predecode functional bits have information for early detection of the opcode byte. If the instruction has less than two prefixes, no functional bit is set from the third byte. Decoding for the prefix is limited to two bytes in this case. If the instruction has two or more prefixes, then a functional bit will be set for the opcode byte. The decoding is needed to detect the 0x0F prefix which may be located one byte prior to the first opcode byte. The opcode byte is used as the entry to the MROM. The opcode is also decoded in the MIU for the other fields of the instruction. The prefix decoding can be the same block as the 2-cycle instruction prefix decoding with extra logic for detection of the repeat-byte for the string operation.

Register Operand Decoding

FIG. 33 is a block diagram showing how processor 500 extends the register set for MROM instructions. In order to have no effect on the MODRM decoding of fast path instructions, the microcode uses a prefix for extending the register field. The extended register field for microcode will be concatenated with the MODRM register field to address the full 64 register file. For fast path instructions, the extended register field is forced to zero. The MODRM, the displacement, and the immediate field can be read from the global decoding registers.

Floating Point Instruction Decoding

The executions of floating point instructions are not optimized in processor 500 as floating point performance is only important in scientific applications. For general purpose applications, floating point performance is not important. All floating point instructions are MROM instructions. The microcode will dispatch the FP instructions to a floating-point co-processor. An entry in the LOROB is used for proper sequential of instructions.

TABLE 21

Signal list.

| | |
|---|---|
| ICxSTART | ICLK7 Input from Icache to Idecode indicates the start-byte for the lines of instructions being fetched. |
| ICxEND(3:0) | ICLK7 Input from Icache to Idecode indicates the end-byte for the lines of instructions being fetched. |
| ICxFUNC(3:0) | ICLK7 Input from Icache to Idecode indicates the functional-bit for the lines of instructions being fetched. |
| MROMDEC(5:0) | Input from MROM indicates the microcodes are being decoded by the decode units. |
| USE0REG(5:0) | |
| USE1REG(5:0) | |
| USE2REG(5:0) | |
| USE3REG(5:0) | |
| USE4REG(5:0) | |
| USE5REG(5:0) | Input from MROM indicates the global decode registers for the MODRM, displacement, immediate field, and prefix control signals for the microcode instruction. |
| MROMPOS(5:0) | Output to MIU indicates the byte position of the MROM instruction for the MIU to decode. |
| MOPBYTE(7:0) | Output from MIU to MROM indicates the opcode-byte of the MROM instruction to use as the entry point. |
| MREPEAT(2:0) | Output from MIU to MROM indicates the repeat-byte for string operation of the MROM instruction. |
| MIDPREF(5:0) | Output from MIU prefix decode to decode units indicates the prefix values. bit 5 - data size, bit 4 - address size, bit 3 - lock, bit 2:0 - segment registers. This can be from the same prefix decoding as the 2-cycle access. |

Global Control of Decode Units

The decode units, in most cases, can decode instructions, generate operand addresses, and dispatch to the functional units individually. There are a few exceptions where global controls are needed. In a few cases, the line of instruction has to be dispatched in a sequence over many clock cycles. Examples include MROM instructions, SIB-byte instructions, two-cycle fast path instructions, and conditional branch instructions which are taken. In these cases the lines of instructions are modified and refreshed instead of accepting a new line of instruction. Partial line dispatching should be detected in the second ICLK. Other conditions to halt the line of instructions before dispatching to the functional units in the next ICLK are the reservation full, the LOROB full, and the Load/Store buffer full. These halt conditions will stop the pipeline in the decoder from advancing.

Partial Line and NOOP Dispatching

Each decode unit detects the conditions for breaking up the line. The two-cycle fast path and MROM instructions are indicated by the functional-byte. SIB-byte instructions are detected by two functional bits not being set between the opcode byte and the displacement/immediate byte. The taken branch instruction is from information from the ICNXTBLK or fast decoding of unconditional branch instruction. The information is sent to the global control to modify and refresh the line of instructions. Some instructions will be changed to NOOP before dispatching to functional units.

TABLE 22

Sample Instruction Seguence.

| Input line | Inst0 | Inst1 | Inst2 | Inst3 | Inst4 | Inst5 |
|---|---|---|---|---|---|---|
| Inst3=2-cycle I | NOOP | NOOP | NOOP | Inst3 | Inst4 | Inst5 |
| Inst3=2-cycle I | Inst0 | Inst1 | Inst2 | NOOP | NOOP | NOOP |
| Inst3=MROM | NOOP | NOOP | NOOP | Inst3 | Inst4 | Inst5 |
| Inst3=MROM | MROM | MROM | MROM | MROM | MROM | MROM |
| Inst3=MROM | Inst0 | Inst1 | Inst2 | NOOP | NOOP | NOOP |
| Inst3=SIB I | NOOP | NOOP | NOOP | SIB two | Inst4 | Inst5 |
| Inst3=SIB I | Inst0 | Inst1 | Inst2 | SIB one | NOOP | NOOP |
| Inst3=Taken B | Inst0 | Inst1 | Inst2 | Taken B | NOOP | NOOP |

Each stage of the pipeline has the latch and can be refreshed. In the third ICLK, the stalling conditions for the operand pointers from the decode units to remain on the buses are:

If the LOROB is full, the decoding is stalled until the LOROB can accept another line of instructions.

If there is a wide-to-narrow dependency; i.e. the read operand is 32-bits and the previous destination operand is 8-bits, the decoding is stalled until the LOROB retires the previous destination entry.

In the fourth ICLK, the line in the LOROB must be allocated, the stalling conditions for the operand data to remain on the buses are:

If the load/store buffer is full, the decoding is stalled until the load/store buffer is available.

If any set of reservation stations is full, the decoding is stalled until the reservation station is available.

Each of the instructions should have a PC offset including the NOOP after a valid instruction. The PC offset is useful for generating the sequential PC in case of branch misprediction, exception, or interrupt. In addition to the above conditions to dispatch NOOP, the decode units also check for start-byte. If the first byte of the decode unit does not have a start-byte, the decode unit dispatches a NOOP to the functional unit. The Icache must clear the start-byte for sending a partial line to the decode units.

SIB-byte Instructions

The X86 instructions specify two operands, and processor 500 is set up to work with two operands throughout the pipeline. One exceptional case is the SIB byte that can introduce another operand; the index operand. In the SIB byte case, the instruction is dispatched as two instructions. The first SIB instruction is a regular ADD for calculation of the scale-index operand as seen by the functional units, for the LOROB, the first SIB instruction has no destination and no increment of the PC. The second SIB instruction will be forced by the stack cache to have a dependency on the first instruction that will be forwarded from the result bus.

Two-Cycle Fast-path Instructions

FIG. 34 is a block diagram of how two-cycle fast path instructions are handled. The number of prefix bytes included in fast path instructions is limited to three. Allowed prefixes include 0xF0 for lock, 0x66 for toggling between 16 or 32 bit data, 0x67 for toggling between 16 or 32 bit address, 0x0F for two-byte opcode, and six more prefixes for segment register override. The prefix bytes are indicated by the number of functional bits set beginning with the start-byte. The decoding of fast path instructions allows only one prefix. In cases where instructions have more than one prefix bytes, an extra cycle is needed to shift the instruction and decode the prefixes. The number of bytes shifted is based on the number of functional bits set beginning with the start-byte. The prefixes combine with the MODRM to provide the size information to the stack cache and register file. The decoding of the prefixes are done before the next cycle begins.

Serialization

Serialization is controlled by the MROM and decode units. The LOROB must be empty before the instructions can be forwarded from the decode units to the stack cache and register file, and the LOROB must be empty again before the next instruction can be dispatched. The serializations are mostly from the MROM, a few may be from fast path instructions with special decoding of the instructions during the second ICLK.

Serialized instructions which must be handled by the decode units include:

INVD—For invalidate the data cache and start the next line. For Icache, the LOROB must re-fetch the next instruction.

HALT—Dispatch the instruction to the LOROB and wait for interrupt.

WAIT—Dispatch the instruction to the LOROB and wait

Instruction Breakpoints

When enabled, instruction breakpoint check instructions are inserted before each instruction by the decode unit. A hardwired input to issue position 0 is serially dispatched before every instruction. The breakpoint instructions go to the LSSEC to check for breakpoints.

Handling of Load/Store Instructions

The load/store section implements a finite size load/store buffer. There are cases when the buffer is full and creates a stall condition in the functional units. To avoid stalling in the functional units, the decode will not dispatch the current line of instructions if there is not enough space in the load/store buffer to handle all the load/store instructions of the current line. The decode units have more time to make this decision than the functional units.

In the fourth ICLK, the decode units send the load/store information to the load/store section. This information includes the current LOROB line, data dependency tags, and load/store type LSTYPE(1:0):

| | |
|---|---|
| 00: | No load/store |
| 01: | Load operation |
| 10: | Store operation |
| 11: | Both Load and Store operations |

If the instruction has a memory reference, then the load/store type should be set, with one exception. The exception is that the linear address can be calculated and the linear address is HIT in the stack cache. The linear address and/or data will be sent to the load/store buffer from the functional units or reservation station at later time. The load/store buffer makes reservations for the dispatched instructions. The store operation should get a slot in the load/store buffer and the load instruction increases a counter to keep track of the number of load in the executing stage. A 3-bit count is sent to the decode units to indicate the number of empty entries in the load/store buffer. The decode units will dispatch a line of instructions only if the number of load/store instructions in the line is less than or equal to the empty entries in the load/store buffer.

TABLE 23

Signal list.

| | |
|---|---|
| ICxSTART | ICLK7 Input from Icache to Idecode indicates the start-byte for the lines of instructions being fetched. |
| ICxEND(3:0) | ICLK7 Input from Icache to Idecode indicates the end-byte for the lines of instructions being fetched. |
| ICxFUNC(3:0) | ICLK7 Input from Icache to Idecode indicates the functional-bit for the lines of instructions being fetched. |
| LSCNT(2:0) | Input from LSSEC indicates the number of empty entries in the load/store buffer. |
| RSFULL | Input from functional units indicates that the reservation stations are full. This signal is the OR of the 6 functional units |
| ROBFULL | Input from LOROB indicates the LOROB is full. |
| BRNTKN(5:0) | Input from branch decoding indicates which decode unit has a taken branch. |
| REFRESH4 | Output indicates the operand data buses will be refreshed and not accept new dispatch data in the fourth ICLK. |
| REFRESH3 | Output indicates that the operand pointer to the register file, stack cache, and the LOROB will be refreshed and not accept new operand. |
| REFRESH2 | Output indicates current line of instructions will be refreshed and not accept new instructions from Icache. |
| IDPREF(5:0) | Output from 2-cycle prefix decode to decode units indicates the prefix values. bit 5 - data size, bit 4 - address size, bit 3 - lock, bit 2:0 - segment registers. |

Timing

The addition of the displacement and the contents of the EBP register for linear address calculations may be accomplished when the instruction arrives at the decode unit. This calculation is accomplished in half a cycle during the second ICLK. A 32-bit add without carry-in takes less than 2.4 ns. The speculative linear address should be available in early third ICLK.

ICLK2: Calculate the displacement linear address. Decode for linear address. Decode for all registers and flags accessed. Calculate the target address for the unconditional branches.

ICLK3: Decode instruction opcode for functional units. Decode for the order of the operands to dispatch to functional units.

ICLK4: Dispatch instructions and operand data to the functional units.

Timing for 2-cycle fast path instructions:

ICLK2: Detect 2-cycle fast-path instructions. Send prefixes to decoding.

ICLK3: Shift the instructions using the functional bits, and feed back to the same decode unit by mid cycle. Controls from prefixes decoding to decode unit.

The MROM interface requires a different timing:

ICLK2: Detect MROM instruction and send the byte position to MROM interface.

ICLK3: Decode prefixes and generate MROM entry point.

ICLK4: Decode instruction.

ICLK5: Decode instruction and latch all field of instructions into global registers.

ICLK6: MROM reads global registers and sends micro-instruction to decode units by mid cycle.

Layout

Figure 35:
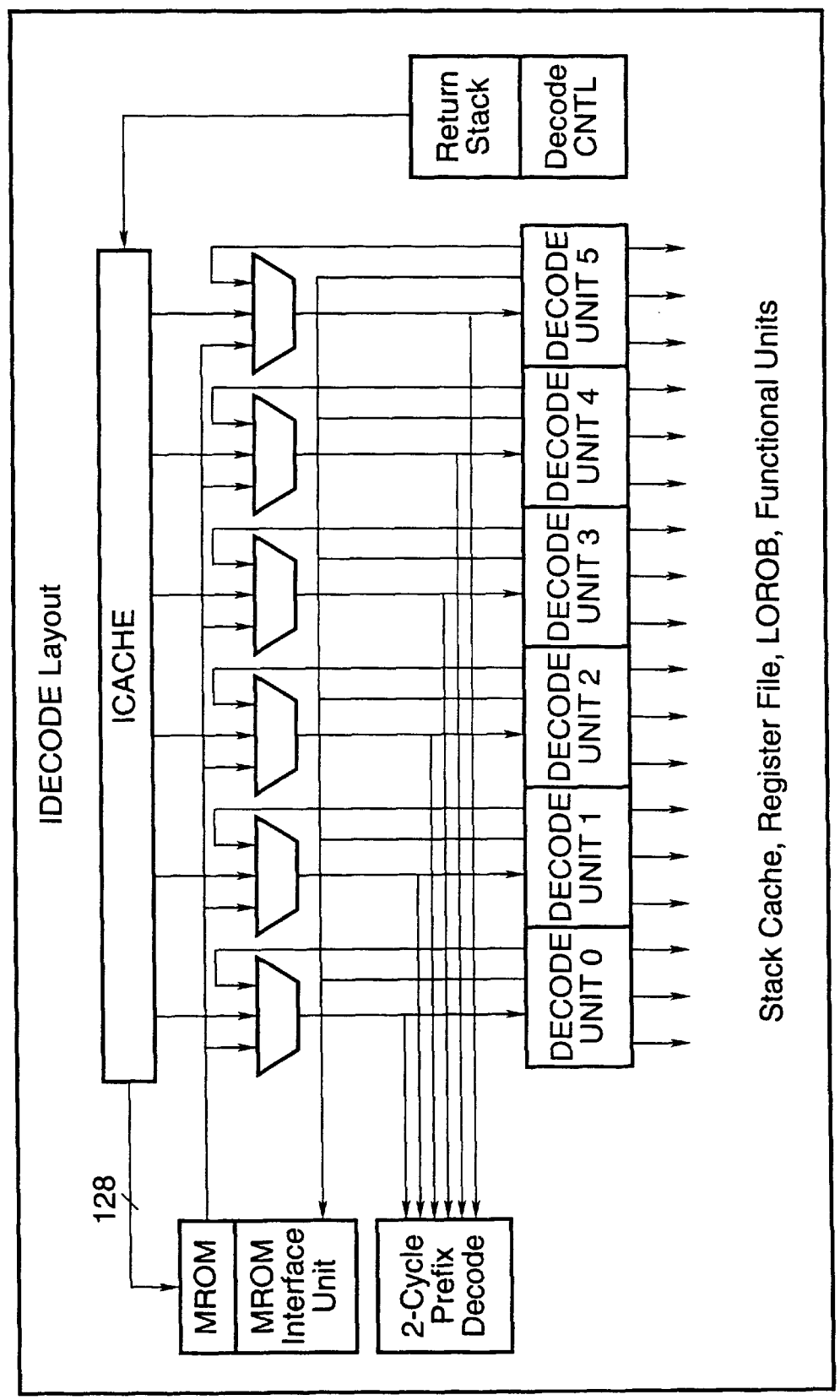

FIG. 35 is a block diagram of the layout of the processor 500 instruction decode unit. The Idecode includes six decode units. Decode units 0 and 6 are modified to accomodate the wrapping of instructions from one cache line to the next. The global blocks are: MROM interface unit, the prefix decoding and control for 2-cycle fast-path instructions, the return stack and controls for branch instructions, and global decoding controls. The MROM interface unit includes global registers accessible by MROM instructions.

DESCRIPTION OF LINE-ORIENTED RE-ORDER BUFFER

This section describes the line-oriented re-order buffer (LOROB), including methods to reduce the dependency checking time. The processor 500 LOROB includes a data array, status and control arrays with associated control logic, and special registers. In most cases, the number of dispatched instructions is always 6 (some of the instructions may be NOOP), and the number of retired instructions is always 6. There are a few exceptions which allow partial lines to be retired. There are 12 read buses and 6 retire buses to support each line of instructions. There are 8 result buses: 6 result buses are for results from 6 functional units, and 2 results buses are for load instructions to return data to the LOROB. In one implementation, the buses are 32-bits wide. The LOROB supports a massive number of comparators to dispatch 6 instructions per LOROB line. With the stack cache, the indirect addresses for load/store create other dependencies which must be checked in the LOROB.

The LOROB is accessed by a fixed number of instructions instead of individual instructions. Each LOROB line has 6 entry positions for the results of instructions, some of which may be NOOPs. The line-oriented ROB has the advantage of a single input to the LOROB. The logic to allocate and retire multiple entry positions at the same time is simpler than allocating and retiring entry positions for single instructions. Since the clock cycle time is 4.5 ns, a method must be implemented to do the dependency checking in one clock cycle and drive the data in the next cycle. The LOROB consists of 5 lines of instructions, where each line has 6 instructions. The LOROB will have one clock cycle to compare the read address to the previous destination entries. The LOROB employs status bits to indicate the most up-to-date destination to reduce the dependency checking time. The dependency checking for the current dispatched line of instructions (read pointer against destination pointers of previous instruction in the same line) is performed in the stack relative cache. The stack relative cache must ensure that the referred data, both read and destination, are presented. The stack relative cache must read from the data cache and allocate an entry if there is a miss. Since the stack relative cache must have both the destination and read addresses, it can check for dependencies within the current line. The LOROB needs to check for dependencies of the read operands against the previous 4 lines. Since the X86 instructions allow a maximum of two operands, with only one memory address operand, the decode units send a 32-bit linear address or a 6-bit register address as the first operand and a 6-bit register address as the second operand. There are two tags along with the operands to indicate the type of operands; linear address/register address, destination, and read. The operand addresses are needed for the dependency checking. With this arrangement, a 32-bit comparator and a 6-bit comparator are needed for dependency checking of each dispatched instruction. The instruction's order of the operands will be decoded and sent from the decode units a cycle later. The LOROB, stack cache, and register file will send the operands to the functional units in the correct instruction's order.

Processor 500 uses fixed issue positions for the decode units and the functional units, and the LOROB, the stack cache, and the register file conform to this arrangement. Each issue position has its own operand buses and result buses. The read buses come from all issue positions.

Figure 36:
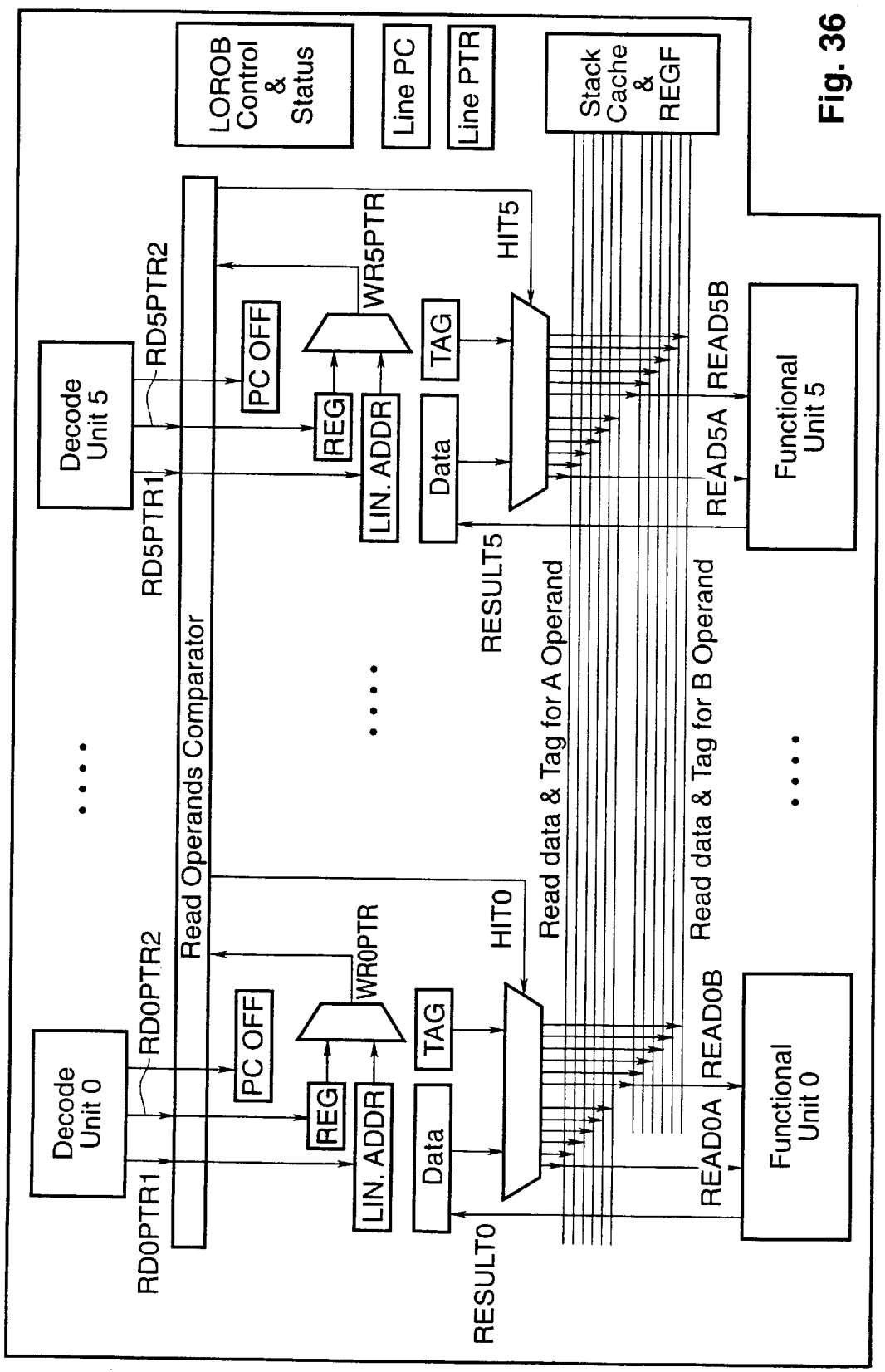

FIG. 36 is a block diagram showing how the LOROB interfaces with other processor 500 units. The proposed arrangement of the LOROB is to have the address and data registers, the comparator, and the control status bits for the comparator in the data path between the decode units and the functional units. Other status bits and control logic are on the left side of the data path as shown in the below figure referenced below.

The LOROB is organized as five lines of six instructions each. The pointer to the entries has two parts, 3-bit line pointer and 3-bit instruction pointer. The line pointer increases after every dispatch; the whole line must be dispatched or retired at one time. The 3-bit line pointer is incremented and wraps around at the count of 4. Since the processor 500 LOROB allocates or retires one line of instructions at a time and the number of dependency checking comparators is large, the LOROB may be implemented by shifting the lines. In this case, the dependency checking comparators are always at lines 0–3. No dependency checking is needed in line 4. The retire line is always line 0. As a line of instructions is retired from line 0, lines 1–4 will shift up one line. The LOROB is implemented as a FIFO (First-In-First-Out). To track the LOROB line number for the instructions in the reservation stations, functional units, and load/store section, a line pointer is assigned to each line as the line is dispatched from decode units. The line pointer is used by reservation stations for result forwarding, and by the functional units and the load/store section to return result data to the LOROB. The LOROB uses the line pointer to latch the result data. The line pointer is latched with each line in the LOROB and circularly shifted as the line is retired from the LOROB.

Figure 37:
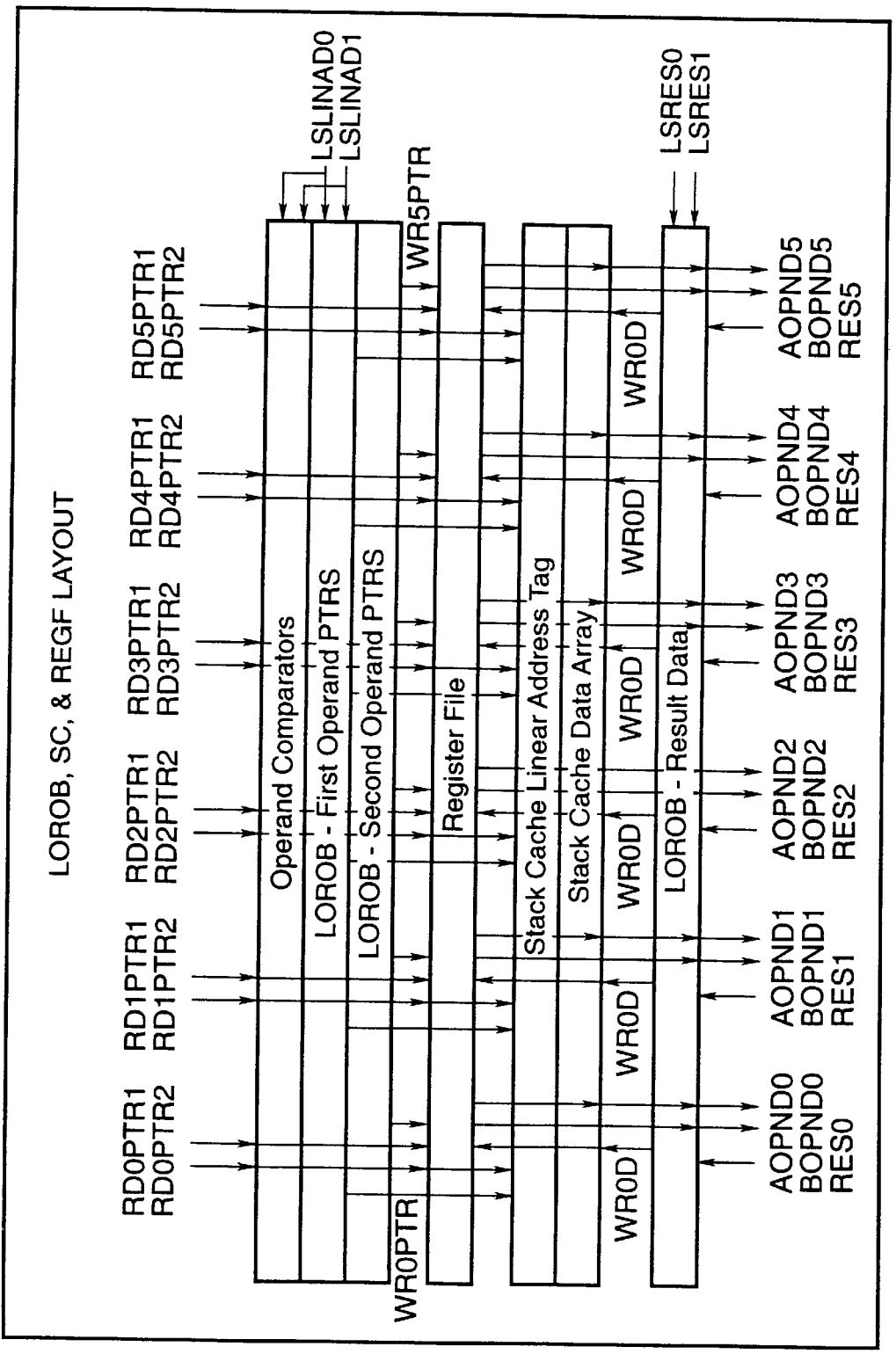

As shown in FIG. 36, the result data of the LOROB, the stack cache, and the register file must drive the source data on 12 horizontal buses. Each functional unit receives two read buses from these horizontal buses. The layout of the result data of the LOROB, the stack cache, and the register file should be in the neighborhood to access the horizontal buses directly. A suggested layout organization is shown in FIG. 37.

TABLE 24

| Signal list. | |
|---|---|
| IRESET | Global signal used to reset all decode units. Clears all states. |
| NMI_P | Input from BIU indicates non-maskable interrupt, the LOROB generates a clean instruction boundary trap to a fixed entry point. The LOROB is sensitive only to the rising edge of this signal |
| INTR_P | Input from BIU indicates the external interrupt. This signal is qualified with the IF bit of the |

TABLE 24-continued

Signal list.

| | |
|---|---|
| | EFLAGS register. The interrupt occurs at appropriate instruction boundaries. |
| SRBHALT | Input from SRB to enter HALT mode. The LOROB stops retiring instructions until RESET, NMI, or external interrupt occurs. The LOROB must retire the HALT instruction before shutting down. |
| CR0NE | Input from SRB indicates the NE bit of the CR0 register. The NE bit indicates the floating point exception can be trapped directly (NE=1) or via XFERR_P and an external interrupt (NE=0). |
| XIGNNE_P | Input from BIU indicates the copy of pin IGNNE. When CR0NE = 0, this signal is inspected to response to enabled floating point exceptions. |
| XFLUSH_P | Input from BIU indicates an external flush request occurs. It is falling edge sensitive and trap on instruction boundary. It is sample during IRESET to enter tri-state test mode, the LOROB should not generate exception. |
| IINIT | Input from BIU indicates an initialization request. It is rising edge sensitive and trap on instruction boundary. It is sample during IRESET to enter BIST test mode, the LOROB generates on of the two reset entry point. |
| MVTOSRIAD | Input from SRB, indicates a move to IAD special register, LOROB needs to check its pointer against the pointer driven on IAD. |
| MVFRSRIAD | Input from SRB, indicates a move from IAD special register, LOROB needs to check its pointer against the pointer driven on IAD. |
| MVTOARIAD | Input from SRB, indicates a move to IAD special register array, LOROB needs to check its pointer against the pointer driven on IAD. |
| MVFRARIAD | Input from SRB, indicates a move from IAD special register array, LOROB needs to check its pointer against the pointer driven on IAD. |
| MROMDEC(5:0) | Input from MROM indicates the microcodes are being decoded by the decode units. Use to set the ROBEXIT bit. |
| RESx(31:0) | Input from FU indicates result data. |
| DTAGx(2:0) | Input from FU indicates LOROB line number of the result. |
| DSTATx(3:0) | Input from FU indicates the status of the result data:<br>0000 - no result<br>0000 - valid result<br>0000 - valid result, shift by zero<br>0000 - exception with vector<br>0000 - software interrupt with vector<br>0000 - TLB miss with vector<br>0000 - load/store breakpoint<br>0000 - exchange result<br>0000 - exchange with underflow<br>0000 - exchange abort<br>0000 - branch taken, mis-prediction<br>0000 - branch not taken, mis-prediction<br>0000 - reserved for FPU<br>0000 - reserved for FPU<br>0000 - reserved for FPU<br>0000 - reserved for FPU |
| RFLAGx(31:0) | Input from FU indicates result flags. |
| LSTAG0(5:0) | Input from LSSEC indicates LOROB line number of the first access. |
| LSTAG1(5:0) | Input from LSSEC indicates LOROB line number of the second access. |
| LSRES0(31:0) | Input from LSSEC indicates result data of the first access. |
| LSRES1(31:0) | Input from LSSEC indicates result data of the second access. |
| LSLINAD0(31:0) | Input from LSSEC indicates the linear address of the first access. |
| LSLINAD1(31:0) | Input from LSSEC indicates the linear address of the second access. |
| SCHIT0 | Input from data cache indicates the linear address of the first access is in the stack cache. |
| SCHIT1 | Input from data cache indicates the linear address of the second access is in the stack cache. |
| SCWAY0 | Input from data cache indicates the way of the linear address of the first access in the stack cache. |
| SCWAY1 | Input from data cache indicates the way of the linear address of the second access in the stack cache. |
| IDPC(31:0) | Input from Idecode indicates the current line PC. |
| ICPOSx(3:0) | ICLK7 Input from Icache to decode units indicates the PC's byte position of the instruction. |
| IDxDAT(1:0) | Input from Idecode indicates the data size information. 01-byte, 10-half word, 11-word, 00-not use. |
| IDxADDR | Input from Idecode indicates the address size information. 1-32 bit, 0-16 bit. |
| DxUSEFL(2:0) DxWRFL(2:0) | Input from Idecode indicates the type of flag uses/writes for this instruction of decode units:<br>xx1 CF-carry flag,<br>x1x OF-overflow flag,<br>1xx SF-sign, ZF-zero, PF-parity, and AF-auxiliary carry |
| DxUSE1(2:0) | Input from Idecode indicates the type of operand being sent on operand 1 for decode units:<br>0xx register address.<br>1xx linear address.<br>x01 A source operand, no destination<br>x11 A source operand, also destination<br>x10 B source operand (always no destination)<br>x00 not use this operand |
| DxUSE2(1:0) | Input from Idecode indicates the type of operand being sent on operand 2 (operand 2 is always register address) for decode units:<br>01 first operand, no destination<br>11 first operand, with destination<br>10 second operand (always no destination)<br>00 not use operand 2 |
| INSDISP(5:0) | Input from Idecode indicates that the instruction in decode unit is valid, if invalid, NOOP is passed to LOROB. |
| RDxPTR1(31:0) | Input from Idecode indicates the linear addresses or register address for operand 1 of the instructions. |
| RDxPTR2(5:0) | Input from Idecode indicates the register address for operand 2 of the instructions. |
| INSLSxB(5:0) | Input from decode units indicates the prefix values. bit 5 - data size, bit 4 - address size, bit 3 - lock, bit 2:0 - segment registers. |
| IDSIB(5:0) | Input from Idecode indicates which decode unit has the SIB-byte instruction. |
| IDECJAMIC | Output indicates that an interrupt or trap is being taken. Effect on Icache is to clear all pre-fetch or access in progress, and set all state machines to Idle/Reset. |
| EXCEPTION | Global output indicates that an interrupt or trap is being taken including resynchronization. Effect on Idecode and Fus is to clear all instructions in progress. |
| REQTRAP | Global output, one cycle after EXCEPTION, indicates that the trap is initiated with new entry point or new PC is driven. |
| SYNC | Output indicates whether the new entry point or new PC is driven. |
| EXCHGSYNC | Output indicates exchange instruction resynchronization to Icache. This occurs when an exchange with a masked underflow is retired. It is a special resynchronize exchange with alternate entry point. |
| XFERR_P | Output to BIU indicates the floating point error which is inverted of the ES bit from the slave of the floating point status register. It is also used by the LOROB to generate the plunger traps. |
| EFLAGSAC | |
| EFLAGSVM | |
| EFLAGSRF | |
| EFIOPL(13:12) | |
| EFLAGSOF | |
| EFLAGSDF | |
| EFLAGSAF | |

TABLE 24-continued

Signal list.

| | |
|---|---|
| EFLAGSCF | Output generates from the EFLAGS register, these bits are visible from the slave copy of the EFLAGS register. The RF bit is also used in the LOROB to handle instruction breakpoint. |
| BRNMISP | Input from the Branch execution of the FU indicates that a branch mis-prediction. The Idecode clears all instructions in progress. |
| UPDFPC | Output to Icache indicate that a new Fetch PC has been detected. This signal accompanies the FPC for the Icache to begin access the cache arrays. |
| TARGET(31:0) | Output to Icache as the new PC for branch correction path. |
| BRNMISP | Input to Icache indicates that a branch mis-prediction. The Icache changes its state machine to access a new PC and clears all pending instructions. |
| BRNTAKEN | Output to Icache indicates the status of the mis-prediction. This signal must be gated with UPDFPC. |
| BRNFIRST | Output to Icache indicates the first or second target in the ICNXTBLK for updating the branch prediction. |
| BRNCOL(3:0) | Output to Icache indicates the instruction byte for updating the branch prediction in the ICNXTBLK. |
| FPCTYP | Input to Icache indicates the type of address that is being passed to the Icache. |
| BPC(11:0) | Output indicates the PC index and byte-pointer of the branch instruction which has been mis-predicted for updating the ICNXTBLK. |
| ROBEMPTY | Output indicates the LOROB is empty. |
| ROBFULL | Output indicates the LOROB is full. |
| LINEPTR(2:0) | Output indicates the current line pointer in the LOROB for the dispatch line of instructions. |
| WBLPTR(2:0) | Output indicates the write-back line pointer in the LOROB for the retiring line of instructions. |
| WBxWAY | Output indicates the way to write-back data to stack cache for retiring instructions. |
| WBxNC | Output indicates the invalid write-back data to the register file and stack cache for retiring instructions. |
| WBxPTR(5:0) | Output indicates the write-back pointer to the register file and stack cache for retiring instructions. |
| WBxD(31:0) | Output indicates the write-back data to the register file and stack cache for retiring instructions. |
| WBxBYTE(3:0) | Output indicates the write-back selected bytes to the register file and stack cache for retiring instructions. |
| RBxDAT1(31:0) | Output indicates the first source operand data for dispatching instructions. |
| RBxDAT2(31:0) | Output indicates the second source operand data for dispatching instructions. |
| FLGxDAT1(5:0) | Output indicates the status flags for dispatching instructions. |
| RBxTAG1(5:0) | Output indicates the first dependency tag for dispatching instructions. |
| RBxTAG2(5:0) | Output indicates the second dependency tag for dispatching instructions. |
| FCFxTAG(5:0) | Output indicates the CF flag dependency tag for dispatching instructions. |
| FOFxTAG(5:0) | Output indicates the CF flag dependency tag for dispatching instructions. |
| FXFxTAG(5:0) | Output indicates the CF flag dependency tag for dispatching instructions. |
| PUSHPOP(2:1) | Output to register file indicates the pop bits of the floating point status register to clear the full bits of the register being popped. FPTOP(2:0) contains the current top-of-stack when these bits are asserted. |
| FPTOP(2:0) | Output to register file indicates the current top-of-stack to identify the registers being popped to clear the full bits. |
| WBEXCHG | Output to register file indicates the exchange instruction being retired. It causes the permanent remapping register to be updated from the write-back bus. |
| WRPTR(6:0) | Output to LSSEC indicates the bottom (oldest) entry in the LOROB without valid result. If this entry matches the store or load-miss entry in the LSSEC, the entry can access the data cache at this time. |
| CANENTRY | Output to LSSEC indicates the bottom entry in the LOROB without valid result is canceled. If this entry matches the store or load-miss entry in the LSSEC, the entry can return without access the data cache at this time. |
| WRPTR1(6:0) | Output to LSSEC indicates the next to bottom entry in the LOROB without valid result. If this entry matches the store or load-miss entry in the LSSEC, the entry can access the data cache. |
| CANENTRY | Output to LSSEC indicates the next to bottom entry in the LOROB without valid result is canceled. If this entry matches the store or load-miss entry in the LSSEC, the entry can return without access the data cache. |

Basic Operations

The LOROB must interface with the decode units and the stack cache for dispatching instructions, with the functional units and LSSEC for results, and with the stack cache and register file for retiring instructions. The LOROB must also update the special registers correctly with each retiring instruction.

Dispatch Interface

Every cycle, the LOROB must indicate the space status to the decode units via ROBFULL or ROBEMPTY. As long as the LOROB is not full the line of instructions can be dispatched. The empty status is used for serialized instructions. The dependency checking is performed for the operands and flags of the top four valid lines of the LOROB. The first operand can be either linear address or register address. The second operand is always register. The LOROB performs the dependency checking and validates the results with decode information and hit signals from the stack cache. The LOROB keeps both the operands of the X86 instructions for load/store dependency checking.

The LOROB must provide the dependency tags for the source operands and flags. The destination tags is by the line number. The fixed location of the instructions is simple for returning of the results. The LOROB implements a FIFO shifter to limit the dependency checking to the first four lines. The line number is shifted along with retiring line to keep track of the instructions in the functional units.

Result Bus Interface

The result buses are dedicated between the functional units and the destination buffers of the LOROB. The LOROB compares the line number for returning results. The exceptions are the floating point unit and LSSEC. The line number and the entry number must be compared in this case. The functional units must send the data and address to the LSSEC for data cache access. The LOROB must latch the store data since the data cache store can become stack cache access.

The result buses contain the status flags and results. Various status/control bits in the LOROB will be set and cleared for the benefit of the retire logic. The new function of the LOROB is the dependency checking for load/store which is discussed in a later section. The LOROB always broadcasts the top two entries which do not have valid results to the LSSEC. If the broadcasted entries match the store or load-miss instructions, the LSSEC can access the data cache and return the results.

Write-Back Interface

The write-back interface of the LOROB is to ensure the results of instructions are retired in program order. In addition to controlling write back to the register file and stack cache, the LOROB must update the EIP register and flag registers and control the order of the load-miss and store accesses. In normal operation, the LOROB retires an entire line of instructions at a time. All instructions in the line must have the valid results from the functional units or LSSEC. All entries with valid result destination will write back to the register file or stack cache. The LIL and NC status bits of the LOROB ensures that none of the write-back destination is the same. The destination address includes the selected bytes for writing back data. In the case where LIL and NC bits are set for destinations of different size, the LOROB masks the selected bytes before sending to the stack cache and register file. In some special cases, the LOROB must retire a partial line. The LIL and NC status bits must be checked and reset before retiring. The LIL and NC status bits are also used for the flags to simplify updating the flags registers.

Since the store instruction must access the data cache in the program order, all instructions before the store must be completed. For a store instruction which hits in the stack cache, the store instruction must be retired in the next cycle to keep the stack cache up-to-date. In this case a partial line is retired. The store's linear address is compared to all the previous destination and reset the LIL and NC bits before retiring the store instruction in the next cycle. The write-back data should be in the correct byte position with byte enable for the stack cache and register file. The shifting of the bytes is done in the LOROB since it has more time to make decision. The clock period is small for the stack cache and register file to shift and write the bytes.

A PC of the current retired instruction is updated very cycle. The PC offset is concatenated with line PC to get the current PC for retired instruction. A real register for the flags and program states are updated with the retired instruction. As the taken branch instruction is retiring, the PC should be updated with the branch target or next line instruction.

Updating the EIP Register

The EIP register is used to keep track of X86 instruction executions. Instructions can be aligned on any byte boundary, 32 bits of EIP are implemented. Every retiring instruction updates the EIP register, there is no concept of freezing. The MROM instructions should not update the EIP register, indicates by ROBEXIT, except for the last MROM instruction in the sequence. The EIP update falls into one of three categories:

1. Retire the entire line, no mis-prediction, EIP=Next line PC.
2. Retire the line with branch mis-prediction, EIP=branch target.
3. Retire the partial line, EIP=EIP: next entry PC offset.

Stack Cache Interface

The stack cache contains 256 bytes organized as 8 lines of 32 bytes and two-way associative. There are four indexes to the stack cache using bits 6:5 of the linear address. Bits 4:0 of the linear address is used to select the exact bytes for the operands. For first access during decoding, the stack cache must use 32-bit comparators for operand linear addresses. Since the stack cache uses 32-bits comparators, the LOROB can use only bits 6:0 for dependency checking. HITs in the LOROB are qualified with HITs in the stack cache. The LOROB uses bits 7:2 of the linear address for dependency checking, which is the same as the register file address. Four extra bits are used for byte select. During dispatching, the stack cache indicates the way which the linear address operand matches in the stack cache. Retiring of instructions should use only bits 6:0 and way-bit. Because of the potential of several matches and delay in, the dependency checking of the current line uses 32 bits. Bits 6:0 and the way-bit are sufficient for the LOROB to identify the entries in the stack cache.

Floating-Point Interface

The LOROB keeps the floating point instruction pointer, data pointer, floating point status and opcode registers for floating point interfacing. The data pointer is updated on every floating point load with the instruction pointer and opcode registers are updated on floating point exception. The data pointer is implemented in the load/store section. The floating point status register is implemented with working and backup copies to ensure correct operation of floating point store.

Trap and Interrupt Processing

For internal exceptions from the functional units, LSSEC, and SRB, the exception entry in the LOROB will be retired in order. As with branch mis-predictions, the pipe and fetching should stop on an exception indication. When all entries before the exception entry are completed and retired, the exception procedure is initiated. All entries in the LOROB, the functional units, and LSSEC will be purged. The exception routine will be fetched. The LOROB is responsible for generating the entry point into the MROM exception routine or new PC into the Icache. No state is updated when a trap is taken. The processor simply fetches from an appropriate entry point and allows the microcode to perform the necessary state modifications. It is up to the microcode to save the current EIP on the stack before the user's trap handler is called.

Other conditions which flush the LOROB result from load/store dependency checking. Re-fetching is done when DC_write-after-SC_read dependency is detected. The LSSEC performs speculative forwarding of store data to load data by partial-address comparison. The full 32-bit address comparison is done in the next cycle which can signal the LOROB to flush the incorrect load-forwarding. The details of exception handling will be discussed in a later section.

Dependency Checking & Dispatching

The LOROB is responsible for checking the source operands of the dispatched line of instructions for dependencies against the destination operands of the previous lines of instructions. The stack cache checks for dependencies within the dispatched line. Dependency checking comparators are needed for the first four lines in the LOROB. In the third clock of the pipeline, the source addresses are checked for dependencies against the previous destination addresses, the dependency tags are generated by the end of this cycle. Data from the LOROB is driven in the fourth clock to the reservation stations. Since the X86 instruction can only have two operands, the operand can be both destination and source, which is indicated by the operand's tag bits. The current destination addresses are checked for dependencies against the previous destination addresses with no extra cost in hardware. The write-after-write dependency information is used to set three new status bits for most up-to-date destination and the previously match destination. The three new status bits are referred to as Last-In-Line (LIL) bit for each line, Last-In-Buffer (LIB) bit for the whole LOROB, and No-Compare (NC) bit. The NC bits ensure that there is only a single HIT for any read operand. The NC bits is used to qualify the dependency checking comparator, and the LIL and the LIB are used to restore the most up-to-date status of the destination in case of cancellation by branch mis-prediction. The LIL limits the HIT to one per line of instructions for restoring the LIB bit.

In the LOROB of processor 500, there is only a single HIT signal which is used as a control signal to multiplex the tag and data directly. The NC and LIL bits are also used for retiring the line to the stack cache and register file. No two entries have the same destination pointer for the line of instructions. The same method can be applied to the status flags. The FNC and FLIL bits are used for the status flags. The status flags are in three groups, OF, {SF,ZF,AF,PF}, and CF.

Figure 38:
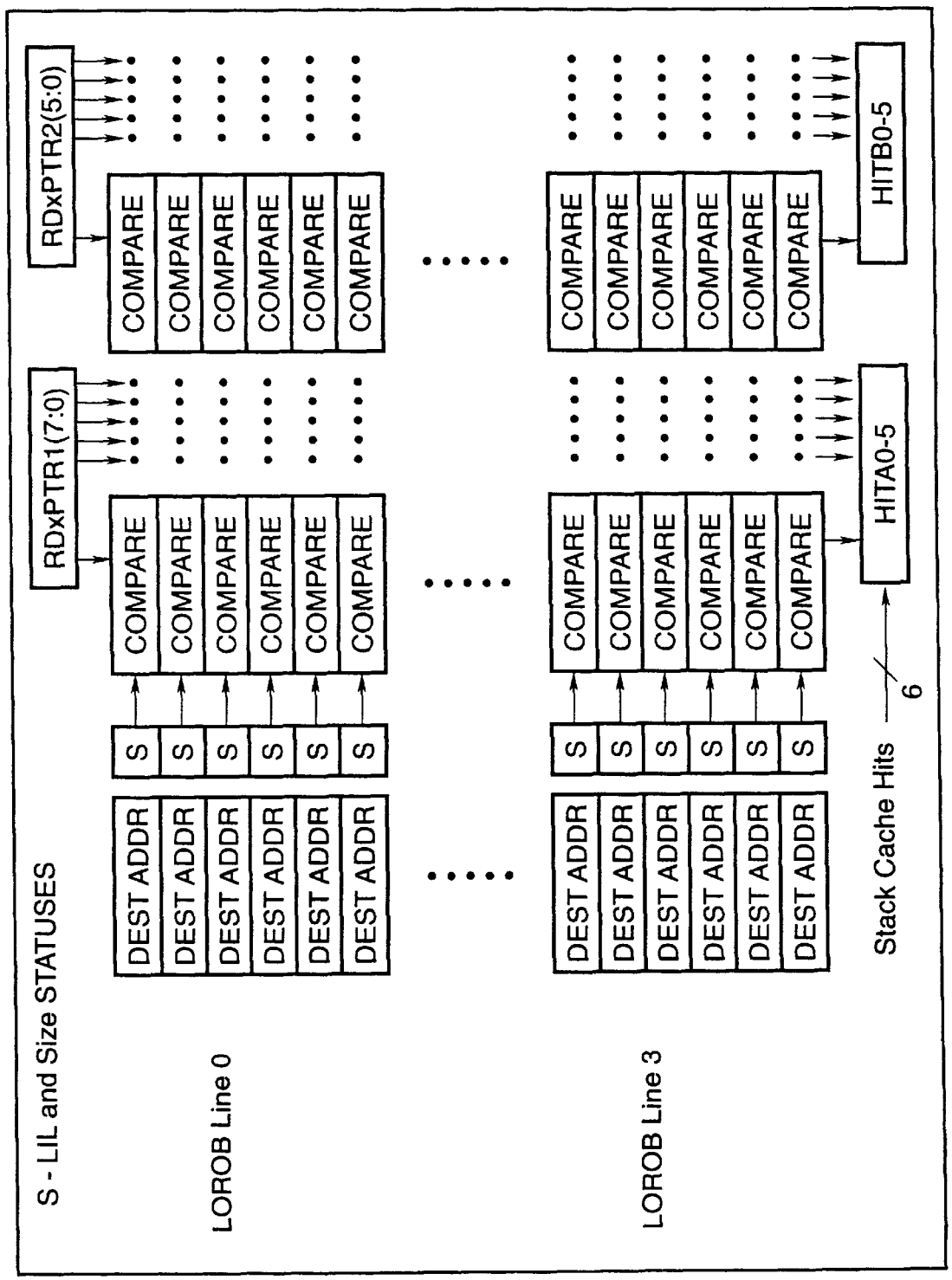

FIG. 38 is a block diagram of the matrix for dependency checking in the LOROB. The matrix compares 24 6-bit destination addresses to the 12 source operand addresses. Six of the source operand addresses may be linear addresses. A hit in the LOROB must be qualified by a hit in the stack cache. For a read operand, if there is a hit in the LOROB, the LOROB has the highest priority to drive the data on the operand bus to the functional unit. The stack relative cache has a higher priority to drive the dependency destination tag to the functional unit (from checking dependency of the current line). HIT signals must be communicated between the LOROB and stack relative cache for the above priorities. If there is a branch mis-prediction, all instructions after the mis-predicted branch with the LIL bit set must feed back to the RDOPTR to check and reset the previous entries with the NC bit set.

Operand Size Dependency

The size of the operands in dependency checking is quite complex for X86 instructions. In processor 500, due to the stack cache, the equivalent number of tags is four for every single byte of the word. To simplify the problem, processor 500 checks for dependencies from wide to narrow and stalls the dispatch line in decode for the narrow to wide dependency. Only one dependency tag is needed for each source operand.

TABLE 25

Signal list.

| | |
|---|---|
| TOPPTR(2:0) | Pointer to the top of the LOROB. This pointer is used to enable the number of lines in the LOROB for dependency checking. |
| ENINTR(5:0) | Input from Idecode indicates external interrupt enable for each instruction. This information is used for retiring instruction. |
| MROMDEC(5:0) | Input from MROM indicates the microcodes are being decoded by the decode units. Use to set the ROBEXIT bit. |
| INSDISP(5:0) | Input from Idecode indicates that the instruction in decode unit is valid, if invalid, NOOP is passed to LOROB. |
| INSLSxB(5:0) | Input from decode units indicates the prefix values. bit 5 - data size, bit 4 - address size, bit 3 - lock, bit 2:0 - segment registers. |
| IDSIB(5:0) | Input from Idecode indicates which decode unit has the SIB-byte instruction. |
| RBxTAG1(5:0) | Output indicates the first dependency tag for dispatching instructions. |
| RBxTAG2(5:0) | Output indicates the second dependency tag for dispatching instructions. |
| FCFxTAG(5:0) | Output indicates the CF flag dependency tag for dispatching instructions. |
| FOFxTAG(5:0) | Output indicates the CF flag dependency tag for dispatching instructions. |
| FXFxTAG(5:0) | Output indicates the CF flag dependency tag for dispatching instructions. |
| DSETALL(5:0) | |
| DSETEXIT(5:0) | |
| DSETINTR(5:0) | Input to set signals for dispatched instructions. The bits should be set in the cycle after the dependency checking. |

Handling of Loads/Stores

Handling of stores and load-misses can also be done with broadcasted entries. The LOROB broadcasts the next-in-line entry which will needs a result from a functional unit. With this LOROB entry, WRPTR(4:0), the LSSEC knows when to execute the store or load-miss instruction without any handshake from the LOROB. This implementation will eliminate signals between the LOROB and the load/store unit. An extra signal, CANENTRY, will accompany the WRPTR to indicate that this entry has been canceled by mis-prediction. The LSSEC and the reservation stations can use this information to return the results without any execution, any data dependency in the load/store buffer is ignored. The LOROB treats the load/store instructions the same as other ALU instructions with this method.

The LSSEC implements a store buffer to keep track of all the store instructions in the pipe for address dependency checking. The store buffer is capable of issuing 2 store instructions to the data cache if the store instructions are next-in-line for retiring. To accomplish this, the LOROB will broadcast another pointer, WRPTR1(4:0), and CANENTRY1 to the store buffer, if the first two entries in the store buffer match the WRPTR and WRPTR1, two stores can be execute concurrently as long as they accesses two different banks in the data cache. The WRPTR and WRPTR1 point to two entries in the LOROB which need results. The two entries are not necessary pointed to the store instructions.

All load and store instructions assumed single cycle access to the data cache. The results are speculatively latched into the data buffer. The validation of the load/store is from the HIT signal of the data cache in early next cycle. The result valid bits of the load/store is clear in the next cycle if a miss occurs in the data cache.

Load/Store Dependency Problem

Accesses to the stack cache and register file occur during decoding to simplify the operation of the X86 instructions. A linear address with EBP base can be calculated in the second ICLK while other register-base addressing modes must wait until execution. Some instructions use indirect addressing (the address is not know in decoding cycle) which can create load/store dependency problems during execution. For example:

| | |
|---|---|
| MV | EAX < addr1 |
| STORE | [EAX] < data1 |
| ADD | EBX > EBX+[addr1] |

Due to out-of-order execution, the ADD instruction may read the old data at addr1 from the stack cache. The STORE instruction will modify the data at addr1 during execution. For correct operation, the ADD instruction should be restarted. The above problem is preferred to as SC__read-after-DC__write dependency. Another problem is DC__read-after-SC__write dependency, the DC__read is an indirect addressing. This dependency is illustrated in the following example:

| | |
|---|---|
| MV | [addr1] < EAX |
| MV | EAX < addr1 |
| LOAD EBX | < [EAX] |

The most-up-to-date data for the LOAD instruction is from the first MV instruction which is in the LOROB. The LOROB must handle the above dependencies.

With the X86 instruction set, at most we can one operand with a 32-bit linear address and a 6-bit register operand. If the LOROB adds an extra 6-bit for storage and extra status bits for indication of the read/write status of the operands, the LOROB can check for load/store dependencies. The LOROB currently has 6 ports of comparators for linear address operand dependency checking as describe previously. Since two load/store instructions can be executed per clock cycle, two extra ports of comparators is needed to check for load/store dependencies. The two extra ports of comparators are for maximum performance.

The stack cache contains 256 bytes organized as eight lines of 32 bytes and two-way associative. There are four indexes to the stack cache using bits 6:5 of the linear address. Bits 4:0 of the linear address is used to select the exact bytes for the operands. The data cache keeps two bits to indicate that the block is in the stack cache and the way of the block in the stack cache. With these two bits, the data cache needs to generate the SC-HIT and SC-WAY signals as quick as possible (same as data cache way prediction.) The dependency checking of the load/store can be limit to seven least significant bits of the address with the way indication. As the LSSEC accesses the data cache, the stack cache bits (SC-HIT and SC-WAY) of the data cache are sent to the LOROB and the stack cache. The stack cache can use seven bits to access the array for two data which will be validated by SC-HIT and selected by SC-WAY to put on to the result bus. The load data can be validated in the next cycle by DC-HIT. Similarly, the LOROB can use seven-bit comparators, SC-HIT, and SC-WAY to find all the exact matches in the LOROB for dependencies. The comparators are actually six-bit, with byte indication.

If there is a DC__write, the DC__write must be executed in program order. When the DC__write accesses the data cache and the stack cache, the linear address is also latched into the 32-bit destination pointer and checked for dependency with all 32-bit linear address read operand in the LOROB. A match with any entry flushes the LOROB from that entry. The PC address of the matching entry is sent to the Icache to re-fetch the instructions.

For DC__read, when the DC__read accesses the data cache and the stack cache, the linear address is also latched into the 32-bit destination pointer and checked for dependencies with all previous 32-bit destination linear addresses in the LOROB. All matches in the LOROB will set status bits for the entries. The LOROB partially retires the line until all matched entries are retired. The DC__read can then be executed.

Data Dependency of Store

Figure 39:
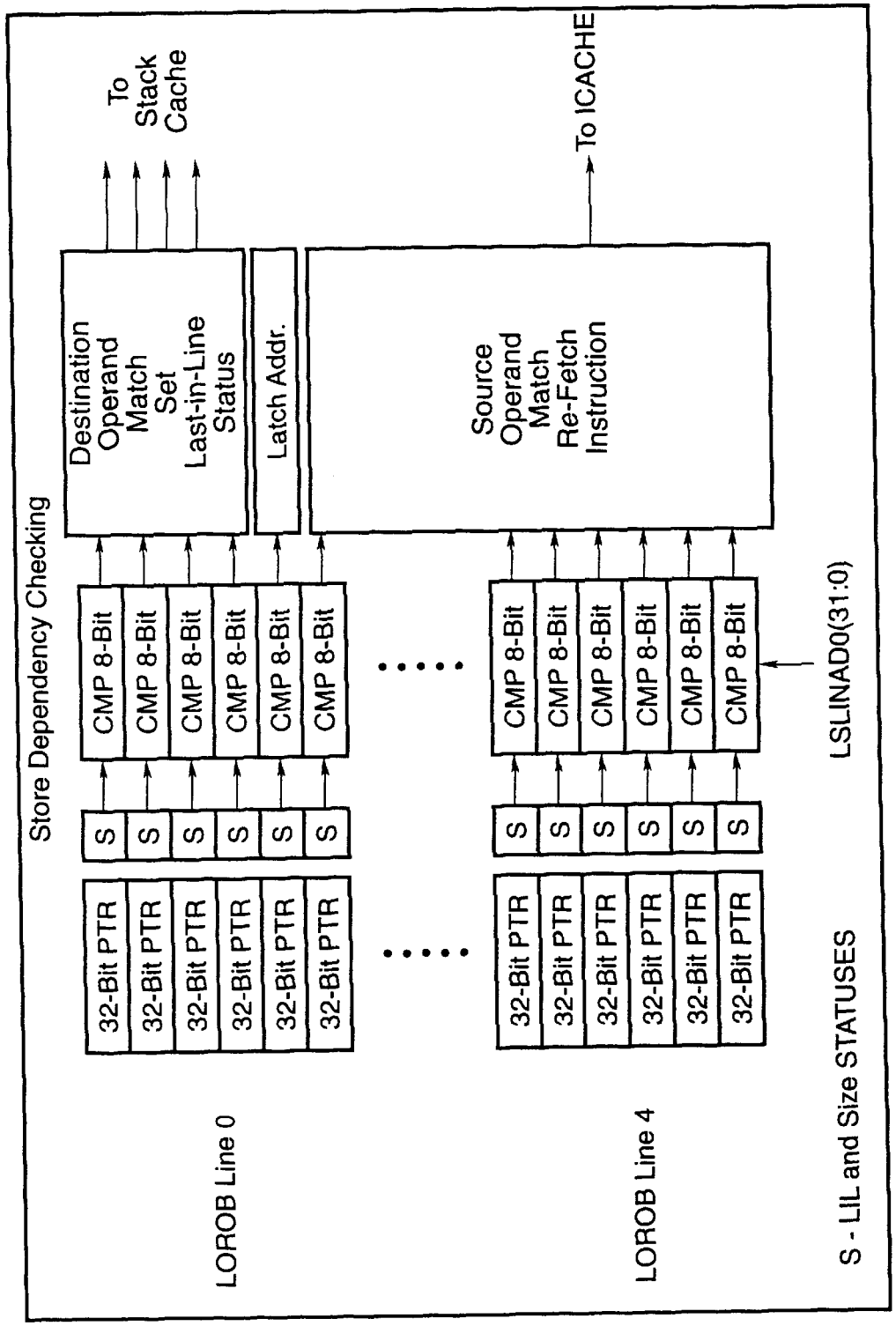

FIG. 39 is a block diagram showing the dependency checking required for store operations. For a store instruction which uses register indirect addressing, the linear address of the operand must be calculated in the functional unit. The actual store to data cache needs to check the stack relative cache with two bits of the address for the indexes of the two-way associative storage of the stack cache. Using the stack cache hit and way from the data cache, the stack cache can use the LOROB's line number which is sent by the LSSEC to set the write bit. The write bit is to ensure that the line in the stack cache remains until the entry is retired from the LOROB. If the cache line is also present in the stack cache, then the store instruction must return the linear address and data to the LOROB. The LOROB will retire the entry as an instruction with a write to the stack cache. This is to keep the data update correctly in the stack cache. The linear address must be compared to the previous destination in the same line to set the LIL bit; this comparator is 8-bit. The linear address must also compare to the followed source linear addresses for DC__write-after-SC__read dependency. The linear address must be compared to the current dispatching line (in the third ICLK) for any dependency. If there is a dependency, the dispatching line must wait for the store to be retired in the next cycle to read the data. The operation of the LOROB in handling the store is as follows:

As the data is passed from the functional unit to the store buffer on the result bus, the LOROB latches the data into the destination data.

As the LSSEC accesses the data cache and stach cache, the LOROB latches the address into the 32-bit destination pointer and compare to all linear addresses in the LOROB. For all prior destination pointers, the LOROB will reset the LIL bit to retire the line. For all followed source pointers, the LOROB will have to flush the all entries from the match point.

With indication of completion from the LSSEC, DC, and SC, the LOROB retires the partial line if a hit occurs in the SC.

Data Dependency of Load

Figure 40:
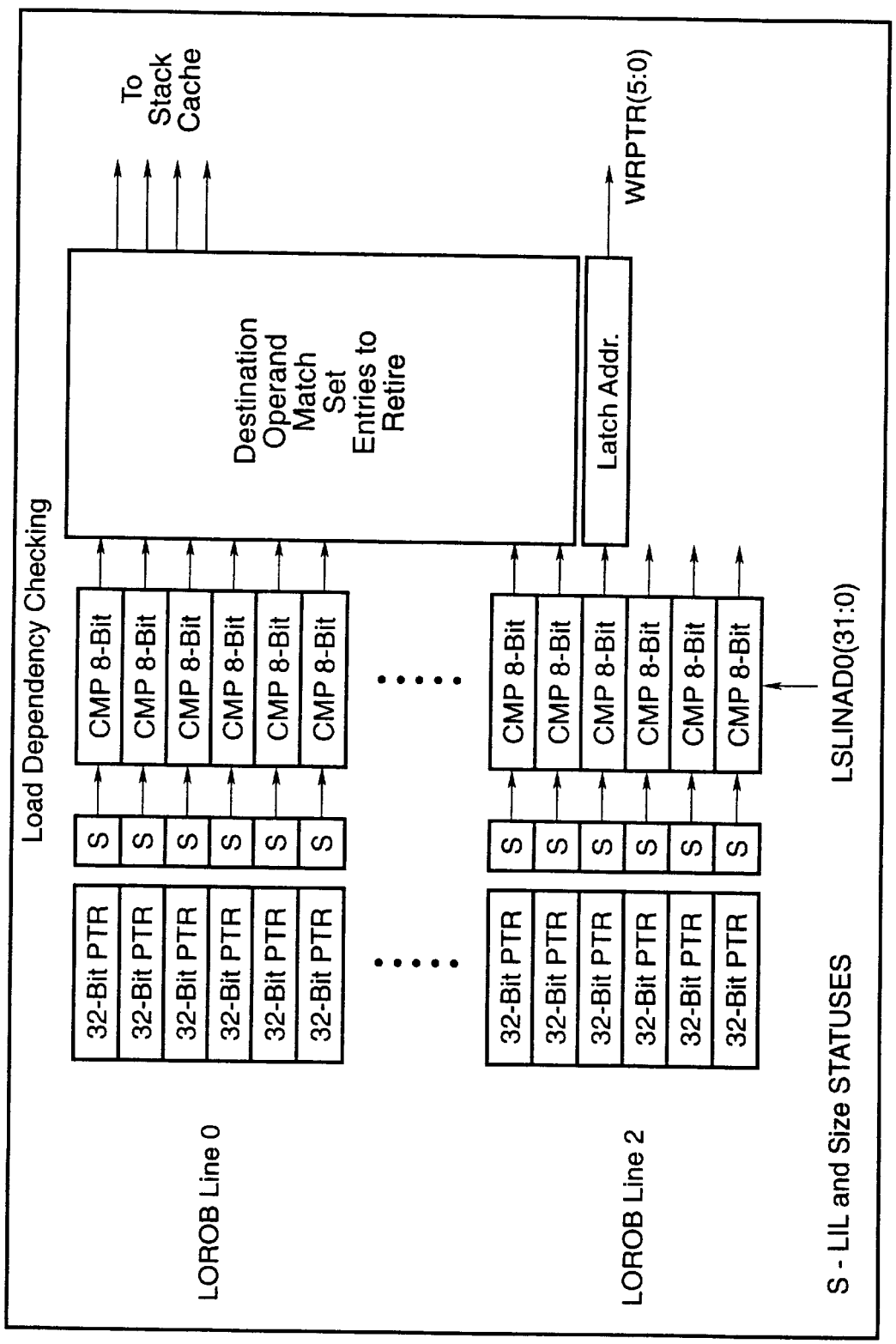

FIG. 40 is a block diagram showing the dependency checking required for load operations. For a load instruction which uses an indirect pointer, the linear address must be calculated by the functional unit. The actual load from the data cache must also check the stack relative cache. If the cache line is also in the stack cache with indication of a write dependency, then the load instruction must wait to be executed in the retired order. The load address also accesses the LOROB for comparison against the destination linear addresses. All matched entries in the LOROB up to the load instruction must be retired to the stack cache before the load instruction can be executed again. This is to keep the most-up-to-date data in the stack cache. A status bit is set for the last matched entry. When the last matched entry is retired, the LOROB will broadcast the load entry by WRPTR for the LSSEC to execute the load instruction. The SC will drive the data on the result bus. The operation of the LOROB in handling the load is as follows:

As the LSSEC accesses the DC and SC, the LOROB latches the address into the 32-bit destination pointer and compare to all prior destination linear addresses in the LOROB. If there is a match, the load instruction must wait for the matching entries to be retired to the stack cache.

The LOROB must partially retire the line until all entries with the load-match bits. The WRPTR signal indicates the load instruction can be executed.

Unaligned Accesses

Processor 500 is optimized for aligned 8/16/32 bits accesses. For aligned access, the operand comparison is for bit 31:2 with indication for checking of 8/16/32 bits. For unaligned operand access, because of the complexity in dependency checking and avoiding stalling of other instructions in the line, the stack cache kicked the instruction to the LSSEC. The LSSEC takes two clock cycles to execute the instruction. The operation of the LSSEC for unaligned load is as follows:

First cycle: Access the data cache (DC) and the stack cache (SC) to read data with the current address, other access can be concurrent. Increase the address by 4 for the second access.

Second cycle: Access the DC and SC to read data with the increased address, other access can be concurrent. Latch the data of the first access at the beginning of this cycle. The DC and SC puts the 8 or 16 bits at the least significant byte (same as any narrow access), and the LSSEC puts the first half data of the unaligned at the most significant byte of the result bus.

A miss in either part of the unaligned access must wait for the WRPTR or WRPTR1 of the LOROB to execute the instruction in program order. The load/store buffer must keep the status to access the data cache and send the results correctly on the buses.

Both halves of the unaligned store must be written into the cache at one time to avoid any intermediate exception. The operation of the LSSEC for unaligned store is as follows:

First cycle: Access the data cache (DC) and the stack cache (SC) with the current address, do not write data, other access can be concurrent. If miss in the data cache, the reload routine can start this cycle. Increase the address by 4 for the second access.

Second cycle: Access the DC and SC using two ports to write data with both addresses. The LOROB latches the first address and compare to all the previous destination linear addresses and all followed source linear addresses for dependency. If there is a SC-HIT for the first address, the LOROB must retire the line up-to this unaligned store in the next cycle. If there is a SC-HIT for the increased address, then the LSSEC needs a third cycle.

Third cycle: Send the increased address and data on the bus to the LOROB again, other access can be concurrent. The LOROB latches the increased address and compare to all the previous destination linear addresses and all followed source linear addresses for dependency. The LOROB must retire the line up-to this unaligned store in the next cycle. The unaligned store can be retired twice by the LOROB to the stack cache.

The advantages of the above procedures include:

The LSSEC always does two accesses and the unaligned access always takes two cycles. The LSSEC has a whole cycle to increment the address; no different for crossing the line boundary.

1. The LSSEC does all the merging for unaligned load with ease. The DC and SC does not need to know about the unaligned access.
2. The LOROB must retire the unaligned store in two cycles, the store cannot be written directly from the LSSEC to the SC. The two halves must be written to the SC in two clock cycles to check for dependency. The LOROB grabs the two addresses as the LSSEC accesses the DC and SC in two cycles.

Alias Address Accesses

Alias address access is when two linear addresses map to the same physical address. The data cache can only have one copy of the physical data with one of the linear address. If there is miss in the data cache, the L2 may notify the data cache that a line in the data cache should be remapped to the new linear address. This is the same procedure in the Icache. The problem is with the stack cache. If the stack cache bit in the data cache is set for the alias address, then the stack cache should also remapped to the new linear address. For the two-way associative stack cache, the remapped for the stack cache is simple by using bits 6:5 for indexes and the SC-WAY from the data cache. The stack cache writes the new tag. Because the 8 least significant bits of the physical address and the linear address are the same, then dependency checking of load/store in the LOROB is the same as non-aliasing address.

TABLE 26

| Signal list. | |
| --- | --- |
| LSTAG0(5:0) | Input from LSSEC indicates LOROB line number of the first access. |
| LSTAG1(5:0) | Input from LSSEC indicates LOROB line number of the second access. |
| LSRES0(31:0) | Input from LSSEC indicates result data of the first access. |
| LSRES1(31:0) | Input from LSSEC indicates result data of the second access. |

TABLE 26-continued

| Signal list. | |
| --- | --- |
| LSLINAD0(31:0) | Input from LSSEC indicates the linear address of the first access. |
| LSLINAD1(31:0) | Input from LSSEC indicates the linear address of the second access. |
| SCHIT0 | Input from data cache indicates the linear address of the first access is in the stack cache. |
| SCHIT1 | Input from data cache indicates the linear address of the second access is in the stack cache. |
| SCWAY0 | Input from data cache indicates the way of the linear address of the first access in the stack cache. |
| SCWAY1 | Input from data cache indicates the way of the linear address of the second access in the stack cache. |
| WRPTR(6:0) | Output to LSSEC indicates the bottom (oldest) entry in the LOROB without valid result. If this entry matches the store or load-miss entry in the LSSEC, the entry can access the data cache at this time. |
| CANENTRY | Output to LSSEC indicates the bottom entry in the LOROB without valid result is canceled. If this entry matches the store or load-miss entry in the LSSEC, the entry can return without access the data cache at this time. |
| WRPTR1(6:0) | Output to LSSEC indicates the next to bottom entry in the LOROB without valid result. If this entry matches the store or load-miss entry in the LSSEC, the entry can access the data cache. |
| CANENTRY | Output to LSSEC indicates the next to bottom entry in the LOROB without valid result is canceled. If this entry matches the store or load-miss entry in the LSSEC, the entry can return without access the data cache. |

Handling of Branches

Since branches can be executed in parallel in multiple functional units, branch mis-prediction must be handled in order. The mis-prediction of branches should be handled by the LOROB. There are two types of branches, the conditional branch and the unconditional branch. Unconditional branches are always taken and include call, return, and unconditional jump instructions. A mis-prediction occurs when the targets do not match. For a conditional branch, a mis-prediction results from a taken/not taken prediction and/or matching target address. Branch mis-prediction always stops the pipe, which maybe accomplished in the functional units. All instructions in decode are cleared, and a new target is fetched by the Icache at a later time. The functional units can send the mis-predicted signal to stop the pipe and return the correct PC address to the LOROB. The LOROB executes branch mis-predictions in order; all previous branches in the LOROB must be completed. Because the Icache needs an extra cycle to update the previously mis-predicted branch into the ICNXTBLK, the functional unit can use this extra cycle to send the correct PC address to the LOROB. When an entry in the LOROB is completed with mis-prediction status, all entries after the branch are marked with canceled status. The canceled entries can have bogus result data from the functional units or LSSEC. Because of the canceled entries, the LIL, LIB, and NC bits must be revisited for correct status.

Recover of Status Bits from Branch Mis-prediction

The status bits are no longer correct with branch mis-prediction. The LOROB takes one clock cycle to reset the status bits for each line of the LOROB after the branch mis-prediction. First, the line with the branch mis-prediction will be corrected. Within the line if there is any LIL bit is set after the branch mis-prediction, the destination is compared against the previous destinations before the branch misprediction. A match will set the LIL bit and clear the NC bit for that entry. If there is any LIB bit is set after the branch mis-prediction, the destination is compared against the LIL destinations of the previous lines. A match will set the LIB bit for the most current line. For each of the line after the branch mis-prediction line, if the LIB is set for any entry, the destination with the LIB is compared against the LIL destination of all previous lines. A match will set the LIB bit for the most current line. At most, the recover of the status bits takes 5 clock cycles for 5 lines in the LOROB. An optimization is to check if all the entries before the branch mis-prediction is completed; in this case, all status's in the LOROB can be cleared.

Updating PC

Each line of the LOROB has a line PC, and each entry has a PC offset. As the line is retired, current PC pointer will point to the next line PC. For partial retiring of the line, the line PC is updated with the offset of the present entry in the LOROB. For an MROM entry, the offset should be with the last MROM instruction, all other MROM instructions should have the same offset with the line PC. With this technique, handling of the PC is relatively simple. In the case of branch mis-prediction for sequential fetch, (the branch prediction is taken) the PC can be calculated by concatenating the line PC with the offset of the next instruction which should be a NOOP. If the mis-predicted branch is at the end of the line, the sequential PC is PC+16.

TABLE 26

| | Signal list. |
|---|---|
| BRNMISP | Input from the Branch execution of the FU indicates that a branch mis-prediction. The Idecode clears all instructions in progress. |
| UPDFPC | Output to Icache indicate that a new Fetch PC has been detected. This signal accompanies the FPC for the Icache to begin access the cache arrays. |
| TARGET(31:0) | Output to Icache as the new PC for branch correction path. |
| BRNMISP | Input to Icache indicates that a branch mis-prediction. The Icache changes its state machine to access a new PC and clears all pending instructions. |
| BRNTAKEN | Output to Icache indicates the status of the mis-prediction. This signal must be gated with UPDFPC. |
| BRNFIRST | Output to Icache indicates the first or second target in the ICNXTBLK for updating the branch prediction. |
| BRNCOL(3:0) | Output to Icache indicates the instruction byte for updating the branch prediction in the ICNXTBLK. |
| FPCTYP | Input to Icache indicates the type of address that is being passed to the Icache. |
| BPC(11:0) | Output indicates the PC index and byte-pointer of the branch instruction which has been mis-predicted for updating the ICNXTBLK. |

Handling Traps and Interrupts

A primary functions of the LOROB is to detect and prioritize the traps and interrupts and to initiate specific redirection's at appropriate times. The LSSEC and functional units should send the highest exception to the LOROB. The basic mechanism for redirection is:

1. Assert EXCEPTION to clear out instructions in the pipe.
2. One cycle later, assert REQTRAP and drive new entry point to the MROM.
3. Correct look-ahead registers at decode and in the branch units.

The LOROB initiates the microcode routine from the MROM by REQTRAP and does not wait for LSSEC to be idle. There are three groups of traps and interrupts:

1. Exception results from functional units, FPU, and LSSEC.
2. External interrupts (maskable and non-maskable).
3. Single step traps.

The LOROB includes a set of entry point vectors which can be sent to MROM on REQTRAP indication.

Internal Traps and Interrupts

The internal exception results are coded into 3 bits of ROBEXC:

000—no exception

001—load/store breakpoint

This is set when any load or store breakpoint status is returned. The instruction is retired normally. The debug entry point is generated and the B bits of the debug status register are set according to the 2-bit debug register hit code reported with the result. The redirection starts when the whole instruction is completed; the ROBEXIT bit is set. Another trap or interrupt can have higher priority while the load/store breakpoint is waiting for the rest of the instruction to complete. The floating point exception cause the LOROB to update all the floating point exception registers but the debug trap has higher priority.

010—software interrupt with vector

This is set when a software interrupt status is returned. This exception includes the INTO instruction. When the instruction is retired, the PC is updated and the exception with vector is taken.

011—floating point exception with write-back/push/pop

This is set when the corresponding status is returned. The instruction retires normally with the floating point opcode and instruction pointer registers are updated. The LOROB does one of the four actions:
1. if a pending breakpoint exits, take a breakpoint trap.
2. if NE=1, take a floating point trap directly.
3. if NE=0 and IGNNE=0, freeze and wait for an external interrupt.
4. if NE=0 and IGNNE=1, resync to the next instruction.

100—exception with vector

This is set when an exception result is returned with a vector (including a TLB miss). When the instruction is retired, no write-back nor PC update, the redirection with the entry point is initiated. This is used for majority of traps, the entry point is provided with the results.

101—exchange abort

This is set when an exchange abort status is returned. The retire procedure is the same as exception with vector except that the PC is driven back instead of the MROM entry point. The signal SYNC and EXCHGSYNC are asserted along with REQTRAP to notify the Icache.

110—not used

111—floating point exception without write-back/push/pop

This is set when the corresponding status or an exchange result with undeflow is returned. The retire procedure is the same as the above floating point exception without write-back or push/pop.

External Interrupts

The external interrupts include both maskable and non-maskable. The non-maskable interrupt (NMI) is a normal, precise, external interrupt. The NMI should only be seen by the LOROB. The external interrupt is only recognized during selected windows:

Partially retired all valid instructions in the bottom line with ROBEXIT status and did not cause a trap or resynchronization.

Frozen due to having retired a floating point exception with NE=0 and IGNNE=0.

On all external interrupts, the entry point is generated locally by the LOROB at the time the redirection is initiated. If the maskable interrupt is level sensitive while the NMI is edge sensitive. FLUSH and INIT are also treated as edge sensitive asynchronous interrupts, similar to NMI. The NMI is taken, it cannot be taken again before an IRET is executed. The microcode maintains a series of global flags that are inspected and modified by many of the trap handler entry points, and the IRET instruction. It is also the responsibility of the microcode to detect the NMI and delay the NMI until after executing of the IRET, the MROM allows only one level of NMI. Many other aspects of nested trap control (double fault, shutdown, etc.) will be handled with this microcode mechanism. There is no hardware support for any of this. When an enabled trap condition arises, the LOROB takes it at the next available window.

The HALT instruction causes the LOROB to update the EIP before entering shutdown mode. If the shutdown is entered as a result of a failed NMI, microcode should also clear the IF bit before halting.

Single Step Traps

The single step traps are similar to the trace traps. When the TF bit of the EFLAGS register is set, a debug trap is taken at the successful completion of every instructions, not including the instruction that actually caused TF to be set (i.e. the POP or IRET). The LOROB takes a single step trap on the successful retire of the second instruction after the setting of the TF bit. When the TF bit is clear the effect is immediate. When a single step trap is taken, the entry point is generated locally by the LOROB, and the BS bit of the debug status register is set. The TF bit of the EFLAGS register is not cleared by hardware; it is cleared by microcode after pushing EFLAGS onto the stack.

Debug Interface

A summary of each type of debug trap is presented in this section. Load and store breakpoints are detected by the LSSEC and returned as a status to the LOROB with a two-bit code identifying the breakpoint register that got the match. When the instruction is retired the LOROB initiates a debug trap and sets the corresponding B bit in the debug status register. The entry point for this trap is generated locally. The instructions with load/store breakpoint trap is considered to have completed successfully.

Instruction breakpoints are not handled by the LOROB. The pre-decode disables the Icache and sends a special serializing instruction to each new instruction, whenever any of the debug registers are enabled for code breakpoints. The special instruction is serially dispatched to the LSSEC where it compares the pre-decode PC to the breakpoint registers, accounting for the state of the RF bit. If a breakpoint is detected, a normal exception status is returned to the LOROB and a trap is taken. The provided entry point depends upon which breakpoint register got the hit and the setting of the appropriate B bit is the responsibility of the microcode. The LOROB is unaware of the nature of the trap being taken. The RF bit is cleared automatically by the LOROB, on the successful retire of the second instruction follow its low to high transition.

Single step debug traps are handled in hardware by the LOROB as was described in previous section. The setting of the BS bit is done automatically by the LOROB but the handling of the TF bit is the responsibility of the microcode.

The global detect debug trap is handled by the SRB, by inspecting the state of the GD bit in the debug control register whenever a move to or from any debug register is attempted. If it is set, no move is performed an a trap status is returned. The setting of the BD bit when the trap is taken is performed by microcode; the LOROB is unaware of the nature of the trap being taken.

The task-switch debug trap is handled by microcode, including the setting of the BT bit in the debug status register.

The breakpoint instruction (INT 3-0xCC) is treated exactly like a normal software interrupt. It is dispatched a functional unit and returns an appropriate status. The LOROB updates the EIP register (which is one byte for the INT 3 instruction) and traps to the provided entry point. The LOROB does not treat this instruction any different than other software interrupts.

TABLE 28

Signal List.

| | |
|---|---|
| NMI_P | Input from BIU indicates non-maskable interrupt, the LOROB generates a clean instruction boundary trap to a fixed entry point. The LOROB is sensitive only to the rising edge of this signal |
| INTR_P | Input from BTU indicates the external interrupt. This signal is qualified with the IF bit of the EFLAGS register. The interrupt occurs at appropriate instruction boundaries. |
| SRBHALT | Input from SRB to enter HALT mode. The LOROB stops retiring instructions until RESET, NMI, or external interrupt occurs. The LOROB must retire the HALT instruction before shutting down. |
| CR0NE | Input from SRB indicates the NE bit of the CR0 register. The NE bit indicates the floating point exception can be trapped directly (NE=1) or via XFERR_P and an external interrupt (NE=0) |
| XIGNNE_P | Input from BIU indicates the copy of pin IGNNE. When CR0NE = 0, this signal is inspected to response to enabled floating point exceptions. |
| XFLUSH_P | Input from BIU indicates an external flush request occurs. It is falling edge sensitive and trap on instruction boundary. It is sample during IRESET to enter tri-state test mode, the LOROB should not generate exception. |
| IINIT | Input from BIU indicates an initialization request. It is rising edge sensitive and trap on instruction boundary. It is sample during IRESET to enter BIST test mode, the LOROB generates on of the two reset entry point. |
| EFLAGSRF | Output generates from the EFLAGS register, these bits are visible from the slave copy of the EFLAGS register. The RF bit is also used in the LOROB to handle instruction breakpoint. |
| EFLAGSIF | Output generates from the EFLAGS register, this is the mask bit for INTR_P. When clear, INTR_P is ignored. |
| EFLAGSTF | Output generates from the EFLAGS register, the interrupt and trace flags are needed locally to control external interrupts and single step trapping after two completed instructions retires. |
| LOCVEC | Input from ROBCTL indicates whether entry point of the redirection is from the result status or locally generated. |
| ASYNCOK | Input from ROBWB indicates an external interrupt or NMI can be taken. |
| DOEXC | Input from ROBWB indicates an EXCEPTION is asserted and a trap to the entry point returned with the instruction is initiated. |
| DOXABORT | Input from ROBWB indicates an EXCEPTION is asserted and a resync is initiated. The signal EXCHGSYNC is asserted in addition to the normal resync signals. |

TABLE 28-continued

Signal List.

| | |
|---|---|
| DOFP | Input from ROBWB indicates an floating point exception by inspecting CR0NE and XIGNNE_P. Exception, freeze mode, or resync is taken in next cycle. |
| DOBREAK | Input from ROBWB indicates an EXCEPTION is asserted and a trap to a locally generated debug entry point is initiated. |
| DOSBZ | Input from ROBWB indicates an EXCEPTION is asserted and a resync to the next instruction is initiated. |
| DOLSYNC | Input from ROBWB indicates an EXCEPTION is asserted and a resync to the next instruction is initiated. |
| DOTRACE | Input from ROBWB indicates an EXCEPTION is asserted and a trap to a locally generated single-step entry point is initiated. |
| LOCENTRY(9:0) | Output of local entry point vector for traps or interrupts. |
| EXCEPTION | Global output indicates that an interrupt or trap is being taken including resynchronization. Effect on Idecode and FUs is to clear all instructions in progress. |
| REQTRAP | Global output, one cycle after EXCEPTION, indicates that the trap is initiated with new entry point or new PC is driven. |
| SYNC | Output indicates whether the new entry point or new PC is driven. |
| FREEZE | Output from a latch indicates when an SRBHALT occurs, or when DOFP is asserted with CR0NE=0 and XIGNNE_P=1. The latch is reset when an enabled external interrupt, NMI, or IRESET occurs. |
| XFERR_P | Output to BIU indicates the floating point error which is inverted of the ES bit from the slave of the floating point status register. It is also used by the LOROB to generate the plunger traps. |
| EXCHGSYNC | Output indicates exchange instruction resynchronization to Icache. This occurs when an exchange with a masked underflow is retired. It is a special resynchronize exchange with alternate entry point. |

Listing of Status Bits

This section describes the status bits and fields in the LOROB. The LOROB keeps track of all the processor states, status flags, handling correct PC, and retires instructions in program order to the register file and stack cache. The number of status bits and fields in the LOROB is organized in four groups; the data path, the entry's status bits, the line's status, and the global field.

The Data Path

The data path contains all the necessary data for the 32-bit communication with the decode units, the register file, the stack cache, and the functional units.

TABLE 29

Signal List.

| | |
|---|---|
| ROBDATA | RESULT DATA - 32-bit - Receive data from functional unit by comparison of result line number. Write data back to the register file and stack cache from the bottom of the LOROB. This can also be the branch target to be routed to the Icache. |
| ROBLAPTR | LINEAR ADDRESS OPERAND - 32-bit - Receive the linear address from the decode units into the top of the LOROB. The linear address can be from the LSSEC for indirect load/store. This can be either 32-bit for linear address or 6-bit for register file. Send the address to the register file and stack cache to latch valid result data from the bottom of the LOROB. The address routes to the comparators for dependency checking. |

TABLE 29-continued

Signal List.

| | |
|---|---|
| ROBLAXR | LINEAR ADDRESS/REGISTER FILE SELECT - 1-bit - Receive the type of operand from the decode units. 0 - register address, 1 - linear address. Use to select the 32-bit or 6-bit of the ROBLAPTR. |
| ROBTYPE1 | OPERAND TYPE - 2-bit - Receive the type of the first operand from the decode units. Bit 0 - destination operand, bit 1 - source operand. Use to select the ROBLAPTR. The destination status can change with store dependency checking (hit in the stack cache). |
| ROBWAY | STACK CACHE WAY BIT - 1-bit - Receive the way bit from the stack cache or the data cache. Use to write back data to stack cache and compare for the load/store dependency. |
| ROBREGPTR | REGISTER FILE OPERAND - 6-bit - Receive the register address from the decode units into the top of the LOROB. Send the address to the register file to latch valid result data from the bottom of the LOROB. The address routes to the comparators for dependency checking. |
| ROBTYPE2 | OPERAND TYPE - 2-bit - Receive the type of the second operand from the decode units. Bit 0 - destination operand, bit 1 - source operand. Use to select the ROBREGPTR. |
| ROBBYTE | SELECT BYTE - 4-bit - Receive the operand size from the decode units. Decode into 4 bits and for comparators and write back to the register file and stack cache. |
| ROBNC | NO-COMPARE - 4-bit - Receive from the dispatch line comparator, indicates that there is another instruction in the dispatch line with the same destination. The 4 bits is used for 4 bytes in the data word. This entry should not used in dispatch dependency checking. If the ROBLIL bit is not set, the destination of this entry should not be used for writing back to the stack cache or register file or for load/store dependency checking. |
| ROBLIB | LAST-IN-BUFFER BIT - 4-bit - Receive from comparing of the dispatch line against the previous line in the LOROB. The 4 bits is used for 4 bytes in the data word. This entry to ensure a single hit for all lines in the LOROB. Use for dispatch dependency checking. |
| ROBLIL | LAST-IN-LINE BIT - 4-bit - Receive from the dispatch line comparator, indicates that there is another instruction in the dispatch line with the same destination. The 4 bits is used for 4 bytes in the data word. Use for writing back to the stack cache or register file and for dependency checking. If the ROBNC bit is also set, indicates the matched destination with another entry in the buffer. |
| ROBFNC | FLAG NO-COMPARE - 1-bit - Receive from the dispatch line comparator, indicates that there is another instruction in the dispatch line with the same flag destination. This entry should not used in flag dependency checking. If the ROBFLIL bit is not set, the destination of this entry should not be used for updating the flags registers. |
| ROBFLIB | FLAG LAST-IN-BUFFER BIT - 1-bit - Receive from comparing of the dispatch line against the previous line in the LOROB. This entry to ensure a single hit for all lines in the LOROB. Use for flag dependency checking. |
| ROBFLIL | FLAG LAST-IN-LINE BIT - 1-bit - Receive from the dispatch line comparator, indicates that there is another instruction in the dispatch line with the same flag destination. Use for updating the flags registers and for dependency checking. If the ROBFNC bit is also set, indicates the matched destination with another entry in the buffer. |
| ROBPCOFF | PC OFFSET - 4-bit - Receive from the decode units, indicates the offset from the current line PC. This PC offset concatenates with the PC to form the 32-bit address. |
| ROBGBTAG | GLOBAL BRANCH TAG - 4-bit - Receive from the decode units, indicates the global branch prediction tag. Use to recover the global branch prediction shift |

TABLE 29-continued

Signal List.

| | |
|---|---|
| | register, the counters, and the byte position of the mis-predicted branch instruction. This is to properly update the ICNXTBLK. |
| ROBTAG | LOROB TAG - 3-bit - The hard-wired tag of the LOROB entries. A single tag is used for all lines in the LOROB. This tag in combination with the ROBLTAG is multiplexed to the reservation station in case of dependency. |
| ROBFUPD | FLAG UPDATE - 3-bit - Receive from the decode units, indicates that the instructions will update the status flags. Use for flag dependency checking and writing back to the global status flag registers. Bit 2 - OF, bit 1 - SF, ZF, AF, PF, bit 0 - CF. The status for the floating point will be defined later. |
| ROBFLDAT | FLAG RESULT - 6-bit - Receive from the functional units for the updates flags. Use for writing back to the global status flag registers. |

TABLE 30

Signal List.

| | |
|---|---|
| RB0P0HIT1(5:0) | Input from ROBCMP indicates that the LOROB line 0 matches with the first operand of the instruction at position 0. There are a total of 24 RBxPxHIT1(5:0) signals. These signals are used to multiplex the dependency tag and data to the functional units. |
| RB1P0HIT1(5:0) | |
| RB2P0HIT1(5:0) | |
| RB3P0HIT1(5:0) | Input from ROBCMP indicates that the LOROB line 1-3 matches with the first operand of the instruction at position 0. |
| RB0P1HIT1(5:0) | |
| RB0P2HIT1(5:0) | |
| RB0P3HIT1(5:0) | |
| RB0P4HIT1(5:0) | |
| RB0P5HIT1(5:0) | Input from ROBCMP indicates that the LOROB line 0 matches with the first operand of the instruction at position 1-5. |
| RBQP0HIT2(5:0) | Input from ROBCMP indicates that the LOROB line 0 matches with the second operand of the instruction at position 0. There are a total of 24 RBxPxHIT2(5:0) signals. |
| RB1P0HIT2(5:0) | |
| RB2P0HIT2(5:0) | |
| RB3P0HIT2(5:0) | Input from ROBCMP indicates that the LOROB line 1-3 matches with the second operand of the instruction at position 0. |
| RB0P1HIT2(5:0) | |
| RB0P2HIT2(5:0) | |
| RB0P3HIT2(5:0) | |
| RB0P4HIT2(5:0) | |
| RB0P5HIT2(5:0) | Input from ROBCMP indicates that the LOROB line 0 matches with the second operand of the instruction at position 1-5. |
| WBENB(5:0) | Input from ROBCTL indicates that writing back is enable from the bottom of the LOROB. |
| RESx(31:0) | Input from FU indicates result data. |
| DTAGx(2:0) | Input from FU indicates LOROB line number of the result. |
| RFLAGx(31:0) | Input from FU indicates result flags. |
| LSTAG0(5:0) | Input from LSSEC indicates LOROB line number of the first access. |
| LSTAG1(5:0) | Input from LSSEC indicates LOROB line number of the second access. |
| LSRES0(31:0) | Input from LSSEC indicates result data of the first access. |
| LSRES1(31:0) | Input from LSSEC indicates result data of the second access. |
| WBxWAY | Output indicates the way to write-back data to stack cache for retiring instructions. |
| WBxNC | Output indicates the invalid write-back data to the register file and stack cache for retiring instructions. |
| WBxPTR(5:0) | Output indicates the write-back pointer to the register file and stack cache for retiring instructions. |
| WBxD(31:0) | Output indicates the write-back data to the register file and stack cache for retiring instructions. |
| WBxBYTE(3:0) | Output indicates the write-back selected bytes to the register file and stack cache for retiring instructions. |
| RBxDAT1(31:0) | Output indicates the first source operand data for dispatching instructions. |
| RBxDAT2(31:0) | Output indicates the second source operand data for dispatching instructions. |
| FLGxDAT1(5:0) | Output indicates the status flags for dispatching instructions. |
| RBxTAG1(5:0) | Output indicates the first dependency tag for dispatching instructions. |
| RBxTAG2(5:0) | Output indicates the second dependency tag for dispatching instructions. |
| FCFxTAG(5:0) | Output indicates the CF flag dependency tag for dispatching instructions. |
| FOFxTAG(5:0) | Output indicates the CF flag dependency tag for dispatching instructions. |
| FXFxTAG(5:0) | Output indicates the CF flag dependency tag for dispatching instructions. |
| TARGET(31:0) | Output to Icache indicates the new PC for branch correction path and resynchronization. It is also used for special register updates in the LOROB. |
| RBxNC | Output to ROBCMP indicates the invalid entry for dependency checking. |
| RBxLIL | Output to ROBCMP indicates the last-in-line entry for dependency checking. |
| RBxFNC | Output to ROBCMP indicates the invalid entry for flag dependency checking. |
| RBxFLIL | Output to ROBCMP indicates the last-in-line entry for flag dependency checking. |
| ICPOSx(3:0) | ICLK7 Input from Icache to decode units indicates the PC's byte position of the instruction. |
| IDxDAT(1:0) | Input from Idecode indicates the data size information. 01-byte, 10-half word, 11-word, 00-not use. |
| IDxADDR | Input from Idecode indicates the address size information. 1-32 bit, 0-16 bit. |
| DxUSEFL(2:0) | |
| DxWRFL(2:0) | Input from Idecode indicates the type of flag uses/writes for this instruction of decode units:<br>xx1 CF-carry flag,<br>x1x OF-overflow flag,<br>1xx SF-sign, ZF-zero, PF-parity, and AF-auxiliary carry |
| DxUSE1(2:0) | Input from Idecode indicates the type of operand being sent on operand 1 for decode units:<br>0xx register address.<br>1xx linear address.<br>x01 A source operand, no destination<br>x11 A source operand, also destination<br>x10 B source operand (always no destination)<br>x00 not use this operand |
| DxUSE2(1:0) | Input from Idecode indicates the type of operand being sent on operand 2 (operand 2 is always register address) for decode units:<br>01 first operand, no destination<br>11 first operand, with destination<br>10 second operand (always no destination)<br>00 not use operand 2 |
| INSDISP(5:0) | Input from Idecode indicates that the instruction in decode unit is valid, if invalid, NOOP is passed to LOROB. |
| RDxPTR1(31:0) | Input from Idecode indicates the linear addresses or register address for operand 1 of the instructions. |
| RDxPTR2(5:0) | Input from Idecode indicates the register address for operand 2 of the instructions. |

TABLE 30-continued

Signal List.

| | |
|---|---|
| INSLSxB(5:0) | Input from decode units indicates the prefix values. bit 5 - data size, bit 4 - address size, bit 3 - lock, bit 2:0 - segment registers. |

The Entry's Status
  Each entry of the LOROB has many status bits:

TABLE 31

LOROB Status Bits.

| | |
|---|---|
| ROBALL | ALLOCATE - 1-bit - Set during dispatching of instructions based on INSDISP. Clear on retiring instructions. This status qualifies all other status's. |
| ROBVAL | VALID RESULT - 1-bit - Set when functional units return valid results. The entry can be retired when this bit is set. |
| ROBTKN | TAKEN BRANCH - 1-bit - Set when functional units return valid results. Use to update the EIP with the taken branch target. |
| ROBUNL | UNALIGNED ACCESS - 1-bit - Set the LSSEC send the unaligned store access. If hit in the stack cache, the first half result data must write back to the stack cache in the next cycle. Another cycle from LSSEC is used to send address to LOROB for retiring the second half of the access. |
| ROBCAN | CANCELED ENTRY - 1-bit - Set when branch mis-prediction is detected or SC-read_after_DC-write dependency is detected from load/store dependency checking. The entry is retired normally without updating the EIP. |
| ROBLSYNC | LOAD/STORE RESYNC - 1-bit - Set when functional units return valid results with resync status. The load/store hits in the Icache for self-modifying code. The next instruction should be re-fetched from the Icache. |
| ROBSBZ | SHIFT BY ZERO - 1-bit - Set when functional units return valid results with SBZ status. The scheduled flags updates are canceled. This status is used to qualify the ROBFUPD. |
| ROBEXIT | LAST MROM INSTRUCTION - 1-bit - Set for all instructions except for MROM instructions and SIB-byte instructions. This status is used to update the EIP and flags registers when retiring instructions. |
| ROBEXC | EXCEPTION STATUS - 2-bit - Set when functional units return valid results with exception status. The exception code is:<br>000 - no exception<br>001 - load/store breakpoint<br>010 - software interrupt with error<br>011 - floating point exception with write-back/push/pop<br>100 - exception with vector (including TLB miss)<br>101 - exchange abort<br>110 - reserved<br>111 - floating point exception without write-back/push/pop |
| ROBFP | FLOATING POINT ENTRY - 1-bit - Set for floating point instruction during dispatching. |

TABLE 32

Signal List.

| | |
|---|---|
| DSTATX(3:0) - | Input from FU indicates the status of the result data:<br>0000 - no result<br>0000 - valid result<br>0000 - valid result, shift by zero<br>0000 - exception with vector<br>0000 - software interrupt with vector |

TABLE 32-continued

Signal List.

| | |
|---|---|
| | 0000 - TLB miss with vector<br>0000 - load/store breakpoint<br>0000 - exchange result<br>0000 - exchange with underflow<br>0000 - exchange abort<br>0000 - branch taken, mis-prediction<br>0000 - branch not taken, mis-prediction<br>0000 - reserved for FPU<br>0000 - reserved for FPU<br>0000 - reserved for FPU<br>0000 - reserved for FPU |
| DSETALL (5:0)<br>DSETEXIT (5:0)<br>DSETINTR (5:0) - | Input to set signals for dispatched instructions. The bits should be set in the cycle after the dependency checking. |
| RSETTKN (5:0)<br>RSETVAL (5:0)<br>RSETEXC (5:0)<br>RSETSBZ (5:0)<br>RSETLSYNC (5:0) - | Input to set signals for result instructions. The bits are set in the same cycle as the results from functional units. |
| WBALL (5:0)<br>WBVAL (5:0)<br>WBCAN (5:0)<br>WBTKN (5:0)<br>WBSBZ (5:0)<br>WBEXC (23:0)<br>WBEXJT (5:0)<br>WBLSYNC (5:0)<br>WBFP(5:0) - | Output indicates the current status of the bottom line of the LOROB for retiring instructions. |

The Line's Status

Each line in the LOROB has its own status and information for dispatching and retiring instructions. The LOROB is a FIFO registers to avoid the dependency checking for the top line. The virtual line tag which is routed to the functional units and stack cache is rotated with the shifting of the line.

TABLE 33

Signal List.

| | |
|---|---|
| ROBLPC - LINE PC - 28-bit - Receive from the decode units. Use to update the current retired PC, branch mis-prediction, or re-fetch from Icache. |
| ROBLTAG - VIRTUAL LINE TAG - 3-bit - Reset for each line from 0 to 4. These virtual line tags are rotated with retiring instructions. The line write pointer always points to the bottom of the LOROB and the line read pointer points#to the next available line in the LOROB. The virtual line tags are sent to the stack cache and functional units. |

TABLE 34

Sianal List.

| | |
|---|---|
| IDPC(31:0) - | Input from Idecode indicates the current line PC. |
| ROBPC(31:0) - | Output indicates the current retire line PC. |
| ROBEMPTY - | Output indicates the LOROB is empty. |
| ROBFULL - | Output indicates the LOROB is full. |
| LINEPTR (2:0) - | Output indicates the current line pointer in the LOROB for the dispatch line of instructions. |
| TOPPTR (2:0) - | Pointer to the top of the LOROB. This pointer is used to enable the nuniber of lines in the LOROB for dependency checking. |

The Global Status & Registers

The LOROB includes some of the processor special registers. They are used for instruction execution. These registers can be accessed using move to/from protocol of the SRB. The special registers located in the LOROB are:

ROBEIP—PROCESSOR PC-32-bit—The register is updated on-the-fly by retiring instructions. It always tracks the real instruction execution, regardless of the current state of the processor i.e. there is no concept of freezing the PC. The EIP can be accessed using the standard move to/from protocol of the SRB.

RCVBASE—RECOVERY PC BASE-32-bit—Update at the retire of each taken branch instruction by the content of the ROBEIP(31:4) and the offset of the branch instruction within the line. It is used by microcode to recover the PC of a branch to an illegal address. This is necessary since the limit violation is not detected until the branch instruction is fetched.

EFLAGS—THE FLAG REGISTER-19-bit—Update at the retire of the instructions. The six status bits are divided into three groups OF, {SF,ZF,AF,PF}, and CF. The RF bit is cleared during certain debug operations. All EFLAGS bits are cleared by IRESET. The non-status bits can be accessed only via the move to/from protocol of the SRB by 10 different pointers. These ten pointers provide independent software read/write access as:
  read/write the entire EFLAG register—bits 18:0.
  read/write the lower word—bit 15:0.
  read/write the lower byte—bit 7:0.
  complement the carry flag—bit 0.
  set/clear the direction flag—bit 10.
  set/clear the interrupt flag—bit 9.
  set/clear the carry flag—bit 0.

FPIP—FLOATING POINT PC-48-bit—Update at the retire of the floating point instructions. The FPIP can be accessed using the standard move to/from protocol of the SRB.

FPSR—FLOATING POINT STATUS REGISTER-16-bit—Update at the retire of the floating point instructions. The FPSR can be accessed either by using the standard move to/from protocol of the SRB or by a unique pointer to clear the exception bits. A move to FPSR must be accompanied by a move to the look-ahead copy which is the responsibility of the microcode.

FPOPCODE—FLOATING POINT OPCODE REGISTER-11-bit—Update at the retire of the floating point instructions. The FPOPCODE can be accessed using the standard move to/from protocol of the SRB.

DR6—DEBUG STATUS REGISTER-16-bit—Update the B bits at the retire of the load/store breakpoints instruction and update the BS bits during single stepping. On instruction breakpoints, global debug traps, and task switch debug traps, DR6 must be set by microcode. The DR6 can be accessed using the standard move to/from protocol of the SRB.

TABLE 35

Signal List.

| | |
|---|---|
| WRFPSR(1:0) | Input from ROBCTL indicates to write the two floating point flag groups, {C3,C2,C1,C0} and {SF,PE,UE,OE,ZE,DE,IE}. The updating of FPSR register is from FPSRIN. |
| FPSRIN(10:0) | Input data for FPSR register updates. |
| WRFPOPCD | Input from ROBCTL indicates to write the FPOPCODE register from FPOPCDIN. |
| FPOPCDIN(10:0) | Input data for FPOPCODE register updates. |
| PUSHPOP(2:0) | Input to increment or decrement the TOP field of the FPSR register. Bit 0 - push, decrement by 1. Bit 1 - pop, increment by 1. Bit 2 - double pop, increment by 2. |
| WRxFLG(2:0) | Input from ROBCTL indicates to write the three flags of EFLAGS register. |
| EFTOFLGB(2:0) | Input from ROBCMP indicates to drive the flags to functional units on flag dependency checking. |
| CLRRF | Input from ROBCTL indicates to clear the RF bit of EFLAGS register. |
| UPDFPIP | Input from ROBCTL indicates to update FPIP from LSCSSEL and EIP. |
| SETBS | Input from ROBCTL indicates to update the B bit of DR6. |
| LSCSSEL(15:0) | Input from LSSEC indicates the current code segment used for updating FPIP. |
| WRPC(5:0) | Input from ROBCTL indicates which PC offset to use to update EIP. |
| RBLPC(31:4) | Input from the next to bottom line PC for updating of EIP. |
| MVTEIP | Input ROBCTL indicates EIP register updates from IAD bus. |
| MVFEIP | Input ROBCTL indicates EIP register move to IAD bus. |
| MVTCVB | Input ROBCTL indicates RCVBASE register updates from IAD bus. |
| MVFCVB | Input ROBCTL indicates RCVBASE register move to IAD bus. |
| MVTCVIO | Input ROBCTL indicates RCVIO register updates from IAD bus. |
| MVFCVIO | Input ROBCTL indicates RCVIO register move to IAD bus. |
| MVTIPCS | Input ROBCTL indicates the upper 16 bits of the FPIP register updates from IAD bus. |
| MVFIPCS | Input ROBCTL indicates the upper 16 bits of the FPIP register move to IAD bus. |
| MVTIPOFS | Input ROBCTL indicates the lower 32 bits of the FPIP register updates from IAD bus. |
| MVFIPOFS | Input ROBCTL indicates the lower 32 bits of the FPIP register move to IAD bus. |
| MVTDR6 | Input ROBCTL indicates DR6 register updates from IAD bus. |
| MVFDR6 | Input ROBCTL indicates DR6 register move to IAD bus. |
| MVTEFLAGS(2:0) | Input ROBCTL indicates EFLAGS register updates in three pieces (the upper half-word and the lower two bytes) from IAD bus. |
| MVFEFLAGS(2:0) | Input ROBCTL indicates EFLAGS register moves in three pieces (the upper half-word and the lower two bytes) to IAD bus. |
| MVTEFBIT(6:0) | Input ROBCTL indicates manipulation of individual bits in the EFLAGS register. The action performed for each of these bits is: bit 6: complement the carry flag (bit 0) bit 5: set the direction flag (bit 10) bit 4: set the interrupt flag (bit 9) bit 3: set the carry flag (bit 0) bit 2: clear the direction flag (bit 10) bit 1: clear the interrupt flag (bit 9) bit 0: clear the carry flag (bit 0) |
| MVFDR6 | Input ROBCTL indicates DR6 register move to IAD bus. |
| EFLAGSAC | |
| EFLAGSVM | |
| EFLAGSRF | |
| EFIOPL(13:12) | |
| EFLAGSOF | |
| EELAGSDF | |
| EFLAGSAF | |
| EFLAGSCF | Output generates from the EFLAGS register, these bits are visible from the slave copy of the EFLAGS |

TABLE 35-continued

Signal List.

| | |
|---|---|
| | register. The RF bit is also used in the LOROB to handle instruction breakpoint. |
| EFLAGSIF EFLAGSTF | Output generates from the EFLAGS register, the interrupt and trace flags are needed locally to control external interrupts and single step trapping. |
| XRDFLGB(5:0) | Output. to flag operand bus, the bits are read by EFTOFLGB. The order of the bits is OF, SF,ZF,AF,PF,CF. |
| MVTFPSR | Input ROBCTL indicates FPSR register updates from IAD bus. |
| MVFFPSR | Input ROBCTL indicates FPSR register move to IAD bus. |
| CLRFPEXC | Input ROBCTL indicates to clear the stack fault and exception bits {SF,PE,UE,OE,ZE,DE,IE} in the FPSR register. Indirectly the ES and B bits are cleared. |
| FPTOP(2:0) | Output to register file indicates the current top-of-stack to identify the registers being popped to clear the full bits. |
| REQTRAP | Global output, one cycle after EXCEPTION, indicates to drive the XLASTKPTR. |
| XFERR_P | Output to BIU indicates the floating point error which is inverted of the ES bit from the slave of the FPSR. It is also used by the LOROB to generate the plunger traps. |
| XLASTKPTR(2:0) | Output to Idecode indicates the TOP bits for the FPSR for correct floating point stack pointer. |
| MVTFPOPCD | Input ROBCTL indicates FPOPCODE register updates from IAD bus. |
| MVFFPOPCD | Input ROBCTL indicates FPOPCODE register move to IAD bus. |

Timing

Since the clock cycle is reduced to 4.5 ns, the comparators and detection of the hit for dependency can be done in a phase using CAM cells. The tag and decision to send data should be done in another cycle.

ICLK2: The operand linear address and register address is available at the end of this cycle.

ICLK3: Dependency checking. Generate dependency tag and read data to operand steering if hit.

ICLK4: Read and multiplex data to the operand data buses to the functional units. Update status bits.

For retiring instructions:

ICLK5: Results from the functional units. Compare tag to latch data. Update status and check for branch misprediction.

ICLK6: Retire a line if all entries have valid results. Update PC, flags. Drive new WRPTR and WRPTR1.

Layout

Figure 41:
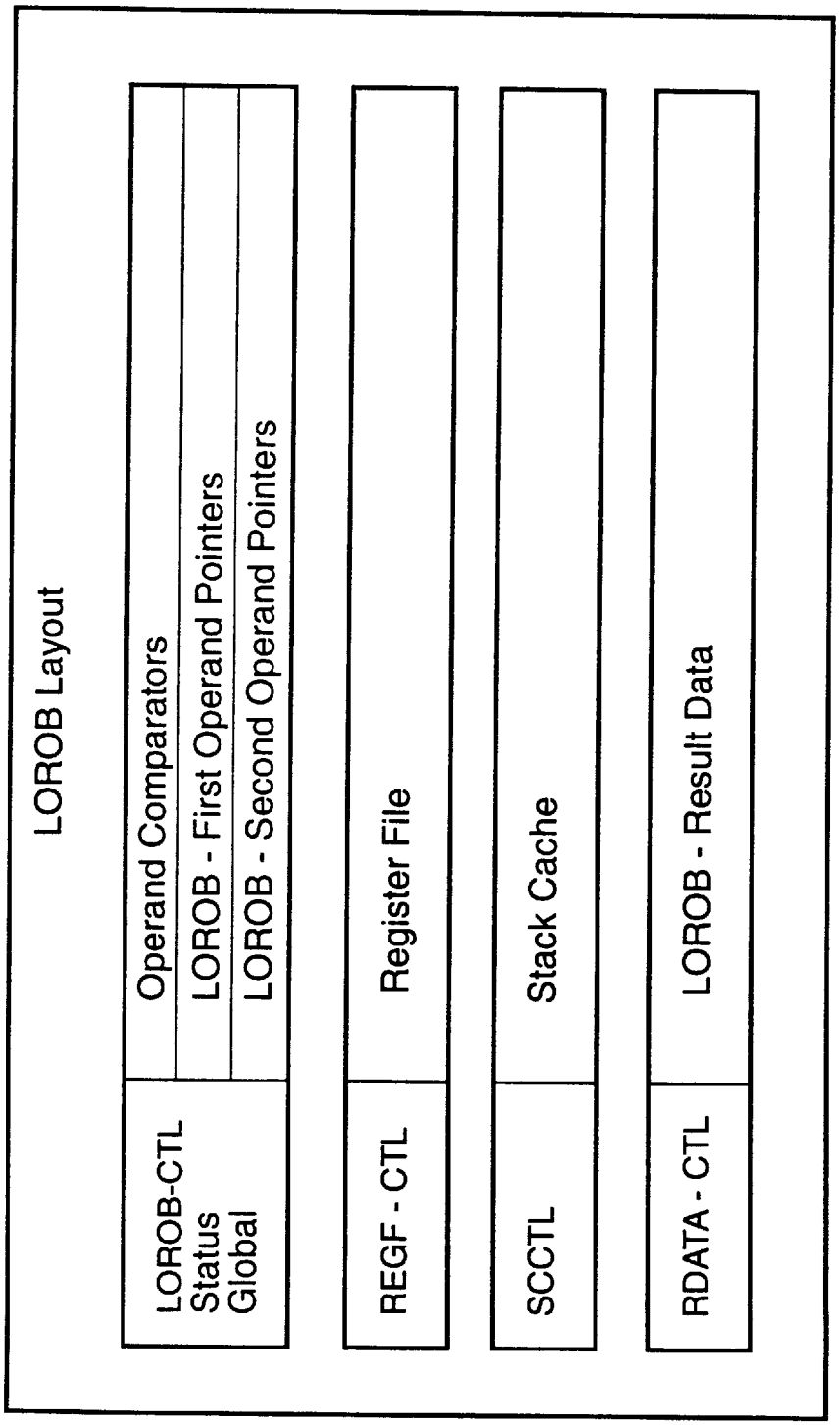

FIG. 41 is a block diagram of a layout of the LOROB. The LOROB is split into three sections in different locations:

1. The operand addresses and comparators in the data path next to the decode units.
2. The result data in the data path next to the reservation stations and functional units.
3. The status and global controls on the left side of the data path.

DESCRIPTION OF THE STACK CACHE

The stack cache provides several non-contiguous lines of memory which can be accessed like a register file. Speed up over previous microprocessor performance comes from using base pointer relative addressing (EBP+displacement) and many access/writeback ports (9 access/6 writeback) to provide the operands needed by a wide issue superscalar processor (note: one of the access ports is for top of stack; the other two access ports are for data cache accesses). The following is an example line of code which could be executed in parallel:

Add [EBP+14],ECX; Mov EDX,[EBP+8]; Sub [EBP-3C], EBX;

Push EAX; Push EBX; Mov [EBP-4],EDI; Shr ESI,14h

In previous X86 architectures, quick operand accesses were limited to only eight registers or slower accesses to one or two read ports for memory (data cache) operands. The line of code above can access all of its operands out of the register file or out of the stack cache which are both very quick. The current model only uses one push per dispatch position. A speculative copy of ESP is available to the six linear address adders. These adders can quickly (1/2 cycle; end of ICLK2) determine base pointer and stack pointer relative linear addresses which use 32 bit displacements. ICLK3 is used to determine multiple pushes, ESP/EBP add, or subtract updates (i.e., SUB ESP,0x20). Three pushes are allowed per line. A MOV EBP, ESP and a POP EBP instruction will update the speculative copy of EBP during the 3rd ICLK. Aligned 32 bit accesses to the stack cache are done quickly while unaligned accesses that cross 32 bit boundaries are converted to DC accesses. Unaligned reads are done by the LSSEC as two separate reads and two consecutive cycles. Unaligned writes from the LOROB to the stack cache also take two cycles since there is only one writeback port per position. A DC write to the stack cache only sets a "w" but does not perform the actual write. During ICLK4 the ESP and EBP relative accesses (either read or write) are done on the stack cache. A write access will set the "w" bit for the LOROB line (one being dispatched) on the corresponding stack cache line. For example, if the 2nd LOROB line is being dispatched, a write to stack cache line 1, way 0 would set the 2nd "w" bit on stack cache line 1, way 0. Any line with a "w" bit set cannot be replaced (sent back to the data cache if modified) until the writeback and clearing of the "w" bit. Accesses which read from the stack cache in the 4th ICLK do not set any bits but only read the appropriate data and send it to the operand steering unit.

Figure 42:
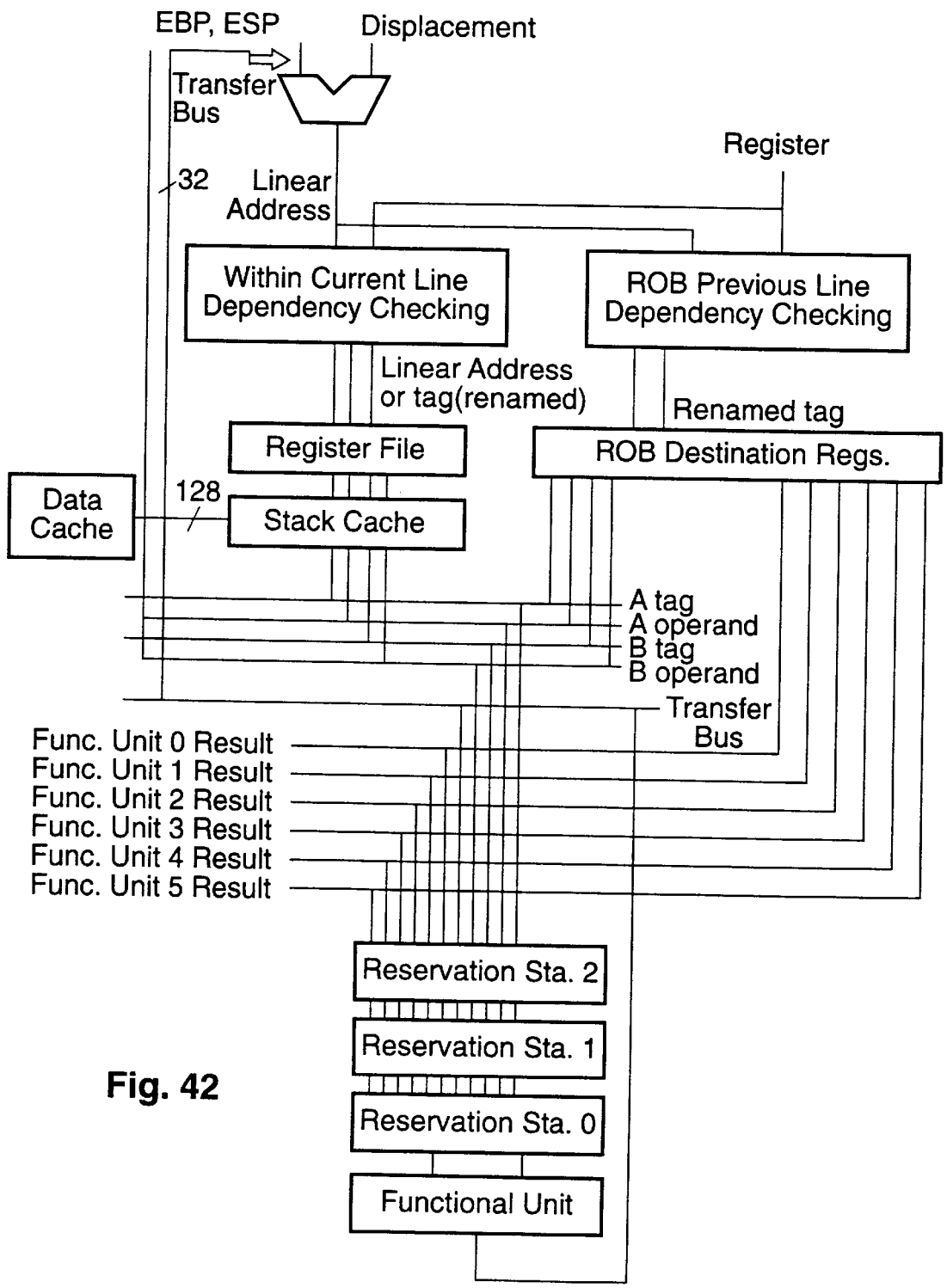

FIG. 42 is a block diagram of the stack cache. The stack cache is a two way associative cache which does the 4th ICLK cycle accesses (reads and setting "w" bits) at the beginning of the cycle. Writeback are done at the end of the cycle. The decode logic for both writeback and 4th ICLK accesses evaluate in parallel, but the writebacks are delayed slightly until the 4th ICLK accesses have finished. Eight bit compares are done between the writebacks and the ICLK4 accesses to check for possible dependencies and reaccess of the ICLK4 accesses if needed. A 6 writeback port/9 read port stack cache cell may be constructed with fully static logic instead of precharge discharge logic so that capacitive coupling can be minimized. The 9th read port is for top of stack (TOS). The other 2 read ports are accessed by the LSSEC in parallel with data cache accesses. When there is a miss in one or more of the 6 dispatch positions, the pipeline will stall one cycle while the victim line is copied to buffers and then the pipeline (less the data cache and LSSEC) will begin running again. Once the new line has been transferred from the data cache into the stack cache buffers, the pipeline will again stall (for 2 cycles) while the new line is written into the stack cache.

The functional units send their results back to the LOROB during the beginning of the 7th ICLK. About the middle of the 7th ICLK, the LOROB will send byte enable and linear address (bits 6:2) signals to the stack cache to allow the stack cache to set up for the coming write during the 8th ICLK. Although the byte enable information can be sent without knowing whether or not the LOROB line will retire, the stack cache control needs to know before the end of the 7th ICLK whether a writeback will take place by receiving the VWB(5:0) bits (valid writeback).

DC Read after SC Write and SC Read after DC Write

Dependency checking may be done in the LOROB. To get good performance from register indirect addressing and not consume large areas of the die with more dependency checking, a scoreboard type of model is used for dependency checking between the stack cache and data cache. Note that all writes that access the stack cache line, keep that line in the stack cache until the access has been retired. Dependency checking/renaming is done during the 4rd ICLK for base pointer and stack pointer relative accesses using linear addresses. This array of linear address comparators uses thousands (safe assumption) of transistors to detect RaW dependencies and perform renaming/forwarding. Since indirect address accesses get sent onto the reservation stations before their linear addresses are calculated, they miss out on RaW dependency checking and renaming.

The stack cache has 5 write bits associated with each line in the stack cache; one write bit for each of the 5 LOROB lines. These bits can be marked by any write probe access which is going to cause a future writeback to the stack cache. A bit is needed for each line of the data cache to let the L2 know during snoops that the line is also in the stack cache, and the corresponding data cache line may contain bogus data. The bit can also serve as part of the dependency checking. The stack cache is a very small subset of the data cache and contains the most up to date data. When the LSSEC does a write to the data cache, it also does an inquiry of the stack cache. In the case where only the data cache contains the line, no SC read after DC write or DC read after SC write dependencies will exists.

As referred to herein, SC_read means a base pointer read that immediately gets data from the stack cache, and DC_write means an indirect write through the LSSEC to the data cache (and always to the stack cache).

When a DC write occurs to a stack cache line that already has an SC write for that stack cache line (same LOROB line), the actual write must be changed from a DC write to a SC write. The write will still occur to the data cache and possibly leave the data cache with incorrect data, but the stack cache will have the correct data when the LOROB line is retired. An example of this condition is when LOROB line 1, entry 3 (1_3) uses base pointer relative to write to stack cache address 1000h during retire, and the LSSEC store (line 1, entry 4: 1_4) writes to the data cache location 1000h. The data cache location 1000h now contains, the 1_4 value written by the LSSEC but does not contain any stack cache updates until the stack cache line is written back during stack cache flush or victim line replacement. When the stack cache detected that the LSSEC was trying to perform a DC write to location 1000h which was also going to be written using base pointer relative, the DC write was changed to a LOROB stack cache write. The LOROB will check all of its entries on line 1 before retire and determine that the 1_4 destination value was the latest value and write it to the stack cache at location 1000h. If this condition had not been changed to a LOROB stack cache write, the 1_4 value would first be written to the stack cache location 1000h by the LSSEC, and then the LOROB would later overwrite location 1000h with the 1_3 value.

DC_read means an indirect read through the LSSEC to the data cache (and always to the stack cache). SC_write means a write to the stack cache using base pointer relative. A write bit will be set for any base pointer relative write for that LOROB line. Later when the LSSEC tries to do a data cache read (and always a stack cache read), the stack cache detects that a "w" bit is set (indicating a possible dependency) and does not send the data from the stack cache. The most recent data will be in the LOROB (if the corresponding FNCU has sent it). Since the dependencies between the DC_read after SC_write are considered infrequent, the read will be held until the write is written back. Then the LSSEC can once again read the value from the stack cache after it is updated. A problems to avoid is waiting to repeat the DC_RD until stack cache "w" bit for that LOROB line is cleared. These stack cache "w" bits cannot be cleared until the entire LOROB line is retired which means that the DC_RD must be able to read this line at the proper time and ignore the "w" bit.

Look-ahead ESP and EBP Register Models

Figure 43:
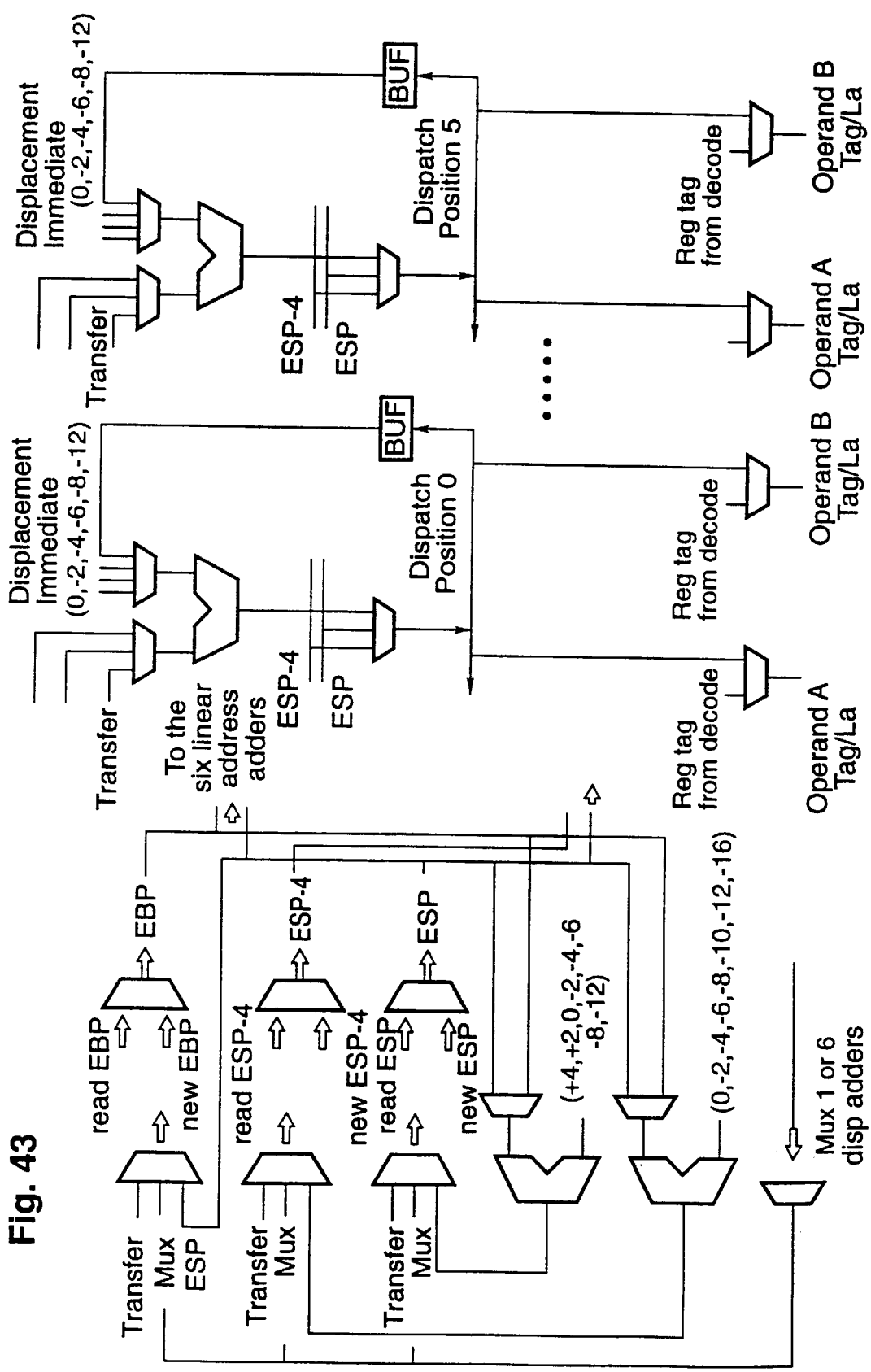

FIG. 43 is a block diagram of the look-ahead ESP and EBP register models. Base pointer relative additions (EBP and displacement) occur in the 2nd ICLK for eight bit displacements. The linear address can be used at the beginning of the 4th ICLK. A maximum of 3 pushes are allowed per line. The stack cache linear address requires that Flat segmentation is being used; otherwise an additional cycle would be needed to bring in the segment using the transfer bus and add it to the sum of the base pointer and displacement. SIB addressing that uses the ESP with no index will also require another cycle after the 2nd ICLK. The 3rd ICLK pipe stage is dedicated to setting up for multiple Pushes and for moving the ESP (subtracting and updating ESP). If a "MOV EBP,ESP", "ADD EBP, imm", "SUB EBP, imm", "POP EBP", "MOV ESP, EBP", "ADD ESP, imm", or "SUB ESP, imm" is detected, the linear address calculation stage will attempt to update a speculative copy of EBP or ESP (3rd ICLK) and continue issuing subsequent opcodes that use base pointer relative addressing. When an opcode that modifies EBP or ESP, does not use the previous encodings, the subsequent opcodes will be stalled in the pipeline until EBP/ESP is non-speculative.

A saved copy of the EBP, ESP, and ESP-4 which existed at the start of each LOROB line is latched in a FIFO next to the ESP/EBP lookahead generator. When a portion of one LOROB line needs to be flushed, one alternative may be to flush the entire LOROB line and grab the EBP, ESP, and ESP-4 that existed at the start of that line. There are signals from the LOROB to the ESP/EBP FIFO to keep it synchronized. A RETIRE, FLUSH, and ALLOCATE signal will be needed.

Dependency Checking, Renaming, Stack Cache Accesses, and Replacement

Several possibilities can occur when trying to generate an operand, LA1 (linear address #1):

The operand is a memory location which is either Locked or Non-Cacheable

When a Locked access occurs to a stack cache or data cache line, processor 500 will first drive a bogus Locked Read on the external pins in order to maintain control of the bus. The load can occur from the stack cache or data cache. Then if the line is modified, the stack cache or data cache line must be copied back to external memory. Finally, the Locked single cycle write will occur externally following by Unlock.

The operand is base pointer relative but not currently in the stack cache

Allocating a new stack cache line will occur due to base pointer relative or stack pointer relative addressing and pushes to locations not currently present in the stack cache. However, any linear address (e.g., ADD [EAX],EBX) can be read from or written to the stack cache if the needed line is already present (DC_RD and DC_WR). If the least recently used line of the stack cache still has its "w" bits set (not yet retired), the line cannot be replaced as indicated by the signal NEWSCLRQI(new stack cache line request ignored). Since the stack cache is a write back cache, the victim line needs to have its dirty bit checked and be copied back to the data cache (if set). All base pointer relative accesses, pushes, and pops that do not hit in the stack cache are immediately changed to DC accesses and sent onto the reservation stations. If one or more base pointer relative or push accesses did not hit in the stack cache, the oldest program order LOROB entry's linear address is placed in the "new linear address for stack cache line load buffer" (NLA4SCLBUF). The stack cache will then attempt to load this line from the data cache or clear the NLA4SCLBUF if it is non-cacheable. Even though the opcode which caused this data cache line to be transferred to the stack cache has been changed to a DC access, the LSSEC will still find the moved line in the stack cache.

The stack cache drives the operand bus
The stack cache drives the operand bus when the operand hits and there is no overriding LOROB destination driving the operand bus.

The LOROB drives the operand or tag bus (forwarding or renaming)
The LOROB drives the operand bus when its dependency checking hits on the actual value requested. Note that when the LOROB has a value to write back to the stack cache the stack cache will have that line present and will hit but not drive the operand bus. The LOROB will take priority on the operand bus.

The LOROB drives the tag bus when its dependency checking hits on the requested linear address, the LOROB does not have the data, and the current line dependency checking does not hit.

The within line dependency checking drives the tag (renaming)
The current line dependency checking (CLDEPCHK) drives the tag bus when a previous entry within the current line writes to a stack cache or register file location that a subsequent entry within that same line reads. Driving a tag from the current line dependency checking takes higher priority over driving a tag from the ROB. Worst case timing for the current line dependency checking will be from the position 5 all the way back to position 0. Each previous position must be checked for the latest stack cache write to a location that position 5 reads.

Dealing with Multiple Stores
WaW (write after write or output) dependencies are covered by the LIL (last in line) bits in the ROB and by the LOROB/LSSEC protocol for Stores. When two entries of an ROB line write to the same location, only the last one will have its LIL bit set allowing it to do the actual write for SC_WR and register writes(all six entries of the LOROB line are written at the same time). The LOROB will tell the LSSEC when the top two entries in the Store buffer are no longer speculative and can be written. However, it is important that if these two stores are to the same linear address, they should not be collapsed (or effectively done at the same time: only the last one Stores). In the case of a DC_WR at 1_2, SC_RD at 1_3, and a DC_WR at 1_4 (1_2 & 1_4 both stores to address 1000h), the DC_WR at 1_2 must be done first to allow the LOROB to flush the bogus data read by the SC_RD at 1_3.

RaR and WaR Dependencies
Load requests from the reservation stations can pass (in any order) through the FNCUs and into the LSSEC. WaR (write after read or anti-dependencies) are taken care of by the LOROB. Before any write is allowed (non-speculative), all of the reads for that line will have already taken place. When a read needs to get a value from the LOROB, tag renaming or forwarding will allow the correct value to be read from the line-oriented re-order buffer dependency checking unit.

Within Current Line Dependency Checking
The only dependency left is the RaW (read after write or true) dependency which is handled by renaming in the line-oriented ROOB dependency checking unit or the current within line dependency checking unit. There is also the possible DC_RD after SC_WR dependency which is detected by a "w" bit in the stack cache during the DC RD. The data is not forwarded in this case, and the LOROB will need to write back its SC_WR entries before the DC_RD entry, restart the DC_RD (ignoring the "w" bit) and then retire the LOROB line when the DC_RD entry and the rest of that line have completed.

Figure 44:
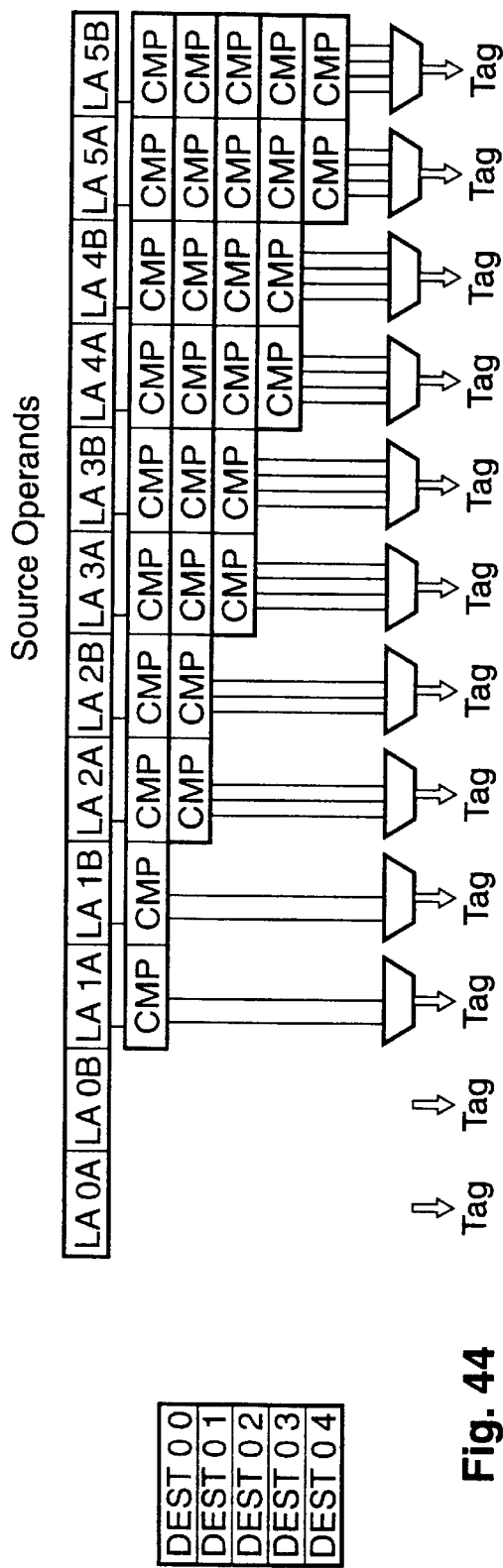

FIG. 44 is a block diagram of the current within line dependency checking unit. For current within line dependency checking, source operands for entry zero do not require any dependency checking, and the tag passes through without renaming. Source operands for entry 5 will need to be compared to five destination tags (entries 0 to 4) and then the hit results will go into a six input MUX (original source linear address=sixth input). If any of the compares for a given source entry hits, a hit signal will be sent to the LOROB dependency unit to prevent it from driving the tag bus. The current line dependency checking always has priority for the tag bus. The MUX is six tristate gates in the worst case, and the longest path through the MUX control logic is (!HIT4& !HIT3 & !HIT2 & !HIT1 & !HIT0) for the case of passing the original source linear address (no renaming) on entry 5.

Figure 45:
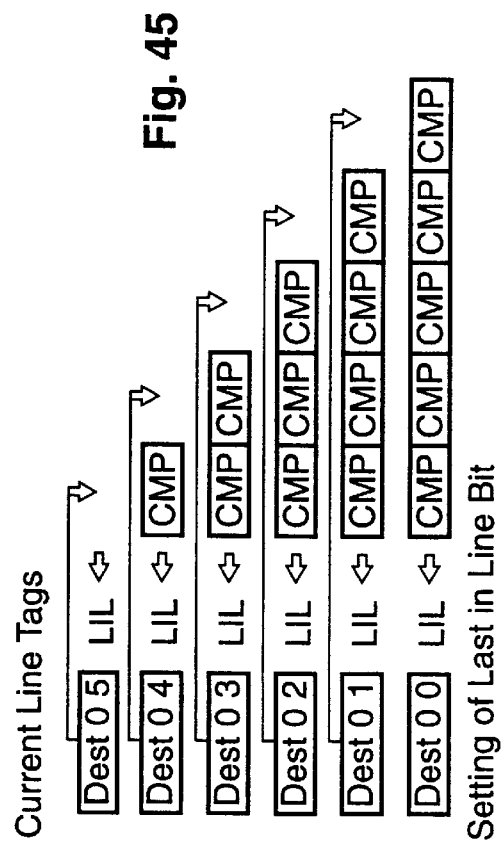

FIG. 45 is a block diagram illustrating how the last in line bits are set. Setting of the Last in Line bits (one for each entry of the LOROB) is done during the beginning of the ICLK. This information is not needed by the current line dependency checking, but will be used during the end of the ICLK to determine the LIL (last in line bit) that the LOROB needs for its dependency checking. For the case of entry 5, the LIL bit will always by set. The LIL bit for entry 4 will only be set if the comparison between its destination and entry 5's destination is false. Entry zero must have all five of its comparisons be false before its LIL bit can be set. After the detection of a possible DC_RD after SC_WR, the LOROB will need to scan from the point of completed instruction that are non-speculative forward looking for SC_WRs until the DC_RD read instructions. All SC_WRs in this scanned region will need to be written in program order before the DC_RD can be resent to the stack cache for its data. During this scanning for SC_WRs, the LIL bits are not useful since these bits were set assuming that the entire LOROB line would be written at the same time.

Figure 46:
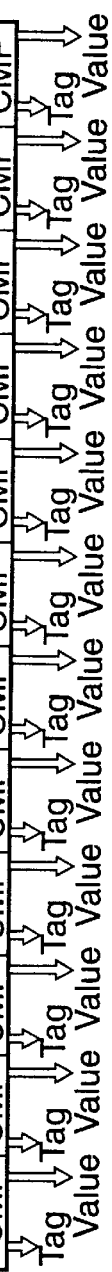

Line-Oriented Re-Order Buffer Dependency Checking
FIG. 46 is a block diagram illustrating the previous lines dependency checking operation performed in the LOROB. Twelve linear addresses/tags for the source operands of the current line are sent to the LOROB for dependency checking. Four lines with six destination tags and destination data entries each are used in the LOROB dependency checking. The current line dependency checking is done in parallel with the LOROB dependency checking. Each entry in the LOROB dependency checking unit has an LIL (last in line), and a TL (tag register/linear address) bit. The LIL bit is used for writing back results during retire, and it allows the LOROB to determine which is the last line entry to write to a given location (stack cache or register). LIL is set during the same cycle that the current line dependency checking unit is used. During the dependency checking the LOROB entries must have their LIL bit set before they can hit.

Referring to FIG. 46, the following is an example of how the previous lines dependency checking operation works. The source LA_0A is requesting memory location 1000h, and both Dest0_4, Dest0_5, and Dest2_1 write to location 1000h. The value for Dest0_4 and Dest0_5 have been returned to the LOROB, but the value for Dest2_1 has not been returned yet. Dest0_5 and Dest2_1 both have their LIL bit set since each contains the last in line value within its line. When the compare takes place, Dest2_1 will have priority over Dest0_5 and will drive its tag onto the LA_0A tag bus. Before Dest0_5 would be able to drive the tag or operand bus, the other lines after it would need to not have hits. When an entry of the LOROB is going to write to the stack cache, the stack cache will also have a line that hits since a corresponding "w" bit in that stack cache line is set and prevents the line from becoming a victim line for replacement. The stack cache will drive the operand bus, but the reservation station knows to ignore it when it sees a valid tag from the LOROB. Had the LOROB also wanted to drive the operand bus, the stack cache would have been prevented from driving the stack cache value due to the LOROB hit signal for the operand LA_0A. The LOROB dependency checking consists of a large array of eight bit comparators which is 12 sources by 24 previous line destinations. Since the entire 32 bits of the linear address is not being compared, the dependency detection must also be qualified with a stack cache read hit to be a true dependency.

TABLE 36

| Signal List - Inputs. | |
|---|---|
| WBIT_IGNR - | ignore any "w" bits when reading the stack cache |
| RDnPTR1 (31:0) - | the six read/write pointers into the stack cache from the dispatch/decode unit. |
| RDnBENL (3:0) - | latched read byte enables. |
| LSLINADn (31:0) - | the two LSSEC linear addresses for read accesses and write probing to the stack cache |
| ESP (31:0) - | the extended stack pointer to point to top of stack (TOS) in the stack cache. |
| VRD (8:0) - | valid readpointer indicator for the nine read / write probe linear addresses. |
| SCDC - | stack cache and data cache are transfer a line between them. |
| SCDCRSET (1:0) - | the stack cache control indicates which of the 4 sets are being accessed for stack cache/data cache transfers. |
| WBnPTR (6:2) - | writeback pointer from the LOROB. |
| VWB (5:0) - | valid writeback indictor for positions 5 to 0. |
| WBWAY (5:0) - | the way to be written back to for positions 5 to 0. |
| SCDCPKT - | stack cache/data cache transfer packet; a high indicates the high 128 bits. |
| RDpDBW (31:0) - | stack cache data read out for position p way w. |
| WBnDS (31:0) - | the six writeback data busses which have already been shifted in the LOROB. |
| STBUFDR (1:0) - | the store buffer is going to drive the LSRES1 /LSRES0 bus; no stack cache driving of the corresponding LSRES bus is allowed. |
| CURLINE (2:0) - | current LOROB line being sent through the stack cache. |

TABLE 36-continued

| Signal List - Inputs. | |
|---|---|
| RETLINE (2:0) - | retiring LOROB line being sent through the stack cache. |
| FLUSHSC - | LOROB request to flush the stack cache; the stack cache begins writing dirty lines back to the data cache. |
| DCCANREQ - | the data cache is canceling a new line request from the stack cache. |

TABLE 37

| Signal List -Outputs. | |
|---|---|
| SCnDAT (31:0) - | stack cache data read out for position n. |
| SCnHIT - | stack cache hit on accesses at position n (8 to 0). |
| DCSCD (127:0) - | data cache/stack cache transfer bus. This bus is also used for sending the new linear address tag and the victim tag from the stack cache to the data cache. |
| LSRESn (31:0) - | this bus can be used by the stack cache to drive read results on one of the DC read accesses |
| SCHLDD - | indication to the decode/dispatch to hold up the pipe (stall) until this signal is negated. |
| SCLINEREQ - | the stack cache is request a new line from the data cache. |
| SCVJCTLINE - | the stack cache is sending a dirty victim line to the data cache. |

TABLE 38

| Signal List for Stack Cache Sub-blocks. | |
|---|---|
| RDnPTRL (31:0) - | latched read/write probe pointers. |
| RDnBENL (3:0) - | latched read byte enables. |
| SRDn (31:0) - | select for reading a dword from the stack cache. Goes to both way 0 and 1. |
| RSELn (31:0) - | read select into the 32 dwords (each way) |
| WBPSWBb (31:0) - | dword writeback select for position p, way w, and byte b. |
| WBnPTRL (6:2) - | writeback pointer from the LOROB. |
| VWBL (5:0) - | latched valid writeback indictor for Positions 5 to 0. |
| WBWAYL (5:0) - | latched way to be written back to for positions 5 to 0. |
| RDpDBW (31:0) - | stack cache data read out for position p way w. |
| WBnDSL (31:D) - | the six latched writeback data busses which have already been shifted in the LOROB. |
| SCnHITw - | stack cache hit on accesses at position n (8 to 0) way w. |
| NEWSCLRQI - | new stack cache line request is ignored due to no victim line being available to replace. |

DESCRIPTION OF REGISTER FILE AND SRB

Processor 500 has the standard x86 register file (EAX to ESP) which is read from all six dispatch positions and written to from the LOROB. There are also 12 scratch registers available to all six dispatch positions. A special register block will only be available to dispatch position 5 and will be serialized. Only the real (non-speculative) states are stored in the register file. No floating point registers are stored in the integer register file. Each of the 8 visible registers and the 12 temporary registers will have enables to selectively write to bits (31:16), (15:8), or (7:0). The LOROB will send byte enable bits and valid write bits to the register file. Read valid bits and read byte enables will be sent by the dispatch/decode unit. Currently the register file will be a write first followed by a read; however, some spice work needs to first be done to verify this.

Figure 47:
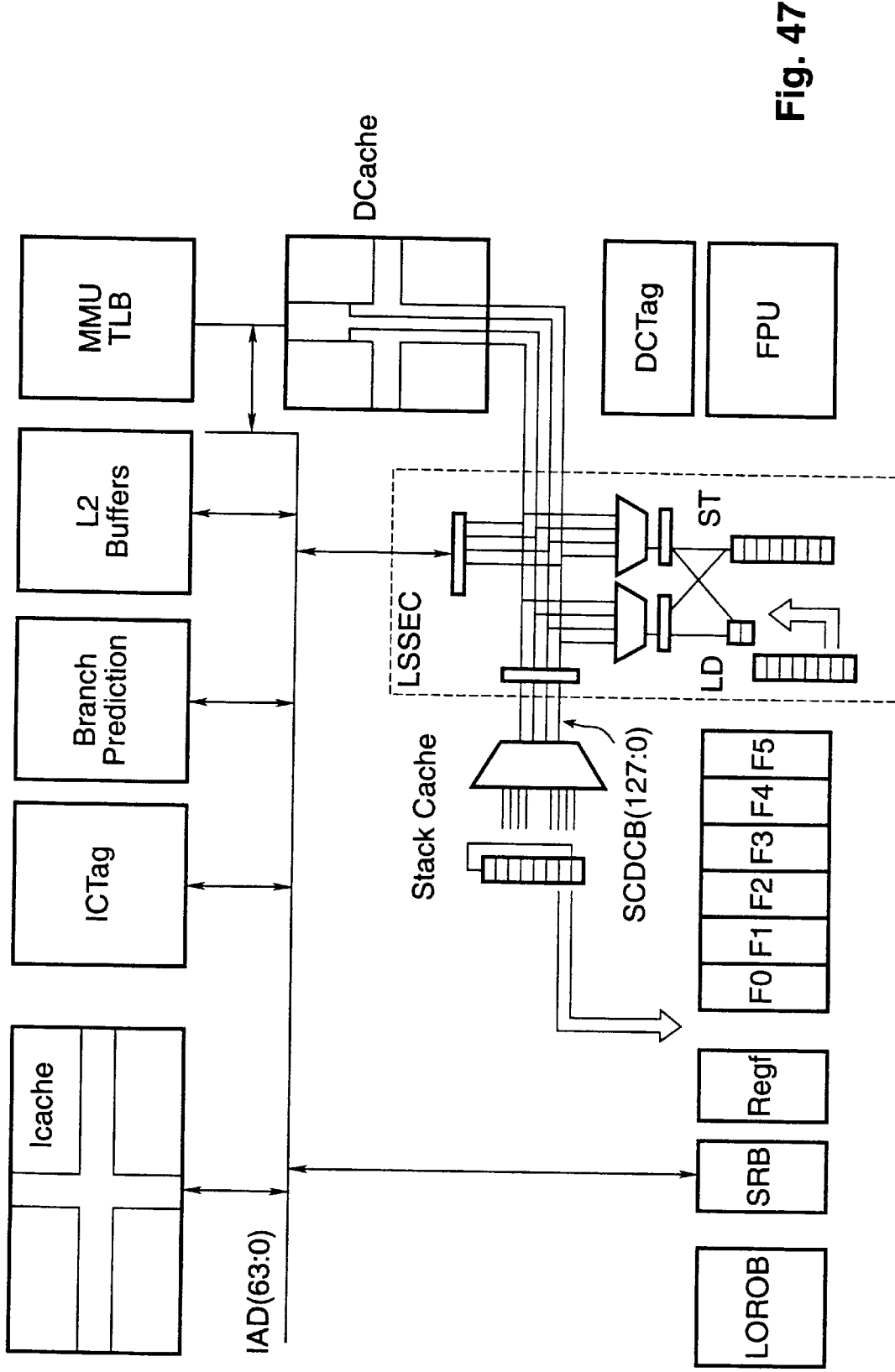

FIG. 47 is a block diagram showing portions of processor 500 which interface with the register file and special register block.

TABLE 39

Signal List.

| | |
|---|---|
| RDnPTR1(8:0) | the first operand pointer for reading from the register file for positions 0 to 5. |
| RDnPTR2(8:0) | the second operand pointer for reading from the register file for positions 0 to 5. |
| USE1RD(5:0) | These signals are valid bits from IDECODE indicating which reads are valid for the first operand. Each bit in these busses correspond to a dispatch position. |
| USE2RD(5:0) | These signals are valid bits from IDECODE indicating which reads are valid for the 2nd operand. Each bit in these busses correspond to a dispatch position. |
| RDnENB1(2:0) | byte enables for position n and for the first operand. Bit 2 refers to the upper two bytes while bits 1 and 0 refer to the lower bytes (bits 15:8) and (bits 7:0). |
| RDnENB2(2:0) | byte enables for position n and for the 2nd operand. Bit 2 refers to the upper two bytes while bits 1 and 0 refer to the lower bytes (bits 15:8) and (bits 7:0). |
| WBnPTR(7:0) | the writeback pointer for position n. This must be qualified with the register write valid bits |
| VRWB(5:0) | valid register writeback indication for each of six positions. |
| WBnENB1(2:0) | byte enables for position n and for the register writeback. Bit 2 refers to the upper two bytes while bits 1 and 0 refer to the lower bytes (bits 15:8) and (bits 7:0). |
| LAXTAG(5:0) | The LOROB will distinguish between a linear address for the stack cache or a tag for the register file for writebacks. |
| IRESET | Global reset signal. |

Special Register Block (SRB)

Processor 500 runs in a serialized mode so that no reservation stations or forwarding is needed. The following mnemonics are used: MVSR2FN5, MVRES52SR, MVSR2IAD, MVIAD2SR, MVAR2IAD, and MVIAD2AR where MV, FN, SR, RES, IAD, and AR stand for move, functional unit, special register, result bus #5, IAD bus, and arrays. The "A" operand bus will contain data while the "B" operand bus will be used for the pointer to the special register or array entry. SRB contains an SRBCTL control block, an SRBLOCAL block, and an SRBIO interface block.

IAD Bus Transfers

For an IAD transfer, the IAD bus will contain the pointer during the first cycle, and each of the various blocks that connect to the IAD bus will check the pointer value to see if they need to be involved in the transfer next cycle. Then the appropriate block will transfer the data the following cycle. (MVIAD2AR, MVAR2IAD, MVIAD2SR, and MVSR2IAD)

Non-IAD Bus Transfers

Functional unit 5 can be used to manipulate data by using the LSRES0 and LSRES1 busses to bring data into the FNCU. The LSSEC section arbitrates which drivers will control the LSRES0 and LSRES1 busses: data cache blocks 0, 1, 2, or 3, or SRB output. The RES5 bus is always driven by FNCU5 (never arbitrated), and the SRB can get results from FNCU5 over the RES5 bus. An example of (MVRES52SR and MVSR2FN5)

TABLE 40

SRB Sianal List.

SRBLDSEL
    Setup the SRB to receive operands.
IAD (63:0)
    Bidirectional bus into the SRB block.
LSRES0 (31:0)
LSRES1 (31:0)
    LSSEC result busses which can be used by the SRB to send data to FNCU5.
SRBPTR (7:0)
    Pointer latched off the RESLA5 (31:0) bus. SRBPTR goes to the SRBCTL block.
XSRB_JAD_BR
    SRB requesting the IAD bus from the L2 arbitrator
XSRB_IAD_BR
    SRB has been granted the IAD bus from the L2 arbitrator
BSTDPOUT
CROAM
CROEM
CROMP
CRONE
CRDNW
CROPE
CROPG
CROTS
CROWP
CR4_DE
CR4_MCE
CR4_PSE
CR4_PVI
CR4_VME
FCTRLE (5:0)
FCTRLPC (1:0)
FCTRLRC (1:0)
MICRODONE
SRBRLSTLBM
SRB_FLUSH
SRB_HALT
SRB_INV_DLV
SRB_INV_DPV
SRB_INV_ILV
SRB_INV_IPV
SRB_INV_TLB
SRB_INV_TLBG
SRB_STPCLK
TR12_BT
TR12_DDC
TR12_DIC
TR12_NBP
TR12_NWA
VIRTCR (15:10)
VIRTCR_ICE
VIRTCR_SMM
Various status signals that are outputs from the special register block

DESCRIPTION OF RESERVATION STATIONS

Dispatch and Issue Logic

The term "dispatch" is used to describe the action of taking several opcodes within one newly allocated LOROB line and sending them with their tags/operand/opcode to the corresponding reservation stations.

Allocation and Dispatch

Processor 500 has six dispatch positions corresponding to each of the six functional units. When executing the fast path instruction subset, all six dispatch positions will be used. For executing microcode, either dispatch position "5" only, dispatch positions "4" and "5", or dispatch positions "0" to "5" can be used. Floating point execution only uses dispatch positions "4" and "5" while special register updates (descriptor registers, test registers, debug registers, etc) use dispatch position "5" only. Other microcode and fast path will dispatch to positions "0" to "5". Once the opcode has been dispatched to a reservation station (station 0, 1, or 2), the station then snoops the result bus tags for the remaining operands that will be forwarded to it. Issue from the reservation stations to the functional units can be done out of order. The oldest opcode (program order) which has all of its operands will be issued to the functional unit so long as the functional unit is not stalled. The priority for which reservation station is serviced next is as follows:

1. Oldest RES_STA if it has all of its operands ready, if it has a store only (MOV) linear address calculation which may or may not have the source operand (data), or if it needs to calculate a linear address that will be used for both a load & store
2. Next oldest RES_STA if it has all of its operands ready, if it has a store only (MOV) linear address calculation which may or may not have the source operand (data), or if it needs to calculate a linear address that will be used for both a load & store
3. Youngest RES_STA if it has all of its operands ready, if it has a store only (MOV) linear address calculation which may or may not have the source operand (data), or if it needs to calculate a linear address that will be used for both a load & store
4. Oldest RES_STA if it needs to calculate a load only linear address
5. Next Oldest RES_STA if it needs to calculate a load only linear address
6. Youngest RES_STA if it needs to calculate a load only linear address Opcodes, tags, and operands for the reservation stations are always dispatched into RS2. Issue to the functional unit can then come from RS2, RS1, or RS0. This causes either RS1 or RS0 to become empty from time to time while RS2 should remain full except when the dispatch has stalled giving the functional unit time to empty out the reservation stations. When a another opcode is dispatched into RS2, the previous opcode in RS2 is shifted down to RS1. If an opcode was in RS1, it would in turn be shifted to RS0.

Figure 48:
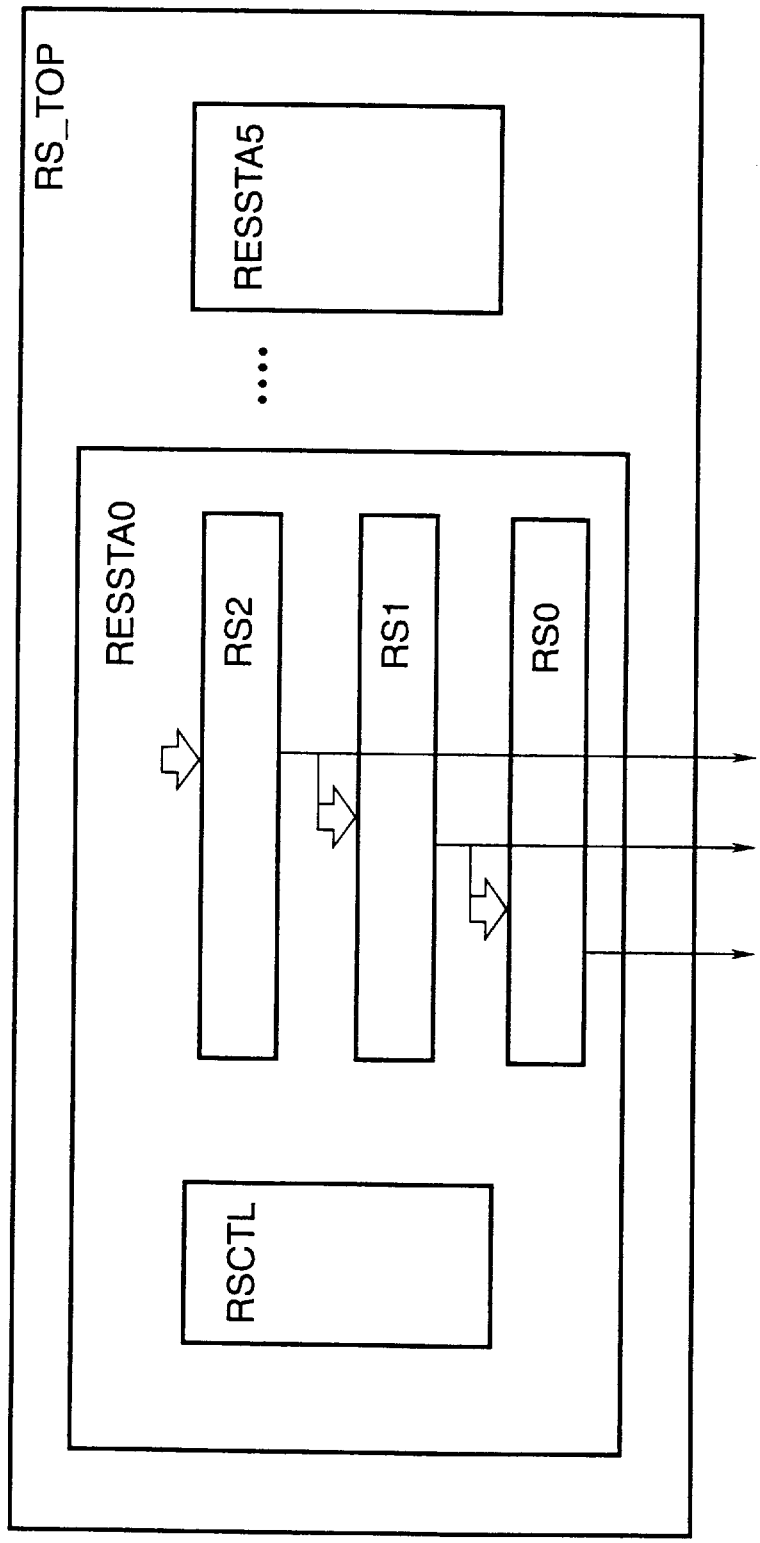

FIG. 48 is a block diagram of a reservation station. The reservation station logic (per dispatch/issue position) is divided into a control sub-block named RSCTL and three reservation stations named RS2, RS1, and RS0. Opcodes, tags, and operands are only dispatched to RS2, while any of the reservation station can issue to the FNCU. If an operation gets all of its operands from the REGF, Stack Cache, and LOROB data section and has no higher priority requests in the reservation stations before it, it can go from the operand steering section (4th ICLK) directly to the FNCU for evaluation in the 5th ICLK; otherwise, the operation gets to wait in the reservation station until its operands are forwarded.

Figure 49:
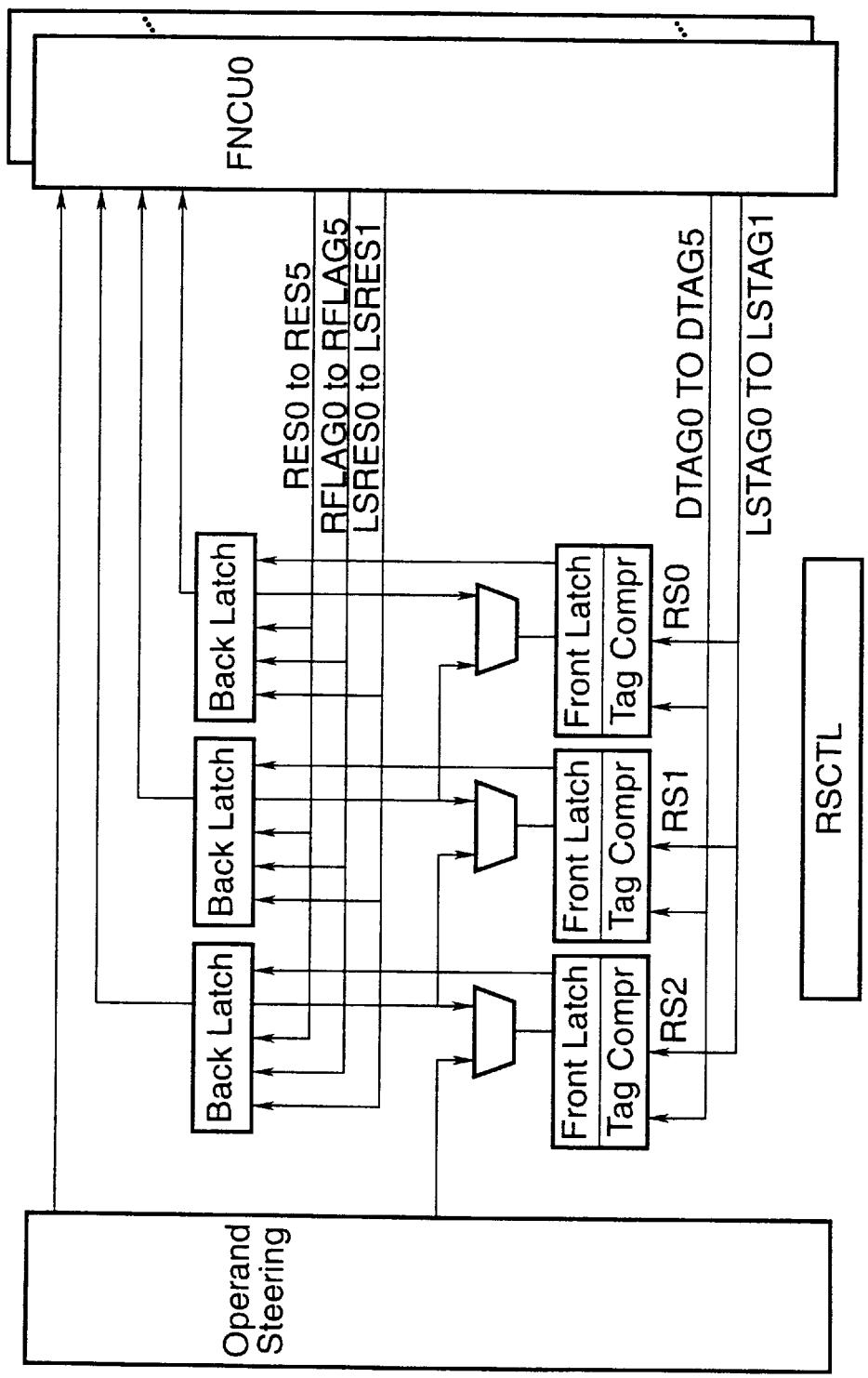

FIG. 49 is a block diagram of the bus structure for the reservation stations. Each reservation station has a front latch which triggers on the rising ICLK edge and a back latch which triggers off a self timing delay after the front latch. A MUX before the front latch allows either new data to come in from the higher numbered reservation station (or operand steering section for RS2) for from the back latch of the same reservation station. The information received from the back latch of the same reservation station could of course be different than the information that the front latch originally sent. For example the front latch may receive a tag for both its A and B operands and then send this information to the back latch. The back latch could receive the forwarded data for the A operand, reset the VAT (valid A tag) bit, and send this information back to the front latch or to the next front latch. The reservation stations shift their information to the next lower numbered reservation station only when new information is coming in. Next the front latch would send the information to the back latch, and the tag comparators might detect a match for the B tag. The back latch would latch in the B operand and send it onto the FNCU input MUX. The RSCTL maintains the juggling act of which operations end up in which reservation stations. An operation will always stay in its current reservation station unless it is shifted to the next or sent to the FNCU for evaluation.

Reservation Station Timing

Figure 50:
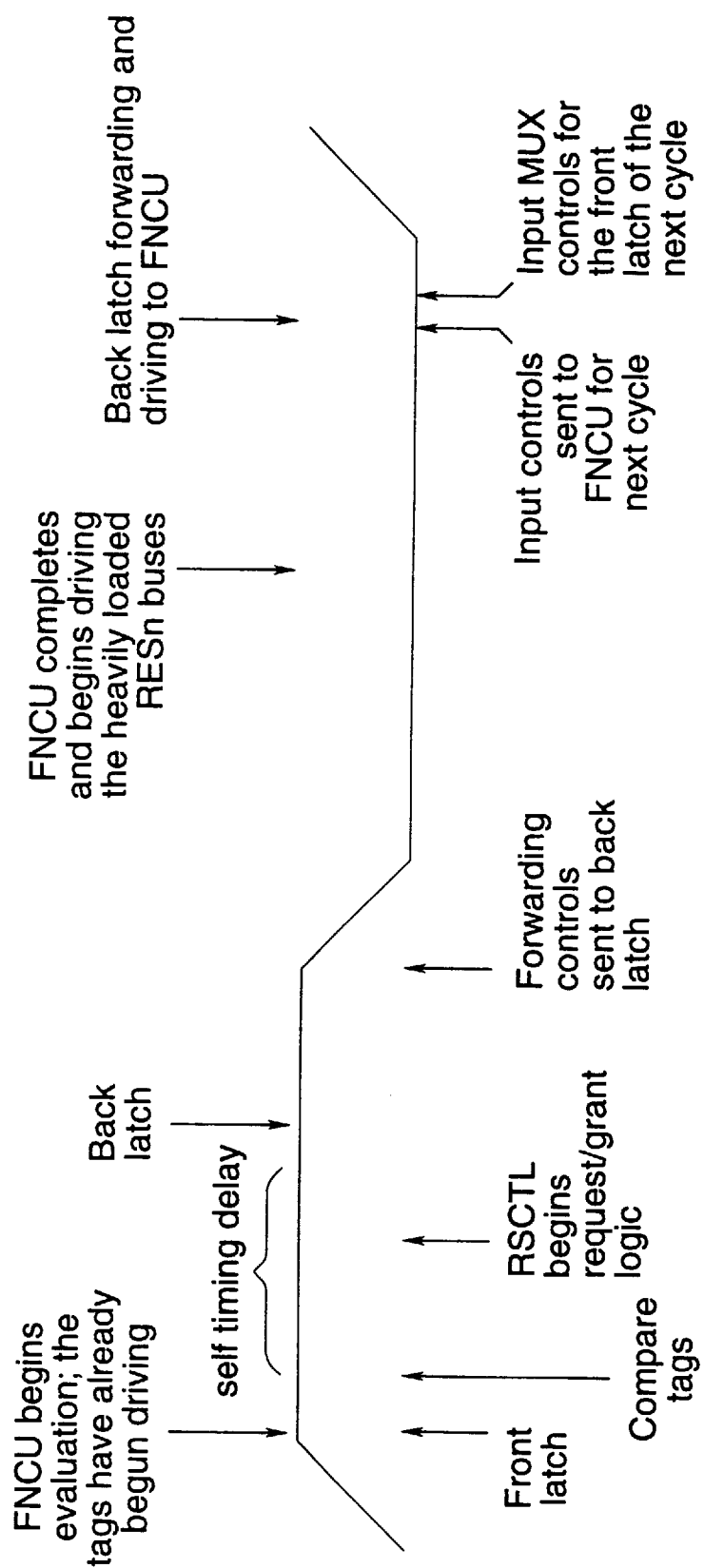

FIG. 50 is a reservation station timing diagram. Right after the front latch fires, a self timing circuit begins a timing delay before the back latch can latch in its data. The tags for an FNCU operation are sent out towards the end of the previous cycle; these are latched in at the beginning of the current cycle along with the new reservation station information. Then the tag comparisons begin to take place. The new information along with tag comparison matches from all three reservation stations goes to the RSCTL unit to begin the process of deciding which operation gets sent to the FNCU next cycle, which back latches need to receive forwarding operands, and how the front end MUXes will be set up for juggling operations around the reservation stations at the beginning of next cycle.

RESSTA0–RESSTA5 Blocks

Each of the Blocks, RESSTA0 through RESSTA5, is one of the 6 groups (one per issue position) of three reservation stations with their control logic RSCTL. During the 3rd ICLK, the stack cache and register file are accessed, the current line dependency checking takes place, and the LOROB dependency checking takes place. The following blocks drive the operand bus using the priority shown below:

1. LOROB—base pointer or stack pointer linear address hits in the LOROB, and the LOROB destination data is present. This will also hit in the stack cache, but the LOROB has higher priority.
2. Stack Cache/Register File—base pointer or stack pointer linear address hits in the stack cache or register tag accesses register file. If this hits in the LOROB, the LOROB will either drive the operand bus or the tag bus.
3. Linear address—base pointer or stack pointer linear address does not hit in the LOROB or in the stack cache; or is not allowed to hit in the stack cache (extremely rare: LOCKed) and does not hit in the LOROB.

RS2 Sub-Block

The RS2 reservation station is the only station connected to the operand steering unit. The operand steering unit can issue directly to the FNCU unit, but it has the lowest priority. When an opcode comes into RS2 from the operand steering unit, it stays here until it gets pushed over to the RS1 reservation station or gets issued to the FNCU. Of the three reservation stations, RS2 will always contain the most recent opcode in program order.

TABLE 41

Input Signal List for RS2.

| | |
|---|---|
| VATnI - | valid ATAG; indicates that forwarding is required to get the A operand data. |
| ATAGnI (5:0) - | the position n operand A tag sent to RS2. |
| VBTnI - | valid BTAG; indicates that forwarding is required to get the B operand data. |

TABLE 41-continued

Input Signal List for RS2.

| Signal | Description |
|---|---|
| BTAGnI (5:0) - | the position n operand B tag. |
| VFTnI - | valid flag tag; indicates that forwarding is required to get the flags. |
| FLGnIT (5:0) - | the position n flag tag. |
| AOPNDnI (31:0) - | the A operand for position n. |
| ABENnI (1:0) - | the byte enables for the A operand; 00: n/a; 01: byte; 10: word; 11: dword |
| BOPNDnI (31:0) - | the B operand for position n. |
| BBENnI (1:0) - | the byte enables for the B operand; 00: n/a; 01: byte; 10: word; 11: dword |
| FLGDnI (5:0) - | the actual flags for position n. |
| DTAGnI (2:0) - | the destination tag for position n; this indicates which LOROB line that the opcode was dispatch onto. |
| DSPRnI (31:0) - | displacement/relative value for RS2 at position n. |
| OPnI (7:0) - | opcode for R52 at position n. |
| VRSnI - | valid reservation station entry for position n. |
| AXBLACnI - | A or B side linear address calculation for position n. |
| RQLACnI - | request linear address calculation for position n; the tag associated with AXBnLAC2 must not be valid (i.e., must not be waiting for forwarding) in order to grant request. |
| OPTYPEnI (1:0) - | reservation station opcode type for position n going to RS2: 00: operation only. 01: load & operation 10: operation & store 11: load, operation, & store. |
| LSTAG0 (5:0) - | the LSSEC tag indicating which line_entry is going to be receiving its load data. If this tag matches DnTAG2 (2:0) concatenated with the position, the LSRES0 (31:0) value will be latched into the operand specified by AXBnLAC2 at the end of the cycle |
| LSRES0 (31:0) - | result data from LSSEC's load operation. |
| LSTAG1 (5:0) - | the LSSEC tag indicating which line entry is going to be receiving its load data. If this tag matches DnTAG2 (2:0) concatenated with the position, the LSRES1 (31:0) value will be latched into the operand specified by AXBnLAC2 at the end of the cycle |
| LSRES1 (31:0) - | result data from LSSEC's load operations. |
| DTAGn (2:0) - | LOROB line number (destination tag) for the result being generated at position n. If this result matches AnTAG2 (5:0) or BnTAG2 (5:0), RESn (31:0) will be latched to the corresponding A or B operand at the end of the cycle. (All six positions go to each reservation station) |
| RESn (31:0) - | results generated by FNCU n; (All six positions go to each reservation station) |
| RFLAGn (5:0) - | result flags from FNCU n operation; (All six positions go to each reservation station). |
| R2SHF - | RSCTL signal to shift in new contents into the front latch of RS2; otherwise, the front latch receives the old contents from the back RS2 latch. At the beginning of the next cycle, the front latch checks for tag matches right after it has latched its inputs (this includes tags from all FNCUs). |

TABLE 42

Output Signal List for RS2.

| Signal | Description |
|---|---|
| MnAT2 - | match on AnTAG2 (5:0). The forwarded data will be latched at the end of this cycle and the A operand is ready to be sent to the FNCU at the beginning of next cycle if FNCU request is granted. |
| MnBT2 - | match on BnTAG2 (5:0). The forwarded data will be latched at the end of this cycle and the B operand is ready to be sent to the FNCU at the beginning of next cycle if FNCU request is granted. |
| MnFT2 - | match on FLGnT2 (5:0). The forwarded data will be latched at the end of this cycle and the flags are ready to be sent to the FNCU at the beginning of next cycle if FNCU request is granted. |
| VnAT2 - | valid ATAG; indicates that forwarding is required to get the A operand data. |
| AnTAG2 (5:0) - | the position n operand A tag. |
| VnBT2 - | valid BTAG from the operand steering unit; indicates that forwarding is required to get the B operand data. |
| BnTAG2 (5:0) - | the position n operand B tag. |
| VnFT2 - | valid flag tag; indicates that forwarding is required to get the flags. |
| FLGnT2 (5:0) - | the position n flag tag. |
| AnOPND2 (31:0) - | the A operand for position n. |
| AnBEN2 (1:0) - | the byte enables for the A operand; 00: n/a; 01: byte; 10: word; 11: dword |
| BnOPND2 (31:0) - | the B operand for position n. |
| BnBEN2 (1:0) - | the byte enables for the B operand; 00: n/a; 01: byte; 10: word; 11: dword |
| FLGnD2 (5:0) - | the actual flags for position n. |
| DnTAG2 (2:0) - | the destination tag for position n; this indicates which LOROB line that the opcode was dispatch onto. |
| DSPnR2 (31:0) - | displacement/relative value for RS2 at position n. |
| OpnR2 (7:0) - | opcode for RS2 at position n. |
| VnRS2 - | valid reservation station entry for position n. |
| AXBnLAC2 - | A or B side linear address calculation for position n. |
| RQnLAC2 - | request linear address calculation for position n; the tag associated with AXBnLAC2 must not be valid (i.e., must not be waiting for forwarding) in order to grant request. |
| OPnTYPE2 (1:0) - | reservation station opcode type for position n. |
| 00: | operation only. |
| 01: | load & operation |
| 10: | operation & store |
| 11: | load, operation, & store. |

RS1 Sub-Block

FNCU requests from this reservation station receive the second highest priority after RS0.

TABLE 43

Input Signal List for RS1.

| Signal | Description |
|---|---|
| VnAT2 | valid ATAG; indicates that forwarding is required to get the A operand data. |
| AnTAG2(5:0) | the position n operand A tag. |
| VnBT2 | valid BTAG; indicates that forwarding is required to get the B operand data. |
| BnTAG2(5:0) | the position n operand B tag. |
| VnFT2 | valid flag tag; indicates that forwarding is required to get the flags. |
| FLGnT2(5:0) | the position n flag tag. |
| AnOPND2(31:0) | the A operand for position n. |
| AnBEN2(1:0) | the byte enables for the A operand; 00: n/a; 01: byte; 10: word; 11: dword |
| BnOPND2(31:0) | the B operand for position n. |
| BnBEN2(1:0) | the byte enables for the B operand; 00: n/a; 01: byte; 10: word; 11: dword |

TABLE 43-continued

Input Signal List for RS1.

| | |
|---|---|
| FLGnD2(5:0) | the actual flags for position n. |
| DnTAG2(2:0) | the destination tag for position n; this indicates which LOROB line that the opcode was dispatch onto. |
| DSPnR2(31:0) | displacement/relative value for RS2 at position n. |
| OpnR2(7:0) | opcode for R52 at position n. |
| VnRS2 | valid reservation station entry for position n. |
| AXBnLAC2 | A or B side linear address calculation for position n. |
| RQnLAC2 | request linear address calculation for position n the tag associated with AXBnLAC2 must not be valid (i.e., must not be waiting for forwarding) in order to grant request. |
| OPnTYPE2(1:0) | reservation station opcode type for position n. 00: operation only. 01: load & operation 10: operation & store 11: load, operation, & store. |
| LSTAG0(5:0) | the LSSEC tag indicating which line_entry is going to be receiving its load data. |
| LSRES0(31:0) | result data from LSSEC's load operation. |
| LSTAG1(5:0) | the LSSEC tag indicating which line_entry is going to be receiving its load data. |
| LSRES1(31:0) | result data from LSSEC's load operations. |
| DTAGn(2:0) | LOROB line number (destination tag) for the result being generated at position n. |
| RESn(31:0) | results generated by FNCU n; (All six positions go to each reservation station). |
| RFLAGn(5:0) | result flags from FNCU n operation; (All six positions go to each reservation station). |
| R1SHF | RSCTL signal to shift in new contents into the front latch of RS1; otherwise, the front latch receives the old contents from the back RS1 latch. At the beginning of the next cycle, the front latch checks for tag matches right after it has latched its inputs (this includes tags from all FNCUs) |

TABLE 44

Output Signal List for RS1.

| | |
|---|---|
| MnAT1 | match on AnTAG2(5:0). The forwarded data will be latched at the end of this cycle and the A operand is ready to be sent to the FNCU at the beginning of next cycle if FNCU request is granted. |
| MnBT1 | match on BnTAG2(5:0). The forwarded data will be latched at the end of this cycle and the B operand is ready to be sent to the FNCU at the beginning of next cycle if FNCU request is granted. |
| MnFT1 | match on FLGnT2(5:0). The forwarded data will be latched at the end of this cycle and the flags are ready to be sent to the FNCU at the beginning of next cycle if FNCU request is granted. |
| VnAT1 | valid ATAG; indicates that forwarding is required to get the A operand data. |
| AnTAG1(5:0) | the position n operand A tag. |
| VnBT1 | valid BTAG; indicates that forwarding is required to get the B operand data. |
| BnTAG1(5:0) | the position n operand B tag. |
| VnFT1 | valid flag tag; indicates that forwarding is required to get the flags. |
| FLGnT1(5:0) | the position n flag tag. |
| AnOPND1(31:0) | the A operand for position n. |
| AnBEN1(1:0) | the byte enables for the A operand; 00: n/a; 01: byte; 10: word; 11: dword |
| BnOPND1(31:0) | the B operand for position n. |

TABLE 44-continued

Output Signal List for RS1.

| | |
|---|---|
| BnBEN1(1:0) | the byte enables for the B operand; 00: n/a; 01: byte; 10: word; 11: dword |
| FLGnD1(5:0) | the actual flags for position n. |
| DnTAG1(2:0) | the destination tag for position n; this indicates which LOROB line that the opcode was dispatch onto. |
| DSPnR1(31:0) | displacement/relative value at position n. |
| OpnRl(7:0) | opcode for RS1. at position n. |
| VnRS1 | valid reservation station entry for position n. |
| AXBnLAC1 | A or B side linear address calculation for position n. |
| RQnLAC1 | request linear address calculation for position n; the tag associated with AXBnLAC2 must not be valid (i.e., must not be waiting for forwarding) in order to grant request. |
| OPnTYPE1(1:0) | reservation station opcode type for position n. 00: operation only. 01: load & operation 10: operation & store 11: load, operation, & store. |

RS0 Sub-Block

This reservation station contains the oldest possible opcode for this dispatch/issue position, and it receives highest priority for using the FNCU.

TABLE 45

Input Signal List for RS0.

| | |
|---|---|
| VnAT1 | valid ATAG; indicates that forwarding is required to get the A operand data. |
| AnTAG1(5:0) | the position n operand A tag. |
| VnBT1 | valid BTAG; indicates that forwarding is required to get the B operand data. |
| BnTAG1(5:0) | the position n operand B tag. |
| VnFT1 | valid flag tag; indicates that forwarding is required to get the flags. |
| FLGnT1(5:0) | the position n flag tag. |
| AnOPND1(31:0) | the A operand for position n. |
| AnBEN1(1:0) | the byte enables for the A operand; 00: n/a; 01: byte; 10: word; 11: dword |
| BnOPND1(31:0) | the B operand for position n. |
| BnBEN1(1:0) | the byte enables for the B operand; 00: n/a; 01: byte; 10: word; 11: dword |
| FLGnD1(5:0) | the actual flags for position n. |
| DnTAG1(2:0) | the destination tag for position n; this indicates which LOROB line that the opcode was dispatch onto. |
| DSPnR1(31:0) | displacement/relative value for RS2 at position n. |
| OpnR1(7:0) | opcode for RS2 at position n. |
| VnRS1 | valid reservation station entry for position n. |
| AXBnLAC1 | A or B side linear address calculation for position n. |
| RQnLAC1 | request linear address calculation for position n; the tag associated with AXBnLAC2 must not be valid (i.e., must not be waiting for forwarding) in order to grant request. |
| DPnTYPE1(1:0) | reservation station opcode type for position n. 00: operation only. 01: load & operation 10: operation & store 11: load, operation, & store. |
| LSTAG0(5:0) | the LSSEC tag indicating which line_entry is going to be receiving its load data. |
| LSRES0(31:0) | result data from LSSEC's load operation. |
| LSTAG1(5:0) | the LSSEC tag indicating which line_entry is going to be receiving its load data. |
| LSRES1(31:0) | result data from LSSEC's load operations. |

TABLE 45-continued

Input Signal List for RS0.

| | |
|---|---|
| DTAGn(2:0) | LOROB line number (destination tag) for the result being generated at position n. |
| RESn(31:0) | results generated by FNCU n; (All six positions go to each reservation station). |
| RFLAGn(5:0) | result flags from FNCU n operation; (All six positions go to each reservation station). |
| R1SHF | RSCTL signal to shift in new contents into the front latch of RS1; otherwise, the front latch receives the old contents from the back RS1 latch. At the beginning of the next cycle, the front latch checks for tag matches right after it has latched its inputs (this includes tags from all FNCUs). |

TABLE 46

Output Signal List for RS0.

| | |
|---|---|
| MnAT0 | match on AnTAG0(5:0). The forwarded data will be latched at the end of this cycle and the A operand is ready to be sent to the FNCU at the beginning of next cycle if FNCU request is granted. |
| NnBT0 | match on BnTAG0(5:0). The forwarded data will be latched at the end of this cycle and the B operand is ready to be sent to the FNCU at the beginning of next cycle if FNCU request is granted. |
| MnFT0 | match on FLGnT0(5:0). The forwarded data will be latched at the end of this cycle and the flags are ready to be sent to the FNCU at the beginning of next cycle if FNCU request is granted. |
| VnAT0 | valid ATAG; indicates that forwarding is required to get the A operand data. |
| AnTAG0(5:0) | the position n operand A tag. |
| VnBT0 | valid BTAG; indicates that forwarding is required to get the B operand data. |
| BnTAG0(5:0) | the position n operand B tag. |
| VnFT0 | valid flag tag; indicates that forwarding is required to get the flags. |
| FLGnT0(5:0) | the position n flag tag. |
| AnOPND0(31:0) | the A operand for position n. |
| AnBEN0(1:0) | the byte enables for the A operand; 00: n/a; 01: byte; 10: word; 11: dword |
| BnOPND0(31:0) | the B operand for position n. |
| BnBEN0(1:0) | the byte enables for the B operand; 00: n/a; 01: byte; 10: word; 11: dword |
| FLGnD0(5:0) | the actual flags for position n. |
| DnTAG0(2:0) | the destination tag for position n; this indicates which LOROB line that the opcode was dispatch onto. |
| DSPnR0(31:0) | displacement/relative value at position n. |
| OpnR0(7:0) | opcode for RS0. at position n. |
| VnRS0 | valid reservation station entry for position n. |
| AXBnLAC0 | A or B side linear address calculation for position n. |
| RQnLAC0 | request linear address calculation for position n; the tag associated with AXBnLAC2 must not be valid (i.e., must not be waiting for forwarding) in order to grant request. |
| OPnTYPE0(1:0) | reservation station opcode type for position n. 00: operation only. 01: load & operation 10: operation & store 11: load, operation, & store. |

RSCTL Sub-Block

RSCTL is the control logic block for all three reservation stations. It decides which reservation station has the highest priority to be issued to the FNCU, when the contents of a reservation station will be shifted down to the next station, and when all reservation stations are full.

DESCRIPTION OF FUNCTIONAL UNITS

Execute Stage

Figure 51:
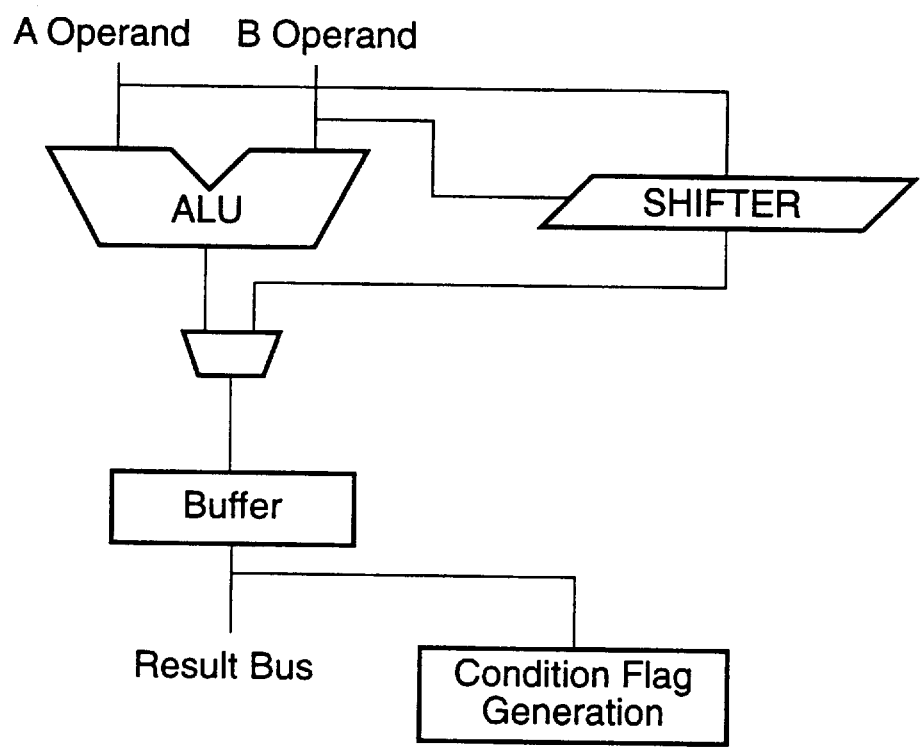

This section covers the functional unit (FNCU) which contains the ALU, branch evaluation, and shifter. FIG. 51 is a block diagram of a functional unit. Processor 500 has six identical functional units which each perform the standard ALU operations (ADD, ADC, SUB, SBB, OR, AND, and XOR) as well as the shifting and rotating operations (ROL, ROR, SHL/SAL, SHR, and SAR). RCL and RCR must be done using microcode. Processor 500 uses fully static ALUs. About 2.5 ns are expected to be used for the adder to evaluate.

ALU Sub Block

This sub-block is used for calculating linear addresses needed by the LSSEC, performing comparisons, and of course for computing arithmetic operations.

Shifter Sub Block

The FNCU contains a barrel shifter which shifts the A operand by the amount indicated on the B operand. This is a static shifter and will perform each of the shifting operations except RCL and RCR which are done using microcode.

Linear Address Handling

The FNCU can be requested to calculate a linear address using the displacement bus and either the A or B operand bus. The result is send to the LSSEC using the RES bus. This assumes that a segment with no offset is being used. When the segment offset needs to be added in, the LSSEC handles the addition.

Output Drivers (Buffers/MUX) Sub Block

This block multiplexes the output data from either the adder or shifter. The branch unit linear address calculation uses the adder. Some bits, ERESn(14:5), for the linear address are sent out to the data cache early while the entire result goes out on RESn(31:0) at the end of the cycle.

Condition Flags Sub Block

Six flags can be set in the FNCU: {C}-carry, {O}-overflow, and {P}-parity, {A}-auxiliary/adjust, {Z}-zero, and {S}-sign flags. Three flag groups are defined as follows: {C}, {O}, and {Z,S,A,P}. These flags should be generated at the end of the same cycle that the FNCU executes, and they should be sent out on their dedicated flag result bus at the beginning of the next cycle. The carry flag will simply be the carry out from cell 31, 15, or 7 based on operand size. The overflow is set based on a result being to large a positive number or too small a negative number to fit into the destination. The parity flag is luckily only the even parity on the lowest byte which should require about $2*\text{Order}(\log_2 n)$ =6 gate levels. The adjust flag is set based on carries from or borrows to the lowest nimble. The zero flag will probably be about 4 to 5 gate delays. The sign flag will just be a multiplex of the highest order bit (31, 15, or 7). These flags are latched by the LOROB at the beginning of the next cycle and forwarded to any FNCU looking for them.

Method of Sending Data Cache Linear Addresses to LSSEC

Linear address calculations that are not base pointer relative are handled as follows:

1) SIB will be held in dispatch until it can be reduced to one unknown value (either the base or index) and one other accumulated total (either base plus displacement or scaled index plus displacement. This stalling of the pipeline is required since there is only enough dependency checking and renaming to let "one" possible renaming occur per operand.

2) For a Load and Store, once the Load linear address is calculated by the functional unit this linear address is both saved for the subsequent store and also sent to the LSSEC for the Load.

In the case of a load, the reservation station remains valid and waits for the LSSEC to return the data. LATYPE indicates whether the RES bus contains a null, load, or store linear address. The LSSEC can do Loads in any order but must first check them with the Store buffer for any dependencies. Information (not shown) is sent from the decode/LOROB directly to the LSSEC to indicate the true store order, since the functional units (FNCU) may give stores to the LSSEC in out of order sequence.

Branching

The instruction fetch unit is using the branch prediction array to decide if a branch is taken or not taken, and the LOROB is keeping track of which is the latest branch in execution that is still speculative and needs to be converted to non-speculative for a correct prediction. Of course the next branch that evaluates to a misprediction will cause itself and all subsequent opcodes to be flushed. The functional units do not keep track of which way (taken or not taken) the instruction fetch unit had predicted a branch. The FNCU data path simply takes the EIP value from the A operand bus and the relative value from the B operand bus and adds them together and places the result on the RESLA bus. This operation starts only after the flags have been read in off the appropriate flag bus. In parallel with adding the branch linear address, the flags are evaluated in the FNCUCTRL block to determine if the jump is taken or not taken. If it is taken the RES bus bit 0 is set to a "1" (upper bits cleared) at the same time that the branch linear address is driven. If the branch is not taken the RESLA bus is still driven with the new branch linear address, but the RES bus bit 0 is set to a "0" (upper bits cleared) which indicates that the RESLA bus contains bogus data. The instruction fetch unit will either continue fetching new instructions according to its branch prediction array information, or it will load in the new linear address according to the LOROB signals. Since their can only be one new branch linear address loaded per cycle, the LOROB may send the instruction fetch unit a tag indicating that the next execution position to evaluate flags for branch determination will be "XXX" (e.g., FNCU3). The LOROB will also tell the instruction fetch unit that the branch was predicted as "T/NT". The very beginning of the next cycle the instruction fetch unit can XOP the predicted "T/NT" bit from the LOROB with the RES bus bit 0 to see if the branch was predicted taken. If this prediction was correct, the instruction fetch unit continues with its current fetching. Otherwise it loads the new linear address off of the RESLA bus according to the tag "XXX" (e.g., FNCU3) that the LOROB had sent it.

In some cases several branches will be evaluated during the same cycle. The LOROB only sends the tag for the oldest branch (program order). The instruction fetch unit only is concerned with the oldest branch for the coming cycle. Also in the coming cycle the LOROB will take the other branch evaluations that just completed (not including the oldest one going to the instruction fetch unit) and do several XOR with their predicted bits "T/NT" and the just latched FNCU RES bus position "0" bits. As an example: the oldest branch prediction sent to the instruction fetch unit had just passed being predicted correctly, and the LOROB detects that one of the other branch predictions that it just latched in from the FNCUs was mispredicted. The LOROB will send a tag to the instruction fetch unit indicating that the next linear address will come from the LOROB and will drive the new linear address from the LOROB to the instruction fetch unit next cycle.

Integer Multiplier

For the first pass design of the integer multiplier, the floating point 32×32 recoded Booth's multiplier will be used. This multiplier will be shared among the six integer functional units. The dispatch/decode unit will be responsible for only allowing 3 multiplies to be pending at a time. The multiplier unit will receive and buffer the 3 multiply line__entries directly from the dispatch/decode unit. As the reservation stations get all of the operands needed for the multiply, they will send there multiply request on the RES bus but not clear there reservation station until the multiplier indicates that it is accepted. Arbitration for the multiplier will be done on PH2 (not shown), and the operands will be driven from the reservation station directly into the multiplier MUXes during PH1.

TABLE 47

| Signals List - Inputs. | |
|---|---|
| FNCUGOn | functional unit go signal. |
| FNCUMUXn(3:0) | input MUX control from the reservation station to the functional unit: 0001: input from reservation station 0 0010: input from reservation station 1 0100: input from reservation station 2 1000: input from operand steering unit |
| AnOPND2(31:0) | the A operand for position n. |
| AnBEN2(1:0) | the byte enables for the A operand; 00: n/a; 01: byte; 10: word; 11: dword |
| BnOPND2(31:0) | the B operand for position n. |
| BnBEN2(1:0) | the byte enables for the B operand; 00: n/a; 01: byte; 10: word; 11: dword |
| FLGnD2(5:0) | the actual flags for position n. |
| DnTAG2(2:0) | the destination tag for position n; this indicates which LOROB line that the opcode was dispatch onto. |
| DSPnR2(31:0) | displacement/relative value for RS2 at position n. |
| OpnR2(7:0) | opcode for RS2 at position n. |
| VnRS2 | valid reservation station entry for position n. |
| AXBnLAC2 | A or B side linear address calculation for position n. |
| RQnLAC2 | request linear address calculation for position n; the tag associated with AXBnLAC2 must not be valid (i.e., must not be waiting for forwarding) in order to grant request. |
| OPnTYPE2(1:0) | reservation station opcode type for position n. 00: operation only. 01: load & operation 10: operation & store 11: load, operation, & store. |
| AnOPND1(31:0) | the A operand for position n. |
| AnBEN1(1:0) | the byte enables for the A operand; 00: n/a; 01: byte; 10: word; 11: dword |
| BnOPND1(31:0) | the B operand for position n. |
| BnBEN1(1:0) | the byte enables for the B operand; 00: n/a; 01: byte; 10: word; 11: dword |
| FLGnD1(5:0) | the actual flags for position n. |
| DnTAG1(2:0) | the destination tag for position n; this indicates which LOROB line that the opcode was dispatch onto. |
| DSPnR1(31:0) | displacement/relative value at position n. |
| OpnR1(7:0) | opcode for RS1. at position n. |
| VnRS1 | valid reservation station entry for position n. |
| AXBnLAC1 | A or B side linear address calculation for position n. |
| RQnLAC1 | request linear address calculation for position n; the tag associated with AXBnLAC2 must not be valid (i.e., must not be waiting for forwarding) in order to grant request. |
| OPnTYPE1(1:0) | reservation station opcode type for position n. 00: operation only. 01: load & operation |

TABLE 47-continued

Signals List - Inputs.

| | |
|---|---|
| | 10: operation & store |
| | 11: load, operation, & store. |
| AnOPND0(31:0) | the A operand for position n. |
| AnBEN0(1:0) | the byte enables for the A operand; 00: n/a; 01: byte; 10: word; 11: dword |
| BnOPND0(31:0) | the B operand for position n. |
| BnBEN0(1:0) | the byte enables for the B operand; 00: n/a; 01: byte; 10: word; 11: dword |
| FLGnD0(5:0) | the actual flags for position n. |
| DnTAG0(2:0) | the destination tag for position n; this indicates which LOROB line that the opcode was dispatch onto. |
| DSPnR0(31:0) | displacement/relative value at position n. |
| OpnR0(7:0) | opcode for RSO. at position n. |
| AXBnLAC0 | A or B side linear address calculation for position n. |
| RQnLAC0 | request linear address calculation for position n; the tag associated with AXBnLAC2 must not be valid (i.e., must not be waiting for forwarding) in order to grant request. |
| OPnTYPE0(1:0) | reservation station opcode type for position n. 00: operation only. 01: load & operation 10: operation & store 11: load, operation, & store. |

TABLE 48

Signals List - Outputs.

| | |
|---|---|
| RFLAGn(5:0) | result flags from this functional unit. |
| RESn(31:0) | functional unit results. |
| DTAGn(2:0) | destination tag indicating the LOROB line for this result. |
| ERESn(14:5) | early linear address calculation results which will be needed by the data cache |
| OPnRTYPE(1:0) | result type that will be generated by this functional unit. This lets the LOROB and the LSSEC know which part of the a load-op-store sequence the functional unit is at. 00: operation only. 01: load & operation |

Operand Steering

This section describes how the various operands, displacements, immediates, tags, and status bits are put together before sending the information to reservation station: RS2. Stack Cache access, LOROB access/renaming, register file access, and dependency checking are completed in the 3rd ICLK. During the 4th ICLK these various tags and data are sent to the operand steering unit which multiplexes and rearranges the information before sending it onto reservation station RS2. Since several units may be sending data/tags to the operand steering block at the same time, the priority table shows which unit's input gets used. For example, a linear address could hit in the stack cache, in the LOROB data section, in the LOROB dependency checking section, and in the current line dependency checking section all at the same time. Here the current line dependency checking section has highest priority.

FIG. 52 is a code sequence showing how the same instructions could receive tags/operands from different sources. It is noted that the 4th SUB example has a linear address that hits in the stack cache and is not overridden by the current line dependency checker or the LOROB data or LOROB dependency checker; the stack cache data is driven onto the AOPND bus. The 3rd SUB example is similar except the stack cache missed which caused the linear address to be driven onto the AOPND bus instead. The stack cache is on the operand 1 side (the 32 bit value side), while the operand 2 side is only for renaming register values. This operand 1 and 2 treatment allows us to have a separate array of 32 bit comparators for operand 1 and another array of 8 bit comparators for operand 2 located in the dependency checkers. The operand steering unit is responsible for swapping operand 1 and 2 to the correct operand A and B (used in the reservation stations) based on decode information for SUB, SUBR, mod/rm location, etc. There are three 32 busses (A operand, B operand, and displacement) which are inputs into the reservation station RS2. An immediate value would be sent to the reservation station via the AOPND or BOPND bus. A linear address would also be sent on the AOPND or BOPND busses (for stack cache miss) which allows the reservation station to look at the VDISP bit to detect that the linear address does not need to be computed for the stack cache miss and register indirect (not renamed) cases. For conditional branches operand A and the displacement contain the two 32 bit quantities which are needed to calculate the branch address, and operand B contains the condition codes. The flags are sent on the flag tag bus (FLG0T) or the flag data bus (FLG0D). The flag tag is from the decoder/dispatcher and tells which result flags to use. For example, the opcode for line1_entry2 generates a zero flag, and the opcode for line1_entry4 could be in a reservation station watching for 1_2 results to be broadcast from functional unit 2 (FNCU2). Once these flag results are latched in, the 1_4 opcode can then be sent from the reservation station to the FNCU to calculate the branch linear address and check the latched in flags against the branch condition codes.

Operand Bus

During the 3rd ICLK, the stack cache and register file are accessed, the current line dependency checking takes place, and the LOROB dependency checking takes place. The following blocks drive the operand bus using the priority shown below:

1. LOROB—base pointer or stack pointer linear address hits in the LOROB, and the LOROB destination data is present. This will also hit in the stack cache, but the LOROB has higher priority.

2. Stack Cache/Register File—base pointer or stack pointer linear address hits in the stack cache or register tag accesses register file. If this hits in the LOROB, the LOROB will either drive the operand bus or the tag bus.

3. Linear address—base pointer or stack pointer linear address does not hit in the LOROB or in the stack cache; or is not allowed to hit in the stack cache (extremely rare: LOCKed) and does not hit in the LOROB.

4. Branch information—EIP and condition codes.

Tag Bus

The ATAG and BTAG busses are used for renaming when the actual operand value is not available to be sent to the reservation station. The tag takes the form of six bits with the first three representing the LOROB line and the last three representing the LOROB entry that will hold the destination value. Since each functional unit can only drive its own dedicated result bus, the reservation stations will only need to compare for the LOROB line value on the first three bits of the corresponding result bus. The only exception is data for the LSRES1 and LSRES0 busses; the tag of the entry that made the load request is driven on the LSTAG0 or LSTAG1 busses. For example when the operation for LOROB line 2 entry 4 is waiting on the LSSEC for the load data, it will compare both the LSRES0 and LSRES1 busses for the 010_100 tag. Instead of watching for a tag from another FNCU, the reservation station is watching its own tag to be sent along with load data from the LSSEC.

The tag bus can be driven by either the current line dependency checking or by the LOROB dependency checking with the following priority.

1. Current line dependency checking—the current line dependency checker will detect when a source operand (current LOROB line) is dependent on a destination operand of one of the earlier entries on the same, current LOROB line. The line_entry tag of the destination is driven onto the tag bus of the source operand that had the dependency.
2. LOROB dependency checking—when a source operand (current LOROB line) is dependent on a destination operand of a LOROB line that was previously dispatched, the line_entry tag of the previously dispatched destination is driven onto the tag bus of the current source operand that has the dependency. This has a lower priority than a dependency detected by the current line dependency checking.

Operand Steering Block Signal List

The following list is about ⅙ the actual number of signals since only one dispatch position of the six is shown using n nomenclature for the positions (0–5).

TABLE 49

| Input Signals. | |
|---|---|
| SCnHIT | the stack cache hit on the linear address for operand 1 on dispatch position n |
| SCnDAT(31:0) | data from the stack cache for dispatch position n. |
| CLDCKnTAG1 | renaming is being done by the current line dependency checker to assign operand 1 a tag (used for forwarding) at dispatch position n. |
| CLnTAG1(5:0) | tag from current line dependency checker for renaming operand 1 position n. |
| CLDCKnTAG2 | renaming is being done by the current line dependency checker to assign operand 2 a tag (used for forwarding) at dispatch position n. |
| CLnTAG2(5:0) | tag from current line dependency checker for renaming operand 2 position n. |
| ROBDCKnTAG1 | renaming is being done by the LOROB dependency checker to assign operand 1 a tag (used for forwarding) at dispatch position n. |
| RBnTAG1(5:0) | tag from LOROB dependency checker for renaming operand 1 position n. |
| ROBDCKnTAG2 | renaming is being done by the LOROB dependency checker to assign operand 2 a tag (used for forwarding) at dispatch position n. |
| RBnTAG2(5:0) | tag from LOROB dependency checker for renaming operand 2 position n. |
| ROBDCKnDAT1 | data exists in the LOROB and will be sent to the operand steering unit for operand 1 position n. |
| RBnDAT1(31:0) | data from LOROB dependency checker for operand 1 position n. |
| ROBDCKnDAT2 | data exists in the LOROB and will be sent to the operand steering unit for operand 2 position n. |
| RBnDAT2(31:0) | data from LOROB dependency checker for operand 2 position n. |
| BRnOP | position n branch opcode which uses the AOPND bus for the EIP, the displacement bus for the relative offset, the FLGnT bus for the Flag Tag, and the BOPND bus for the condition codes. |
| RDnPTR1(31:0) | the operand 1 linear address or register tag for position n; used in the case of a stack cache miss. |
| RDnREG1(31:0) | the operand 1 register value for position n. |
| RDnREG2(31:0) | the operand 2 register value for position n. |
| DISPn(31:0) | the displacement/relative value for position n |

TABLE 49-continued

| Input Signals. | |
|---|---|
| OPCODEn(7:0) | the opcode sent from the decode unit for position n. |
| VFLGnD | valid data on the FLGnDAT bus. |
| FLGnDAT(5:0) | the actual flags for position n from the LOROB or the EFLAGS register |
| VFLGnT | valid tag on the FLGnTAG bus. |
| FLGnTAG(5:0) | the position n flag tag which identifies which result flags to watch for. |
| DESTAGn(2:0) | the destination tag for position n; this indicates which LOROB line that the opcode was dispatch onto. |

TABLE 50

| Output Signals. | |
|---|---|
| VATnI | valid ATAG from the operand steering unit; indicates that forwarding is required to get the A operand data. |
| ATAGnI(5:0) | the position n operand A tag sent to RS2 from the operand steering unit. |
| VBTnI | valid BTAG from the operand steering unit; indicates that forwarding is required to get the B operand data. |
| BTAGnI(5:0) | the position n operand B tag sent to RS2 from the operand steering unit. |
| VFTnI | valid flag tag from the operand steering unit; indicates that forwarding is required to get the flags. |
| FLGnIT(5:0) | the position n flag tag sent to RS2 from the operand steering unit. |
| AOPNDnI(31:0) | the A operand sent to RS2 and to the FNCU from the operand steering unit for position n. |
| ABENnI(1:0) | the byte enables for the A operand; 00: n/a; 01: byte; 10: word; 11: dword |
| BOPNDnI(31:0) | the B operand sent to RS2 and to the FNCU from the operand steering unit for position n. |
| BBENnI(1:0) | the byte enables for the B operand; 00: n/a; 01: byte; 10: word; 11: dword |
| FLGDnI(5:0) | the actual flags for position n sent to RS2 from the operand steering unit. |
| DTAGnI(2:0) | the destination tag for position n; this indicates which LOROB line that the opcode was dispatch onto. |
| DSPRnI(31:0) | displacement/relative value for RS2 at position n from the operand steering unit. |
| OPnI(7:0) | opcode for RS2 at position n from the operand steering unit. |
| VRSnI | valid reseryation station entry for position n from the operand steering unit. |
| AXBLACnI | A or B side linear address calculation for position n input to RS2 |
| RQLACnI | request linear address calculation for position n input to RS2; the tag associated with AXBnLAC2 must not be valid (i.e., must not be waiting for forwarding) in order to grant request. |
| OPTYPEnI(1:0) | reservation station opcode type for position n going to RS2: 00: operation only. 01: load & operation 10: operation & store 11: load, operation, & store. 10: operation & store 11: load, operation, & store. |

DESCRIPTION OF LOAD-STORE SECTION

The load store section can perform single-cycle accesses of two memory based operands. It can also perform out-of-order loads requested by the functional units. The stores always go in order and are performed as pure writes, rather than read-modify-writes. The data cache is a linear cache, dual ported for the two concurrent accesses, 16/32 KB 8-way set associative with way prediction.

Figure 53:
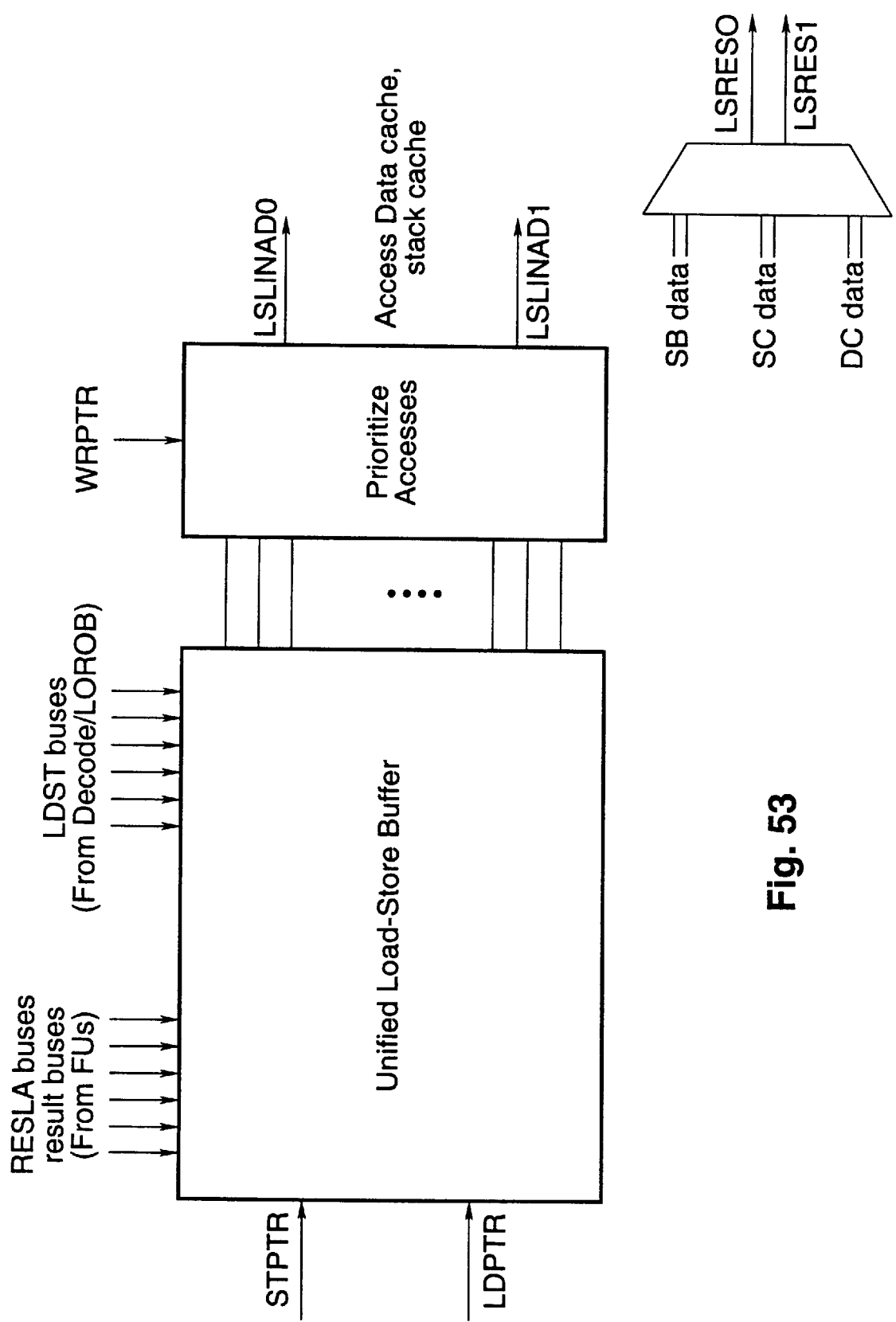

FIG. 53 is a block diagram of the load/store section. The load/store section includes a unified load-store buffer. The information on whether an instruction is a load or a store is sent to the LSSEC by the decode unit. The linear address and data are computed by the functional units and sent to the LSSEC on the RESLA and result buses. The load/store unit then performs two data cache accesses. The loads sent out may be out-of-order, but the stores are always in order. The unified load-store buffer is 16-entries deep with the stores updated from the top and the loads from the bottom of this buffer.

The unit keeps track of the loads and stores using two pointers—LDPTR and STPTR. The buffer can accept up to six instructions per cycle.

Other features include:
* Unaligned accesses have a one cycle penalty (2-cycle latency). Unaligned accesses at the line boundary have a latency of 3 cycles.
* One scheme supports non-blocking loads.

Unified Load-Store Buffer (LDSTBUF)

The loads and stores are buffered up in a common queue, which is referred to as the unified load-store buffer. A unique feature of this buffer is that the loads fill up from one end (bottom) and the stores from the other (top). Two pointers keep track of the latest load and store instruction. The earliest load is at entry 15, while the earliest store is at entry 0. Load-op-store type of instructions take up two entries.

The advantages of this scheme over a scheme where the loads and stores are buffered up in different queues include:
1. Efficient utilization of space due to which the dispatch would stall based on the total number of loads and stores as opposed to the no. of loads or no. of stores in the conventional method.
2. Also, since communication is between the decode unit and load-store section, the functional units would never stall. They can keep executing the instructions in their reservation stations.
3. The order of loads and stores are known since they are dispatched directly to the load-store section, instead of going through the functional units which could send requests out of order.

Figure 54:
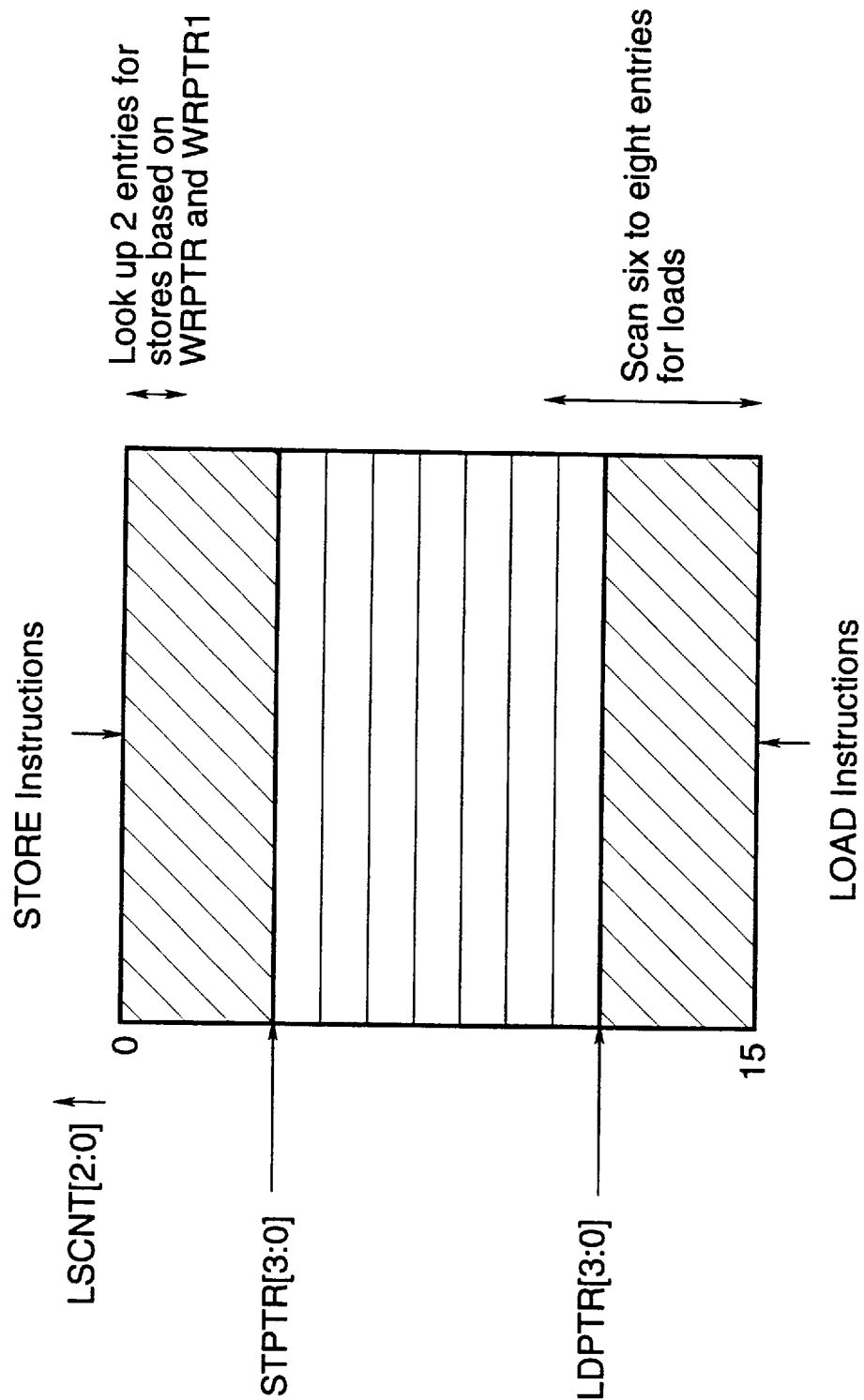

FIG. 54 is a block diagram of the unified load-store buffer. It is 16 entries deep with LDPTR and STPTR keeping a track of the loads and stores. STPTR is never equal to or greater than LDPTR. FIG. 55 is a block diagram of a load-store buffer entry. Each entry in the buffer is broken down into three fields. The first field is made up of the LOROB instruction tag and the instruction type (load, store or load-op-store). The source of updates for this field is the decode unit /LOROB. The second field has the linear address and store data and the associated valid bits, the update source being the functional units. The third field is made up of some control information (for e.g. M bit indicating that this entry missed in the data cache on a prior access, D bit indicating that the load in the entry is dependent on a store in the buffer), the update source being the load-store section itself.

LSCNT[2:0] indicates to the decode unit the no. of free entries in the buffer so that decode can take the necessary action. It is the difference between LDPTR and STPTR.

Updating the entries

Figure 56:
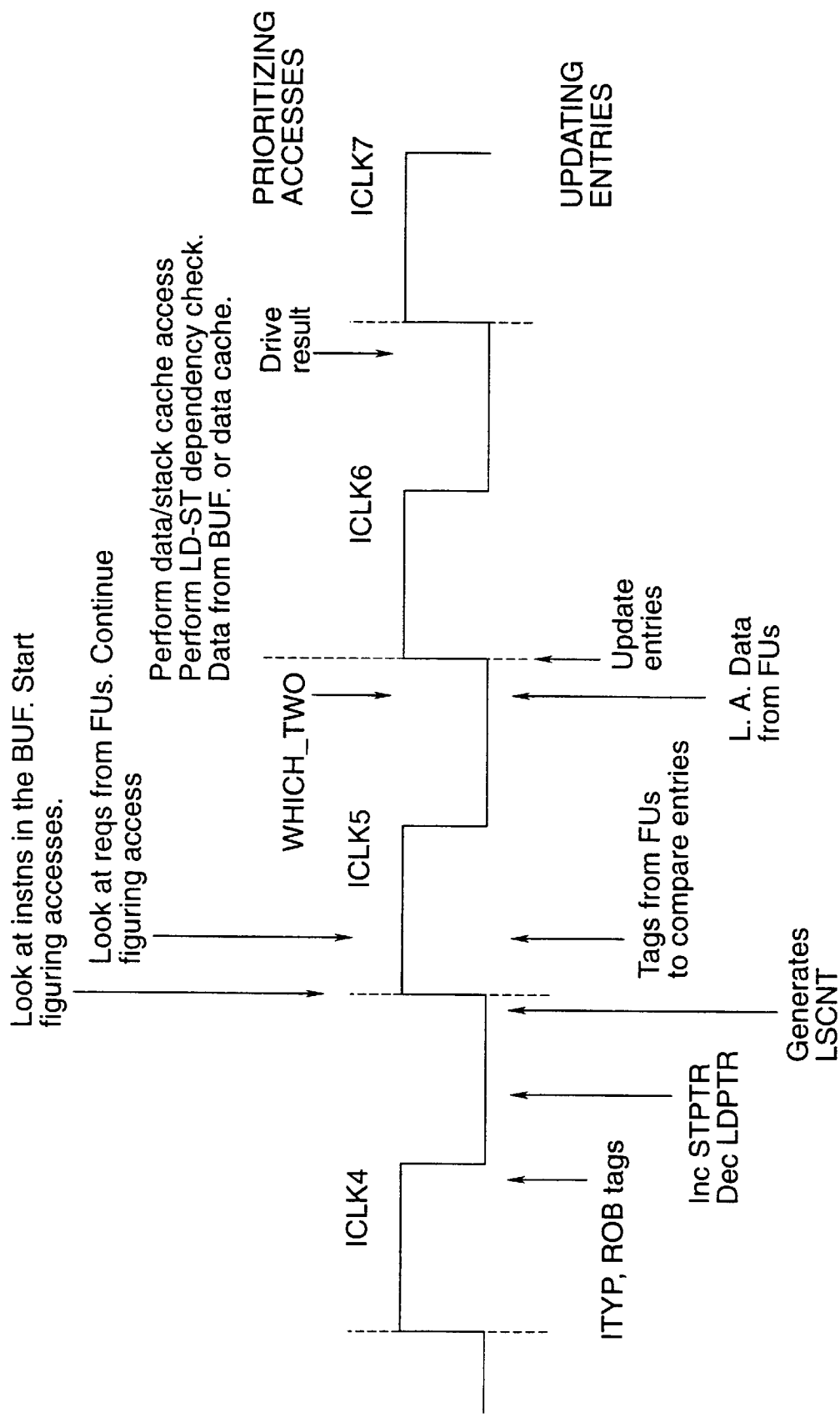

FIG. 56 is a timing diagram showing when the different fields in each entry of the buffer are updated. The instruction types (ITYPnB[1:0]) and LOROB tags (DTAGnB[2:0]) are sent in the 4th ICLK; the corresponding multiplexer select lines are generated and the entries updated. In addition, the STPTR and LDPTR are incremented/decremented and by the end of that cycle LSCNT[2:0] is generated. At the beginning of the 5th ICLK, the functional units send the tags of the instructions they are currently processing. The LSSEC looks up at the tags information from the functional units, compares against the DTAG information in the LDSTBUF and sets up the appropriate multiplexer select lines to latch in the linear address and store data. Also, the corresponding valid bits (LV and DV) are set up at this point so that they can be latched in when the address and data get latched in on the rising edge of 6th ICLK. The load-store section then accesses the data-cache, stack-cache and the LDSTBUF entries.

Prioritizing the accesses

The accesses to be performed sit in the unified load-store buffer with or without the linear addresses and store data. The load-store section must be able to forward the linear addresses from the functional units for data cache accesses. In the worst case, the LSSEC has to scan eight to ten entries in the buffer to figure out which two need to access the data cache. In general, the processing of instructions may be prioritized according to the following:

1. Misses and stores have the highest priority. They are processed as soon as they are known to be non-speculative. The reason that the stores have higher priority over loads is because of the line-oriented nature of the reorder buffer and we would want to retire instructions as quickly as possible.
2. Loads can go out of order. The result can come back from the data cache, stack cache or the unified load-store buffer from stores that have not been retired.

The data cache, stack cache and LDSTBUF are accessed at the same time. The results are returned on the dedicated load-store result buses LSRES0 and LSRES1.

Data Cache Accesses

The datacache accesses are performed through the LSLINAD0 and LSLINAD1 buses. LSLINAD0 is connected to port A and LSLINAD1 is connected to port B of the data cache. The results are returned on LSRES0 and LSRES1 buses. The store data is driven on the LSRES0 or LSRES1 bus.

Hits

Bits 14:0 of the linear address are presented to the data cache at the rising edge of ICLK6. The array is accessed and the tag is compared with the upper 17-bits of the linear address to generate the hit signal. The value can be driven to the functional units prior to the hit being generated. If there is no hit, the functional unit can be stopped in the next cycle.

Handling Misses

If there is a miss, the M bit (Miss) in the entry is set so that the load/store section based on the WRPTR information figures out whether the instruction is non-speculative and decides when to go external to fetch the data. As the L2 sends the appropriate block to the dcache, the result is grabbed directly from the block to be written and placed on the result bus. There is no handshaking between LSSEC and LOROB.

Canceling entries

When CANENTRY (associated with WRPTR) or CANENTRY1 (associated with WRPTR1) is asserted, the load-store section keeps returning bogus data on LSRES0 and LSRES1 buses until all the entries in the LDSTBUF are cleared.

Unaligned Accesses

Unaligned loads are performed as 2-cycle single port accesses. When a load access is unaligned, the LSSEC splits that access into 2 single port accesses and issues them in two separate cycles to the data cache. Another aligned load or store can accompany the access on the other port. In the first cycle as the first half of the access is going on, the address is incremented by 4 and in the second cycle, the other half of the access can be performed. The merging is done by the LSSEC.

Performing unaligned stores have a problem if they cross lines. If one access hits and the other misses, and if a fault occurs while processing the miss, it could leave the processor in an undesirable state. The safest and probably easiest approach is to let the LSSEC perform a dual port access so that if any of the two accesses misses, the other is canceled and is performed only after the line is brought in.

Checking for unaligned accesses

To figure out whether an access is unaligned or not, the LSSEC looks at the least significant two bits of LSLINAD0 and LSLINAD1 and the corresponding data operand sizes. An access is unaligned if the operand size is 32-bits and any one of the two least significant address bits is set or if the operand size is 16 bits and both the least significant bits of the linear address are set.

Aliasing problem and solution

The data cache is a linear cache with two ports. There is a potential that two or more linear addresses map to the same physical address (aliasing). There can never be more than one location in the data cache for a physical address. The problem is with the loads going out-of-order. The load with linear address LA1 has the potential of going out-of-order and if that location exists in the data cache, it hits and returns the result. A store with linear address LA2 ahead of the load might be mapped to the same physical address. Then, the result that the load returned is wrong since the load was not able to see the dependency. One solution to this problem is, if on a load/store miss the PIT reports an alias, to let the LSSEC signal LOROB to flush all instructions after that load/store. The data cache and stack cache have to update their tags with the new tag.

Non-blocking loads

The gap between microprocessor and memory speeds is widening with every new generation of microprocessors. This speed discrepancy can impact performance if the load-store section of the processor stalls whenever a data cache miss occurs. To prevent stalling of the load-store section, loads in the buffer can access the data cache as any miss is being processed. The following describes a method that processor 500 uses to perform non-blocking loads.

Load and store instructions are sent to a unified load-store buffer. Each entry in this buffer has a bit M that indicates if the load or store in the entry missed on a prior access. Whenever a data cache access misses, the M bit (miss) is set in the entry. Since the processor allows speculative execution, the miss cannot be processed immediately. It can be processed only when the instruction is no longer speculative. In conventional implementations, when a miss is being processed, loads or stores in the queue are held up till the miss gets resolved. Here, load accesses are performed as the miss is being processed.

The load-store section invalidates the line in the data cache and requests the Physical Tags (PT) to perform an external access to process a miss. The PT goes external and takes a long time before it can fetch the line of interest. The fetched line comes in packets of 64 bits over the data bus to PT which in turn sends the packet over to the data cache. The data cache latches the packets in a local buffer (BUF1). In the mean time, the load-store section can keep sending load accesses to the data cache. If the accesses hit in the cache, the results are returned. If an access misses, the M bit for that entry is set and the remaining loads in the buffer can be sent to the data cache. Once the data cache receives the entire line from PT, it initiates the reload sequence. This reload sequence involves reading the line to be replaced into another local buffer (BUF2) and then updating, the fine and tag with the contents of BUF1. When it performs the line write, the load-store section clears the M bit for all the entries in the LDSTBUF so that if any of the accesses missed on the line that was being brought in, it need not go external again. If the line in BUF2 is dirty, the load-store section initiates an external write cycle through the PT.

Possible scenarios of load/store data cache accesses:

Port A:
  Reloads from Physical Tags (PT)
  Accesses from LSLINAD0
  Drives result on LSRES0
Port B:
  Reload invalidations
  Accesses from LSLINAD1
  Drives result on LSRES1

Before accessing the data cache, the load-store section check for bank conflicts and unaligned accesses. If there is a bank conflict, the load-store section will issue only one access. This is transparent to the data cache.

Port A—load, Port B—load
Port A hit, port B hit—Complete both accesses
Port A miss, port B hit—Complete Port B access
Port A hit, port B miss—Complete Port A access
Port A miss, port B miss—Mark entries as misses
Port A access unaligned—Perform access. Ignore port B access. Take penalty.
Perform Port B access in a later cycle.
Port B access unaligned—do not perform access
Port A—store, Port B—load
Port A hit, port B hit—Complete both accesses
Port A miss, port B hit—Complete Port B access
Port A hit, port B miss—Complete Port A access
Port A miss, port B miss—Serialize
Port B access unaligned—do not perform access
Port A—load, Port B—store Same as the previous case.
Port A—store, Port B—store The ROB provides two signals—the current instruction (store) to be retired and WRPTR—the next store in the current line that can be retired. By looking at this information, the LSSEC should be able to perform two simultaneous stores to the dcache.

Port A hit, port B hit—Complete accesses
Port A miss, Port B hit—Complete Port B access
Port A hit, Port B miss—Complete Port A access
Port A miss, Port B miss—Serialize
Port B access unaligned—do not perform access

Checking for bank and index conflicts

Any two concurrent accesses to the data cache cannot be to the same bank. Therefore, the LSSEC must determine if there is a bank conflict and cancel the port B access and issue it in the next cycle. Since the tag array is also dual ported, the data cache needs information if two concurrent accesses are to the same index.

Bank Conflict: DCDBNKCT is driven high if LSLINAD0 [4:2]=LSLINAD0[4:2]
Index Conflict: DCDINDCT is driven high if LSLINAD [11:5]=LSLINAD0 [11:5]

Also for the way prediction array, which is also dual ported, another signal DCWAYCT is driven if LSLINAD1[14:5]=LSLINAD0[14:5]

Serialization conditions a) Miss—Any entry that misses has to wait for WRPTR from LOROB to compare against its tag before it can go external.
b) Stack Cache Hit and the write bit (W) is set—This means that the data is in the LOROB. In this case the LSSEC signals LOROB that it came across this condition and waits till LOROB retires all the instructions up to that load instruction.
c) Store address match—Wait for store data.
d) Store address match, data ready but of diff size—wait till the store is done.
d) Store linear address not ready—wait for store linear address.

Dependency Checking against stores in the buffer

When the load-store section performs data cache/stk cache accesses, it also performs dependency checking against the stores in the store buffer. Bits 9:0 of the linear addresses are compared against the corresponding bits of the linear addresses of all the stores prior to the load. If the addresses match, the data of the latest store to that address is forwarded on to the result bus. To perform dependency checking and forward the store data, the load-store section has one whole cycle. In the following cycle, the rest of the bits (31:10) are compared. If this compare fails, the LSSEC signals LOROB and the functional units to cancel that result just the way the data cache does and the LSSEC serializes that load. The advantage of using 10-bit comparators as against 32-bit comparators is the obvious reduction in hardware and increase in speed. On the condition that the addresses match and the operand sizes are different, that load is serialized.

Figure 57:
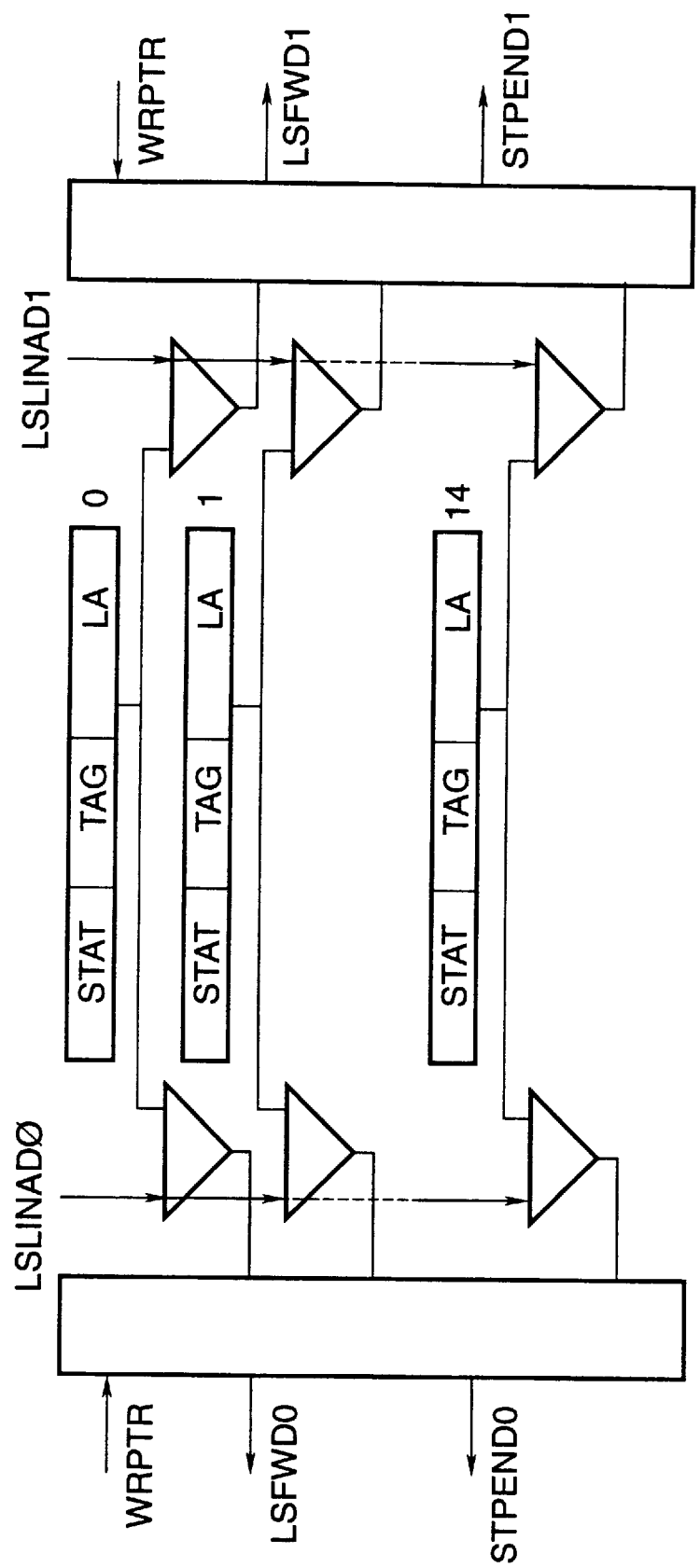

FIG. 57 is a block diagram which illustrates store data forwarding for loads.

Special Registers (LSSPREG)

Special Registers in the load store section include the segment registers and the debug registers. The linear addresses that are generated by the functional units do not account for the segment base. If the appropriate segment base is not zero, it has to be added to the result generated by the functional units. In the case of non-zero segment base, we take an extra clock cycle to compute the linear address. The adders to generate the linear address and the limit checking comparators are in the LSSPREG block.

The LSSEC maintains all the segment registers and their invisible portion—the 8-byte descriptor. The segment registers can be loaded using a load instruction with the selector value as the operand. The special registers are summarized below:

| CS   | Selector, | CSDES.HI,   | CSDES.LO   |
|------|-----------|-------------|------------|
| SS   | Selector, | SSDES.HI,   | SSDES.LO   |
| DS   | Selector, | DSDES.HI,   | DSDES.LO   |
| ES   | Selector, | ESDES.HI,   | ESDES.LO   |
| FS   | Selector, | FSDES.HI,   | FSDES.LO   |
| GS   | Selector, | GSDES.HI,   | GSDES.LO   |
| LDTR | Selector, | LDTRDES.HI, | LDTRDES.LO |
| TR   | Selector, | TRDES.HI,   | TRDES.LO   |
| TEMP | Selector, | TEMPDES.HI, | TEUTDES.LO |

All of the above have BASE, LIMIT and A=fields within their descriptor M and LO fields and can be read independently.

| GDTR | BASE,    | LIMIT   |
|------|----------|---------|
| IDTR | BASE,    | LIMIT   |
| FPDP | FPDP.HI, | FPDP.LO |
| CAR  |          |         |
| DR0  |          |         |
| DR1  |          |         |
| DR2  |          |         |
| DR3  |          |         |
| DR7  |          |         |

The SRB can access all the following fields: DESC.HI, DESC.LO, LIMIT, ATTR, BASE, SELECTOR.

In addition to the instruction type information, the decode unit should send additional control bits to the load-store section directly as summarized below. The information is to let the LSSEC know which segment is being accessed, the type of protection checks that need to be performed, etc. An assumption is that there are six buses INSLSNB[7:0] that supply this information. The following are the possible encodings.

In addition, the LSSEC needs three bits of information communicated by the microcode about flavors of segment loads, type of protection checking, reporting of error codes, etc.

Segment Loads

CS loads

| 000 | Normal segment load for a far jump, call, mov, etc. |
| 001 | due to selector from call gate when executing jmp instruction. |
| 010 | due to selector call from call gate when executing call instruction. |
| 011 | due to selector from task gate. Should not result in another gate. Should be type TSS. |
| 100 | Selector from RET instruction. |
| 101 | Selector from IRET instruction. |
| 110 | Selector from INT instruction. |
| 111 | This is used when loading selectors from TSS on a task switch. |

SS loads

| 001 | Selector from TSS. This is used when performing SS load on a privilege level change using a selector that has been read out of TSS. |
| 111 | Report errors as TSS faults as selector came from TSS. |

DS, ES, FS, GS, LDTR, TR

| 111 | Report errors as TSS faults as selector came from TSS. |

TR loads

| 001 | All busy checks are done by microcode when performing task switches. However, when loading TR using LTR instruction, the busy check has to be done by LSSEC. |
| 000 | This is the normal TR load. No busy checks. When performing task switches. |

General loads and stores

| 010 | When these operations are performed, report CPL as zero to DCACHE and TLB so that they can do page level protection checking using CPL of 0 instead of CURCPL. |
| 001 | AU pushes and pops of copying parameters, when switching stacks, will report errors as TSS faults. |
| 011 | Ignore alignment checking. |
| 110 | Used in CMPXCHG8B routine. |

IDT loads

| 001 | This switch indicates that the MT lookup was initiated by a software interrupt and the DPL and CPL checks should be done. |
| 010 | When these operations are performed, report CPL as zero to DCACHE and TLB so that they can do page level protection checking using CPL of 0 instead of CURCPL. |

Limit Checking

The limit checking is done in the LSSPREG section. The following information is needed to perform limit checking.

* Data size—byte, word, dword, 64 bits, 80 bits.
* PE, VM bits.
* D, G, ED from the descriptor.

Protection checking logic is also in this block.

Microcode Support

The Special Register block contains the segment and debug registers. Also segment limit and protection checking are performed here.

Microcode Interface.

Interface to Physical Tags.

Floating Point Unit Interface.

TABLE 51

Signal List.

IRESET Input from LOROB
  Global reset signal. Clears all LDSTBUF entries. Puts the control state machine to idle/reset state.
ITYPEnB[1:0] Input from STK CACHE n = O, I . . ., 5
  These buses give the type of instructions dispatched.
  00  NULL
  01  LOAD
  10  STORE
  11  LOAD-OP-STORE
RLINE[2:0] Input from LOROB
  These buses give the LOROB line number associated with the instructions dispatched.
WRPTR[5:0] Input from LOROB
  This gives the line and entry numbers of the instruction that is ready to get retired.
WRPTR1[5:0] Input from LOROB
  This gives the line and entry numbers of the next store in a LOROB line that can be retired with another store. This aids in sending out two store accesses.
CANENTRY Input from LOROB
  This bit says that all entries after the instruction pointed to by WRPTR have to be invalidated.
CANENTRY1 Input from LOROB
  This bit says that all entries after the instruction pointed to by WRPTR1 have to be invalidated.
LSCNT[2:0] Output to DECODE
  Number of free entries in the LDSTBUF. Decode can make use of this information and dispatch instructions accordingly.
LSRES0[31:0] Output to FNCU/LOROB/DCACHE
  Result bus returning results for AC0. The intermediate results for load-op-store instructions are indicated by the LSSTAT0B bus. The result bus also has the store data for stk cache and data cache stores.
XLSRES0[31:0] Output to FNCU/LOROB/DCACHE
  The inverse of LSRES0B. The differential buses are used for speed.
LSRES1[31:0] Output to FNCU/LOROB
  Result bus returning results for AC1 The intermediate results for load-op-store instructions are indicated by the LSSTAT1B bus. The result bus also has the store data for stk cache and data cache stores.
XLSRES1[31:0] Output to FNCU/LOROB/DCACHE
  The inverse of LSRES1B. The differential buses are used for speed.
LSTAG0B[5:0] Output to FNCU/LOROB
  This gives the tag of the instruction returned on LSRES0B.
LSTAG1B[5:0] Output to FNCU/LOROB
  This gives the tag of the instruction returned on LSRES1B.
LSSTAT0B[2:0] Output to LOROB/FNCU
  Status of the result returned on LSRES0B. Encodings are not defined yet. One of the encodings indicates whether a result is intermediate.
LSSTAT1B[2:0] Output to LOROB/FNCU

TABLE 51-continued

Signal List.

Status of the result returned on LSRES1B. Encodings are not defined yet. One of the encodings indicates whether a result is intermediate.
LSLINAD0[31:2] Output to DCACHE/Stk Cache/LOROB
  The linear address which would be sent as the port A access to the data cache and stack cache. If the access hits in the stk cache and the 'R' or 'W' bit is set, the LOROB looks at this information to take the necessary action.
LSLINAD1[31:2] Output to DCACHE/Stk Cache/LOROB
  The linear address which would be sent as the port B access to the data cache and stack cache. If the access bits in the stk cache and the 'R' or 'W' bit is set, the LOROB looks at this information to take the necessary action.
IAD[63:0] Output to L2
  The information on stores is sent on this bus to L2. The store information has to go to L2 since it has the control information (WT and multiprocessing information).
BYTEN[3:0] Output to Dcache/Stk Cache
  The byte enables saying which of the bytes in a bank are being accessed.
RESLAnB[31:0] Input from FUn n = O, I, . . ., 5
  Linear addresses from the functional units. The result buses are slow. The linear addresses need to come to the LSSEC faster so that it can perform two accesses at the end of the cycle. If needed, the bus width can be reduced to 14 bits - so that the cache indexing can be done. 'Me rest of the bits can be grabbed from the result buses.
RESnB[31:0] Input from FUn n = O, 1, . . ., 5
  The store data is driven on the result buses by the functional units.
RTAGnB[2:0] Input from FUn n = O, I, . . ., 5
  This gives the ROB line number of the instruction that the FU is processing.
LATYPEnB[1:0] Input from FUn n = O, I, . . ., 5
  00  Null
  01  Address is driven by the functional unit on the RESLA bus
  10  Data is driven on the result bus by the functional unit
DCINDXCT Output to DCACHE
  This indicates if there is an index conflict for the two concurrent data cache accesses to be performed.
DCBNKCT Output to DCACHE
  This indicates if there is a bank conflict for the two concurrent data cache accesses to be performed.
DCWAYCT Output to DCACHE
  This indicates if there is an index conflict in the way prediction array for the two concurrent accesses to be performed.

Partitioning of LSSEC

The load-store section is partitioned into the following blocks:

1. LDSTDAT—The store data array.
2. LDSTADR—The array having the address portion of the load-store buffer. It also contains the dependency checking logic for store data forwarding.
3. LDSTSTAT—Array holding the status information. The status information is looked at mostly by the control unit.
4. LDSTTAGS—Array containing the instruction tags. This array is updated by the decode unit and the information is needed to update LDSTDAT and LDSTADR blocks and to perform dependency checking.
5. LSSPREG—Array of segment registers. The details of this block have yet to be thought out.
6. LSCTL—The load-store section control block.

Layout of LSSEC

Figure 58:
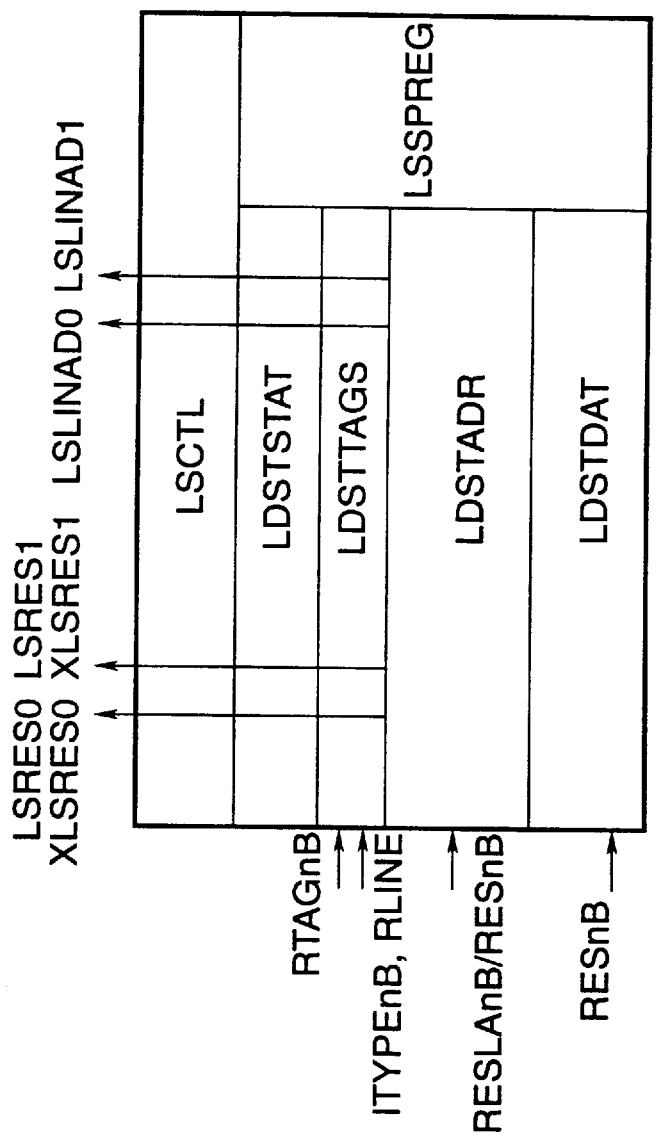
Figure 59:
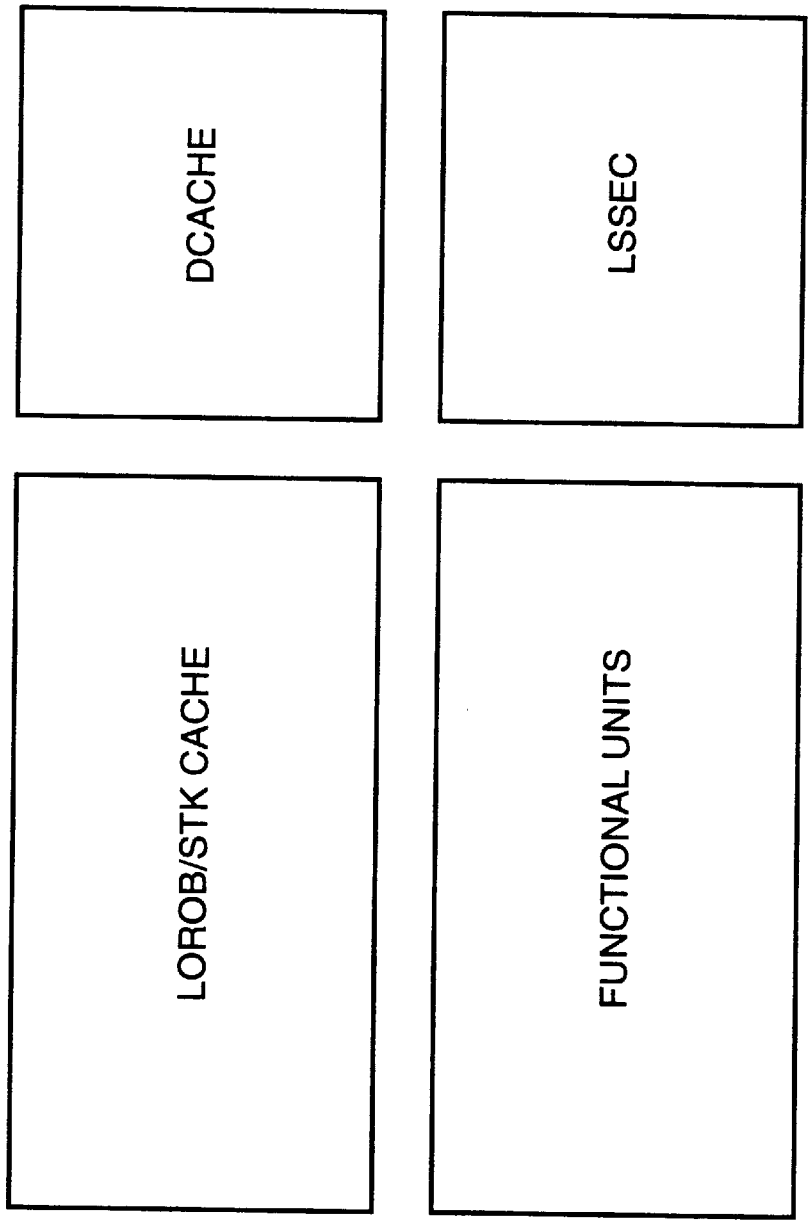

FIG. 58 shows a layout configuration of the LSSEC. LDSTDAT, LDSTADR, LDSTTAGS and LDSTSTAT constitute the unified load-store buffer (LDSTBUF). FIG. 59 shows the relative position of the LSSEC with respect to other units.

LDSTDAT (The array containing the store data)

This array contains the store data. There are sixteen entries of 32-bits each. The sources of updates to this array are the functional units. The array looks at the LATYPE signal which indicates whether address or data is driven on the result bus. The control section indicates which of the entries need to be updated (LSUPD[15:0]). LSRDDAT0 [15:0] and LSRDDAT1[15:0] indicate which of the two entries go out as accesses for stores. LSFWD0[15:0] LSFWD1[15:0] indicate as to which entries need to get forwarded over to LSRES0 and LSRES1 buses.

TABLE 52

Signal List.

RESnB[31:0] Input from FUn n = 0, 1, . . ., 5
    The result buses from the functional units.
LATYPEn[1:0] Input from FUn n = 0, 1, . . ., 5
    The type signal indicating whether address or data is driven on the bus
        00 - Null
        01 - address
        10 - data
LSUPD[15:0] Input from LDSTTAGS
    The update signals after comparing the tags.
LSRDDAT0[15:0] Input from LSCTL
    Indicates which of the entries must go out as AC0 for stores.
LSRDDAT1[15:0] Input from LSCTL
    Indicates which of the entries must go out as AC I for stores.
LSFWD0[15:0] Input from LDSTADR
    Indicates which of the entries need to be forwarded on to LSRES0.
LSFWD1[15:0] Input from LDSTADR
    Indicates which of the entries need to be forwarded on to LSRES1.
LSRES0[31:0], XLSRES0[31:0] Output to FUn/LOROB
    Load-store result bus. The store data is also driven on this bus. The DCACHE and LOROB monitor this bus for store data.
LSRES1[31:0], XLSRES1[31:0] Output to FUn/LOROB
    Load-store result bus. The store data is also driven on this bus. The DCACHE and LOROB look at this bus for store data.

LDSTADR (The array containing the load-store address)

This array of 16-entries contains the address for the load-store—The update sources for the array are the functional units. The functional units send the bits (14:0) on the RESLAn buses and the entire address on the RESnB buses. The array gets updated via the RESnB buses. The RESLA buses are much faster than the result buses and are used to send out the index for the data cache accesses as soon as possible. Also, the LSSEC determines bank conflicts and unaligned accesses. This again needs the LSBs of the address available to the LSSEC early.

This block also contains the logic for dependency checking against stores in the buffer and sending the forwarding signals to LDSTDAT.

TABLE 53

Signal List.

RESnB[31:0] Input from FUn n = 0, 1, . . ., 5
    The result buses from the functional units.
LATYPEn[1:0] Input from FUn n = 0, 1, . . ., 5
    The type signal indicating whether address or data is TABLE 53-continued Signal List.

driven on the bus
    00 - Null
    01 - address
    10 - data
LSUPD[15:0] Input from LDSTTAGS
    The update signals from the control unit.
LDPTR[3:0] Input from LSCTL
    The pointer from the control block indicating which entry has the latest load.
STPTR[3:0] Input from LSCTL
    The pointer from the control block indicating which entry has the latest store.
LSLINAD0[31:0] Output to Dcache/Stk Cache
    The address for access AC0.
LSLINAD1[31:0] Output to Dcache/Stk Cache
    The address for access AC1.
WRPTR[5:0] Input from LOROB
    This indicates the line that is about to be retired (bottom of LOROB). This information is needed for dependency checking.
XLIAD[63:0] Output to Physical Tags
    Whenever the LSSEC performs a data cache store, that information has to be sent to the physical tags. Both the address and data have to be driven on this bus.
LTAGENTn[5:0] Input from LDSTTAGS n = 0, 1, 2 . . . 15.
    These are the LOROB tags associated with each entry in the buffer. The LDSTADR block monitors this information for dependency checking.
ACTAG0[5:0] Input from LDSTTAGS
    This is the LOROB tag associated with access AC0.
ACTAG1[5:0] Input from LDSTTAGS
    This is the LOROB tag associated with access AC I.
5.0 LDSTSTAT (The array containing the control/status information)
    This array is also 16-entries deep and contains the control/status information of the loads and stores in the LSSEC. The update source for this array is the load-store section itself.

TABLE 54

Signal List.

SETVAL[15:0] Input from LSCTL
    Based on this the valid bit for the entry is reset.
RSTVAL[15:0] Input form LSCTL
    Based on this the valid bit for the entry is reset.
SETMISS[15:0] Input from LSCTL
    Based on this, the M bit for the entries in the array is set.
RSTMISS[15:0] Input from LSCTL
    Based on this, the M bit for the entries in the array is reset.
SETDEP[15:0] Input from LSCTL
    Set the D (dependent) bit.
RSTDEP[15:0] Input from LSCTL
    Reset the D (dependent) bit.
SETDV[15:01 Input from LSCTL
    Set the DV (data valid) bit.
RSTDV[15:0] Input from LSCTL
    Reset the data valid bit.
SETLV[15:0] Input from LSCTL
    Set the linear address valid bit.
RSTLV[15:0] Input from LSCTL
    Reset the linear address valid bit.
MISSLD[5:0] Output to LSCTL
    This gives the information to the LSCTL while prioritizing accesses.
MISSST[1:0] Output to LSCTL
    The Miss status bit look up for stores. The LSSEC needs to look at only the earliest two stores.
DEPLD[5:0] Output to LSCTL
DEPST[1:0] Output to LSCTL
VALLD[5:0] Output to LSCTL

TABLE 54-continued

Signal List.

VALST[1:0] Output to LSCTL
DVLD[5:0] Output to LSCTL
DVST[1:0] Output to LSCTL
LVLD[5:0] Output to LSCTL
LVST[1:0] Output to LSCTL
These signals are looked up by LSCTL for prioritizing accesses.

LDSTTAGS (Array containing the LOROB tags)

This 16-entry array contains the LOROB tags for the instructions in the LSSEC. The tags are looked up by the control unit during access prioritization. The tags in the entries are compared against the tags from the functional units when updating the address and data arrays. The tags information is also needed when performing dependency checking.

TABLE 55

Signal List.

ITYPEnB[1:0] Input from DECODE n = 0, 1 . . ., 5
    These buses give the type of instructions dispatched.
        00    NULL
        01    LOAD
        10    STORE
        11    LOAD-OP-STORE
RLINE[2:0] Input from LOROB
    These buses give the LOROB line number associated with the instructions dispatched.
RTAGnB[5:0] Input from FUn n = 0, 1, . . ., 5
    The tags from the functional units for the address and data they are generating.
LSUPD[15:0] Output to LDSTDAT and LDSTADR
    Update signals to update the address and data arrays.
LTAGENTn[15:0] Output to LDSTADR, LSCTL n = O, 15
    This information is sent to LDSTADR to perform dependency checking and to LSCTL to prioritize accesses.
LSTAG0B[5:01 Output to FNCU/LOROB
    This gives the tag of the instruction returned on LSRES0B.
LSTAG1B[5:0] Output to FNCU/LOROB
    This gives the tag of the instruction returned on LSRES1B.

LSCTL (The control block for LSSEC)

TABLE 56

Signal List.

LSRDDAT0[15:0] Output to LDSTDAT
    Indicates which of the entries must go out as AC0 for stores.
LSRDDAT1[15:0] Output to LDSTDAT
    Indicates which of the entries must go out as AC1 for stores.
LDPTR[3:0] Output to LDSTADR
    The pointer from the control block indicating which entry has the latest load.
STPTR[3:0] Output to LDSTADR
    The pointer from the control block indicating which entry has the latest store.
SETVAL[15:0] Output to LDSTSTAT
    Based on this the valid bit for the entry is reset.
RSTVAL[15:0] Output to LDSTSTAT
    Based on this the valid bit for the entry is reset.
SETMISS[15:0] Output to LDSTSTAT
    Based on this, the M bit for the entries in the array is set.

TABLE 56-continued

Signal List.

RSTMISS[15:0] Output to LDSTSTAT
    Based on this, the M bit for the entries in the array is reset.
SETDEP[15:0] Output to LDSTSTAT
    Set the D (dependent) bit.
RSTDEP[15:0] Output to LDSTSTAT
    Reset the D (dependent) bit.
SETDV[15:0] Output to LDSTSTAT
    Set the DV (data valid) bit.
RSTDV[15:0] Output to LDSTSTAT
    Reset the data valid bit.
SETLV[15:0] Output to LDSTSTAT
    Set the linear address valid bit.
RSTLV[15:0] Output to LDSTSTAT
    Reset the linear address valid bit.
MISSLD[5:0] Output to LDSTSTAT
    This gives the information to the LSCTL while prioritizing accesses. (Here, I am assuming that we can scan up to 6 loads in the buffer).
MISSST[1:0] Output to LDSTSTAT
    The Miss status bit look up for stores. The LSSEC needs to look at only the earliest two stores.
DEPLD[5:0] Input from LDSTSTAT
DEPST[1:0] Input from LDSTSTAT
VALLD[5:0] Input from LDSTSTAT
VALST[1:0] Input from LDSTSTAT
DVLD[5:0] Input from LDSTSTAT
DVST[1:0] Input from LDSTSTAT
LVLD[5:0] Input from LDSTSTAT
LVST[1:0] Input from LDSTSTAT
These signals are looked up by LSSEC for prioritizing accesses.
LTAGENTn[15:0] Input from LDSTTAGS n = 0, 1, . . ., 15
    This information is sent to LDSTADR to perform dependency checking and to LSCTL to prioritize accesses.

DESCRIPTION OF DATA CACHE

The data cache (herein referred to as the dcache) is a 32 KB/16 KB linearly addressed, 8-way set associative cache. In order to facilitate single cycle dcache access, a way prediction scheme is employed. The dcache size may be 32 KB. Additional features of the dcache are 8-way interleaving, two concurrent accesses per cycle if they are not to the same bank, random replacement policy and one cycle penalty for unaligned loads and unaligned stores.

Figure 60:
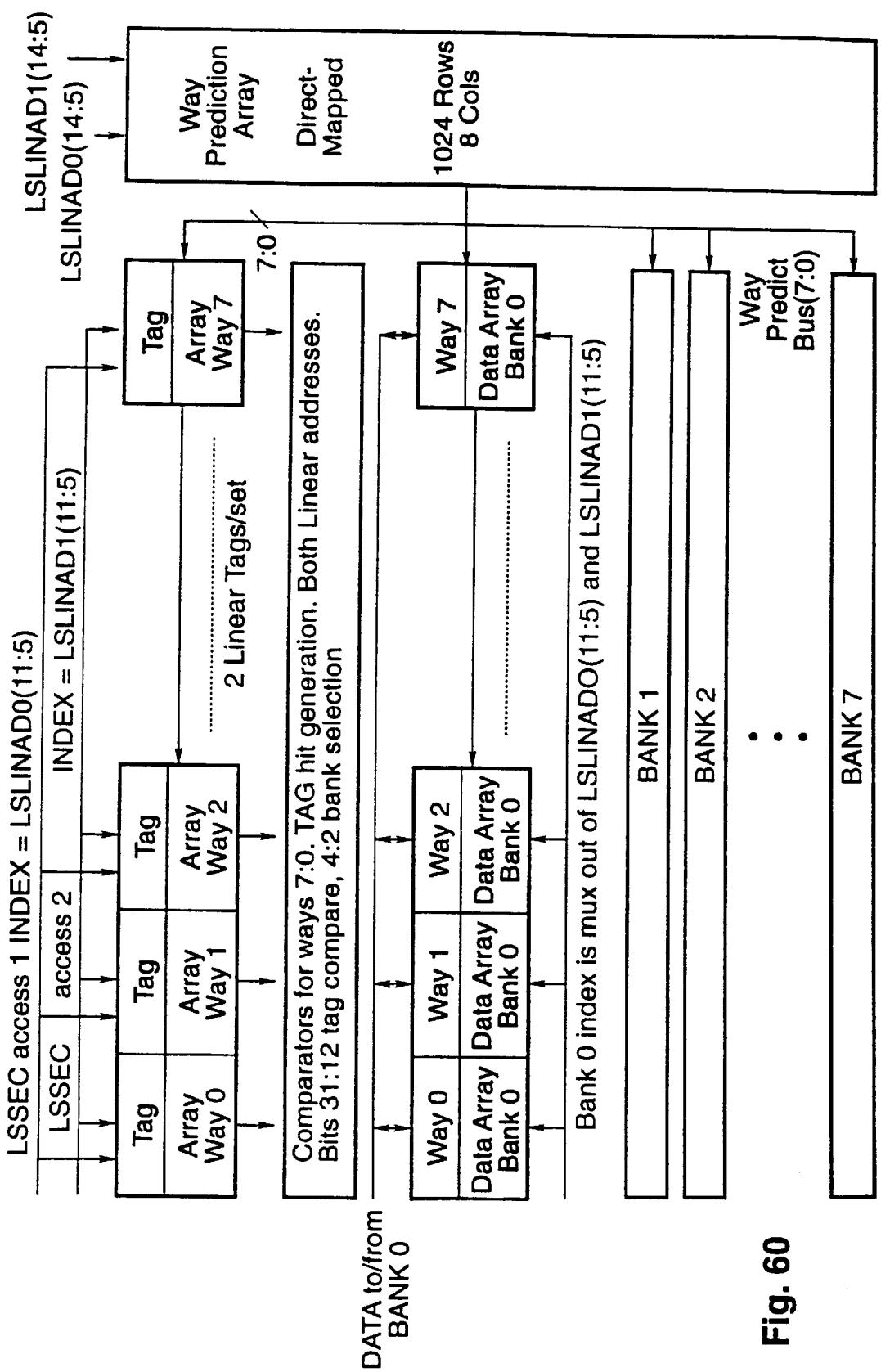

FIG. 60 is a block diagram of the data cache. The dcache is a 32 KB linearly addressed cache implementing the MESI protocol. The line size is 32 bytes and the arrays are organized in a 8-way set associative structure with 8 banks. The 8 banks allow two concurrent accesses per cycle as long as the two accesses are not to the same bank. Bits 4:2 of the two linear addresses are used for bank selection and identifying bank conflicts. Due to the interleaving, the data arrays are effective dual ported and do not need to be implemented as actual dual ported structures.

The dcache is partitioned into three functionally separate arrays. They are the tag array, data array and the way prediction array. The tag arrays are physically dual ported. Since a 32 KB dcache with a 32 byte line size is employed, we have 128 tags per way. Bits 11:5 of the linear address are used to index the tag array with bits 31:12 used for comparison to determine hit or miss.

The data arrays are organized as 8 set arrays in each of the 8 banks. In order to facilitate 8/16 bit accesses as well as unaligned accesses, the LSSEC /DCACHE generates byte enables for each of the two accesses. Bits 11:5 of the linear address are used to index the data arrays. The two ports that allow two concurrent accesses per clock cycle will henceforth be called Port A and Port B.

Way prediction allows the dcache to attain a direct mapped primary cache hit rate while using a set-associative cache array. It also allows a single cycle dcache access when the predicted way hits in the tag compare. If a hit occurs in any of the unpredicted ways then there is a one cycle penalty which would be equivalent to a replacement cache performance. However, unlike a replacement cache there is no swap penalty. All that needs to be done is update the way prediction array entry with the new predicted value. Bits 14:5 of the linear address are used to index the way prediction array. Like the tag array, the way prediction array is also dual ported. Details of the way prediction scheme are described below.

Tag Array

The tag array is organized into a 8-way set associative structure. It is dual ported so as to allow two concurrent accesses per cycle and is laid out as two 64 rows×200 column arrays.

Figure 61:
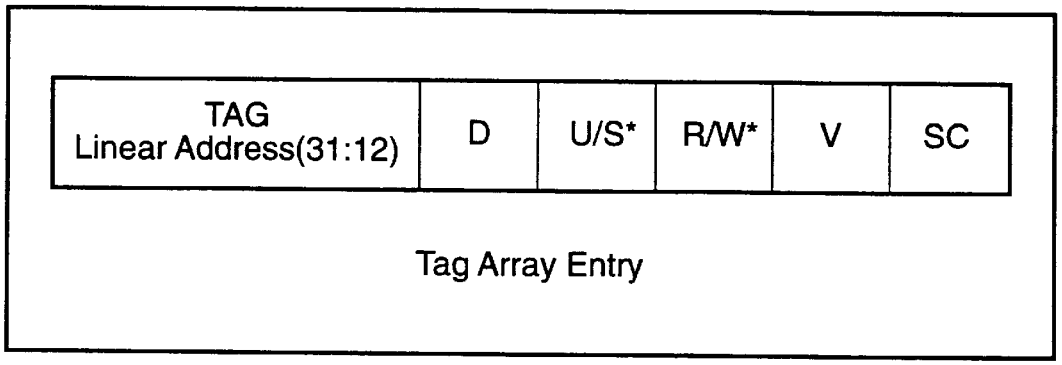

FIG. 61 is a block diagram of a tag array entry. A description of the various fields is as follows:

* Tag is bits (31:12) of the linear address.
* D is the dirty bit that indicates that the line has been previously modified. This information is used during a store when the TLB is accessed to determine whether the corresponding dirty bit in the page table entry is correctly set. If the dirty bit in the page table entry is not set then an exception must occur to write the dirty bit in the external page table entries so that the page gets written back to external memory.
  U/S* is the user/supervisor bit that indicates the access privilege of the dcache line. If this bit is 0 then user level programs cannot access this dcache entry. Supervisor can access any line regardless of this bit.
  R/W* indicates the read/write privilege for user level programs. Supervisor level programs ignore this bit when the WP bit in CR0 register is 0. If the WP bit is set to1 then supervisor level programs will use the R/W* bit. The dcache will do the protection checking and send an exception to the LSSEC if a violation occurs.
  V is the linear valid bit. This bit is 0 on reset and is set to 1 when a new line gets loaded into the dcache. This bit is also reset to 0 on invalidation.
  SC when set to 1 denotes that the line is also present in the stack cache. This bit is set when the line is transferred to the stack cache from the dcache and reset when the line is transferred to the dcache from stack cache.

The tag and the protection bits (D, U/S* and R/W*) will always be accessed together. The V bit can be accessed independently for invalidations and resets. The SC bit can be accessed independently during dcache line transfers to and from the stack cache.

Data Array

The data array is effective dual ported due to interleaving. Each bank will be physically laid out as two 64 rows×256 column arrays. The speed target for processor 500 does not allow a contiguous array larger than 64 rows. During a clock cycle, at most two banks can be accessed. The banks are selected based on the bank select bits 4:2 of the port addresses. The data array is byte addressable via the use of byte enables. Two sets of byte enables are generated per clock corresponding to the two banks being accessed. The byte enables are generated using the operand size information as well as bits 1:0 of the linear address. The byte enables are critical to doing stores in a single cycle for aligned accesses since stores are done as pure writes instead of the read-modify-writes. Unaligned accesses and 8/16 bit accesses use byte enable information in the same fashion as well.

Way Prediction Array

Figure 62:
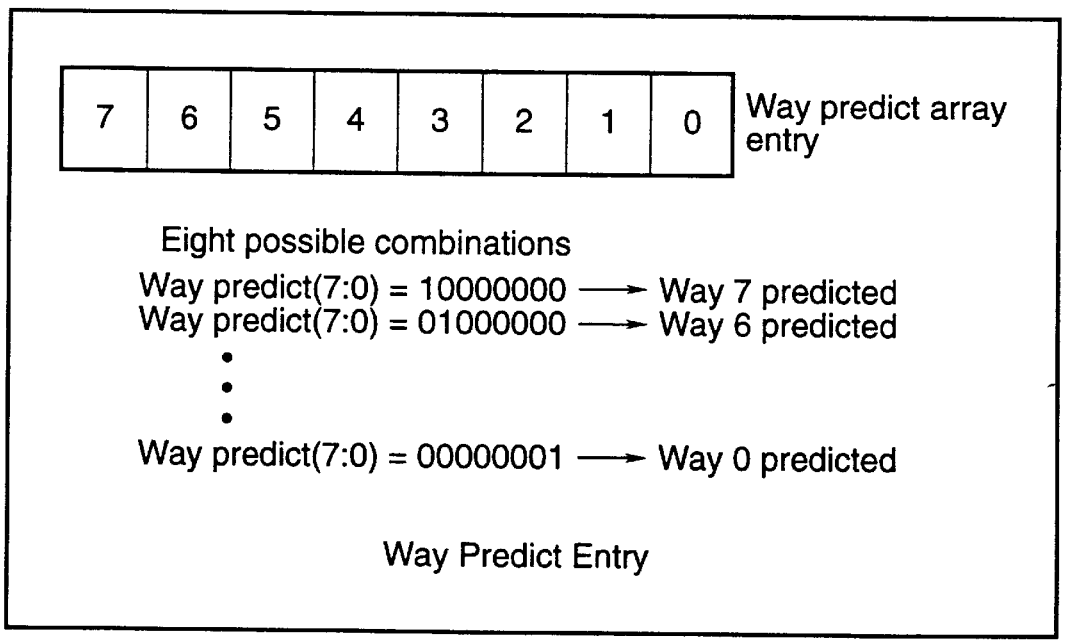

The way prediction array is a 1024 rows×8 columns direct mapped cache that is physically organized into eight 128×8 arrays. Each column corresponds to one of the eight ways of the data and tag arrays. FIG. 62 is a block diagram of a way prediction entry. The way predict array is implemented as a dual ported array to allow two concurrent accesses per cycle. It is indexed by bits 14:5 of the port A and B linear addresses. Note that unlike the data and tag array, the index is 10 bits wide. Therefore, for each tag/data array index, there are 8 possible indexes in the way predict array (provided by extra index bits 14:12).

It is noted that single cycle dcache access is possible for the predicted way. This will be understood from the following sections which describe the actions taken during loads and stores.

Aligned Loads

There are two cases to be considered for aligned loads: (a) 32 bit aligned loads and (b) 8/16 bit aligned loads. FIG. 62 shows a block diagram of hardware for performing for performing aligned loads for both these cases.

Figure 63:
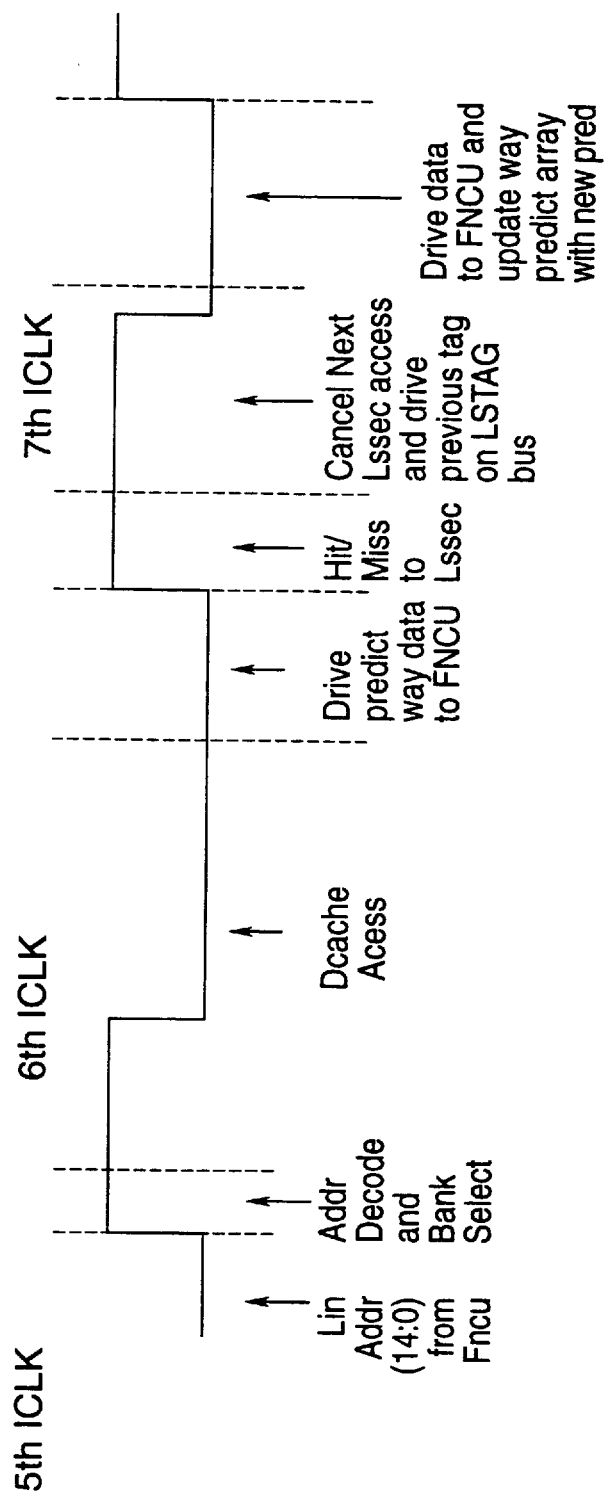
Figure 64:
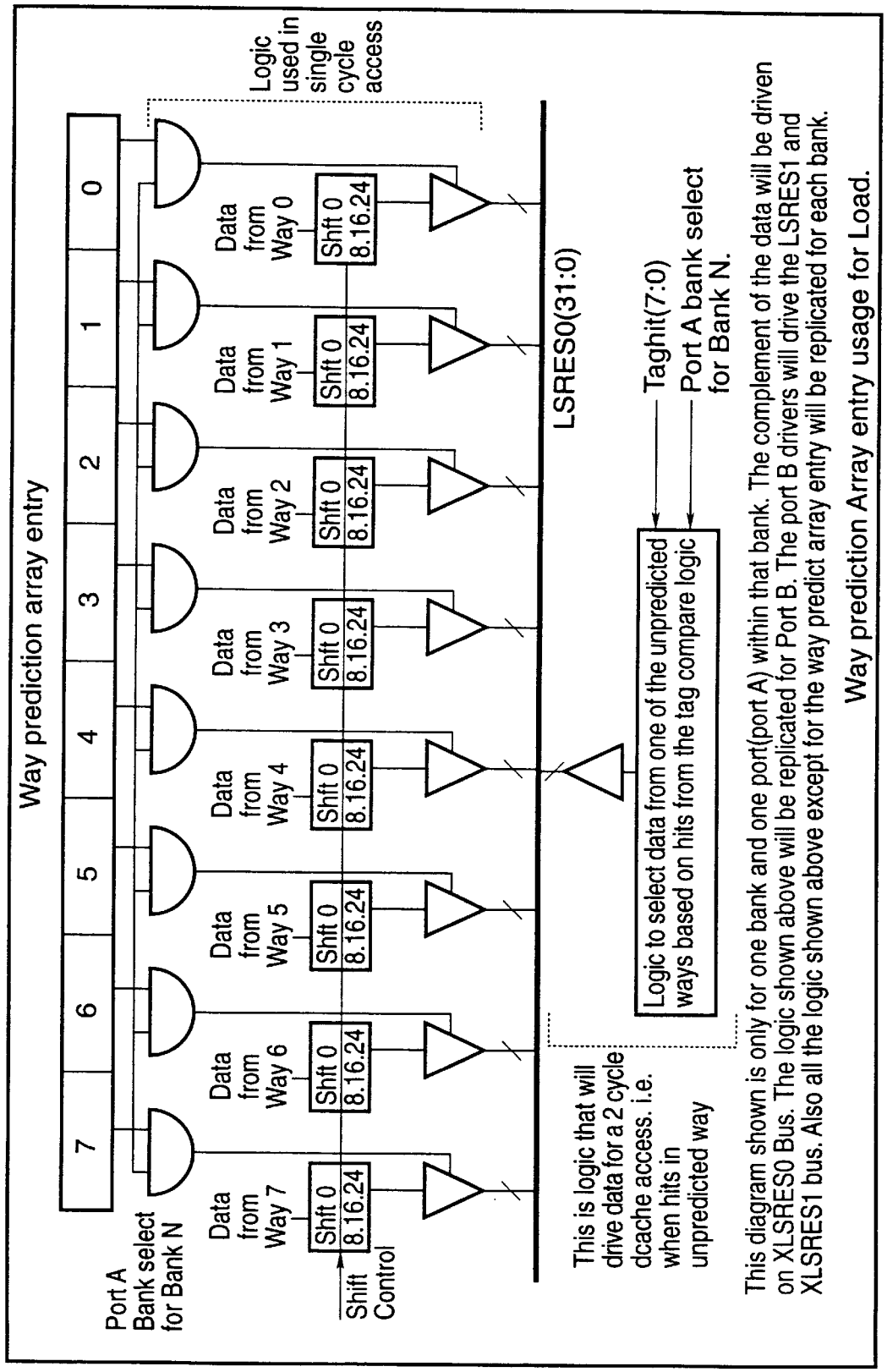

FIG. 63 is a timing diagram for dcache load accesses, and FIG. 64 is a block diagram showing way prediction array entry usage for loads. For the 32 bit loads, the data from the predicted way will be driven on the LSRESn (n=0 or 1) and XLSRESn buses differentially towards the end of the 6th ICLK if the SC bit in the tag array is not set. If this bit were set, the dcache would not drive the data since the updated copy of the data would be in the stack cache which would drive the bus. The appropriate functional unit will latch this data at the beginning of the 7th ICLK and use it. The dcache will meanwhile compute the hit/miss indication for all the 8 ways and send an indication to the functional unit and LSSEC. If there was a hit in the predicted way, then we have single cycle dcache access. If there was a miss on the predicted way, the LSSEC will cancel the next access that it had initiated on that port and drive the previous tag again on the LSTAGn bus. The functional unit will then cancel the operation and wait for data to be driven to it on the next ICLK if there was a hit in one of the unpredicted ways. The data from one of the unpredicted ways will be driven to the functional unit during the 7th ICLK and will be latched at the beginning of the 8th ICLK. Therefore, there will be a one cycle penalty when there is a miss in the predicted way and a hit in one of the unpredicted ways. In addition, the way prediction array would be updated with the new prediction.

For the 8/16 bit aligned loads (i.e., the 16 bit data is contained within one doubleword), the flow is similar except that there is a small amount of shift logic before the bus driver. This logic is present for the 32 bit loads also, but it is always a shift by 0. This shift logic may be implemented using transmission gate multiplexers. For the 8 bit data, we can have either a shift by 0, 8, 16 or 24. For 16 bit data, it is a shift by 0, 8 or 16. The shift will be determined by the operand size information and bits 1:0 of the port linear address. Both of these controls should be known at the beginning of the 6th ICLK and the multiplexers can be setup before the data is available. If there is a miss on all the ways, the LSSEC will wait until the access is no longer speculative and then initiate a reload through the L2.

Aligned Stores

Stores are accomplished as pure writes and not read-modify-writes. The dcache supports byte write capability which allows pure writes. The byte enables used to do this are generated based on the operand size and bits 1:0 of the port linear address. The dcache will support single cycle accesses for stores if the store is to the predicted way.

Figure 65:
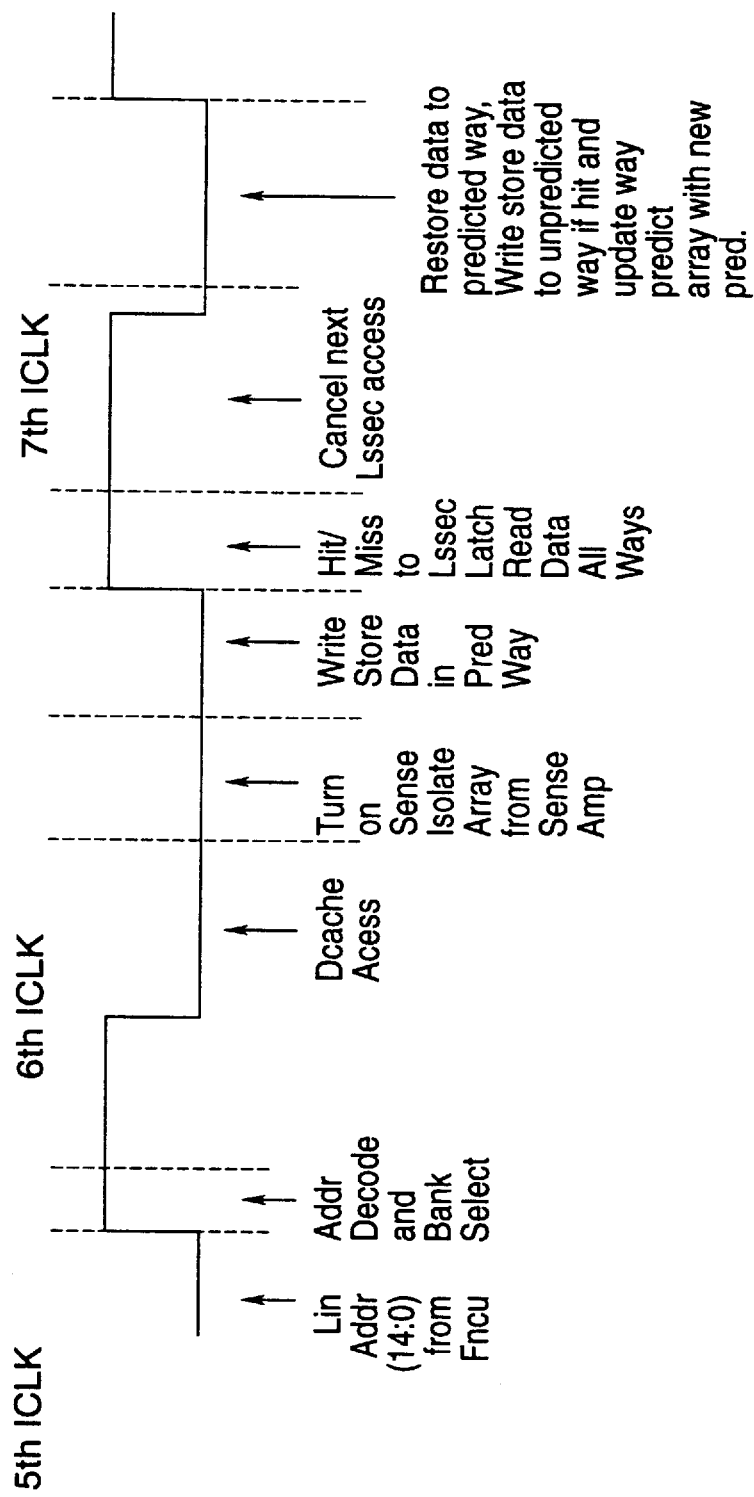

FIG. 65 is a timing diagram for dcache store accesses. The sequence of the actions until the dcache access are similar for both the load and store accesses. When the sense amps are turned on, the arrays are isolated from the senseamp to prevent the bit lines from being pulled down. Therefore, the senseamp provides an automatic latch structure to hold the read data. At this time, the write strobe is turned on thereby writing the store data speculatively into the predicted way. At the beginning of the 7th ICLK, the hit/miss indications are generated. If there was a hit to the predicted way, then a single cycle dcache store access has occurred. If there was a miss in the predicted way but a hit in one of the unpredicted ways, then in the 7th ICLK the store data is written into the way that hit and also the predicted way is restored with the data that was read out in the 6th ICLK. In addition, the way prediction array is updated with the new prediction. For 8/16 bit stores, these actions still occur except that depending on the byte enables that are active, only those bytes will be updated with the new store data.

Unaligned Loads

Figure 66:
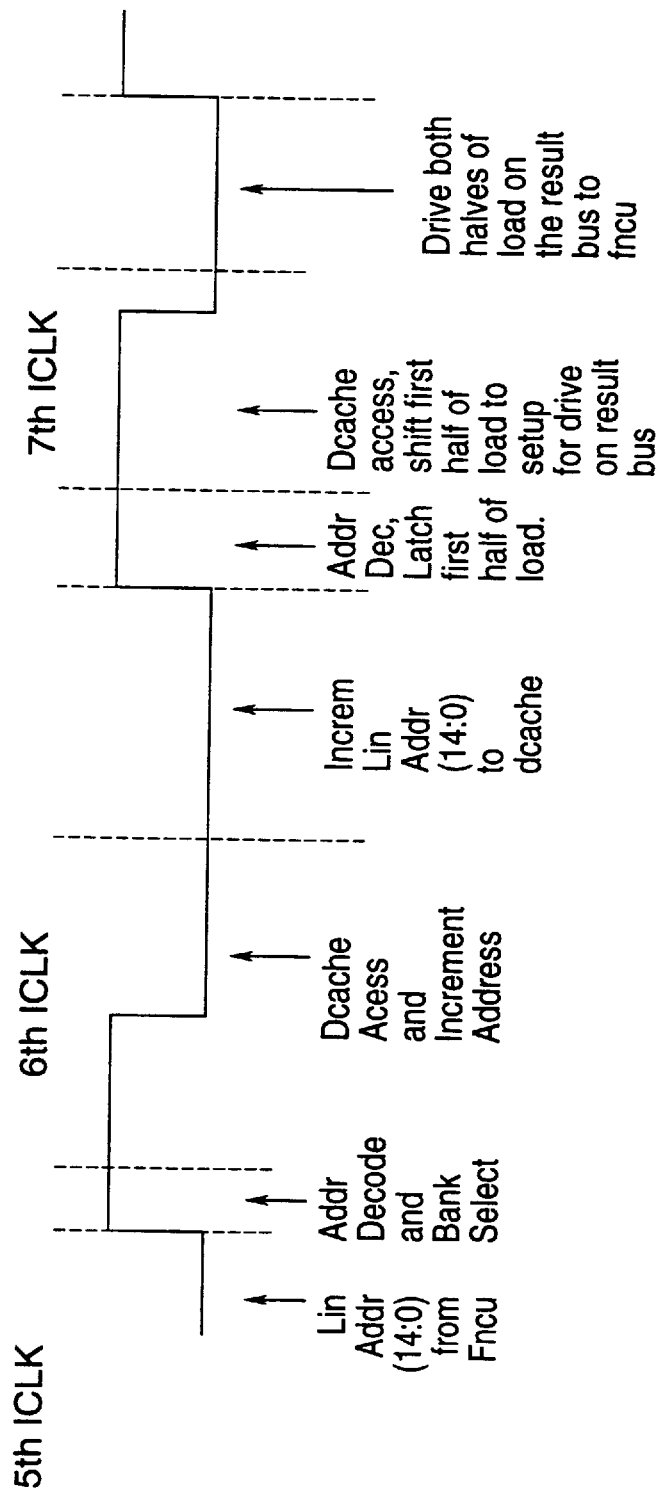

FIG. 66 is a timing diagram for unaligned load accesses. Unaligned loads have a dual cycle dcache access. In the 6th ICLK, the LSSEC will access the dcache with the current address. During this time, the LSSEC will also increment the address by 4 to set up for the second half of the unaligned access. The dcache will latch the first half of the unaligned load at the beginning of the 7th ICLK and do the shift necessary to set up the data to drive on the appropriate bits of the LSRESN and XLSRESN buses. During the 7th ICLK the dcache will read the second half of the unaligned load. The actions taken will be similar for a 8/16 bit aligned load. The two halves of the data will be driven on the LSRESN and XLSRESN buses at the end of the 7th ICLK. It is noted that in this process, the byte enables are used to select the appropriate bytes from the two doublewords that have been read out. If there is a miss on the second half of the unaligned load, the first half of the unaligned load that has been read out will be discarded. The LSSEC will then initiate a reload through the L2.

Unaligned Stores

Figure 67:
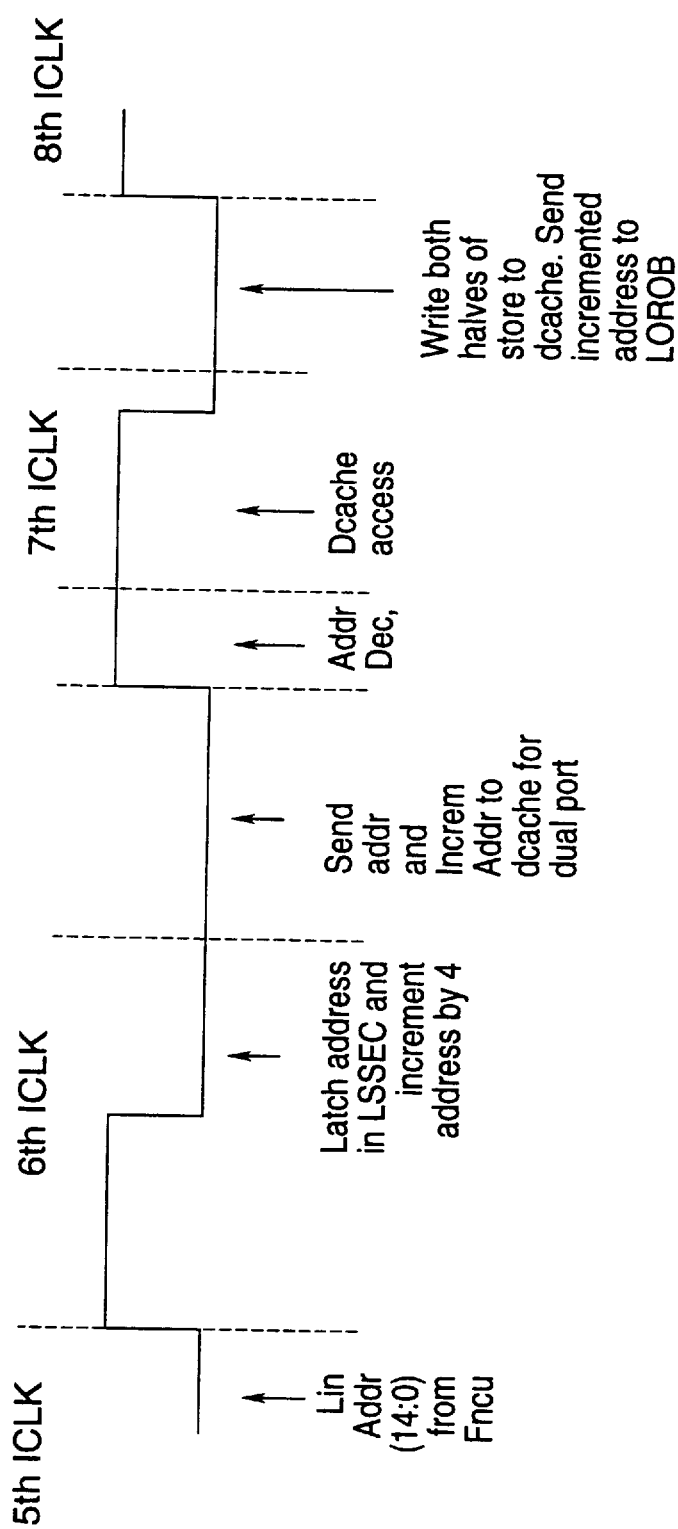

FIG. 67 is a timing diagram for unaligned store accesses. Unaligned stores are executed in a slightly different fashion from unaligned loads. For unaligned stores, the incremented address is generated in the 6th ICLK. In the 7th ICLK, port A is accessed with the original address and port B is accessed with the incremented address. The byte enables for both the ports are used to write only the appropriate bytes of the two doublewords. If there is a miss on any one of the ports, the old data that is read out on the other port can be restored in the next cycle. The LSSEC can initiate a reload through the L2 and reissue the store only after the reload is complete. In order for dependency checking and retiring in the LOROB, the LSSEC must send the incremented address on the LSLINAD0 bus during the 8th ICLK. Therefore, an unaligned store will take 3 cycles compared to 2 cycles for unaligned loads.

Dcache Line fills on Misses

On either a load miss or a store miss, the LSSEC will wait until the dcache access is no longer speculative. The LSSEC will then request the L2 to perform an external access (cache line Fill via asserting XKEN). The L2 will initiate the bus cycle and fetch the line in four packets of 64 bits each (external data bus=64 bits). The L2 can transfer each packet to the dcache as soon as it is received on the IAD bus. The dcache will latch each packet into a 256 bit buffer(BUF1). The L2 will also select the way in the dcache to be replaced and send that selection to the dcache along with the last packet. After all 4 packets have been received, the dcache/LSSEC will initiate the line swap. The dcache will read the line to be replaced into a 256 bit buffer(BUF2) and write the line in BUF1 into that way. This swap can be done in one cycle. The dcache will also update the tag and way predict arrays. The way into which the new line was put will be the new way prediction for that index. If the line that was replaced was dirty, the L2 will request the dcache to send that line from BUF2 and will then initiate an external write cycle.

The replacement policy may be random. However, it will have to prevent lines that are in the dcache as well as in the stack cache from being replaced. One way this may be achived is to store the SC bit that exists in the dcache tag arrays in the physical data tag arrays in the L2 as well. This is in addition to the Valid (V) bit that is also replicated in both of these arrays. The L2 can then use the V and SC bits in its implementation of its "pseudo-random" replacement policy.

Line Transfers between Dcache and Stack Cache

FIG. 68 is a timing diagram for DC/SC line transfers. The DC/SC line transfers are initiated by the stack cache(SC) whenever there is a SC miss.

If there is a line that can be replaced in the stack cache, the stack cache will initiate a line transfer. In the first cycle, the SC will send the new tag and replacement tag on the lower 64 bits of the DCSCSWAP bus to the dcache. In addition, the SC will read the replaced line into a buffer (BUF3). In the second cycle, the dcache access begins. The SC also sends the lower 16 bytes of the replaced line to the dcache on the DCSCSWAP bus. The dcache will latch these bytes into the lower 16 bytes of BUF1 at the beginning of the third cycle. In the third cycle, the dcache will select the line to be sent to SC based on tag hit. The lower 16 bytes of this line will be driven on the DCSCSWAP bus to the SC. In the fourth cycle, the selected line from dcache is latched into BUF2. The SC latches the lower 16 bytes of the new line into BUF4. The dcache also drives the upper 16 bytes of the new line to the SC. In the fifth cycle, the SC updates the new line. It also sends the upper 16 bytes of the line in BUF3 to the dcache. The dcache will then towards the end of the fifth cycle, write the line sent from the SC into the way that contained the replacement line.

TABLE 57

Signal List.

LSRES0(31:0): Input/Output. Connects to LSSEC/Stk Cache/FNCU/LOROB.
    This is the true portion of the LSSEC/dcache port A access result bus. Driving buses is a major task and it has been determined that for speed reasons this bus in conjunction with XLSRES0(31:0) will be a differential bus. Data is output from dcache on this bus during loads. Data is input on this bus to dcache during stores.
XLSRES0(31:0): Input/Output. Connects to LSSEC/Stk Cache/FNCU/LOROB.
    This is the false portion of the LSSEC/dcache port A access result bus. As stated above, the XLSRES0 bus is part of a differential bus.
LSRES1(31:0): Input/Output. Connects to LSSEC/Stk Cache/FNCU/LOROB.
    This is the true portion of the LSSEC/dcache port B access result bus. Driving buses is a major task and it has been determined that for speed reasons this bus in conjunction with XLSRES1(31:0) will be a differential bus. Data is output from dcache on this bus during loads. Data is input on this bus to dcache during stores.
XLSRES1(31:0): Input/Output. Connects to LSSEC/Stk Cache/FNCU/LOROB.

TABLE 57-continued

Signal List.

This is the false portion of the LSSEC/dcache port B access result bus. As stated above. the XLSRES1 bus is part of a differential bus.

LSLINAD0(31:2): Input. Connects to LSSEC/Stk Cache/LOROB
    This bus carries the dcache/stk cache port A linear address. In addition to having the port A linear address for loads/stores, this bus will also carry the linear address when a reload from the L2 is ready to be done. i.e. the new line from L2 has been read into the 256 bit buffer (BUF1) that exists in the dcache and it is ready to be put in place of the replaced line.

LSLINAD1(31:2): Input. Connects to LSSEC/Stk Cache/LOROB
    This bus carries the dcache/stk cache port B linear address.

DCBNKCT: Input. Output from LSSEC
    This signal indicates that there will be a bank conflict for the two dcache accesses. A bank conflict is generated if bits 4:2 of the two linear addresses match. If this signal is asserted, the dcache will cancel the port B access and execute only the port A access. The LSSEC will issue the port B access on a subsequent clock.

DCINDXCT: Input. Output from LSSEC
    This signal indicates an index conflict for the two dcache accesses. An index conflict is generated if bits 11:5 of the two linear addresses match. This signal will be used to read only one port of the dual ported tag arrays. As long as there is no bank conflict, this signal will not cause any serialization of dcache accesses.

DCWYPRCT: Input. Output from LSSEC
    This signal indicates an index conflict for the way prediction array in dcache. Note that the index for this array is bits 14:5 of the linear address. This signal will be used to fire only one port of the way predict array.

PABYTEN(3:0): Input. Output from LSSEC
    These are the byte enables for the dcache port A access. They will be used in unaligned accesses and 8/16 bit accesses.

PBBYTEN(3:0): Input. Output from LSSEC
    These are the byte enables for the dcache port B access. They will be used in unaligned accesses and 8/16 bit accesses.

LSRELOAD: Input. Output from LSSEC
    This signal indicates to the DCACHE that the new line from the L2 is available to do a reload. The LSSEC sends this request during external reloads from L2. The dcache will then on port A read all 8 banks into a buffer (BUF2) and write contents of another buffer (BUF1) into the selected way.

IAD(63:0): Input/Output. Connects to LSSEC/L2
    This is a bidirectional bus between the L2, LSSEC and the dcache. This bus is used to send data during stores to the dcache from LSSEC, sends the linear address to the L2 from LSSEC to check for aliases as well as for initiating external reloads and to send the new line from the L2 to the dcache. When the L2 reports an alias, the new tag is also sent on the IAD bus.

L2_REPCOL(2:0): Input. Output from L2
    This bus selects the way to be replaced during an external reload cycle. Note that the pseudo-random replacement strategy will be implemented in the L2.

DCPAPRHIT: Output. Connects to LSSEC/Fncu
    This signal indicates to the functional units and the LSSEC that there was a hit on the port A predicted way. Single cycle dcache access is achieved on port A when this signal is active.

DCPBPRHIT: Output. Connects to LSSEC/Fncu
    This signal indicates to the functional units and the LSSEC that there was a hit on the port B predicted way. Single cycle dcache access is achieved on port B when this signal is active.

DCPAHIT: Output. Connects to LSSEC/Fncu
    This signal indicates to the functional units and the LSSEC that there was a hit in one of the port A unpredicted ways. Two cycle dcache access is achieved on port A when this signal is active.

DCPBHIT: Output. Connects to LSSEC/Fncu
    This signal indicates to the functional units and the LSSEC that there was a hit in one of the port B unpredicted ways. Two cycle dcache access is achieved on port B when this signal is active.

DCSCSWAP(127:0): Input/Output. Connects to Stk Cache
    This is the bus used to do Dcache/Stk Cache Line transfers.

INITSWAP: Input. Connects to LOROB/Stk Cache/LSSEC
    This signal will start the sequence of actions that the dcache and stack cache need to execute to complete a line swap. Two sequencers may be employed in the dcache and stack cache that generate the control signals internal to each block to complete the swap.

DCBUSY: Output. Connects to LSSEC/Fncu
    This signal is asserted to inform the LSSEC that the dcache is busy doing a dcache/stk cache line transfer. The LSSEC must not send any dcache accesses as long as this signal is active.

IRESET: Input.
    This is the global internal reset signal. AU entries in the dcache must be invalidated on assertion of IRESET.

PAGE_PROT(2:0): Input. Connects to L2
    These are the page protection bits (D, U/S*, R/W*) that are sent by the TLB on dcache misses. They will be written into the tag array in the event of an alias.

CURCPL(1:0): Input. Connects to LSSEC
    This the Current Privilege level information. It is used for Protection checking by the dcache.

DCLSPROK(1:0): Output. Connects to LSSEC
    Indicates a protection violation during a dcache access. DCLSPROK(0) corresponds to port A and DCLSPROK(1) corresponds to port B.

L2_DC_INV: Input. Connects to L2
    This signal is used to invalidate a dcache line.

CROWP: Input. Output of LSSEC/SRB
    This the WP bit in the CR0 special register. This bit is used with the page protection bits to determine protection violations.

Changes if 16 KB dcache is implemented

Several changes may be made if a 16 KB dcache is implemented. The changes are mainly to the physical organization of the three arrays that constitute the dcache and their addressing bits. The functionality supported may be the same regardless of the dcache size. The changes to the tag array may be as follows:

(a) There will be 64 tags per way instead of 128.

(b) The index is bits 10:5 of the linear address and not bits 11:5.

(c) The tag is bits 31:11 of the linear address and not bits 31:12.

(d) The tag array will be laid out as one 64 rows×208 column array.

(e) A tag array entry per set consists of 26 bits and not 25 bits since the tag is bigger by 1 bit.

The changes to the data array are as follows:

(a) Each bank in the data array will be laid out as one 64 rows×256 column array instead of two.

(b) The index is bits 10:5 of the linear address instead of bits 11:5.

The changes to the way prediction array are as follows:

(a) The index is bits 13:5 of the linear address instead of bits 14:5.

(b) The way prediction array is now a 512 rows×8 columns direct mapped cache.

(c) The array will be laid out as four 128 rows×8 columns arrays.

In accordance with the above disclosure, a mechanism for branch misprediction recovery and load/store ordering has been described. The branch misprediction recovery mechanism requires a clock cycle to complete once the misprediction is discovered, allowing for high performance by minimizing the number of idle clock cycles due to branch misprediction. The load/store ordering mechanism allows for load/store ordering with a minimal amount of handshaking between units. The minimal handshaking lowers the number of interface signals and simplifies the design of the superscalar microprocessor.

Numerous variations and modifications will become apparent to those skilled in the art once the above disclosure is fully appreciated. It is intended that the following claims be interpreted to embrace all such variations and modifications.

What is claimed is:

1. A superscalar microprocessor comprising a plurality of functional units wherein each of said plurality of functional units is configured to execute instructions, and wherein at least one of said plurality of functional units is further configured to execute branch instructions, and wherein each of said plurality of functional units is configured to receive a pointer configured to identify an oldest outstanding branch instruction, and wherein said each one of said plurality of functional units is further configured to generate a corrected fetch address at a time when said branch instruction being executed by said one of said functional units is mispredicted, and wherein said each one of said plurality of functional units is configured to convey said corrected fetch address responsive to said pointer identifying said branch instruction being executed by said one of said functional units.

2. The superscalar microprocessor as recited in claim 1 wherein said pointer is common to each of said plurality of functional units.

3. The superscalar microprocessor as recited in claim 2 wherein said plurality of functional units are configured to execute a plurality of branch instructions in a clock cycle, and wherein each of said plurality of branch instructions are executed in a separate one of said plurality of functional units.

4. The superscalar microprocessor as recited in claim 1 further comprising a reorder buffer coupled to said functional units wherein said reorder buffer is configured to generate said pointer.

5. The superscalar microprocessor as recited in claim 4 wherein said pointer conveys a reorder buffer tag.

6. The superscalar microprocessor as recited in claim 5 wherein each one of said plurality of functional units are further configured with a reorder buffer tag associated with said instruction being executed by said one of said plurality of functional units, and wherein each one of said plurality of functional units are further configured to compare said reorder buffer tag associated with said instruction being executed by said one of said plurality of functional units to said reorder buffer tag conveyed on said pointer.

7. The superscalar microprocessor as recited in claim 6 wherein each one of said plurality of functional units are further configured to convey said corrected fetch address at a time when said reorder buffer tag associated with said instruction being executed by said one of said plurality of functional units compares equal to said reorder buffer tag conveyed on said pointer.

8. The superscalar microprocessor as recited in claim 7 wherein each one of said plurality of functional units are further configured to convey said corrected fetch address at a time when the instruction being executed by said one of said plurality of functional units is a mispredicted branch.

9. The superscalar microprocessor as recited in claim 4 wherein each one of said plurality of functional units is configured to signal said reorder buffer during a clock cycle in which a branch instruction being executed by said one of said plurality of functional units is determined to be correctly predicted.

10. The superscalar microprocessor as recited in claim 9 wherein said plurality of functional units are further configured to employ a priority system to determine which one of said plurality of functional units conveys said corrected fetch address, wherein said priority system comprises a first of said plurality of functional units as highest priority, and wherein said priority system further comprises a second of said plurality of functional units as second highest priority.

11. A superscalar microprocessor comprising:

a plurality of functional units wherein each of said plurality of functional units is configured to execute instructions, and wherein at least one of said plurality of functional units is further configured to execute branch instructions, and wherein each of said plurality of functional units is configured to receive a pointer capable of identifying an oldest outstanding instruction, and wherein each one of said plurality of functional units is further configured to convey a corrected fetch address during a clock cycle in which a mispredicted branch is being executed by said one of said plurality of functional units and said pointer identifies said branch instruction;

a load/store unit coupled to said functional units wherein said load/store unit is configured to execute load and store instructions wherein said load/store unit is further configured to receive said pointer; and a reorder buffer coupled to said load/store unit and said plurality of functional units wherein said reorder buffer is configured to generate said pointer.

12. The superscalar microprocessor as recited in claim 11 wherein said pointer is configured to identify a branch instruction.

13. The superscalar microprocessor as recited in claim 11 wherein said pointer is configured to identify an instruction which is not in condition for retirement.

14. The superscalar microprocessor as recited in claim 11 further comprising a data cache coupled to said load/store unit wherein said load/store unit is further configured to store a datum associated with a store instruction into said data cache during a clock cycle in which said pointer identifies said store instruction.

15. The superscalar microprocessor as recited in claim 11 further comprising a data cache coupled to said load/store unit wherein said load/store unit is further configured to cause a memory location to be transferred into said data cache, and wherein said memory location is associated with a load instruction which misses said data cache, and wherein said memory location is caused to be transferred during a clock cycle in which said pointer identifies said load instruction.

16. The superscalar microprocessor as recited in claim 11 wherein said reorder buffer is further configured with a plurality of pointers.

17. The superscalar microprocessor as recited in claim 11 further comprising a data cache coupled to said load/store unit wherein said load/store unit is further configured to signal said reorder buffer during clock cycles in which said load/store unit executes a load instruction which hits in said data cache.

18. The superscalar microprocessor as recited in claim 11 wherein each one of said plurality of functional units is further configured to signal said reorder buffer during clock cycles in which said one of said plurality of functional units is executing a correctly predicted branch.

19. A method of operating a superscalar microprocessor comprising:

executing a plurality of instructions in a plurality of functional units, wherein at least one of said plurality of functional units is configured to execute branch instructions;

generating a pointer within a reorder buffer, wherein said pointer is configured to identify an oldest outstanding branch instruction; and comparing said pointer with a reorder buffer tag associated with each instruction being executed by each of said plurality of functional units.

20. The method as recited in claim 19 further comprising conveying a corrected fetch address to a branch prediction unit from a particular functional unit if said reorder buffer tag associated with said particular functional unit matches said pointer.

21. A functional unit coupled to receive a reorder buffer tag identifying an oldest outstanding branch instruction, said functional unit configured to execute a branch instruction and configured to convey a corrected fetch address to a branch prediction unit, wherein said corrected fetch address is generated by detecting that said branch instruction is mispredicted, and wherein said functional unit is configured to convey said corrected fetch address in response to determining that said branch instruction is said oldest outstanding branch instruction.

22. The functional unit as recited in claim 21 wherein said functional unit is configured to inhibit conveyance of said corrected fetch address to said branch prediction unit in response to determining that said branch instruction is not said oldest outstanding branch instruction.

* * * * *